(12) United States Patent
Hadjivassiliou et al.

(10) Patent No.: US 12,545,740 B2
(45) Date of Patent: Feb. 10, 2026

(54) ENGINEERING OF AN ANTIBODY FOR TUMOR-SELECTIVE BINDING OF CD47

(71) Applicant: CELGENE CORPORATION, Summit, NJ (US)

(72) Inventors: Haralambos Hadjivassiliou, Summit, NJ (US); Dan Zhu, Summit, NJ (US); Jeonghoon Sun, Summit, NJ (US); Sharmistha Acharya, Summit, NJ (US); Jeffrey Johnson, Summit, NJ (US); Kandasamy Hariharan, Summit, NJ (US); Ho Cho, Summit, NJ (US)

(73) Assignee: CELGENE CORPORATION, Summit, NJ (US)

( * ) Notice: Subject to any disclaimer, the term of this patent is extended or adjusted under 35 U.S.C. 154(b) by 1073 days.

(21) Appl. No.: 17/594,134

(22) PCT Filed: Apr. 3, 2020

(86) PCT No.: PCT/US2020/026579
§ 371 (c)(1),
(2) Date: Oct. 4, 2021

(87) PCT Pub. No.: WO2020/206255
PCT Pub. Date: Oct. 8, 2020

(65) Prior Publication Data
US 2022/0162330 A1 May 26, 2022

Related U.S. Application Data

(60) Provisional application No. 62/830,335, filed on Apr. 5, 2019.

(51) Int. Cl.
*C07K 16/28* (2006.01)
*A61K 39/00* (2006.01)
*A61P 35/00* (2006.01)

(52) U.S. Cl.
CPC .......... *C07K 16/2887* (2013.01); *A61P 35/00* (2018.01); *C07K 16/2803* (2013.01); *C07K 16/2863* (2013.01); *A61K 2039/505* (2013.01); *C07K 2317/21* (2013.01); *C07K 2317/24* (2013.01); *C07K 2317/31* (2013.01); *C07K 2317/33* (2013.01); *C07K 2317/34* (2013.01); *C07K 2317/55* (2013.01); *C07K 2317/565* (2013.01); *C07K 2317/732* (2013.01); *C07K 2317/734* (2013.01); *C07K 2317/76* (2013.01); *C07K 2317/92* (2013.01)

(58) Field of Classification Search
CPC ............ C07K 16/2887; C07K 16/2803; C07K 16/2863; C07K 2317/21; C07K 2317/24; C07K 2317/31; C07K 2317/33; C07K 2317/34; C07K 2317/55; C07K 2317/565; C07K 2317/732; C07K 2317/734; C07K 2317/76; C07K 2317/92; C07K 2317/73; C07K 2317/90; A61P 35/00; A61P 35/02; A61K 2039/505

See application file for complete search history.

(56) References Cited

U.S. PATENT DOCUMENTS

| | | |
|---|---|---|
| 2016/0177276 A1 | 6/2016 | Lo et al. |
| 2018/0201677 A1 | 7/2018 | Grosveld et al. |
| 2018/0291115 A1 | 10/2018 | Masternak et al. |
| 2019/0048075 A1 | 2/2019 | Weissman et al. |

FOREIGN PATENT DOCUMENTS

| | | | |
|---|---|---|---|
| CA | 3 078 413 | A1 | 4/2019 |
| CN | 108864290 | A | 5/2018 |
| CN | 110885376 | A | 3/2020 |
| JP | 2017-525698 | A | 9/2017 |
| JP | 2018500017 | A | 1/2018 |
| TW | 202104260 | A | 2/2021 |
| WO | 2011-034969 | A1 | 3/2011 |
| WO | 2013/119714 | A1 | 5/2013 |
| WO | 2014/123580 | A1 | 8/2014 |
| WO | 2016022971 | A1 | 2/2016 |
| WO | 2016/109415 | A1 | 7/2016 |
| WO | 2014/054804 | A1 | 8/2016 |
| WO | 2014/104165 | A1 | 1/2017 |
| WO | 2017121771 | A1 | 7/2017 |
| WO | 2018/009499 | A1 | 1/2018 |
| WO | 2018/035084 | A1 | 2/2018 |
| WO | 2018/183182 | A1 | 10/2018 |
| WO | 2018/155611 | A1 | 12/2019 |

OTHER PUBLICATIONS

J Mol Biol. Nov. 14, 2003;334(1):103-18. doi: 10.1016/j.jmb.2003.09.054. PMID: 14596803. (Year: 2003).*

(Continued)

*Primary Examiner* — Chun W Dahle
*Assistant Examiner* — James Lyle McLellan
(74) *Attorney, Agent, or Firm* — Debora Plehn-Dujowich; Eckert Seamans Cherin & Mellott, LLC

(57) ABSTRACT

Antibodies are provided which comprise at least one Fab portion that binds CD47 and at least one Fab portion that binds the tumor associated antigen (TAA) CD20; wherein the Fab portion that binds CD47 exhibits low affinity for CD47; and, wherein the Fab portion that binds CD20 exhibits high affinity for CD20; and, wherein the antibody selectively binds CD47 and blocks CD47 interaction with SIRPα in tumor cells while exhibiting no substantial binding to CD47 in normal cells.

34 Claims, 24 Drawing Sheets
Specification includes a Sequence Listing.

(56) References Cited

OTHER PUBLICATIONS

J Immunol. Dec. 15, 2004;173(12):7358-67. doi: 10.4049/jimmunol. 173.12.7358. PMID: 15585860. (Year: 2004).*
Nat Rev Immunol. Jun. 2019; 19(6):355-368. doi: 10.1038/s41577-019-0126-7. PMID: 30718829. (Year: 2019).*
Protein Eng Des Sel. Mar. 2009;22(3):159-68. doi: 10.1093/protein/gzn058. Epub Oct. 29, 2008. PMID: 18974080. (Year: 2009).*
MAbs. 2015;7(5):946-56. doi: 10.1080/19420862.2015.1062192. PMID: 26083076; PMCID: PMC4623422. (Year: 2015).*
Janeway Jr et al., Immunology, 3rd Edition, 1997 Garland Publishing Inc. (Year: 1997).*
Rudikoff S. et al, "Single amino acid substitution altering antigen-binding specificity", Proceedings of The National Academy of Sciences, National Academy of Sciences, US, (Mar. 1, 1982), vol. 79, No. 6, doi:10.1073/PNAS.79.6.1979, ISSN 0027-8424, pp. 1979-1983.
Y.W. Wong, et al: "Structural requirements for a specificity switch and for maintenance of affinity using mutational analysis of a phage-displayed anti-arsonate antibody of Fab heavy chain first complementarity-determining region". J Immunol. Jun. 15, 1998;160(12):5990-7.
Z. Liu, et al: "Fine mapping of the antigen-antibody interaction of scFv215, a recombinant antibody inhibiting RNA polymerase II from *Drosophila melanogaster*". J Mol Recognit. Mar.-Apr. 1999; 12(2):103-11.
Paul H. Kussie et al: "A Single Engineered Amino Acid Substitution Changes Antibody Fine Specificity". journal of Immunology, 1994, 152: 146-152.
J Panka, et al: "Variable region framework differences result in decreased or increased affinity of variant anti-digoxin antibodies". Proc Natl Acad Sci U S A. May 1988; 85(9):3080-4.
Inbal Sela-Culang et al, "The Structural Basis of Antibody-Antigen Recognition", Frontiers in Immunology, (Oct. 8, 2013), vol. 4.
Mathieu Dondelinger et al, "Understanding the Significance and Implications of Antibody Numbering and Antigen-Binding Surface/Residue Definition", Frontiers in Immunology, (Oct. 16, 2018), vol. 9, pp. 1-15.
Vered Kunik, et al: "Structural consensus among antibodies defines the antigen binding site." PLoS Comput Biol. 2012;8(2).
Christian Klein, et al: "Epitope interactions of monoclonal antibodies targeting CD20 and their relationship to functional properties". MAbs. Jan. 1, 2013; 5(1): 22-33.
Veillette, A., et al., (SIRP)α-CD47 Immune Checkpoint Blockade in Anticancer Therapy. Trends in Immunology, 2018, 39(3):173-184.
Veillette A., et al., Signaling Regulatory Protein (SIRP)α-CD47 Blockade Joins the Ranks of Immune Checkpoint Inhibition. J Clin Oncol. Feb. 27, 2019.
Chothia & Lesk, Canonical Structures for the Hypervariable Regions of Immunoglobulins, J. Mol. Biol. 196, 901-917 (1987).
Lefranc, M-P., et al., "IMGT Unique Numbering for Immunoglobulin and Cell Receptor Variable Domains and Ig superfamily V-like domains," Dev. Comp. Immunol. 27, 55-77 (2003).
Weiskopf K., et al., Cancer immunotherapy targeting the CD47/SIRPα axis, Eur J Cancer. May 2017;76:100.
Ridgway, J. B., et al., 'Knobs-into-holes' engineering of antibody CH3 domains for heavy chain heterodimerization, Protein Eng. 9 (1996) 617-621.
Denny, TN et al., Quantitative Determination of Surface Antibody Binding Capacities of Immune Subsets Present in Peripheral Blood of Healthy Adult Donors, Cytometry, Dec. 1996;26(4):265-74.

He, M. and Taussig, M.J., Rapid discovery of protein interactions by cell-free protein technologies, Biochem Soc Trans. Nov. 2007, 35(Pt 5):962-5.
Weiskopf, K., et al., Eradication of Canine Diffuse Large B-Cell Lymphoma in a Murine Xenograft Model with CD47 Blockade and Anti-CD20, Cancer Immunol Res. Dec. 2016 ; 4(12): 1072-1087.
Russ, A., et al., Blocking 'don't eat me' signal of CD47-SIRP? in hematological malignancies, an in-depth review, Blood Rev. Nov. 2018 ; 32(6): 480-489.
Piccione, Emily C., et al., "A bispecific antibody targeting CD47 and CD20 selectively binds and eliminates dual antigen expressing lymphoma cells", MABS, US, (Jun. 17, 2015), vol. 7, No. 5, doi:10.1080/19420862.2015.1062192, ISSN 1942-0862, pp. 946-956.
Dheilly, Elie, et al., "Selective Blockade of the Ubiquitous Checkpoint Receptor CD47 is Enabled by Dual-Targeting Bispecific Antibodies", Molecular Therapy : The Journal of the American Society of Gene Therapy, US, (Feb. 1, 2017), vol. 25, No. 2, doi:10.1016/j.ymthe.2016.11.006, ISSN 1525-0016, pp. 523-533.
Van Bommel, Peter, E., et al., "CD20-selective inhibition of CD47-SIRP[alpha] "don't eat me" signaling with a bispecific antibody-derivative enhances the anticancer activity of daratumumab, alemtuzumab and obinutuzumab", Oncoimmunology, (Oct. 31, 2017), vol. 7, No. 2, doi: 10.1080/2162402X.2017.1386361, pp. 1-8.
Bortoletto, Nicola, et al., "Optimizing anti-CD3 affinity for effective T cell targeting against tumor cells", European Journal of Immunology, Wiley VCH, Weinheim, (Nov. 1, 2002), vol. 32, No. 11.
Buatois, Vanessa , et al., "Preclinical Development of a Bispecific Antibody that Safely and Effectively Targets CD19 and CD47 for the Treatment of B-Cell Lymphoma and Leukemia", Molecular Cancer Therapeutics, vol. 17, No. 8, May 9, 2018.
Chao, M. P., et al., "Anti-CD47 Antibody Synergizes with Rituximab to Promote Phagocytosis and Eradicate Non-Hodgkin Lymphoma", Cell 142, Sep. 3, 2010.
Tian, W., et al., "Abstract 545: Preclinical development of a bispecific antibody-trap selectively targeting CD47 and CD20 for the treatment of B cell lineage cancer", American Association for Cancer Research, vol. 79, Issue 13 Supplement Mar. 29, 2019.
International Search Report of PCT/US2020/026575, mail date Jul. 17, 2020.
International Written Opinion of PCT/US2020/026575, mail date Jul. 17, 2020.
International Preliminary Report on Patentability of PCT/US2020/026575, maile date May 28, 2021.
International Search Report of PCT/US2020/026579, mail date Jul. 7, 2020.
International Written Opinion of PCT/US2020/026579, mail date Jul. 7, 2020.
International Preliminary Report on Patentability of PCT/US2020/026579, mail date Jun. 10, 2021.
Kipriyanov, S. M., et al., Bispecific CD33CD19 Diabody for T Cell-Mediated Lysisof Malignant Human B Cells, Int. J. Cancer 77 (1998), 763-772.
Feng, M., et al., Phagocytosis checkpoints as new targets for cancer immunotherapy, Nat Rev Cancer. Oct. 2019;19(10):568-586.
Gunasekaran, K., et al., Enhancing antibody Fc heterodimer formation through electrostatic steering effects: applications to bispecific molecules and monovalent IgG, J. Biol. Chem. 285 (2010) 19637-19646.
Sharpe, A. H. Introduction to checkpoint inhibitors and cancer immunotherapy. Immunol Rev. Mar. 2017;276(1):5-8.
Matlung, H.L., et al., Szilagyi K, Barclay NA, van den Berg TK. The CD47-SIRPα signaling axis as an innate immune checkpoint in cancer. Immunol Rev. Mar. 2017;276(1):145-164.

* cited by examiner

| Cell Line | CD20 ABC | CD47 ABC | CD20/CD47 Ratio |
|---|---|---|---|
| OCI-Ly3 | 154,000 | 247,000 | 0.62 |
| Raji | 522,596 | 213,927 | 2.44 |

Both CD47xCD20 (TPP-1362 and TPP-1360) induce significantly higher level of ADCC than Rituxan TPP-1360 Binds Selectively to B Cells in Human Whole Blood CD = cluster of differentiation; IgG1 = immunoglobulin G1; MFI = mean fluorescence intensity; NK = natural killer; RBC = red blood cells; RSV = respiratory syncytial virus.

CD = cluster of differentiation; IgG1 = immunoglobulin G1; MFI = mean fluorescence intensity; RBC = red blood cells; RSV = respiratory syncytial virus; WT = wild-type.

CD = cluster of differentiation; IgG1 = immunoglobulin G1; MFI = mean fluorescence intensity; RBC = red blood cells; RSV = respiratory syncytial virus; WT = wild-type.

Ab = antibody; IgG1 = Immunoglobulin G1; RSV = respiratory syncytial virus.

Ab = antibody; IgG1 = immunoglobulin G1; RSV = respiratory syncytial virus

Macrophage-mediated Phagocytosis Induced by TPP-1360 or Rituximab

ENGINEERING OF AN ANTIBODY FOR TUMOR-SELECTIVE BINDING OF CD47

FIELD OF THE INVENTION

Provided herein are tumor-selective antibodies, pharmaceutical compositions, and methods of use for the treatment of pathological conditions effected by cells undergoing aberrant proliferation, including hematological oncology conditions, hematological malignancies, lymphoproliferative disorders, B-cell disorders, B-cell malignancies, and B-cell lymphoma.

CROSS REFERENCE TO RELATED APPLICATIONS

The present application is a 35 U.S.C. § 371 National Phase Application from International Application No. PCT/US2020/026579, filed Apr. 3, 2020, which is entitled to priority under 35 U.S.C. § 119(e) to U.S. Provisional Application No. 62/830,335, filed Apr. 5, 2019, each of which is hereby incorporated by reference in its entirety.

SEQUENCE LISTING

The instant application contains a Sequence Listing which has been submitted in ASCII format via EFS-Web and is hereby incorporated by reference in its entirety. The ASCII copy, created on Sep. 29, 2021, is named 298068-00402 Sequence Listing.txt and is 417,028 bytes in size.

BACKGROUND OF THE INVENTION

Over the past decade, the use of blocking agents against inhibitory immune checkpoints has been one of the most significant advances in anticancer treatment (Sharpe A H. Introduction to checkpoint inhibitors and cancer immunotherapy. Immunol Rev. 2017 March; 276(1):5-8). The exciting results obtained with CTLA-4 and PD-1 blockade led to the evaluation of several innate immune checkpoints that could be targeted in anticancer treatment, in particular pathways regulating macrophage function. Macrophages express SIRPα which interacts with CD47, a ubiquitously expressed protein that mediates a "don't eat me" signal that functions to inhibit phagocytosis. Expression of CD47 confers resistance to phagocytosis of antibody-bound tumor cells by macrophages. In the absence of CD47 binding to SIRPα, antibodies that can bind Fc-receptor on macrophages can enhance phagocytosis of these cells. Cancer cells have evolved to hijack this interaction by upregulating the expression of CD47 on their cell surface, thus counterbalancing pro-phagocytic signals and increasing the chances of evading innate immune surveillance (Matlung H L, Szilagyi K, Barclay N A, van den Berg T K. The CD47-SIRPα signaling axis as an innate immune checkpoint in cancer. Immunol Rev. 2017 March; 276(1):145-164). Therefore, blockade of the CD47-SIRPα interaction represents a promising therapeutic strategy to activate the phagocytic clearance of tumor cells from the body. Several SIRPα-CD47 blocking agents, including humanized and fully human anti-CD47 antibodies, anti-SIRPα antibodies, soluble SIRPα dimers fused to the Fc portion of human IgG, high-affinity monomeric SIRPα devoid of Fc portion, and camelid-derived monomeric fragments of anti-CD47 antibodies (nanobodies), have shown efficacy in vitro and in preclinical studies against various types of human tumors (Veillette A, Chen A., SIRPα-CD47 Immune Checkpoint Blockade in Anticancer Therapy. Trends in Immunology, 2018, 39(3):173-184). Some of the SIRPα-CD47 blocking agents, including CC-90002 (anti-CD47), Forty Seven's anti-CD47 (Hu5F9-G4) and Trillium's SIRPα-fusion Fc have been tested in phase I and phase II clinical trials, respectively (Veillette A, Tang Z. Signaling Regulatory Protein (SIRP)α-CD47 Blockade Joins the Ranks of Immune Checkpoint Inhibition. J Clin Oncol. 2019 Feb. 27:JCO190012). These approaches in the clinic are limited by the need for combination therapy (e.g., rituximab), the tissue sink (i.e., presence of non-tumor cells to which the therapeutic antibody binds, thus decreasing the bioavailability of the antibody for tumor cells) in targeting CD47 with a high-affinity binder, and the observed hematologic toxicity with some of the clinical molecules (anemia, neutropenia, and/or thrombocytopenia). Importantly, while protein therapeutics are indeed explored to treat a number of diseases, biopharmaceutical entities can prompt an immune response involving production of anti-entity antibodies when administered to subjects which result in reduced efficacy and/or toxicity.

SUMMARY OF THE INVENTION

The present invention is directed to an antibody comprising at least one Fab portion that binds CD47 with low affinity and at least one Fab portion that binds CD20 with high affinity; wherein the bispecific antibody selectively binds CD47 in tumor cells and is substantially free of binding to CD47 in normal cells.

Fab portions described herein that bind CD47 with low affinity generally exhibit affinity for CD47 between about 0.1 µM and about 25 µM, for example, when measured as Kd (dissociation constant) by surface plasmon resonance (SPR). Fab portions described herein that bind CD47 with low affinity exhibit affinity for CD47 from about 0.25 µM to about 20 µM. Certain preferred embodiments exhibit affinity for CD47 from about 0.4 µM to about 4.0 µM. Certain embodiments exhibit affinity for CD47 from about 1 µM to about 3.0 µM. In some embodiments, for example, the Fab portion that binds CD47 exhibits an affinity for CD47 that is from about 0.1 µM to about 5.0 µM. In some embodiments, the Fab portion that binds CD47 exhibits an affinity for CD47 that is from about 0.1 µM to about 0.2 µM, 0.3 µM, 0.4 µM, 0.5 µM, 0.6 µM, 0.7 µM, 0.8 µM, 0.9 µM, 1.0 µM, 1.1 µM, 1.2 µM, 1.3 µM, 1.4 µM, 1.5 µM, 1.6 µM, 1.7 µM, 1.8 µM, 1.9 µM, 2.0 µM, 2.1 µM, 2.2 µM, 2.3 µM, 2.4 µM, 2.5 µM, 2.6 µM, 2.7 µM, 2.8 µM, 2.9 µM, 3.0 µM, 3.1 µM, 3.2 µM, 3.3 µM, 3.4 µM, 3.5 µM, 3.6 µM, 3.7 µM, 3.8 µM, 3.9 µM, 4.0 µM, 4.1 µM, 4.2 µM, 4.3 µM, 4.4 µM, 4.5 µM, 4.6 µM, 4.7 µM, 4.8 µM, 4.9 µM or about 5.0 µM.

In some embodiments, the Fab portion that binds CD47 exhibits an affinity for CD47 that is from about 0.2 µM to about 4.0 µM. In further embodiments, the Fab portion that binds CD47 exhibits an affinity for CD47 that is from about 0.5 µM to about 3.5 µM. In further embodiments, the Fab portion that binds CD47 exhibits an affinity for CD47 that is from about 1.0 µM to about 3.0 µM.

The present invention is further directed to an antibody comprising at least one Fab portion that binds CD47 and at least one Fab portion that binds CD20; wherein the Fab portion that binds CD47 exhibits low affinity for CD47; and wherein the Fab portion that binds CD20 exhibits high affinity for CD20; and, wherein the bispecific antibody selectively binds CD47 in tumor cells and is substantially free of binding to CD47 in normal cells; and, wherein the antibody activates antibody-dependent cellular phagocytosis of the tumor cells which express CD20.

The present invention is further directed to an antibody comprising at least one Fab portion that binds CD47 and at least one Fab portion that binds CD20; wherein the Fab portion that binds CD47 exhibits low affinity for CD47; and, wherein the Fab portion that binds CD20 exhibits high affinity for CD20; and, wherein the bispecific antibody selectively binds CD47 in tumor cells and is substantially free of binding to CD47 in normal cells; and, wherein the antibody mediates complement-dependent cytotoxicity (CDC) of the tumor cells which express CD20.

The present invention is further directed to an antibody comprising at least one Fab portion that binds CD47 and at least one Fab portion that binds CD20; wherein the Fab portion that binds CD47 exhibits low affinity for CD47; and, wherein the Fab portion that binds CD20 exhibits high affinity for CD20; and, wherein the bispecific antibody selectively binds CD47 in tumor cells and is substantially free of binding to CD47 in normal cells; and, wherein the antibody mediates antibody-dependent cellular cytotoxicity (ADCC) of the tumor cells which express CD20.

The invention is further directed to monomeric elements of the IgG1 1+1 heterodimers described herein which contain certain light chain (LC) and heavy chain (HC) constant regions that drive the production of the IgG1 1+1 heterodimer format. In one embodiment, an anti-CD47 LC constant region that reduces LC mispairing during production comprises SEQ ID NO:340. In another embodiment, an anti-CD47 HC constant region that ensures heterodimer formation of the Fcs during production comprises SEQ ID NO:342. In another embodiment, an anti-CD20 LC constant region that reduces LC mispairing during production comprises SEQ ID NO:344. In another embodiment, an anti-CD20 HC constant region that ensures heterodimer formation of the Fcs during production comprises SEQ ID NO:346.

The invention is further directed to an antibody wherein the Fab portion that binds CD47 is derived from VL (SEQ ID NO:325) and VH (SEQ ID NO: 326) regions of anti-CD47 species CC-90002 wherein the binding affinity for CD47 is substantially attenuated and the immunogenicity is substantially reduced.

The invention is further directed to a bispecific antibody wherein the anti-CD47 VL is derived from SEQ ID NO: 325 and exhibits 1-7 amino acid substitutions relative to SEQ ID NO:325; and, the anti-CD47 VH is derived from SEQ ID NO: 326 and exhibits 141 amino acid substitutions relative to SEQ ID NO:326 wherein the binding affinity for CD47 is substantially attenuated and the immunogenicity is substantially reduced.

The invention is further directed to a bispecific antibody wherein the anti-CD47 VL is derived from SEQ ID NO: 325 and exhibits 1-7 amino acid substitutions relative to SEQ ID NO:325 wherein at least one (1) amino acid substitution in the anti-CD47 VL (SEQ ID NO: 325) is selected from the group consisting of A10S, M11L, K24R, A51E, N52S, L54F, and S56D; (substitutions in the anti-CD47 VL are numbered relative to the first amino acid of the VL) and, the anti-CD47 VH is derived from SEQ ID NO: 326 and exhibits 1-11 amino acid substitutions relative to SEQ ID NO:326 wherein at least one (1) amino acid substitutions in the anti-CD47 VH (SEQ ID NO: 326) is selected from the group consisting of T14P, Q43K, A44G, E59Y, D66G, M76T, S84R, S88A, M93V, S102E, and T115L (substitutions in the anti-CD47 VH are numbered relative to the first amino acid of the VH).

The invention is further directed to a bispecific antibody wherein the Fab portion that binds CD47 comprises (i) a light chain variable region (VL) region selected from the group consisting of SEQ ID NO:1, SEQ ID NO:3, SEQ ID NO:5, SEQ ID NO:7, SEQ ID NO:9, SEQ ID NO:11, SEQ ID NO:13, SEQ ID NO:15, SEQ ID NO:17, SEQ ID NO:19, SEQ ID NO:21, SEQ ID NO:23, SEQ ID NO:25, SEQ ID NO:27, SEQ ID NO:29, SEQ ID NO:31, SEQ ID NO:33, SEQ ID NO:35, SEQ ID NO:37, SEQ ID NO:39, SEQ ID NO:41, SEQ ID NO:43, SEQ ID NO:45, SEQ ID NO:47, SEQ ID NO:49, SEQ ID NO:51, SEQ ID NO:53, SEQ ID NO:55, SEQ ID NO:57, SEQ ID NO:59, SEQ ID NO:61, SEQ ID NO:63, SEQ ID NO:65, SEQ ID NO:67, SEQ ID NO:69, SEQ ID NO:71, SEQ ID NO:73, SEQ ID NO:75, SEQ ID NO:77, SEQ ID NO:79, SEQ ID NO:81, SEQ ID NO:83, SEQ ID NO:85, SEQ ID NO:87, SEQ ID NO:89, SEQ ID NO:91, SEQ ID NO:93, SEQ ID NO:95, SEQ ID NO:97, SEQ ID NO:99, SEQ ID NO:101, SEQ ID NO:103, SEQ ID NO:105, SEQ ID NO:107, SEQ ID NO:109, SEQ ID NO:111, SEQ ID NO:113, SEQ ID NO:115, SEQ ID NO:117, SEQ ID NO:119, SEQ ID NO:121, SEQ ID NO:123, SEQ ID NO:125, SEQ ID NO:127, SEQ ID NO:129, SEQ ID NO:131, SEQ ID NO:133, SEQ ID NO:135, SEQ ID NO:137, SEQ ID NO:139, SEQ ID NO:141, SEQ ID NO:143, SEQ ID NO:145, SEQ ID NO:147, SEQ ID NO:149, SEQ ID NO:151, SEQ ID NO:153, SEQ ID NO:155, SEQ ID NO:157, SEQ ID NO:159, SEQ ID NO:161, SEQ ID NO:163, SEQ ID NO:165, SEQ ID NO:167, SEQ ID NO:169, SEQ ID NO:171, SEQ ID NO:173, SEQ ID NO:175, SEQ ID NO:177, SEQ ID NO:179, SEQ ID NO:181, SEQ ID NO:183, SEQ ID NO:185, SEQ ID NO:187, SEQ ID NO:189, SEQ ID NO:191, SEQ ID NO:193, SEQ ID NO:195, SEQ ID NO:197, SEQ ID NO:199, SEQ ID NO:201, SEQ ID NO:203, SEQ ID NO:205, SEQ ID NO:207, SEQ ID NO:209, SEQ ID NO:211, SEQ ID NO:213, SEQ ID NO:215, SEQ ID NO:217, SEQ ID NO:219, SEQ ID NO:221, SEQ ID NO:223, SEQ ID NO:225, SEQ ID NO:227, SEQ ID NO:229, SEQ ID NO:231, SEQ ID NO:233, SEQ ID NO:235, SEQ ID NO:237, SEQ ID NO:239, SEQ ID NO:241, SEQ ID NO:243, SEQ ID NO:245, SEQ ID NO:247, SEQ ID NO:249, SEQ ID NO:251, SEQ ID NO:253, SEQ ID NO:255, SEQ ID NO:257, SEQ ID NO:259, SEQ ID NO:261, SEQ ID NO:263, SEQ ID NO:265, SEQ ID NO:267, SEQ ID NO:269, SEQ ID NO:271, SEQ ID NO:273, SEQ ID NO:275, SEQ ID NO:277, SEQ ID NO:279, SEQ ID NO:281, SEQ ID NO:283, SEQ ID NO:285, SEQ ID NO:287, SEQ ID NO:289, SEQ ID NO:291, SEQ ID NO:293, SEQ ID NO:295, SEQ ID NO:297, SEQ ID NO:299, SEQ ID NO:301, SEQ ID NO:303, SEQ ID NO:305, SEQ ID NO:307, SEQ ID NO:309, SEQ ID NO:311, SEQ ID NO:313, SEQ ID NO:315, SEQ ID NO:317, SEQ ID NO:319, and SEQ ID NO:321; and, (ii) a heavy chain variable region (VH) region, selected from the group consisting of SEQ ID NO:2, SEQ ID NO:4, SEQ ID NO:6, SEQ ID NO:8, SEQ ID NO:10, SEQ ID NO:12, SEQ ID NO:14, SEQ ID NO:16, SEQ ID NO:18, SEQ ID NO:20, SEQ ID NO:22, SEQ ID NO:24, SEQ ID NO:26, SEQ ID NO:28, SEQ ID NO:30, SEQ ID NO:32, SEQ ID NO:34, SEQ ID NO:36, SEQ ID NO:38, SEQ ID NO:40, SEQ ID NO:42, SEQ ID NO:44, SEQ ID NO:46, SEQ ID NO:48, SEQ ID NO:50, SEQ ID NO:52, SEQ ID NO:54, SEQ ID NO:56, SEQ ID NO:58, SEQ ID NO:60, SEQ ID NO:62, SEQ ID NO:64, SEQ ID NO:66, SEQ ID NO:68, SEQ ID NO:70, SEQ ID NO:72, SEQ ID NO:74, SEQ ID NO:76, SEQ ID NO:78, SEQ ID NO:80, SEQ ID NO:82, SEQ ID NO:84, SEQ ID NO:86, SEQ ID NO:88, SEQ ID NO:90, SEQ ID NO:92, SEQ ID NO:94, SEQ ID NO:96, SEQ ID NO:98, SEQ ID NO:100, SEQ ID NO:102, SEQ ID NO:104, SEQ ID NO:106, SEQ ID NO:108, SEQ ID NO:110, SEQ ID NO:112, SEQ ID NO:114, SEQ ID NO:116, SEQ ID NO:118, SEQ ID NO:120, SEQ ID NO:122, SEQ ID NO:124, SEQ ID NO:126, SEQ ID NO:128, SEQ ID NO:130, SEQ ID NO:132, SEQ ID NO:134, SEQ ID NO:136, SEQ ID NO:138, SEQ ID NO:140, SEQ ID NO:142, SEQ ID NO:144, SEQ ID NO:146, SEQ ID NO:148, SEQ ID NO:150, SEQ ID NO:152, SEQ ID NO:154, SEQ ID NO:156, SEQ ID NO:158, SEQ ID NO:160, SEQ ID NO:162, SEQ ID NO:164, SEQ ID NO:166, SEQ ID NO:168, SEQ ID NO:170, SEQ ID NO:172, SEQ ID NO:174, SEQ ID NO:176, SEQ ID NO:178, SEQ ID NO:180, SEQ ID NO:182, SEQ ID NO:184, SEQ ID NO:186, SEQ ID NO:188, SEQ ID NO:190, SEQ ID NO:192, SEQ ID NO:194, SEQ ID NO:196, SEQ ID NO:198, SEQ ID NO:200, SEQ ID NO:202, SEQ ID NO:204, SEQ ID NO:206, SEQ ID NO:208, SEQ ID NO:210, SEQ ID NO:212, SEQ ID NO:214, SEQ ID NO:216, SEQ ID NO:218, SEQ ID NO:220, SEQ ID NO:222, SEQ ID NO:224, SEQ ID NO:226, SEQ ID NO:228, SEQ ID NO:230, SEQ ID NO:232, SEQ ID NO:234, SEQ ID NO:236, SEQ ID NO:238, SEQ ID NO:240, SEQ ID NO:242, SEQ ID NO:244, SEQ ID NO:246, SEQ ID NO:248, SEQ ID NO:250, SEQ ID NO:252, SEQ ID NO:254, SEQ ID NO:255, SEQ ID NO:258, SEQ ID NO:260, SEQ ID NO:262, SEQ ID NO:264, SEQ ID NO:266, SEQ ID NO:268, SEQ ID NO:270, SEQ ID NO:272, SEQ ID NO:274, SEQ ID NO:276, SEQ ID NO:278, SEQ ID NO:280, SEQ ID NO:282, SEQ ID NO:284, SEQ ID NO:286, SEQ ID NO:288, SEQ ID NO:290, SEQ ID NO:292, SEQ ID NO:294, SEQ ID NO:296, SEQ ID NO:298, SEQ ID NO:300, SEQ ID NO:302, SEQ ID NO:304, SEQ ID NO:306, SEQ ID NO:308, SEQ ID NO:310, SEQ ID NO:312, SEQ ID NO:314, SEQ ID NO:316, SEQ ID NO:318, SEQ ID NO:320, and SEQ ID NO:322.

The invention is further directed to a bispecific antibody wherein the Fab portion that binds CD20 comprises anti-CD20 VL CDRs RASSSVSYIH (CDRL1; SEQ ID NO:353), ATSNLAS (CDRL2; SEQ ID NO:354), QQWTSNPPT (CDRL3; SEQ ID NO:355); and, VH CDRs SYNMH (CDRH1; SEQ ID NO:356), AIYPGNGDTSYNQKFKG (CDRH2; SEQ ID NO:357), STYYGGDWYFNV (CDRH3; SEQ ID NO:358).

The invention is further directed to a bispecific antibody wherein the Fab portion that binds CD20 comprises anti-CD20 LC (SEQ ID NO:331) and anti-CD20 HC (SEQ ID NO:332).

The invention is further directed to a bispecific antibody wherein the Fab portion that binds CD47 comprises a light chain variable region (VL) region comprising VL CDRs QASQDIHRYLS (CDRL1; SEQ ID NO:359), RESRFVD (CDRL2; SEQ ID NO:360), and LQYDEFPYT (CDRL3; SEQ ID NO:361); and a heavy chain variable region (VH) region comprising VH CDRs DYYLH (CDRH1; SEQ ID NO:362), WIDPDQGDTYYAQKFQG (CDRH2; SEQ ID NO:363), AYGESSYPMDY (CDRH3; SEQ ID NO:364).

The invention is further directed to a bispecific antibody wherein the Fab portion that binds CD47 comprises a light chain variable region (VL) region comprising a VL CDRs RASQDIHRYLS (CDRL1; SEQ ID NO:365), RESRFVD (CDRL2; SEQ ID NO:366), LQYDEFPYT (CDRL3; SEQ ID NO:367); and a heavy chain variable region (VH) region comprising VH CDRs DYYLH (CDRH1; SEQ ID NO:368), WIDPDQGDTYYAQKFQG (CDRH2; SEQ ID NO:369), AYGESSYPMDY (CDRH3; SEQ ID NO:370).

The invention is further directed to a bispecific antibody wherein the Fab portion that binds CD47 comprises a light chain variable region (VL) region comprising VL CDRs RASQDIHRYLS (CDRL1; SEQ ID NO:371), RANRLVS (CDRL2; SEQ ID NO:372), LQYDEFPYT (CDRL3; SEQ ID NO:373); and a heavy chain variable region (VH) region comprising VH CDRs DYYLH (CDRH1; SEQ ID NO:374), WIDPDQGDTYYAQKFQG (CDRH2; SEQ ID NO:375), AYGESSYPMDY (CDRH3; SEQ ID NO:376).

The invention is further directed to a bispecific antibody wherein the Fab portion that binds CD47 comprises VL (SEQ ID NO:317); and VH (SEQ ID NO:318).

The invention is further directed to a bispecific antibody wherein the Fab portion that binds CD47 comprises VL (SEQ ID NO:319); and VH (SEQ ID NO:320).

The invention is further directed to a bispecific antibody wherein the Fab portion that binds CD47 comprises VL (SEQ ID NO:321); and VH (SEQ ID NO:322).

The invention is further directed to a bispecific antibody wherein the Fab portion that binds CD47 comprises LC (SEQ ID NO:333) and HC (SEQ ID NO:334).

The invention is further directed to a bispecific antibody wherein the Fab portion that binds CD47 comprises LC (SEQ ID NO:335) and HC (SEQ ID NO:336).

The invention is further directed to a bispecific antibody wherein the Fab portion that binds CD47 comprises LC (SEQ ID NO:337) and HC 1367 (SEQ ID NO:338).

In addition, the current invention is directed to a pharmaceutical composition for the control of tumor cells, for administration to a patient in need thereof, comprising a bispecific entity described herein.

In addition, the current invention is directed to a pharmaceutical composition for the treatment of a B-cell disorder or a B-cell malignancy, for administration to a patient in need thereof, comprising a bispecific entity described herein.

The invention is further directed to a method of controlling tumor cells comprising administering an effective amount of a bispecific entity described herein to a patient in need thereof.

Further the invention is directed to a method treatment of a B-cell disorder or a B-cell malignancy comprising administering an effective amount of a bispecific entity described herein to a patient in need thereof.

BRIEF DESCRIPTION OF THE FIGURES

FIGS. 3A-3B are graphs that show the percentage of phagocytic macrophages in view of antibody concentration. FIG. 3C is a table showing KD and EC50 values for bispecific species described herein.

FIGS. 4A-4B are graphs that show CDC in view of antibody concentration. FIG. 4C is a table showing average EC50 values for TPP-1360, TPP-1362 and rituximab.

FIGS. 5A-5B are graphs that show cytotoxicity in view of antibody concentration. FIG. 5C is a table showing CD20/CD47 Ratio.

DETAILED DESCRIPTION OF THE INVENTION

Figure 1:
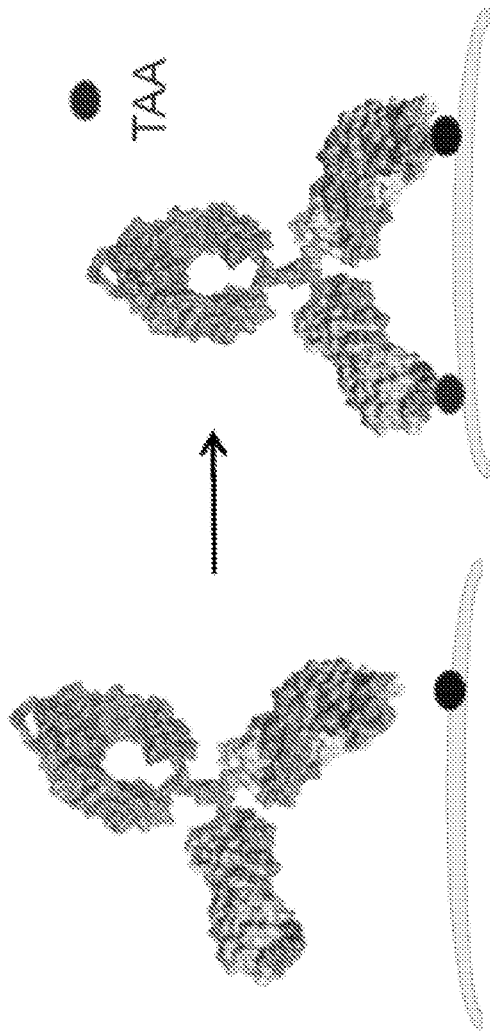
FIG. 1 is a schematic illustration of certain attributes of bispecific entities described herein engineered to overcome the challenge of ubiquitous CD47 expression including low affinity binding without avidity to CD47; minimal binding to normal cells, i.e., no tissue sink; high affinity selective avidity binding to CD20 which results in selective binding to tumor cells. TAA: Tumor Associated Antigen

Unless defined otherwise, all technical and scientific terms used herein have the same meaning as is commonly understood by one of skill in the art to which this invention belongs. All publications and patents referred to herein are incorporated by reference.

As used herein, the articles "a" and "an" may refer to one or to more than one (e.g. to at least one) of the grammatical object of the article.

As used herein, "about" may generally refer to an acceptable degree of error for the quantity measured given the nature or precision of the measurements. Example degrees of error are within 5% of a given value or range of values.

Embodiments described herein as "comprising" one or more features may also be considered as disclosure of the corresponding embodiments "consisting of" and/or "consisting essentially of" such features.

As used herein "low affinity for CD47" refers to an affinity for CD47 that is below about 25 μM, for example from about 0.05 μM to about 25 μM when measured in vitro as Kd by SPR.

As used herein "high affinity for CD20" refers to an affinity for CD20 that is at or above about 0.4 nM, for example, from about 0.4 nM to about 12 nM. In some embodiments, "high affinity for CD20" refers to an affinity for CD20 that is from about 0.4 nM to about 5 nM.

Bispecific entities described herein selectively bind CD47 on tumor cells and are substantially free of binding to CD47 in normal cells. As used herein "substantially free of binding to CD47" generally refers to binding less than 5% of CD47 on (CD20−/CD47+) normal cells. Bispecific entities described herein bind less than 2% of CD47 on (CD20−/CD47+) normal cells. See, Example 5. In other words entities described herein generally exhibit 95% or greater binding to (CD20+/CD47+) cells. Entities described herein exhibit 98% or greater binding to (CD20+/CD47+) cells.

The term "pharmaceutically acceptable" as used herein refers to approved by a regulatory agency of the Federal or a state government, or listed in the U.S. Pharmacopeia, European Pharmacopeia or other generally recognized pharmacopeia for use in animals, and more particularly in humans.

Concentrations, amounts, volumes, percentages and other numerical values may be presented herein in a range format. It is also to be understood that such range format is used merely for convenience and brevity and should be interpreted flexibly to include not only the numerical values explicitly recited as the limits of the range but also to include all the individual numerical values or sub-ranges encompassed within that range as if each numerical value and sub-range is explicitly recited.

Minor variations in the amino acid sequences of antibodies of the invention are contemplated as being encompassed by the present invention, providing that the variations in the amino acid sequence(s) maintain at least 75%, at least 80%, at least 90%, at least 95%, or at least 98 or 99% sequence homology or identity to the sequence of an antibody or antigen-binding fragment thereof provided herein.

Antibodies of the invention may include variants in which amino acid residues from one species are substituted for the corresponding residue in another species, either at the conserved or non-conserved positions. In one embodiment, amino acid residues at non-conserved positions are substituted with conservative or non-conservative residues. In particular, conservative amino acid replacements are contemplated.

As used herein, a "conservative amino acid substitution" refers to one in which the amino acid residue is replaced with an amino acid residue having a similar side chain. Families of amino acid residues having similar side chains have been defined in the art, including basic side chains (e.g., lysine, arginine, or histidine), acidic side chains (e.g., aspartic acid or glutamic acid), uncharged polar side chains (e.g., glycine, asparagine, glutamine, serine, threonine, tyrosine, or cysteine), nonpolar side chains (e.g., alanine, valine, leucine, isoleucine, proline, phenylalanine, methionine, or tryptophan), beta-branched side chains (e.g., threonine, valine, isoleucine) and aromatic side chains (e.g., tyrosine, phenylalanine, tryptophan, or histidine). Thus, if an amino acid in a polypeptide is replaced with another amino acid from the same side chain family, the amino acid substitution is considered to be conservative. The inclusion of conservatively modified variants in an antibody of the invention does not exclude other forms of variant, for example polymorphic variants, interspecies homologs, and alleles.

As used herein, "non-conservative amino acid substitutions" include those in which (i) a residue having an electropositive side chain (e.g., arginine, histidine or lysine) is substituted for, or by, an electronegative residue (e.g., glutamate or aspartate), (ii) a hydrophilic residue (e.g., serine or threonine) is substituted for, or by, a hydrophobic residue (e.g., alanine, leucine, isoleucine, phenylalanine or valine), (iii) a cysteine or proline is substituted for, or by, any other residue, or (iv) a residue having a bulky hydrophobic or aromatic side chain (e.g., valine, histidine, isoleucine or tryptophan) is substituted for, or by, one having a smaller side chain (e.g., alanine or serine) or no side chain (e.g., glycine).

The terms "antibody" and "antibodies", as used herein, refers to conventional isotypes and monospecific formats as well as multivalent antibodies including but not limited to current bispecific entity formats known in the art as well as bispecific antibodies including but not limited to formats otherwise described herein.

A typical antibody comprises at least two "light chains" (LC) and two "heavy chains" (HC). The light chains and heavy chains of such antibodies are polypeptides consisting of several domains. Each heavy chain comprises a heavy chain variable region (abbreviated herein as "VH") and a heavy chain constant region (abbreviated herein as "CH"). The heavy chain constant region comprises the heavy chain constant domains CH1, CH2 and CH3 (antibody classes IgA, IgD, and IgG) and optionally the heavy chain constant domain CH4 (antibody classes IgE and IgM). Each light chain comprises a light chain variable domain (abbreviated herein as "VL") and a light chain constant domain (abbreviated herein as "CL"). The variable regions VH and VL can be further subdivided into regions of hypervariability, termed complementarity determining regions (CDR), interspersed with regions that are more conserved, termed framework regions (FR). Each VH and VL is composed of three CDRs and four FRs, arranged from amino-terminus to carboxy-terminus in the following order: FR1, CDR1, FR2, CDR2, FR3, CDR3, FR4. The "constant domains" of the heavy chain and of the light chain are not involved directly in binding of an antibody to a target, but exhibit various effector functions.

Binding between an antibody and its target antigen or epitope is mediated by the Complementarity Determining Regions (CDRs). The CDRs are regions of high sequence variability, located within the variable region of the antibody heavy chain and light chain, where they form the antigen-binding site. The CDRs are the main determinants of antigen specificity. Typically, the antibody heavy chain and light chain each comprise three CDRs which are arranged non-consecutively. The antibody heavy and light chain CDR3 regions play a particularly important role in the binding specificity/affinity of the antibodies according to the invention and therefore provide a further aspect of the invention.

Thus, the term "antigen binding fragment" as used herein incudes any naturally-occurring or artificially-constructed configuration of an antigen-binding polypeptide comprising one, two or three light chain CDRs, and/or one, two or three heavy chain CDRs, wherein the polypeptide is capable of binding to the antigen.

The sequence of a CDR may be identified by reference to any number system known in the art, for example, the Kabat system (Kabat, E. A., et al., Sequences of Proteins of Immunological Interest, 5th ed., Public Health Service, National Institutes of Health, Bethesda, MD (1991); the Chothia system (Chothia &, Lesk, "Canonical Structures for the Hypervariable Regions of Immunoglobulins," J. Mol. Biol. 196, 901-917 (1987)); or the IMGT system (Lefranc et al., "IMGT Unique Numbering for Immunoglobulin and Cell Receptor Variable Domains and Ig superfamily V-like domains," Dev. Comp. Immunol. 27, 55-77 (2003)). CDRs shown herein employ the boundaries, i.e., size, according to KABAT. Position numbering of antibody constant regions described and referred to herein are generally according to KABAT. However, numbering of anti-CD47 VL and VH regions described herein, i.e., antibody residue positions and substituted positions, begins with the N-terminal residue of each variable region, i.e., VL or VH, particularly with reference to SEQ ID NO:325 and SEQ ID NO:326, respectively.

"Bispecific entities described herein" generally refers to the functionally defined antibodies, bispecific elemental formats, elemental sequences, antibodies, and antibody species described herein.

The term "Fab portion" or "arm", as used herein, refers to an antigen-binding fragment of an antibody, i.e., a region of an antibody that binds an antigen. As used herein it comprises one variable domain of each of a light and heavy chain (VL/VH).

A "Fab' fragment" contains a single light chain and a single heavy chain but in addition to the CH1 and the VH, a "Fab' fragment" contains the region of the heavy chain between the CH1 and CH2 domains that is required for the formation of an inter-chain disulfide bond. Thus, two "Fab' fragments" can associate via the formation of a disulphide bond to form a F(ab')2 molecule.

A "F(ab')2 fragment" contains two light chains and two heavy chains. Each chain includes a portion of the constant region necessary for the formation of an inter-chain disulfide bond between two heavy chains.

An "Fv fragment" contains only the variable regions of the heavy and light chain. It contains no constant regions.

A "single-domain antibody" is an antibody fragment containing a single antibody domain unit (e.g., VH or VL).

A "single-chain Fv" ("scFv") is antibody fragment containing the VH and VL domain of an antibody, linked together to form a single chain. A polypeptide linker is commonly used to connect the VH and VL domains of the scFv.

A "tandem scFv", also known as a TandAb®, is a single-chain Fv molecule formed by covalent bonding of two scFvs in a tandem orientation with a flexible peptide linker.

A "bi-specific T cell engager" (BiTE®) is a fusion protein consisting of two single-chain variable fragments (scFvs) on a single peptide chain. One of the scFvs binds to T cells via the CD3 receptor, and the other to a tumour cell antigen.

A "diabody" is a small bivalent and bispecific antibody fragment comprising a heavy (VH) chain variable domain connected to a light chain variable domain (VL) on the same polypeptide chain (VH-VL) connected by a peptide linker that is too short to allow pairing between the two domains on the same chain (Kipriyanov, Int. J. Cancer 77 (1998), 763-772). This forces pairing with the complementary domains of another chain and promotes the assembly of a dimeric molecule with two functional antigen binding sites.

A "DARPin" is a bispecific ankyrin repeat molecule. DARPins are derived from natural ankyrin proteins, which can be found in the human genome and are one of the most abundant types of binding proteins. A DARPin library module is defined by natural ankyrin repeat protein sequences, using 229 ankyrin repeats for the initial design and another 2200 for subsequent refinement. The modules serve as building blocks for the DARPin libraries. The library modules resemble human genome sequences. A DARPin is composed of 4 to 6 modules. Because each module is approx. 3.5 kDa, the size of an average DARPin is 16-21 kDa. Selection of binders is done by ribosome display, which is completely cell-free and is described in He M. and Taussig M J., Biochem Soc Trans. 2007, November; 35 (Pt 5):962-5.

The terms "tumor" and "tumor cell" as used herein broadly refers to cancer cells including but not limited to cells undergoing aberrant proliferation, hematological oncology conditions, hematological malignancies, lymphoproliferative disorders, B-cell disorders, B-cell malignancies, and B-cell lymphoma.

IgG1 or IgG1 1+1 heterodimer format, as used herein, fundamentally refers to a whole IgG1 antibody composed of (i) one heavy chain (HC) and one light chain (LC), on one side, from one source, i.e., anti-CD47; and, one heavy chain (HC) and one light chain (LC), on the other side, from another source, e.g., anti-CD20. See, e.g., FIG. 2 and FIG. 6.

CD47

The value of cancer immunotherapy targeting the CD47/SIRPα axis is well-established. See, e.g., Weiskopf, K., et al., Eur J Cancer. 2017 May; 76:100; Feng, M., et al., Nat Rev Cancer. 2019 October; 19(10):568-586. Anti-CD47 approaches in the clinic have been be limited by the need for combination therapy, the tissue sink in targeting CD47 with a high-affinity binder, immunogenicity, and the observed hematologic toxicity with some of the clinical molecules (anemia, neutropenia, and/or thrombocytopenia).

CD47, while upregulated on tumor cells, is also ubiquitously expressed on all cells, including, at relatively high levels, NK cells, RBCs, and platelets. Monospecific agents targeting CD47 therefore tend to exhibit poor pharmacokinetic properties due to target-mediated drug disposition (TMDD) and side effects, including anemia and thrombocytopenia. Target-mediated drug disposition (TMDD) is the phenomenon in which a drug binds with high affinity to its pharmacological target site (such as a receptor) to such an extent that this affects its pharmacokinetic characteristics. Anti-CD47 IgG4 mAbs are generally required to reduce toxicity. Single anti-CD47, e.g., IgG1, agent activity thus tends to be limited.

Russ, A., et al., Blood Rev. 2018 November; 32(6):480 described a specific well-characterized IgG4 anti-CD47 antibody (CC-90002). See, particularly, WO2013119714 (U.S. Pat. No. 9,045,541). Various amino acid substitutions in this antibody, designed to increase cell-free production and reduce immunogenicity, have been described. See WO2016109415 (US20170369572); WO2018009499 (US20190241654); and WO2018183182. CC-90002 is a high affinity IgG4 PIE anti-CD47 molecule that binds to CD47 expressed on disease and normal tissues.

Because CD47 is expressed widely on normal tissues as well as on tumor cells, however, a high-affinity anti-CD47 antibody may lead to undesirable toxicity. Provided herein, therefore, are bispecific antibodies comprising a CD47-binding domain that improves upon CC-90002 with respect to toxicity and efficacy. In particular, the bispecific entities described herein selectively and safely target tumor cells, with little to no binding to CD47 in peripheral tissues. The present invention is directed to an antibody comprising at least one Fab portion that binds CD47 and at least one Fab portion that binds CD20; wherein the Fab portion that binds CD47 exhibits low affinity for CD47 (e.g., Kd greater than 100 nM); and, wherein the Fab portion that binds CD20 exhibits high affinity for CD20 (e.g., Kd less than 5 nM); and, wherein the bispecific antibody selectively binds CD47 in tumor cells and is substantially free of binding to CD47 in normal cells.

CC-90002 is provided as a reference parental sequence and as a source of anti-CD47 elements for construction of some of the bispecific entities described herein. CC-90002 VL CDRs are SEQ ID NO:347 (CDRL1), SEQ ID NO:348 (CDRL2), and SEQ ID NO:349 (CDRL3). CC-90002 VH CDRs are SEQ ID NO:350 (CDRH1), SEQ ID NO:351 (CDRH2), and SEQ ID NO:352 (CDRH3). CC-90002 VL (SEQ ID NO:325) and VH (SEQ ID NO:326) are also provided for reference. CC-90002 VL fused to a native IgG1 LC constant region to form a whole LC for reference is provided as CC-90002 WHOLE LC/IgG1 (SEQ ID NO:327). CC-90002 VH fused to a native IgG1 HC constant region to form a whole HC for reference is provided as CC-90002 whole HC/IgG1 (SEQ ID NO:328).

Both VH and VL regions of CC-90002 were engineered to reduce immunogenicity, while retaining functionality for employment in bispecific entities described herein.

Bispecific entities described and exemplified herein, for example, are demonstrated to overcome the challenges of single agent anti-CD47 mAb therapy. Due to the detuned affinity for CD47, CD47×CD20 bispecific entities described and provided herein bind preferentially to CD20$^+$ Tumor Associated Antigen (TAA) cells, thereby reducing the sink effect mediated by CD47$^+$ cells and on-target off-tumor toxicity. Together, the cellular potency, in vivo efficacy, and safety data indicate that CD47×CD20 bispecifics described and exemplified herein offer a unique option as single agents for CD20-positive B cell malignancy, for example.

FIG. 1 is a schematic illustration of certain attributes of bispecific entities described herein engineered to overcome the challenge of ubiquitous CD47 expression including low affinity binding without avidity to CD47; minimal binding to normal cells, i.e., no tissue sink; high affinity selective avidity binding to the Tumor Associated Antigen (TAA) CD20; which results in selective binding to tumor cells.

CD47×CD20 bispecifics provided herein may comprise a CD20 binding domain from any high-affinity CD20 binder.

Rituximab LC (SEQ ID NO:329) and HC (SEQ ID NO:330) are preferred sources of anti-CD20 elements for construction of bispecific entities described herein. In certain embodiments, the bispecific antibodies provided herein comprise one or both of the rituximab VL (SEQ ID NO:323) and VH (SEQ ID NO:324), or comprise Rituximab VL CDRs: SEQ ID NO:353 (CDRL1), SEQ ID NO:354 (CDRL2), and SEQ ID NO:355 (CDRL3); and, Rituximab VH CDRs: SEQ ID NO:356 (CDRH1), SEQ ID NO:357 (CDRH2), and SEQ ID NO:358 (CDRH3), respectively. Anti-CD20 IgG1 LC and HC constant regions as otherwise described herein are fused to the carboxy termini of rituximab VL (SEQ ID NO:323) and rituximab VH (SEQ ID NO:324), respectively. Anti-CD20 LC (SEQ ID NO:331) is preferred for employment in construction of bispecific entities of the present invention. Anti-CD20 HC (SEQ ID NO:332) is preferred for employment in construction of bispecific entities of the present invention.

Example bispecific entities described herein selectively and safely target CD20+ tumor cells, with substantially no of binding to CD47 in peripheral tissues, RBCs, and platelets, providing prolonged half-life with lower toxicity and wherein the antibody mediates complement-dependent cytotoxicity (CDC) of the tumor cells.

Bispecific Entities are Preferably of the IgG1 1+1 Heterodimer Format.

In certain embodiments, the bispecific antibodies provided herein comprise two antigen binding arms, which are covalently connected to form a single entity. IgG bispecific antibodies that employ two Fab domains require careful consideration with regards to expression and purification strategy to ensure proper assembly of the desired product. Efforts can be taken at the genetic level to bias the expression of the desired bispecific antibody. For instance, substitutions in the CH3 domains of the IgG Fc to drive heterodimerization of the Fc have been described. Further, knob-in hole strategy utilizes steric hindrance to create complementary asymmetric molecular faces between two different Fc CH3 domains. Other strategies known in the art employ electrostatic complementarity to drive specificity. Alternatively, wild-type IgG scaffolds can be used and the resulting combination of products can be separated during to protein purification to isolate the desired product.

Figure 2:
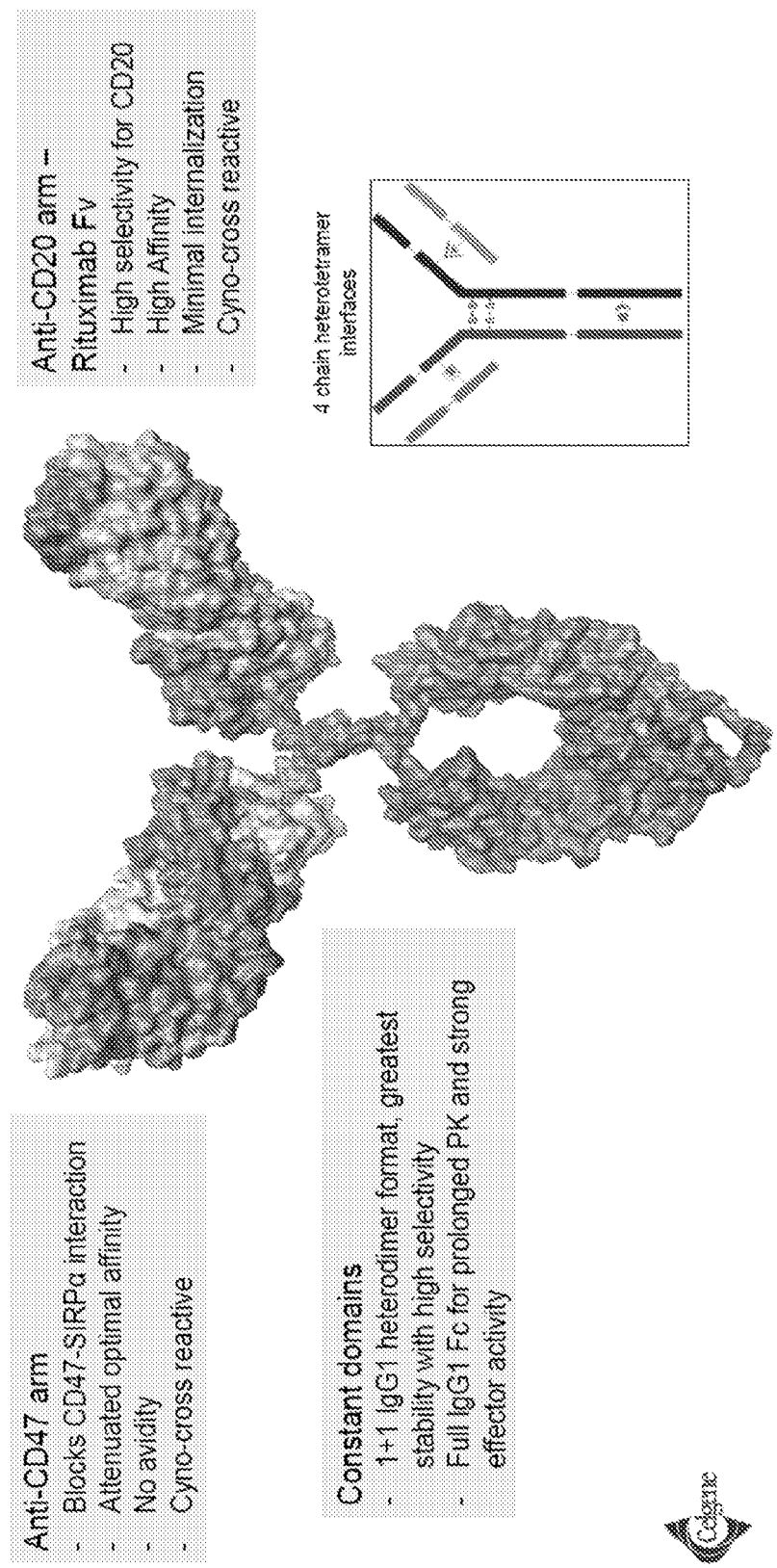
FIG. 2 illustrates an example bispecific entity architecture, protein engineering features, and several biopharmacological attributes.
Figure 6:
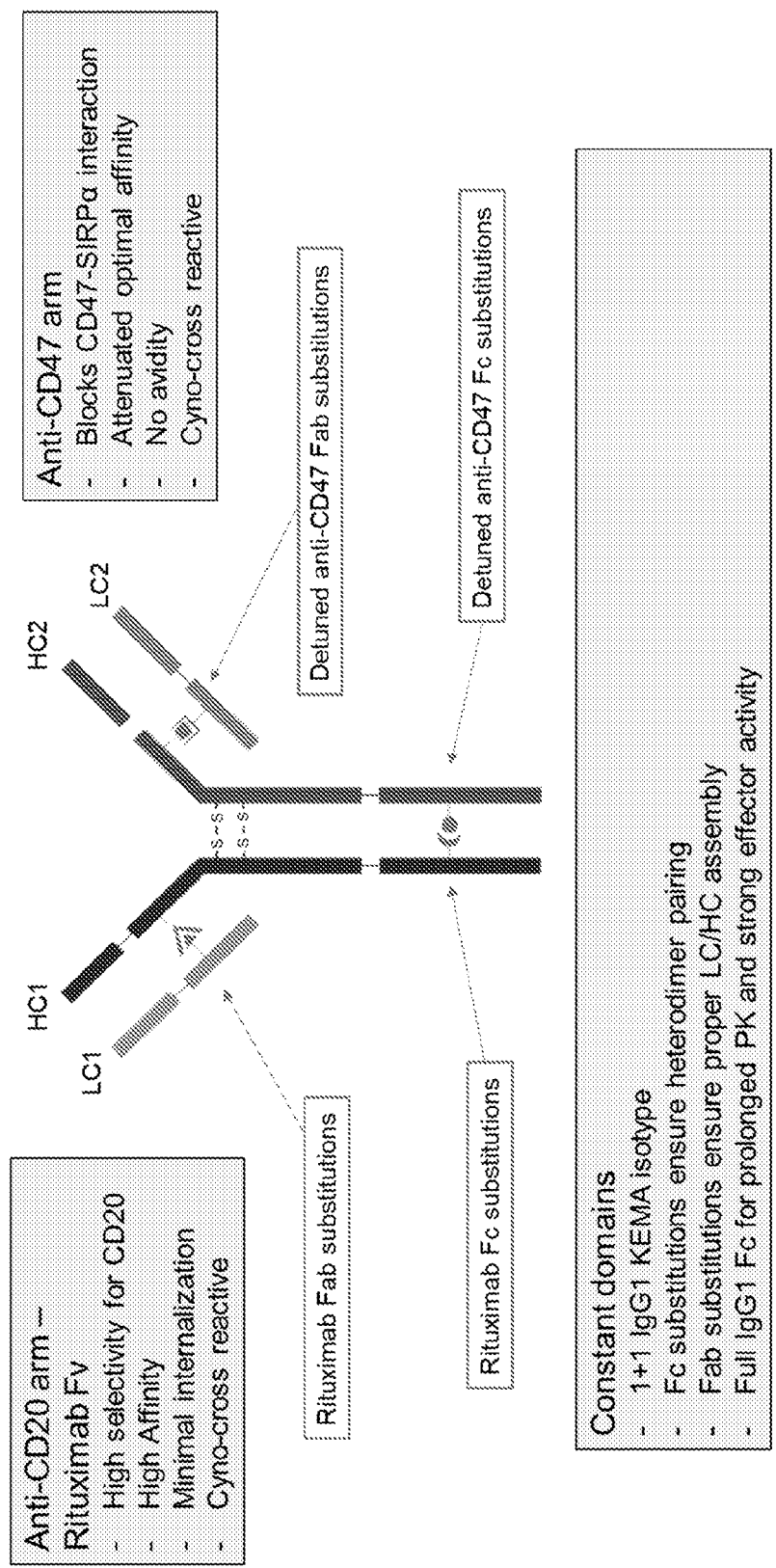
FIG. 6 illustrates example architecture of bispecific entities described herein as well as features of certain examples.

Preferred bispecific antibodies of the present invention are fundamentally native human IgG1 antibodies composed of, (A) one anti-CD47 IgG1 (monomeric) portion which contains one entire light chain (LC) and one entire heavy chain (HC), as well as (B) one anti-CD20 IgG1 (monomeric) portion which contains one entire light chain (LC) and one entire heavy chain (HC). The two monomers form a conventional dimeric IgG1 antibody wherein one arm (Fab$_1$) provides for attenuated binding of CD47 while the other arm (Fab$_2$) provides for affinity binding and avidity for CD20. FIG. 2 and FIG. 6 illustrate CD47×CD20 example architecture described herein and example protein engineering features.

Preferred monomeric elements of the IgG1 1+1 heterodimers described herein each contain certain subsequences within the LC and HC constant regions that reduce homodimer formation during production of the IgG1 1+1 heterodimer format. In one embodiment, an anti-CD47 LC constant region that ensures proper LC/HC pairing during production comprises SEQ ID NO:340. In another embodiment, an anti-CD47 HC constant region that ensures Fc heterodimer formation during production comprise SEQ ID NO:342. Preferred anti-CD20 LC constant region to ensure proper LC/HC pairing during production comprise SEQ ID NO:344. Preferred anti-CD20 HC constant region to ensure Fc heterodimer formation during production comprise SEQ ID NO:346. An example anti-CD47 LC constant region to ensure proper LC/HC pairing during production is SEQ ID NO:339. An example anti-CD47 HC constant region to ensure Fc heterodimer formation during production is SEQ ID NO:341. An example anti-CD20 LC constant region to ensure proper LC/HC pairing during production is SEQ ID NO:343. An example anti-CD20 HC constant region to ensure Fc heterodimer formation during production is SEQ ID NO:345.

Preferred IgG1 constant regions for employment with 161 Fabs described herein in IgG1 1+1 heterodimer format wherein the Fabs provide for attenuated binding of CD47 are LC constant region SEQ ID NO:339 and HC constant region SEQ ID NO:341.

Provided is an anti-CD47 IgG1 LC Constant Region comprising substitutions Q124E, L135W, Q160E, and T180E ensure proper LC/HC pairing during production of the IgG1 1+1 heterodimer format, as compared to CC-90002.

Further provided herein is a preferred anti-CD47 IgG1 LC Constant Region (SEQ ID NO:339). In certain embodiments, e.g., certain embodiments of the bispecific antibodies provided herein, an anti-CD47 VL region provided herein is fused to the amino terminus of SEQ ID NO:339. SEQ ID NO:340 is internal to SEQ ID NO:339. SEQ ID NO: 339 and SEQ ID NO: 440 comprise substitutions Q124E, L135W, Q160E, and T180E, that ensure proper LC/HC pairing during production of the IgG1 1+1 heterodimer format.

Provided is an anti-CD47 IgG1 HC Constant Region comprising substitutions Q179K, T371V, T389L, K420L, and T422W to ensure proper LC/HC pairing and Fc heterodimer formation during production of the IgG1 1+1 heterodimer format.

Further provided herein is a preferred anti-CD47 IgG1 HC Constant Region (SEQ ID NO:341). In certain embodiments, e.g., certain embodiments of the bispecific antibodies provided herein, an anti-CD47 VH region provided herein is fused to the amino terminus of SEQ ID NO:341. SEQ ID NO:342 is internal to SEQ ID NO:341. SEQ ID NO: 341 and SEQ ID NO: 342 comprise substitutions Q179K, T371V, T389L, K420L, and T422W to ensure Fc heterodimer formation during production of the IgG1 1+1 heterodimer format.

Provided is an anti-CD20 IgG1 LC Constant Region comprising substitutions F116A, Q124R, L135V, T178R that ensure proper LC/HC pairing during production of the IgG1 1+1 heterodimer format, as compared to rituximab.

Further provided herein is a preferred anti-CD20 IgG1 LC Constant Region (SEQ ID NO:343). In certain embodiments, e.g., certain embodiments of the bispecific antibodies provided herein, an anti-CD20 VL region provided herein is fused to the amino terminus of SEQ ID NO:343. SEQ ID NO:344 is internal to SEQ ID NO:343. SEQ ID NO:343 and SEQ ID NO:344 comprise substitutions F116A, Q124R, L135V, and T178R that reduce homodimer formation during production of the IgG1 1+1 heterodimer format.

Provided is an anti-CD20 IgG1 HC Constant Region comprising substitutions A139W, L143E, K145T, Q179E, T371V, L372Y, F436A, and Y438V that ensure Fc heterodimer formation during production of the IgG1 1+1 heterodimer format, as compared to rituximab.

Further provided herein is a preferred anti-CD20 IgG1 HC Constant Region (SEQ ID NO:345). In certain embodiments, e.g., certain embodiments of the bispecific antibodies provided herein, an anti-CD20 VH region provided herein is fused to the amino terminus of SEQ ID NO:345. SEQ ID NO:346 is internal to SEQ ID NO:345. SEQ ID NO:345 and SEQ ID NO:346 comprise substitutions A139W, L143E, K145T, Q179E, T371V, L372Y, F436A, and Y438V that reduce homodimer formation during production of the IgG1 1+1 heterodimer format.

CD47×CD20 Bispecifics

A CD47×CD20 bispecific program was initiated to identify therapeutic antibodies that are able to block human CD47 binding to SIRPα only on CD20 expressing cells. Examples resulting from that project and provided herein bind with high affinity to CD20 while exhibiting a detuned affinity to CD47. Once bound to CD20 on tumor cells the antibodies potently block CD47-SIRPα interaction and co-engage activating receptors FcγRs on effector cells through IgG1 Fc, resulting in activation of macrophage mediated phagocytosis and natural killer (NK) cell mediated cytotoxicity against tumor cells.

Bispecific Antibodies Comprising Anti-CD47 Derived from CC-90002

CD47 Epitope Mapping and CC-90002

The anti-CD47 epitope was determined by solving the crystal structure of a non-detuned parental version of CC-90002 (408_437) Fab (VL: SEQ ID NO:387; VH: SEQ ID NO:388) in complex with the human CD47 extracellular domain at 2.4 Å resolution. All three light chain (LC) CDRs (SEQ ID NO:347, SEQ ID NO:348, SEQ ID NO:349) and the heavy chain (HC) CDR2 (SEQ ID NO:351) and HC CDR3 (SEQ ID NO:352) participate in binding to a large surface area of the CD47 ECD. The HC CDRs make multiple contacts to the KGRD loop of CD47 and the LC CDRs overlap with the SIRPα binding site, which explains the ability of CC-90002 and bispecific entities described herein to block SIRPα binding.

CD47×CD20 bispecific entities described herein are designed to promote CD20-restricted blockade of the CD47-SIRPα "don't eat me" signal on cancer cells that express both CD20 and CD47, while sparing CD47$^+$/CD20$^-$ normal cells. Multiple steps of protein engineering led to the anti-CD47 Fabs of the bispecific entities described herein. (1) Protein engineering was employed on both VH and VL chains of CC-90002 to reduce immunogenicity, while retaining functionality; and, (2) Protein engineering was also employed to detune CC-90002. IgG1 bispecific antibodies targeting CD47 and CD20 with reduced affinity to CD47, described and exemplified herein, 1) retain efficacy in mediating anti-tumor function by targeting the CD47-SIRPα interaction and engaging activating receptors FcγRs; 2) minimize target-mediated sink effects and toxicity observed with anti-CD47 therapeutics; 3) incorporate CD47 and CD20 engagement in a single molecule avoiding the need for combination therapy with 2 monoclonal antibodies.

Protein Design

A crystal structure of the effector antigen CD47 was bound to a high affinity anti-CD47 Fab (CC-90002 (408_437 VL: SEQ ID NO:899; 408_437 VH: SEQ ID NO:900)) to guide the construction of an in silico library of Fab variants predicted to have a range of lower affinities, good stability, and low immunogenicity. Variants from this library were expressed as IgG1 bispecifics with a high affinity anti-CD20 Fab (rituximab (VL: SEQ ID NO:323; VH: SEQ ID NO:324)).

The resulting 143 physical constructs were screened for selectivity and potency using cell-based assays for CD47 binding and SIRPα blocking to identify those variants that effectively bound to the effector antigen, CD47, on target cells co-expressing the selectivity antigen, CD20, but which bound minimally to a non-target cell line that expressed only the effector antigen, CD47.

Example anti-CD47 whole LC and HC, LC and HC constant regions, VL and VH regions, and CDR sequences are provided and otherwise described herein that have substantially reduced binding affinity for CD47 and reduced immunogenicity as compared to CC-90002, including but not limited to the IgG1 isotype. IgG1 1+1 heterodimer format is preferred, as described infra, comprising (A) one anti-CD47 IgG1 (monomeric) portion which contains one entire light chain (LC) and one entire heavy chain (HC), as well as (B) one anti-CD20 IgG1 (monomeric) portion which contains one entire light chain (LC) and one entire heavy chain (HC).

Figure 3A:
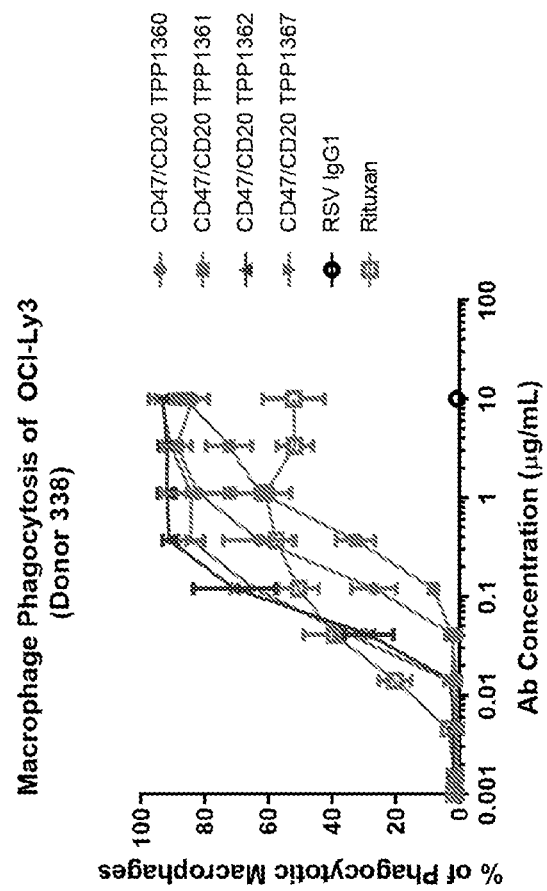
FIGS. 3A-3C show that example species bispecific entities described herein induce macrophage-mediated phagocytosis of CD20+CD47+ OCI-Ly3 NHL cells.
Figures 3B, 3C:
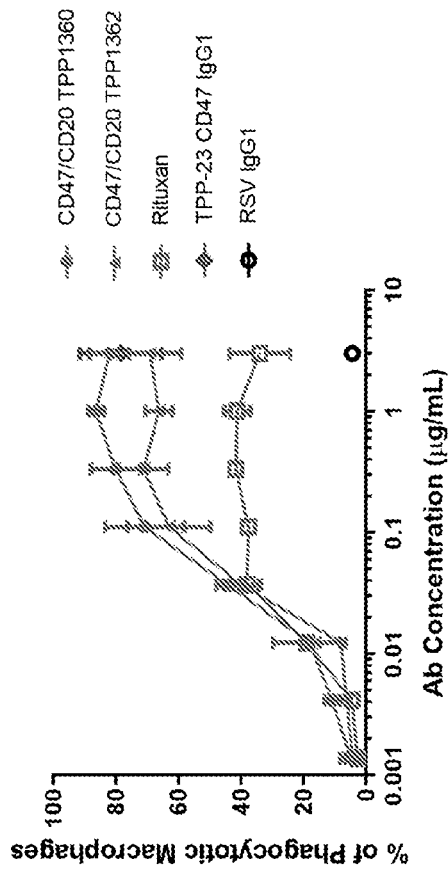
Figure 4A:
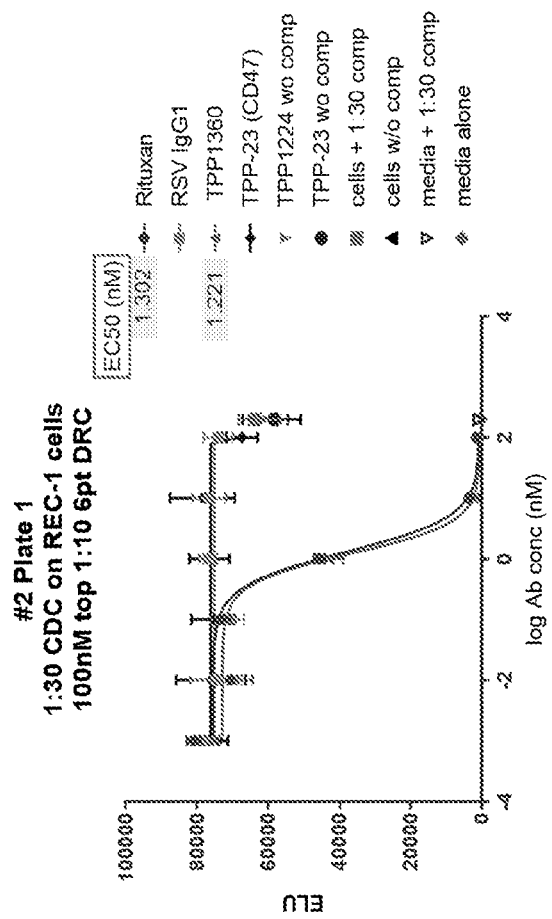
FIGS. 4A-4C show that example bispecific entities, CD47×CD20 IgG1 species, described herein demonstrate CDC function.
Figure 4B:
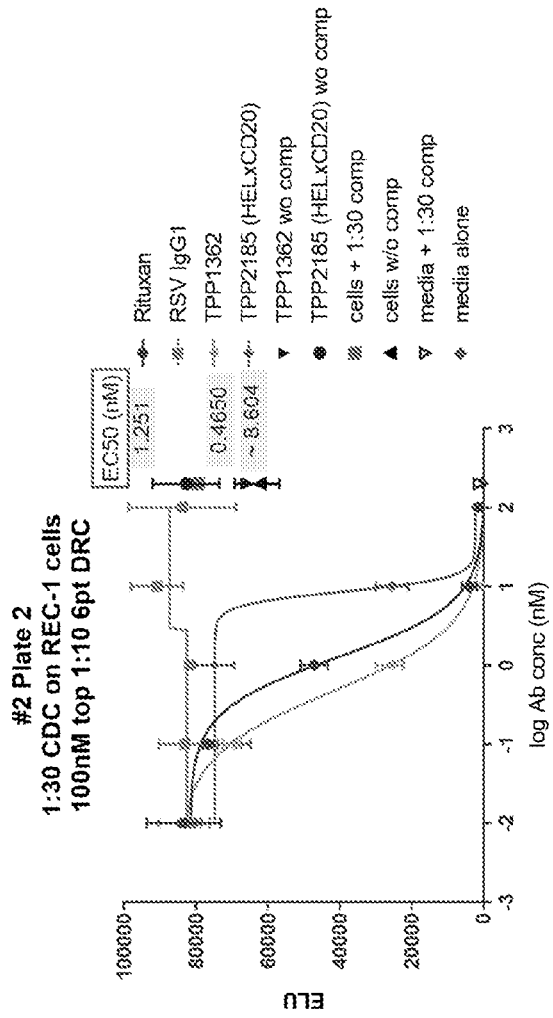
Figure 4C:
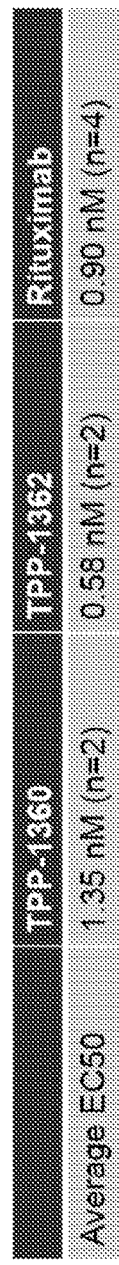
Figure 5A:
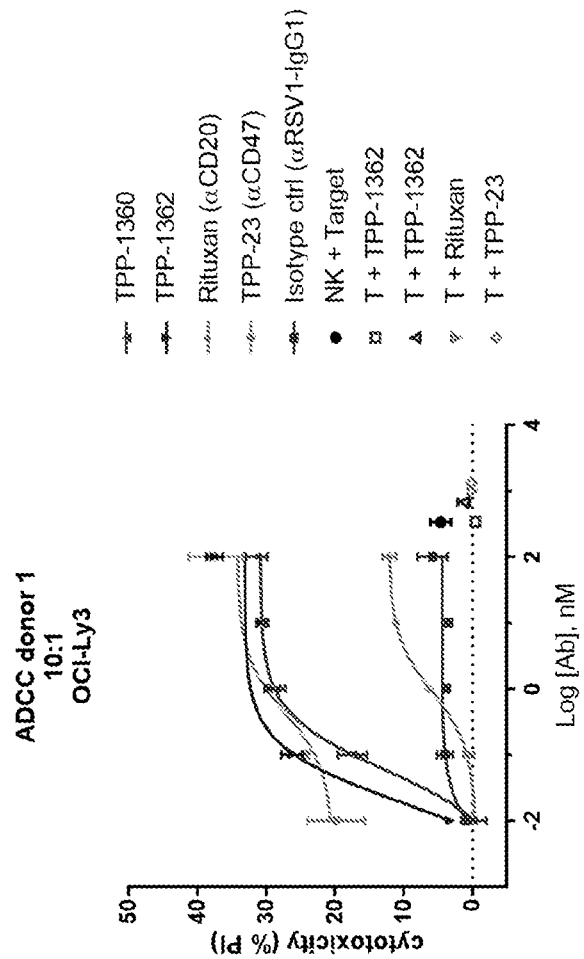
FIGS. 5A-5C show that example bispecific entities, CD47×CD20 IgG1 species, described herein demonstrate potent ADCC function in CD20 high NHL cells, i.e., significantly higher than rituximab.
Figures 5B, 5C:
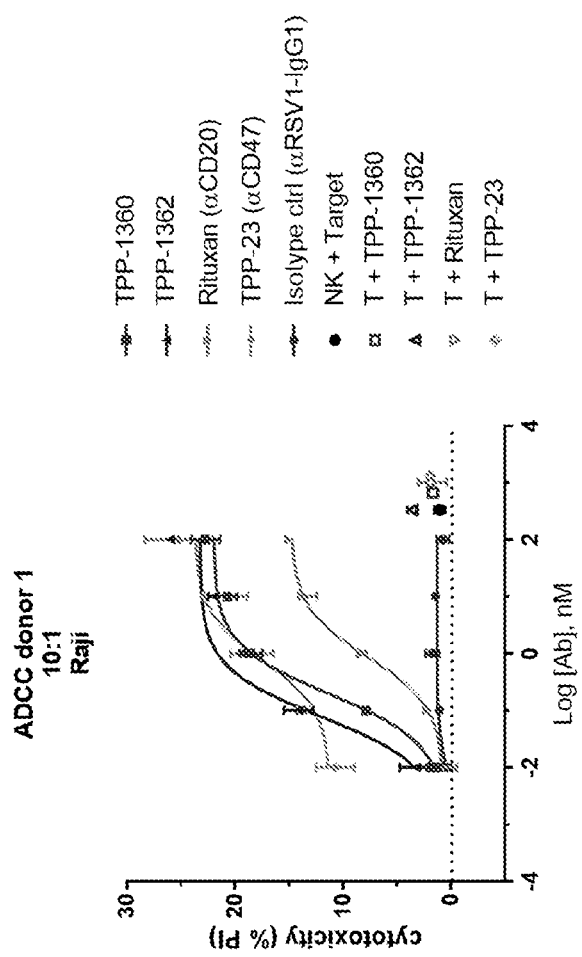

Antibodies of the present invention comprise VL and VH amino acid sequences derived from CC-90002, i.e., SEQ ID NO:325 and SEQ ID NO:326, respectively, wherein the binding affinity for CD47 is substantially attenuated, i.e., Fab portion that binds CD47 exhibits low affinity. A range of affinities to CD47 from the screen of detuned anti-CD47 binders described herein were found to have dramatically reduced binding to non-target cells and yet were still able to effectively bind to CD47 in an avid manner when recruited to the surface of the target cell after binding to CD20. Initial detuned CD47×CD20 bispecific leads achieved this selectivity with affinities that ranged from about 0.5 μM to about 2.5 μM. FIGS. 3A-3C. TPP-1360, for example, was measured to have an affinity for human CD47 ECD of 1.7 μM Kd, which reflects about 350× decrease in affinity relative to the parental anti-CD47 binder. TPP-1362 was measured to have an affinity for human CD47 ECD of 0.796 μM Kd, which reflects ~150× decrease in affinity relative to the parental anti-CD47 binder. Detuned CD47×CD20 bispecific entitled described herein exhibit selectivity with affinities that range from about 0.2 μM to about 4 μM.

Bispecific entities described herein selectively bind CD47 on CD20 expressing tumor cells and are substantially free of binding to CD47 in normal cells. The ratio of binding to Raji (CD47+CD20+) vs human RBC in the co-culture binding assay for bispecific entities described herein is about 6,000 fold, for example. The ratio of binding to human B cells (CD47+CD20+) vs human RBC for bispecific entities described herein is about 700 fold, for example. The level of selection of bispecific entities described herein exhibit selection in the range from about 400 to about 8,000 fold depending upon the expression level of CD20 and CD47 on tumor cells and normal cells. Accordingly, assuming a fixed level of CD47 expression, as CD20 levels increase bispecific entitled described herein exhibit increased selectivity and potency.

Example antibodies of the present invention also comprise VL and VH regions derived from CC-90002, i.e., SEQ ID NO:325 and SEQ ID NO:326, respectively, wherein the VL, VH, or both comprise one or more amino acid substitutions that substantially reduce the immunogenicity of the resulting antibody. Example antibodies of the present invention comprise VL and VH regions derived from CC-90002, SEQ ID NO:325 and SEQ ID NO:326, respectively, wherein the VL, VH, or both sequences comprise one or more amino acid substitutions that reduce the binding affinity of the resulting antibody for CD47 and substantially reduced the immunogenicity of the resulting antibody.

Accordingly, preferred antibodies derived from CC-90002 described herein exhibit 1-7 amino acid substitutions relative to VL SEQ ID NO:325; and, 141 amino acid substitutions relative to VH SEQ ID NO:326.

Further contemplated and otherwise functionally described herein are antibodies derived from CC-90002 that exhibit 8 amino acid substitutions relative to VL SEQ ID NO:325. Further contemplated and otherwise functionally described herein are antibodies derived from CC-90002 that exhibit 9 amino acid substitutions relative to VL SEQ ID NO:325. Further contemplated and otherwise functionally described herein are antibodies derived from CC-90002 that exhibit 10 amino acid substitutions relative to VL SEQ ID NO:325.

Further contemplated and otherwise functionally described herein are antibodies derived from CC-90002 that exhibit 12 amino acid substitutions relative to VH SEQ ID NO:326. Further contemplated and otherwise functionally described herein are antibodies derived from CC-90002 that exhibit 13 amino acid substitutions relative to VH SEQ ID NO:326. Further contemplated and otherwise functionally described herein are antibodies derived from CC-90002 that exhibit 14 amino acid substitutions relative to VH SEQ ID NO:326.

Provided herein is a CD47 antibody wherein the anti-CD47 VL exhibits 1-7 amino acid substitutions relative to SEQ ID NO:325 wherein at least one (1) of said amino acid substitutions is selected from the group consisting of A10S, M11L, K24R, A51E, N52S, L54F, and S56D; and the anti-CD47 VH exhibits 1-11 amino acid substitutions relative to SEQ ID NO:326 wherein at least one (1) of said amino acid substitutions is selected from the group consisting of T14P, Q43K, A44G, E59Y, D66G, M76T, S84R, S88A, M93V, S102E, and T115L.

Also provided herein is a CD47 antibody described herein wherein the anti-CD47 VL exhibits at least one (1), at least two (2), at least three (3), at least four (4), at least five (5), at least six (6) or at least seven (7) amino acid substitutions relative to SEQ ID NO:325 wherein the amino acid substitution is selected from the group consisting of A10S, M11L, K24R, A51E, N52S, L54F, and S56D.

The invention is directed to an antibody described herein wherein the anti-CD47 VL exhibits at least seven (7) amino acid substitutions relative to SEQ ID NO:325 wherein seven (7) of the amino acid substitutions are A10S, M11L, K24R, A51E, N52S, L54F, and S56D.

The invention is directed to an antibody described herein wherein the anti-CD47 VH exhibits at least one (1), two (2), three (3), four (4), five (5), six (6), seven (7), eight (8), nine (9), ten (10), or eleven (11) amino acid substitution relative to SEQ ID NO:326 wherein the amino acid substitution is selected from the group consisting of T14P, Q43K, A44G, E59Y, D66G, M76T, S84R, S88A, M93V, S102E, and T115L.

The invention is directed to an antibody described herein wherein the anti-CD47 VH exhibits at least eleven (11) amino acid substitutions relative to SEQ ID NO:326 wherein eleven (11) of the amino acid substitutions are T14P, Q43K, A44G, E59Y, D66G, M76T, S84R, S88A, M93V, S102E, and T115L.

Anti-CD47 LC (SEQ ID NO:335) and HC (SEQ ID NO:336) are preferred sources of anti-CD47 elements for construction of bispecific entities described herein, particularly VL (SEQ ID NO:319) and VH (SEQ ID NO:320) which comprise VL CDRs SEQ ID NO:365 (CDRL1), SEQ ID NO:366 (CDRL2), and SEQ ID NO:367 (CDRL3); and, VH CDRs SEQ ID NO:368 (CDRH1), SEQ ID NO:369 (CDRH2), and SEQ ID NO:370 (CDRH3), respectively. Substitutions A10S, M11L, K24R, A51E, N52S, L54F, and S56D are important VL (SEQ ID NO:319) substitutions with regard to CC-90002 to effect low CD47 binding affinity and reduce immunogenicity. T14P, Q43K, A44G, E59Y, D66G, M76T, S84R, S88A, M93V, S102E, and T115L are important VH (SEQ ID NO:320) with regard to CC-90002 to effect low CD47 binding affinity (particularly E59Y and S102E) and reduce immunogenicity. Anti-CD47 IgG1 LC and HC Constant Regions as otherwise described herein, e.g., SEQ ID NO:339 and SEQ ID NO:341, respectively, are in certain embodiments fused to the carboxy termini of VL (SEQ ID NO:319) and VH (SEQ ID NO:320). Anti-CD47 LC (SEQ ID NO:335) is preferred for employment in construction of bispecific entities of the present invention. Anti-CD47 HC (SEQ ID NO:336) is preferred for employment in construction of bispecific entities of the present invention. Substitutions Q124E, L135W, Q160E, and T180E are important SEQ ID NO:335 positions to ensure proper LC/HC pairing formation during production of the IgG1 1+1 heterodimer format. Substitutions Q179K, T371V, T389L, K420L, and T422W are important SEQ ID NO:336 positions to reduce propensity for homodimer formation during production of the IgG1 1+1 heterodimer format.

The invention is further particularly directed to an antibody otherwise described herein wherein the anti-CD47 VL exhibits 1-3 amino acid substitutions relative to SEQ ID NO:325 wherein at least one (1), at least two (2), or at least three (3) amino acid substitution in the anti-CD47 VL (SEQ ID NO: 325) are selected from the group consisting of A10S, M11L, and K24R (e.g., SEQ ID NO:321); and, the anti-CD47 VH exhibits 1-11 amino acid substitutions relative to SEQ ID NO:326 wherein at least one (1), at least two (2), at least three (3), at least four (4), at least five (5), at least six (6), at least seven (7), at least eight (8), at least nine (9), at least ten (10) or at least eleven (11) amino acid substitution in the anti-CD47 VH (SEQ ID NO: 326) are selected from the group consisting of T14P, Q43K, A44G, E59Y, D66G, M76T, S84R, S88A, M93V, S102E, and T115L (e.g., SEQ ID NO:322).

The invention is particularly directed to an antibody otherwise described herein wherein the anti-CD47 VH exhibits 1-11 amino acid substitutions relative to SEQ ID NO:326 wherein at least one (1), at least two (2), at least three (3), at least four (4), at least five (5), at least six (6), at least seven (7), at least eight (8), at least nine (9), at least ten (10) or at least eleven (11) amino acid substitution in the anti-CD47 VH (SEQ ID NO: 326) are selected from the group consisting of T14P, Q43K, A44G, E59Y, D66G, M76T, S84R, S88A, M93V, S102E, and T115L (e.g., SEQ ID NO:322).

Anti-CD47 LC (SEQ ID NO:337) and HC (SEQ ID NO:338) are preferred sources of anti-CD47 elements for construction of bispecific entities described herein, particularly VL (SEQ ID NO:321) and VH (SEQ ID NO:322) which comprise VL CDRs SEQ ID NO:371, SEQ ID NO:372, and SEQ ID NO:373; and, VH CDRs SEQ ID NO:374, SEQ ID NO:375, and SEQ ID NO:376, respectively. A10S, M11L, and K24R are important VL (SEQ ID NO:321) positions to effect low CD47 binding affinity and reduce immunogenicity. Substitutions T14P, Q43K, A44G, E59Y, D66G, M76T, S84R, S88A, M93V, S102E, and T115L are important VH (SEQ ID NO:322) positions to effect low CD47 binding affinity (particularly E59Y and S102E) and reduce immunogenicity. Anti-CD47 IgG1 LC and HC Constant Regions as otherwise described herein, e.g., SEQ ID NO:339 and SEQ ID NO:341, respectively, are fused to the carboxy termini of VL (SEQ ID NO:321) and VH (SEQ ID NO:322). Anti-CD47 LC (SEQ ID NO:337) is preferred for employment in construction of bispecific entities of the present invention. Anti-CD47 HC (SEQ ID NO:338) is preferred for employment in construction of bispecific entities of the present invention. Substitutions Q124E, L135W, Q160E, and T180E are important SEQ ID NO:337 positions for reducing the propensity for homodimer formation during production of the IgG1 1+1 heterodimer format. Substitutions Q179K, T371V, T389L, K420L, and T422W are important SEQ ID NO:338 positions for reducing the propensity for homodimer formation during production of the IgG1 1+1 heterodimer format.

The invention is particularly directed to an antibody otherwise described herein wherein the anti-CD47 VL exhibits 1-10 amino acid substitutions relative to SEQ ID NO:325 wherein at least one (1), at least two (2), at least three (3), at least four (4 at least five (5), at least six (6), at least seven (7), at least eight (8), at least nine (9), or at least ten (10) amino acid substitution in the anti-CD47 VL (SEQ ID NO: 325) are selected from the group consisting of A10S, M11L, K24Q, K39D, K42T, K45Q, A51E, N52S, L54F, and S56D (e.g., SEQ ID NO:317); and, the anti-CD47 VH exhibits 1-11 amino acid substitutions relative to SEQ ID NO:326 wherein at least one (1), at least two (2), at least three (3), at least four (4), at least five (5), at least six (6), at least seven (7), at least eight (8), at least nine (9), at least ten (10) or at least eleven (11) amino acid substitution in the anti-CD47 VH (SEQ ID NO: 326) are selected from the group consisting of T14P, A44G, E59Y, D66G, M76T, S84A, R87T, S88A, M93V, S102E, and T115L (e.g., SEQ ID NO:318).

The invention is particularly directed to an antibody otherwise described herein wherein the anti-CD47 VH exhibits 1-11 amino acid substitutions relative to SEQ ID NO:326 wherein at least one (1), at least two (2), at least three (3), at least four (4), at least five (5), at least six (6), at least seven (7), at least eight (8), at least nine (9), at least ten (10) or at least eleven (11) amino acid substitutions in the anti-CD47 VH (SEQ ID NO: 326) are selected from the group consisting of T14P, A44G, E59Y, D66G, M76T, S84A, R87T, S88A, M93V, S102E, and T115L (e.g., SEQ ID NO:318).

Anti-CD47 LC (SEQ ID NO:333) and HC (SEQ ID NO:334) are preferred sources of anti-CD47 elements for construction of bispecific entities described herein, particularly VL (SEQ ID NO:317) and VH (SEQ ID NO:318) which comprise VL CDRs: SEQ ID NO:359, SEQ ID NO:360, and SEQ ID NO:361; and, VH CDRs: SEQ ID NO:362, SEQ ID NO:363, and SEQ ID NO:364, respectively. Substitutions A10S, M11L, K24Q, K39D, K42T, K45Q, A51E, N52S, L54F, and S56D are important VL (SEQ ID NO:317) positions to effect low CD47 binding affinity and reduce immunogenicity. Substitutions T14P, A44G, E59Y, D66G, M76T, S84A, R87T, S88A, M93V, S102E, and T115L are important VH (SEQ ID NO:318) positions to effect low CD47 binding affinity (particularly E59Y and S102E) and reduce immunogenicity. Anti-CD47 IgG1 LC and HC Constant Regions as otherwise described herein, e.g., SEQ ID NO:339 and SEQ ID NO:341, respectively, are fused to the carboxy termini of VL (SEQ ID NO:317) and VH (SEQ ID NO:318). Anti-CD47 LC (SEQ ID NO:333) is preferred for employment in construction of bispecific entities of the present invention. Anti-CD47 HC (SEQ ID NO:334) is preferred for employment in construction of bispecific entities of the present invention. Substitutions Q124E, L135W, Q160E, and T180E are important SEQ ID NO:333 positions to reduce propensity for homodimer formation during production of the IgG1 1+1 heterodimer format. Substitutions Q179K, T371V, T389L, K420L, and T422W are important SEQ ID NO:334 positions for reducing the propensity for homodimer formation during production of the IgG1 1+1 heterodimer format.

Example antibodies described and contemplated herein comprise anti-CD20 VL CDRs RASSSVSYIH (SEQ ID NO:353), ATSNLAS (SEQ ID NO:354), and QQWTSNPPT (SEQ ID NO:355); and, VH CDRs SYNMH (SEQ ID NO:356), AIYPGNGDTSYNQKFKG (SEQ ID NO:357), and STYYGGDWYFNV (SEQ ID NO:358). Example bispecific antibodies otherwise described herein comprise anti-CD20 VL (SEQ ID NO: 323) and VH (SEQ ID NO: 324). Example preferred species bispecific antibodies functionally described herein comprise anti-CD20 LC (SEQ ID NO:331) and anti-CD20 HC (SEQ ID NO:332).

161 Examples of Detuned Anti-CD47 VL/VH Fabs Derived from CC-90002

Further provided herein are 161 VL and VH Fabs derived from parental antibody CC-90002. For each of the 161 Fabs, the VL amino acid sequences are provided as odd SEQ ID Nos 1-321; and the VH amino acid sequences are provided as even SEQ ID Nos 2-322. Identified Fabs (VL/VH pairs) identified are each numbered as adjacent SEQ ID NOs, i.e., pairs disclosed herein following the pattern: SEQ ID NO:1/SEQ ID NO:2; SEQ ID NO:3/SEQ ID NO:4, and so forth to SEQ ID NO:321/SEQ ID NO:322:

SEQ ID NO:1/SEQ ID NO:2; SEQ ID NO:3/SEQ ID NO:4; SEQ ID NO:5/SEQ ID NO:6; SEQ ID NO:7/SEQ ID NO:8; SEQ ID NO:9/SEQ ID NO:10; SEQ ID NO:11/SEQ ID NO:12; SEQ ID NO:13/SEQ ID NO:14; SEQ ID NO:15/SEQ ID NO:16; SEQ ID NO:17/SEQ ID NO:18; SEQ ID NO:19/SEQ ID NO:20; SEQ ID NO:21/SEQ ID NO:22; SEQ ID NO:23/SEQ ID NO:24; SEQ ID NO:25/SEQ ID NO:26; SEQ ID NO:27/SEQ ID NO:28; SEQ ID NO:29/SEQ ID NO:30; SEQ ID NO:31/SEQ ID NO:32; SEQ ID NO:33/SEQ ID NO:34; SEQ ID NO:35/SEQ ID NO:36; SEQ ID NO:37/SEQ ID NO:38; SEQ ID NO:39/SEQ ID NO:40; SEQ ID NO:41/SEQ ID NO:42; SEQ ID NO:43/SEQ ID NO:44; SEQ ID NO:45/SEQ ID NO:46; SEQ ID NO:47/SEQ ID NO:48; SEQ ID NO:49/SEQ ID NO:50; SEQ ID NO:51/SEQ ID NO:52; SEQ ID NO:53/SEQ ID NO:54; SEQ ID NO:55/SEQ ID NO:56; SEQ ID NO:57/SEQ ID NO:58; SEQ ID NO:59/SEQ ID NO:60; SEQ ID NO:61/SEQ ID NO:62; SEQ ID NO:63/SEQ ID NO:64; SEQ ID NO:65/SEQ ID NO:66; SEQ ID NO:67/SEQ ID NO:68; SEQ ID NO:69/SEQ ID NO:70; SEQ ID NO:71/SEQ ID NO:72; SEQ ID NO:73/SEQ ID NO:74; SEQ ID NO:75/SEQ ID NO:76; SEQ ID NO:77/SEQ ID NO:78; SEQ ID NO:79/SEQ ID NO:80; SEQ ID NO:81/SEQ ID NO:82; SEQ ID NO:83/SEQ ID NO:84; SEQ ID NO:85/SEQ ID NO:86; SEQ ID NO:87/SEQ ID NO:88; SEQ ID NO:89/SEQ ID NO:90; SEQ ID NO:91/SEQ ID NO:92; SEQ ID NO:93/SEQ ID NO:94; SEQ ID NO:95/SEQ ID NO:96; SEQ ID NO:97/SEQ ID NO:98; SEQ ID NO:99/SEQ ID NO:100; SEQ ID NO:101/SEQ ID NO:102; SEQ ID NO:103/SEQ ID NO:104; SEQ ID NO:105/SEQ ID NO:106; SEQ ID NO:107/SEQ ID NO:108; SEQ ID NO:109/SEQ ID NO:110; SEQ ID NO:111/SEQ ID NO:112; SEQ ID NO:113/SEQ ID NO:114; SEQ ID NO:115/SEQ ID NO:116; SEQ ID NO:117/SEQ ID NO:118; SEQ ID NO:119/SEQ ID NO:120; SEQ ID NO:121/SEQ ID NO:122; SEQ ID NO:123/SEQ ID NO:124; SEQ ID NO:125/SEQ ID NO:126; SEQ ID NO:127/SEQ ID NO:128; SEQ ID NO:129/SEQ ID NO:130; SEQ ID NO:131/SEQ ID NO:132; SEQ ID NO:133/SEQ ID NO:134; SEQ ID NO:135/SEQ ID NO:136; SEQ ID NO:137/SEQ ID NO:138; SEQ ID NO:139/SEQ ID NO:140; SEQ ID NO:141/SEQ ID NO:142; SEQ ID NO:143/SEQ ID NO:144; SEQ ID

NO:145/SEQ ID NO:146; SEQ ID NO:147/SEQ ID NO:148; SEQ ID NO:149/SEQ ID NO:150; SEQ ID NO:151/SEQ ID NO:152; SEQ ID NO:153/SEQ ID NO:154; SEQ ID NO:155/SEQ ID NO:156; SEQ ID NO:157/SEQ ID NO:158; SEQ ID NO:159/SEQ ID NO:160; SEQ ID NO:161/SEQ ID NO:162; SEQ ID NO:163/SEQ ID NO:164; SEQ ID NO:165/SEQ ID NO:166; SEQ ID NO:167/SEQ ID NO:168; SEQ ID NO:169/SEQ ID NO:170; SEQ ID NO:171/SEQ ID NO:172; SEQ ID NO:173/SEQ ID NO:174; SEQ ID NO:175/SEQ ID NO:176; SEQ ID NO:177/SEQ ID NO:178; SEQ ID NO:179/SEQ ID NO:180; SEQ ID NO:181/SEQ ID NO:182; SEQ ID NO:183/SEQ ID NO:184; SEQ ID NO:185/SEQ ID NO:186; SEQ ID NO:187/SEQ ID NO:188; SEQ ID NO:189/SEQ ID NO:190; SEQ ID NO:191/SEQ ID NO:192; SEQ ID NO:193/SEQ ID NO:194; SEQ ID NO:195/SEQ ID NO:196; SEQ ID NO:197/SEQ ID NO:198; SEQ ID NO:199/SEQ ID NO:200; SEQ ID NO:201/SEQ ID NO:202; SEQ ID NO:203/SEQ ID NO:204; SEQ ID NO:205/SEQ ID NO:206; SEQ ID NO:207/SEQ ID NO:208; SEQ ID NO:209/SEQ ID NO:210; SEQ ID NO:211/SEQ ID NO:212; SEQ ID NO:213/SEQ ID NO:214; SEQ ID NO:215/SEQ ID NO:216; SEQ ID NO:217/SEQ ID NO:218; SEQ ID NO:219/SEQ ID NO:220; SEQ ID NO:221/SEQ ID NO:222; SEQ ID NO:223/SEQ ID NO:224; SEQ ID NO:225/SEQ ID NO:226; SEQ ID NO:227/SEQ ID NO:228; SEQ ID NO:229/SEQ ID NO:230; SEQ ID NO:231/SEQ ID NO:232; SEQ ID NO:233/SEQ ID NO:234; SEQ ID NO:235/SEQ ID NO:236; SEQ ID NO:237/SEQ ID NO:238; SEQ ID NO:239/SEQ ID NO:240; SEQ ID NO:241/SEQ ID NO:242; SEQ ID NO:243/SEQ ID NO:244; SEQ ID NO:245/SEQ ID NO:246; SEQ ID NO:247/SEQ ID NO:248; SEQ ID NO:249/SEQ ID NO:250; SEQ ID NO:251/SEQ ID NO:252; SEQ ID NO:253/SEQ ID NO:254; SEQ ID NO:255/SEQ ID NO:256; SEQ ID NO:257/SEQ ID NO:258; SEQ ID NO:259/SEQ ID NO:260; SEQ ID NO:261/SEQ ID NO:262; SEQ ID NO:263/SEQ ID NO:264; SEQ ID NO:265/SEQ ID NO:266; SEQ ID NO:267/SEQ ID NO:268; SEQ ID NO:269/SEQ ID NO:270; SEQ ID NO:271/SEQ ID NO:272; SEQ ID NO:273/SEQ ID NO:274; SEQ ID NO:275/SEQ ID NO:276; SEQ ID NO:277/SEQ ID NO:278; SEQ ID NO:279/SEQ ID NO:280; SEQ ID NO:281/SEQ ID NO:282; SEQ ID NO:283/SEQ ID NO:284; SEQ ID NO:285/SEQ ID NO:286; SEQ ID NO:287/SEQ ID NO:288; SEQ ID NO:289/SEQ ID NO:290; SEQ ID NO:291/SEQ ID NO:292; SEQ ID NO:293/SEQ ID NO:294; SEQ ID NO:295/SEQ ID NO:296; SEQ ID NO:297/SEQ ID NO:298; SEQ ID NO:299/SEQ ID NO:300; SEQ ID NO:301/SEQ ID NO:302; SEQ ID NO:303/SEQ ID NO:304; SEQ ID NO:305/SEQ ID NO:306; SEQ ID NO:307/SEQ ID NO:308; SEQ ID NO:309/SEQ ID NO:310; SEQ ID NO:311/SEQ ID NO:312; SEQ ID NO:315/SEQ ID NO:316; SEQ ID NO:317/SEQ ID NO:318; SEQ ID NO:319/SEQ ID NO:320; and, SEQ ID NO:321/SEQ ID NO:322.

Although preferred, this disclosure is not limited to each pair as indicated, per se. The population of VL and VH region species disclosed herein can be employed to form distinct pairs i.e., diverse Fabs selected from the population of VL and VH species regions provided.

Example antibodies otherwise functionally described herein are provided wherein the anti-CD47 VL is selected from the group consisting of SEQ ID NO:1, SEQ ID NO:3, SEQ ID NO:5, SEQ ID NO:7, SEQ ID NO:9, SEQ ID NO:11, SEQ ID NO:13, SEQ ID NO:15, SEQ ID NO:17, SEQ ID NO:19, SEQ ID NO:21, SEQ ID NO:23, SEQ ID NO:25, SEQ ID NO:27, SEQ ID NO:29, SEQ ID NO:31, SEQ ID NO:33, SEQ ID NO:35, SEQ ID NO:37, SEQ ID NO:39, SEQ ID NO:41, SEQ ID NO:43, SEQ ID NO:45, SEQ ID NO:47, SEQ ID NO:49, SEQ ID NO:51, SEQ ID NO:53, SEQ ID NO:55, SEQ ID NO:57, SEQ ID NO:59, SEQ ID NO:61, SEQ ID NO:63, SEQ ID NO:65, SEQ ID NO:67, SEQ ID NO:69, SEQ ID NO:71, SEQ ID NO:73, SEQ ID NO:75, SEQ ID NO:77, SEQ ID NO:79, SEQ ID NO:81, SEQ ID NO:83, SEQ ID NO:85, SEQ ID NO:87, SEQ ID NO:89, SEQ ID NO:91, SEQ ID NO:93, SEQ ID NO:95, SEQ ID NO:97, SEQ ID NO:99, SEQ ID NO:101, SEQ ID NO:103, SEQ ID NO:105, SEQ ID NO:107, SEQ ID NO:109, SEQ ID NO:111, SEQ ID NO:113, SEQ ID NO:115, SEQ ID NO:117, SEQ ID NO:119, SEQ ID NO:121, SEQ ID NO:123, SEQ ID NO:125, SEQ ID NO:127, SEQ ID NO:129, SEQ ID NO:131, SEQ ID NO:133, SEQ ID NO:135, SEQ ID NO:137, SEQ ID NO:139, SEQ ID NO:141, SEQ ID NO:143, SEQ ID NO:145, SEQ ID NO:147, SEQ ID NO:149, SEQ ID NO:151, SEQ ID NO:153, SEQ ID NO:155, SEQ ID NO:157, SEQ ID NO:159, SEQ ID NO:161, SEQ ID NO:163, SEQ ID NO:165, SEQ ID NO:167, SEQ ID NO:169, SEQ ID NO:171, SEQ ID NO:173, SEQ ID NO:175, SEQ ID NO:177, SEQ ID NO:179, SEQ ID NO:181, SEQ ID NO:183, SEQ ID NO:185, SEQ ID NO:187, SEQ ID NO:189, SEQ ID NO:191, SEQ ID NO:193, SEQ ID NO:195, SEQ ID NO:197, SEQ ID NO:199, SEQ ID NO:201, SEQ ID NO:203, SEQ ID NO:205, SEQ ID NO:207, SEQ ID NO:209, SEQ ID NO:211, SEQ ID NO:213, SEQ ID NO:215, SEQ ID NO:217, SEQ ID NO:219, SEQ ID NO:221, SEQ ID NO:223, SEQ ID NO:225, SEQ ID NO:227, SEQ ID NO:229, SEQ ID NO:231, SEQ ID NO:233, SEQ ID NO:235, SEQ ID NO:237, SEQ ID NO:239, SEQ ID NO:241, SEQ ID NO:243, SEQ ID NO:245, SEQ ID NO:247, SEQ ID NO:249, SEQ ID NO:251, SEQ ID NO:253, SEQ ID NO:255, SEQ ID NO:257, SEQ ID NO:259, SEQ ID NO:261, SEQ ID NO:263, SEQ ID NO:265, SEQ ID NO:267, SEQ ID NO:269, SEQ ID NO:271, SEQ ID NO:273, SEQ ID NO:275, SEQ ID NO:277, SEQ ID NO:279, SEQ ID NO:281, SEQ ID NO:283, SEQ ID NO:285, SEQ ID NO:287, SEQ ID NO:289, SEQ ID NO:291, SEQ ID NO:293, SEQ ID NO:295, SEQ ID NO:297, SEQ ID NO:299, SEQ ID NO:301, SEQ ID NO:303, SEQ ID NO:305, SEQ ID NO:307, SEQ ID NO:309, SEQ ID NO:311, SEQ ID NO:313, SEQ ID NO:315, SEQ ID NO:317, SEQ ID NO:319, and SEQ ID NO:321; and, the anti-CD47 VH is selected from the group consisting of SEQ ID NO:2, SEQ ID NO:4, SEQ ID NO:6, SEQ ID NO:8, SEQ ID NO:10, SEQ ID NO:12, SEQ ID NO:14, SEQ ID NO:16, SEQ ID NO:18, SEQ ID NO:20, SEQ ID NO:22, SEQ ID NO:24, SEQ ID NO:26, SEQ ID NO:28, SEQ ID NO:30, SEQ ID NO:32, SEQ ID NO:34, SEQ ID NO:36, SEQ ID NO:38, SEQ ID NO:40, SEQ ID NO:42, SEQ ID NO:44, SEQ ID NO:46, SEQ ID NO:48, SEQ ID NO:50, SEQ ID NO:52, SEQ ID NO:54, SEQ ID NO:56, SEQ ID NO:58, SEQ ID NO:60, SEQ ID NO:62, SEQ ID NO:64, SEQ ID NO:66, SEQ ID NO:68, SEQ ID NO:70, SEQ ID NO:72, SEQ ID NO:74, SEQ ID NO:76, SEQ ID NO:78, SEQ ID NO:80, SEQ ID NO:82, SEQ ID NO:84, SEQ ID NO:86, SEQ ID NO:88, SEQ ID NO:90, SEQ ID NO:92, SEQ ID NO:94, SEQ ID NO:96, SEQ ID NO:98, SEQ ID NO:100, SEQ ID NO:102, SEQ ID NO:104, SEQ ID NO:106, SEQ ID NO:108, SEQ ID NO:110, SEQ ID NO:112, SEQ ID NO:114, SEQ ID
NO:116, SEQ ID NO:118, SEQ ID NO:120, SEQ ID
NO:122, SEQ ID NO:124, SEQ ID NO:126, SEQ ID
NO:128, SEQ ID NO:130, SEQ ID NO:132, SEQ ID
NO:134, SEQ ID NO:136, SEQ ID NO:138, SEQ ID
NO:140, SEQ ID NO:142, SEQ ID NO:144, SEQ ID
NO:146, SEQ ID NO:148, SEQ ID NO:150, SEQ ID
NO:152, SEQ ID NO:154, SEQ ID NO:156, SEQ ID
NO:158, SEQ ID NO:160, SEQ ID NO:162, SEQ ID
NO:164, SEQ ID NO:166, SEQ ID NO:168, SEQ ID
NO:170, SEQ ID NO:172, SEQ ID NO:174, SEQ ID
NO:176, SEQ ID NO:178, SEQ ID NO:180, SEQ ID
NO:182, SEQ ID NO:184, SEQ ID NO:186, SEQ ID
NO:188, SEQ ID NO:190, SEQ ID NO:192, SEQ ID
NO:194, SEQ ID NO:196, SEQ ID NO:198, SEQ ID
NO:200, SEQ ID NO:202, SEQ ID NO:204, SEQ ID
NO:206, SEQ ID NO:208, SEQ ID NO:210, SEQ ID
NO:212, SEQ ID NO:214, SEQ ID NO:216, SEQ ID
NO:218, SEQ ID NO:220, SEQ ID NO:222, SEQ ID
NO:224, SEQ ID NO:226, SEQ ID NO:228, SEQ ID
NO:230, SEQ ID NO:232, SEQ ID NO:234, SEQ ID
NO:236, SEQ ID NO:238, SEQ ID NO:240, SEQ ID
NO:242, SEQ ID NO:244, SEQ ID NO:246, SEQ ID
NO:248, SEQ ID NO:250, SEQ ID NO:252, SEQ ID
NO:254, SEQ ID NO:255, SEQ ID NO:258, SEQ ID
NO:260, SEQ ID NO:262, SEQ ID NO:264, SEQ ID
NO:266, SEQ ID NO:268, SEQ ID NO:270, SEQ ID
NO:272, SEQ ID NO:274, SEQ ID NO:276, SEQ ID
NO:278, SEQ ID NO:280, SEQ ID NO:282, SEQ ID
NO:284, SEQ ID NO:286, SEQ ID NO:288, SEQ ID
NO:290, SEQ ID NO:292, SEQ ID NO:294, SEQ ID
NO:296, SEQ ID NO:298, SEQ ID NO:300, SEQ ID
NO:302, SEQ ID NO:304, SEQ ID NO:306, SEQ ID
NO:308, SEQ ID NO:310, SEQ ID NO:312, SEQ ID
NO:314, SEQ ID NO:316, SEQ ID NO:318, SEQ ID
NO:320, and SEQ ID NO:322.

Properties of CD47×CD20 Bispecific Entities of the Present Invention

In vitro affinity measurements with the extracellular domain of the effector antigen, CD47, initially revealed a 100-200-fold decrease in affinity for these variants. In vitro affinity measurements with the extra-cellular domain of CD47 revealed that the variants had a 100-500-fold decrease in affinity. In vivo and in vitro cell based studies with these detuned IgG1 1+1 heterodimer format bispecifics confirmed effector-based cell killing and decreased binding to non-target cell types relative to a monospecific antibody. Anti-CD20 VL: SEQ ID NO:323; anti-CD20 VH: SEQ ID NO:324. Anti-CD20 LC constant region is SEQ ID NO:343. Anti-CD20 HC constant region is SEQ ID NO:345.

Bispecific entities described, exemplified, and claimed herein demonstrate selective binding to CD20-expressing cells, for example, wherein the interaction of CD47 with the macrophage checkpoint inhibitor, signal-regulatory protein alpha (SIRPα), is blocked. This increased selectivity over monospecific anti-CD47 approaches allows for the use of an IgG1 Fc, which engages activating fragment crystallizable gamma receptors (FcγRs) to fully potentiate macrophages to engulf and destroy CD20 positive cells. In comparison to the anti-CD20 antibody rituximab, for example, anti-CD47/anti-CD20 bispecific antibodies described and exemplified herein are more potent in inducing phagocytosis and ADCC in vitro.

In vitro cell-based studies demonstrate that detuned CD47 bispecific entities described herein activate antibody-dependent cellular phagocytosis, complement-dependent cytotoxicity (CDC), and antibody-dependent cellular cytotoxicity (ADCC). See FIGS. 4A-4C and FIGS. 5A-5C. Further, cynomolgus (cyno) monkey pharmacokinetic (PK) and exploratory toxicity (E-tox) studies experiments demonstrate the detuned CD47 bispecifics effectively deplete B-cells and have reduced binding to cynomolgus red blood cells (RBCS) relative to the parental monospecific anti-CD47 antibody, thereby substantially confirming the success and medical value of the target-cell selective strategy described and claimed herein. Species exemplified herein demonstrate favorable pharmacokinetics and depletion of $CD20^+$ B cells with minimum deleterious effects seen on hematologic parameters following multiple administrations to nonhuman primates.

In specific embodiments, CD47×CD20 bispecifics provided herein, designated TPP-1360, TPP-1361, TPP-1367, and TPP-1362, comprise heavy and light chain sequences as follows: TPP-1360 comprises (CD47 LC SEQ ID NO:335; HC SEQ ID NO:336)×(CD20 LC SEQ ID NO:331; HC SEQ ID NO:332). TPP-1361 comprises (CD47 LC SEQ ID NO:333; HC SEQ ID NO:334)×(CD20 LC SEQ ID NO:331; HC SEQ ID NO:332). TPP-1367 comprises (CD47 LC SEQ ID NO:337; HC SEQ ID NO:338)×(CD20 LC SEQ ID NO:331; HC SEQ ID NO:332). TPP-1362 comprises (CD47 LC SEQ ID NO:385; HC SEQ ID NO:386)×(CD20 LC SEQ ID NO:331; HC SEQ ID NO:332).

With regard to TPP-1362, the CD47 VL comprises SEQ ID NO:383. TPP-1362 CD47 VH comprises SEQ ID NO:384. TPP-1362 CD47 VL CDRs comprise SEQ ID NO:377 (CDRL1); SEQ ID NO:378 (CDRL2); and, SEQ ID NO:379 (CDRL3). TPP-1362 CD47 VH CDRs comprise SEQ ID NO:380 (CDRH1); SEQ ID NO:381 (CDRH2); and, SEQ ID NO:382 (CDRH3).

An example series of bispecific entities within the genera otherwise described herein are demonstrated to exhibit pharmacology characteristics generally indicative of the therapeutic value of the genera.

These highly evaluated species, for example, exhibit high affinity to CD20 and detuned affinity to CD47, showing effective CD47 blocking, cyno-cross reactivity, good physicochemical properties (solubility, stability, expression), and low immunogenicity prediction (EpiVax). See Example 13, FIG. 18. The IgG1 heterodimer format and Fc confer reliable production in sufficient amounts and purity using standard CHO processes, with phase appropriate titer, yield, product quality and liquid formulation. These example highly evaluated species exhibit in vitro phagocytosis capacity of $CD20^+$ tumor cells superior to CC-90002 and more potent ADCC than rituximab. These example highly evaluated species also exhibit marked reduction in cyno B cells in peripheral blood and lymphoid tissues. These example highly evaluated species also exhibit minimal sink effects with no binding to $CD20^-$ $CD47^+$ healthy cells (RBC and platelets). These example highly evaluated species also exhibit acceptable PK parameters to support weekly, for example, dosing.

Figure 8:
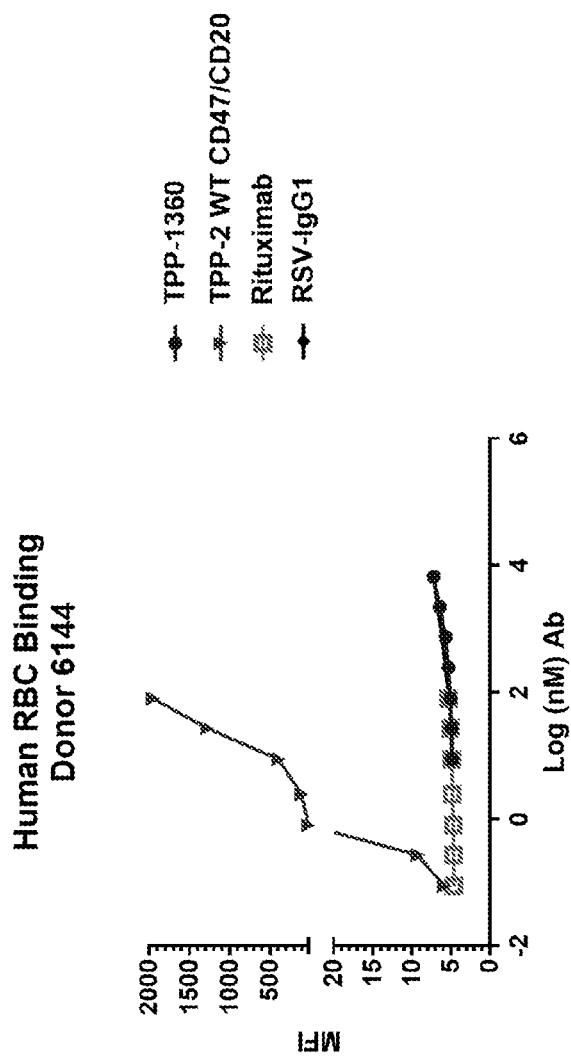
FIG. 8 illustrates an example species bispecific entity described herein, TPP-1360, that is demonstrated to selectively bind CD47$^+$/CD20$^+$ Raji Cells but not CD47$^+$/CD20$^-$ human red blood cells (RBCs).
Figure 9:
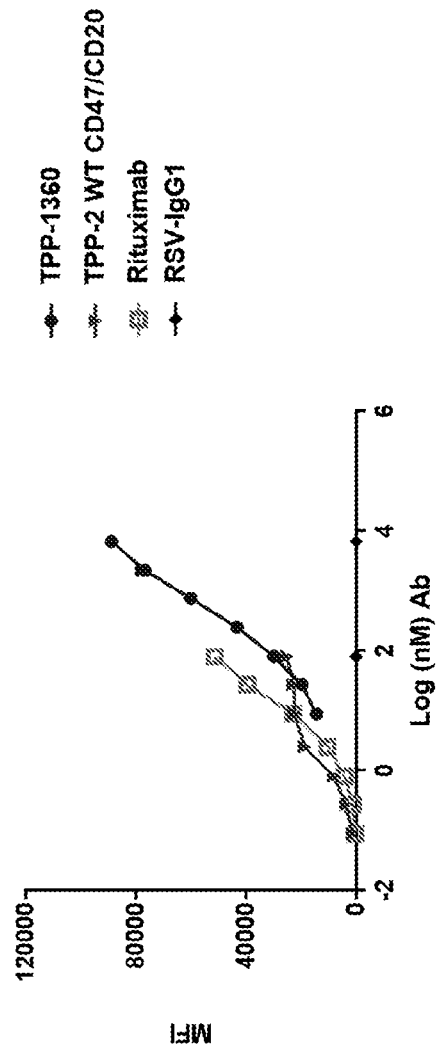
FIG. 9 shows that, in a co-culture of Raji cells and human RBCs, an example species bispecific entity described herein, TPP-1360, displayed dose-dependent binding to CD47$^+$/CD20$^+$ Raji cells but no binding to human RBCs, even at concentration as high as 1 mg/mL.

RBC binding capacity of TPP-1360, for example, was extensively evaluated in purified human RBCs and in co-culture of human RBCs with tumor cells. As illustrated in FIG. 8, TPP-1360 is demonstrated to selectively bind $CD47^+/CD20^+$ Raji Cells but Not $CD47^+/CD20^-$ human RBCs. Moreover, in a co-culture of Raji cells and human RBCs, TPP-1360 displayed dose-dependent binding to $CD47^+/CD20^+$ Raji cells but no binding to human RBCs, even at concentration as high as 1 mg/mL. See, FIG. 9. To the contrary, the CD47 wild type/CD20 bispecific, TPP-2, significantly bound to both Raji cells and human RBCs. In addition, TPP-1360 does not show binding to purified cyno RBC from multiple donors.

TPP-1360, an example species bispecific entity of the present disclosure, is a first-in-class antibody, co-targeting CD47 and CD20, designed to bind CD20 with high affinity and CD47 with optimally detuned affinity. When bound to CD20 expressing cells, TPP-1360, for example, not only blocks macrophage checkpoint inhibitor SIRPα interaction with CD47 but also engages activating FcγRs to fully potentiate macrophages to engulf and destroy CD20 positive cells. Potent in vitro activity is induced by TPP-1360, for example, to eliminate cancer cells via multiple modes of action, including phagocytosis, ADCC and CDC. TPP-1360, exemplary of the bispecific entities described herein, provides enhanced pharmacological activities over rituximab and CC-90002.

CD47×CD20 bispecific entities described and claimed herein demonstrate enhanced phagocytosis compared to rituximab or CC-90002 as a single agent. Phagocytosis activity of CD47×CD20 bispecific entities described herein generally correlate with their CD47 binding affinity. CD47× CD20 bispecific entities described herein single agent activity is equivalent to the combination of CC-90002 and rituximab in inducing phagocytosis.

CD47×CD20 bispecific entities described herein demonstrate improved ADCC in rituximab sensitive and resistant tumor cells as compared to single agent anti-CD47 activity.

CD47×CD20 bispecific entities described herein demonstrate better efficacy than rituximab in vivo in Raji NOD-SCID model. See Example 15.

TPP-1360 enhances both phagocytosis and ADCC activity over rituximab. In addition, TPP-1360 and related bispecific entities described, exemplified, and claimed herein, differentiate from CD20×CD3 bispecific T-cell engagers such as REGN1979 from Regeneron, or mosunetuzumab from Roche, now in the clinic as it has different modes of action, including phagocytosis, ADCC and CDC, compared to T cell activation. Furthermore, the toxicity profile is different from CD20×CD3 (potential hematologic toxicity vs cytokine release syndrome). Particularly, T-cell engagers are potent immune engagers that have the potential to trigger apoptosis of non-target cells which express very low levels of the target antigen, therefore either the target antigen needs to be extremely specific or the anti-targeting arm of the bispecific needs to employ either a masking technology or be tuned to differentiate between the levels of expression of the target antigen on normal and disease tissue. Additionally, the anti-CD3 portion of the bispecific needs to be precisely tuned to prevent cytokine release due to systemic activation of T-cells. Importantly, TPP-1360, as a representative example herein, demonstrates favorable elimination kinetics with minimum deleterious effects seen on hematologic parameters following multiple administrations to nonhuman primates. CD47×CD20 bispecific antibodies of the present invention are developed inter alia as intravenous (IV) injectable treatment for B-lymphoma patients, for example, refractory and/or resistant to current therapies.

Bispecific entities described herein are provided for methods of treatment and/or control of tumors, tumor cells, cancer, including but not limited to cells undergoing aberrant proliferation, hematological oncology conditions, hematological malignancies, lymphoproliferative disorders, B-cell disorders, B-cell malignancies, and/or B-cell lymphoma. Bispecific entities of the present invention are formulated and administered according to and consistent with the current state of the art of antibodies as therapeutic entities. Standards of formulation and administration of IgG1 antibodies, for example, are well-known in the art. Antibodies described herein are administered, for example, as an intravenous (IV) injectable treatment for CD20 positive B cell lymphoma patients. The invention is directed to a method of controlling tumor cells comprising administering an effective amount of a bispecific entity described herein to a patient in need thereof. Tumor cells refer to cancer cells including but not limited to cells undergoing aberrant proliferation, hematological oncology conditions, hematological malignancies, lymphoproliferative disorders, B-cell disorders, B-cell malignancies, and B-cell lymphoma.

CD47×CD20 bispecific entities described herein are particularly provided to be employed in a method treatment of a B-cell disorder or a B-cell malignancy comprising administering an effective amount of a bispecific entity described herein to a patient in need thereof.

Allometry and Human Pharmacokinetics are evaluated for bispecific entities described herein. The entities of the present invention comprise a detuned CD47 binding arm and a regular CD20 (rituximab) binding arm. Given the detuned binding affinity of the CD47 arm, the target-mediated drug disposition (TMDD) for the bispecific entities is potentially primarily driven by the CD20 binding. Accordingly, in certain embodiments, the clinical doses will be in the ranges of what is currently used for rituximab. Based on the 10, 20 and 100 mg/kg doses in cynomolgus monkeys, the terminal half-life is approximately 7 days. CD20 mediated TMDD is based on additional preclinical and clinical data for rituximab. The first-in-human clinical study is an open-label, multicenter, Phase 1/1b study to evaluate the safety and tolerability in subjects with relapsed or refractory CD20+ NHL who have progressed on rituximab and/or other CD20-targeted therapies. Dose escalation begins at less than 1 mg/kg and then escalates to 10 mg/kg, which is the current clinical dose for rituximab. Cynomolgus monkeys were dosed twice at 20 mg/kg, on day 1 and day 15. Bispecific entities described herein are found to be well tolerated as single agent in NHP eTOX study with dose-proportional exposure. Mammalian or human dosage of bispecific entities described herein is within the range of about 3 mg/kg to about 20 mg/kg. Further mammalian or human dosage of bispecific entities described herein is particularly within the range of about 5 mg/kg to about 15 mg/kg. Mammalian or human dosage of bispecific entities described herein is also between about 7 mg/kg and about 13 mg/kg. Dosage regimen of bispecific entities described herein is about once every five (5) days, or about once a week (seven (7) days), or about once every ten (10) days, or about once every two (2) weeks.

A manufacturing process for bispecific antibodies described herein may follow a typical Chinese Hamster Ovary (CHO) manufacturing platform. A common contaminant observed in the purification of these bispecific antibodies is the half-antibody, which requires specific purification protocols to remove. After expression of the 4 chain bispecific in Chinese Hamster Ovary cell, protein A is used as the first step to purify an IgG based bispecific. Following this first step there are generally two species present, the desired 4 chain bispecific and a half-antibody. In most cases ion exchange chromatography is sufficient to separate these two species, but in others hydrophobic interaction chromatography may be required. Correct pairing of the LCs should be assessed by mass spectrometry and mis-assembled impurities should be removed by additional protein purification methods, such as ion exchange or hydrophobic interaction chromatography. Following either secondary purification approach, preparative size exclusion chromatography (SEC) can be used to polish and ensure conformational homogeneity, while buffer exchanging the 4 chain bispecifics. Final quality control should include analytical SEC, mass spectrometry, and in vito binding assessments with the different antigens to ensure the conformational and chemical integrity of the bispecific. See, e.g., J. B. Ridgway et al., Protein Eng. 9 (1996) 617-621. K. Gunasekaran et al., J. Biol. Chem. 285 (2010) 19637-19646. Preferred monomeric elements of the IgG1 1+1 heterodimers described herein each contain certain LC and HC constant region sequences discussed supra and identified herein to reduce propensity for homodimer formation during production of the IgG1 1+1 heterodimer format.

EXAMPLES

Example 1: Detuning of CC-90002

Rational design to decrease the affinity of the non-detuned parental version of CC-90002 (408_437) anti-CD47 arm was enabled with a crystal structure of an anti-CD47 Fab bound to the extra cellular domain of CD47. The epitope bound by CC-90002 is identical to that of original murine anti-CD47 2A1 bound to human CD47. See, U.S. Pat. No. 9,045,541.

The variable domains of 2A1 were humanized and the final antibody was named "QN" composed of HC_2.3Q and LC_N, which ultimately was developed as an IgG4 PIE format (CC-90002). QN was further modified by the introduction of residues into the variable heavy domain for improved cell-free expression, this HC variant was named "HC_Q_5_MUT". The HC_Q_5_MUT HC and LC_N were further modified to decrease their immunogenicity using in silico modeling and in silico prediction of immunogenicity, these were collectively referred to as "CD47 2.0". Further variants in the variable heavy and variable light domains of CD47 2.0 LC_1147_2 and CD47 2.0 HC_434 were designed for improved pharmacokinetics, these were referred to as "CD47 3.0". WO2016109415 (US.20170369572); WO2018009499 (US.20190241654); and WO2018183182, each of which are herein incorporated by reference.

The anti-CD47 epitope covers a large surface area and residues from both the light chain (LC) and the heavy chain (HC) participate in the interaction.

To decrease the affinity of the anti-CD47 arm for CD47, CD47 interacting residues from both the LC and HC were subjected to in silico mutagenesis using the "Residue Scan" module from the Molecular Operating Environment (MOE) modeling program. This process created a library of thousands of variants with a wide range of predicted affinities. Each in silico Fab variant was modeled to calculate a predicted change in stability (dStability) or a change in affinity for the CD47 ECD (dAffinity). Over 5,000 variants with positive dAffinity scores (predicted to have lower affinity relative to the parental Fab) and negative dStability (predicted to have higher stability than the parental Fab) were analyzed using immunogenicity assessment software to identify variants that would be predicted to have low immunogenicity. Of these, 143 low immunogenic risk Fab variants with predicted Kds for CD47 ranging from 10 nM to 1 mM, were selected for cell based testing.

To screen target-cell selective anti-CD47 Fabs, the selected anti-CD47 Fab variants were constructed as IgG1 fusions and paired with the anti-EGFR arm from cetuximab. The proper assembly of the 4 chain bispecific was enabled by the presence of Fab and Fc substitutions described herein present in all 4 chains. The 4 chain bispecifics containing the 143 selected variants were transiently expressed in Expi-CHO cells and the bispecifics were purified in a single step using magnetic protein A beads. To identify the target-cell selective bispecifics, the variants were tested with two experiments. The first experiment measured the ability of the detuned anti-CD47× anti-EGFR bispecifics to bind to the non-target Raji cell line that expressed the CD47 antigen, but not the EGFR antigen. The second experiment measured the ability of the detuned anti-CD47× anti-EGFR bispecifics to block SIRPα binding to the target Fadu cell line that expressed the CD47 antigen and the EGFR antigen. These experiments, yielded a set of 8 variants that showed a 10-fold to 20-fold decreased affinity for the non-target CD47+/EGFR-Raji cell line relative to the non-detuned anti-CD47× anti-EGFR parental antibody, and yet was still able to block 75-90% SIRPα binding to the CD47+/EGFR+ Fadu target cell line.

The rituximab anti-CD20 arm was paired with the 8 detuned anti-CD47 variants similarly using an IgG1 Fc. It was observed that the detuned CD47×CD20 bispecifics had reduced binding to the CD47+/CD20− non-target Fadu cell line relative to the non-detuned CD47×CD20 parental antibody, and yet were still able to block 75-90% of SIRPα binding to the target Raji cell line which was CD47 and CD20 positive.

Additional developability assessments of the variants led to the selection of a single anti-CD47 Fab variant, VH E59Y/S102E, which was cloned into three CC-90002 derived frameworks, for pharmacokinetic testing in cynomolgus monkeys: TPP-1367, TPP-1360, and TPP-1361.

Example 2: Summary of SPR Binding Results for Bispecific Entities Described Herein Surface Plasmon Resonance (SPR) experiments were used to measure the affinities of TPP-1360 and TPP-1362 to CD47. These two antibodies were tested for binding to human CD47 and cynomolgus CD47, and were found to not bind to mouse CD47. TPP-1360 was measured to have an affinity for human CD47 ECD of 1.7 µM Kd, which reflects ~350× decrease in affinity relative to the parental anti-CD47 binder. The TPP-1360 affinity for the cynomolgus CD47 ECD was found to be 4.51 µM Kd. TPP-1362 was measured to have an affinity for human CD47 ECD of 0.796 µM Kd, which reflects ~150× decrease in affinity relative to the parental anti-CD47 binder. The TPP-1362 affinity for the cynomolgus CD47 ECD was found to be 2.06 µM Kd. Finally, in addition to the measured affinities, a sandwich SPR assay demonstrated that both bound CD47 and CD20 simultaneously.

Figure 21:
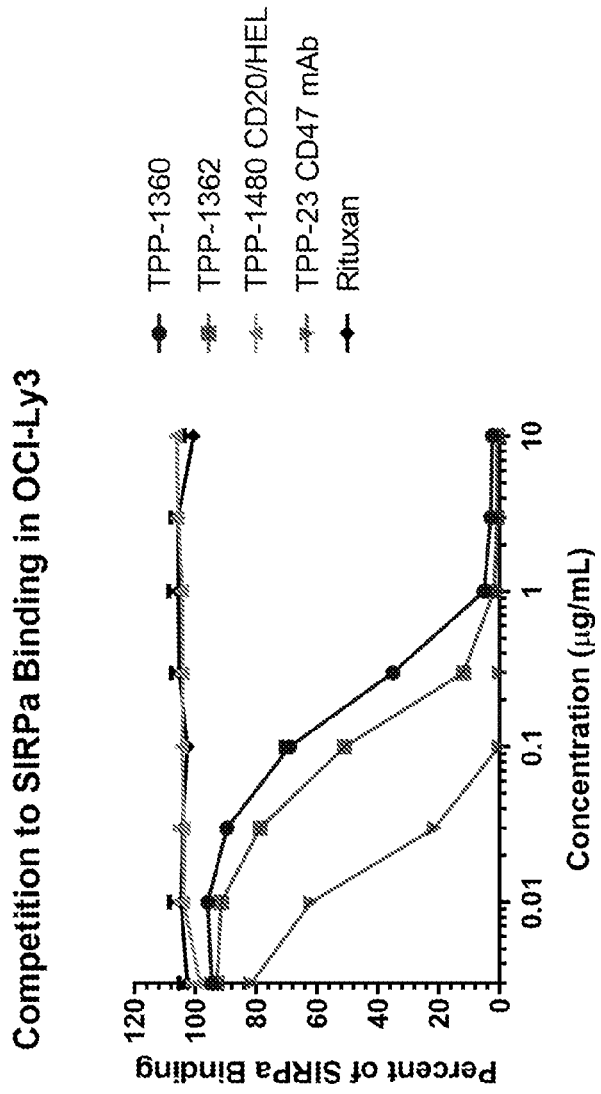
FIG. 21 illustrates that TPP-1360 and TPP-1362, for example, potently and completely blocked recombinant human SIRPα binding to human CD47 expressed on the surface of CD20$^+$/CD47$^+$ lymphoma cell line OCI-Ly3. Rituxan was found to have no effect on SIRPα binding.

Example 3: Dose Response of Binding and SIRPα Blocking of Example Bispecific Entities Dose response curves for TPP-1360 and TPP-1362 blocking of human SIRPα binding to various CD20 expressing non-Hodgkins lymphoma tumor cell lines were generated. Cell lines were incubated with increasing concentrations of either bispecific, then human SIRPα was added at a saturating concentration. In addition to the bispecific, rituximab and the parental anti-CD47 binder (TPP-23 which is 408_437 with IgG1) were included for reference. Cells were washed then incubated with a secondary antibody to measure the amount of SIRPα bound to the tumor cells. For cell line OCI-Ly3 (a DLBCL cell line), TPP-1360 was found to have an EC50=1.30 nM and TPP-1362 was found to have an EC50=0.70 nM. For the Raji cell line (a B-lymphocyte Burkitt's lymphoma cell line) TPP-1360 was found to have an EC50=1.64 nM and TPP-1362 was found to have an EC50=1.10 nM. The parental anti-CD47, TPP-23, was found to have an $IC_{50}$ of 0.11 nM for blocking human SIRPα binding to OCI-Ly3 cells as shown in FIG. 21. Rituximab had no effect on SIRPα binding.

Example 4: Dose Response for Phagocytosis

Dose response curves for TPP-1360 and TPP-1362 activation of phagocytosis towards various CD20 expressing non-Hodgkins lymphoma tumor cell lines were generated. Human monocytes were differentiated into macrophages, which were then added to tumor cell lines that had been incubated with increasing concentrations of either bispecific. In addition to the bispecific entities, rituximab and the parental anti-CD47 binder (TPP-23) were included for reference. Fluorescence labeling of macrophages and tumor cells was used to measure the number of phagocytic events using an image based quantification method. For the OCI-Ly3 cell line, TPP-1360 was found to have an IC50=1.4 nM and TPP-1362 was found to have an IC50=0.43 nM. For the Raji cell line, TPP-1360 was found to have an IC50=1.8 nM and TPP-1362 was found to have an IC50=0.37 nM.

Example 5: Binding Studies with Human and Cyno RBCs and Hemagglutination

Binding of certain bispecific entity examples to human and cynomolgus monkey RBCs was determined to assess their non-target cell binding potential. RBCs were isolated from whole blood and were incubated with increasing concentrations of the example bispecifics. Binding was expressed as a percentage of the amount of binding observed at 2 µg/ml of the parental anti-CD47 binder (TPP-23). At 200 µg/ml, TPP-1360 and TPP-1361 bound to <1% of that seen for the parental anti-CD47 binding to human RBCs. Similarly, at 200 µg/ml, TPP-1360 bound to <1% of that seen for the parental anti-CD47 binding to cynomolgus RBCs. A higher degree of binding was observed for TPP-1362 binding to cynomolgus RBCs at 200 µg/ml, which showed a binding of 2-3% of the parental anti-CD47 binder. Finally, the parental anti-CD47 binders for both leads demonstrated no hemagglutination of human RBCs at 200 µg/ml. Similarly, both TPP-1360 and TPP-1361 showed no hemagglutination at 200 µg/ml. BRIC6, a known hemagglutinating antibody was used as a positive control.

Example 6: Binding Studies to Human PBMCs and Whole Blood

Binding of the bispecific entity species described herein to human Peripheral Blood Mononuclear Cells (PBMCs) was assessed. Relative to the parental anti-CD47 binder TPP-23 and rituximab, the TPP-1360 bispecific showed less binding to all cell types with the exception of the B-cells, which showed significant binding through the presence of the anti-CD20 Fab portion.

Example 7: First Round Lead Cynomolgus PK

A cynomolgus PK experiment was carried out with example bispecific entity species described herein. Cynomolgus monkeys were dosed twice at 20 mg/kg, on day 1 and day 15. B-cell depletion was observed. From these studies TPP-1360 and TPP-1362 were chosen for further study in a cynomolgus monkey exploratory toxicology (E-tox) study, as described in Example 8.

Example 8: Second Round Lead Cynomolgus E-Tox

A cynomolgus E-tox experiment was carried out with TPP-1360, and TPP-1362. For TPP-1360, cynomolgus monkeys were dosed at 100, 20, and 10 mg/kg, once a week for two weeks, which was followed by a non-dosing period of 2 weeks. A second TPP-1360 arm, tested 10 mg/kg twice a week for two weeks, which was also followed by a two week non-dosing period. For TPP-1362, cynomolgus monkeys were dosed at 60, 20, and 10 mg/kg, once a week for two weeks, which was followed by a non-dosing period of 2 weeks. A second TPP-1362 arm, tested 10 mg/kg twice a week for two weeks, which was also followed by a two week non-dosing period, twice at 20 mg/kg, on day 1 and day 15. These studies showed that TPP-1360 was well tolerated, showed deep B-cell depletion, and achieved dose-proportional exposure, confirming the avoidance of sink thus the target-cell selective.

Example 9: In Vitro Pharmacology

A. Human Whole Blood Binding

To assess the specificity of TPP-1360, its binding profile was first evaluated in whole blood using flow cytometry. Across two donors, 200 nM TPP-1360 substantially shifted the binding signal to B cells and rather weakly to T cells, monocytes, and NK cells, with minimal or no binding to platelets or red blood cells thereby illustrating selective binding to B cells in human whole blood. See, FIG. 7.

Figure 7:
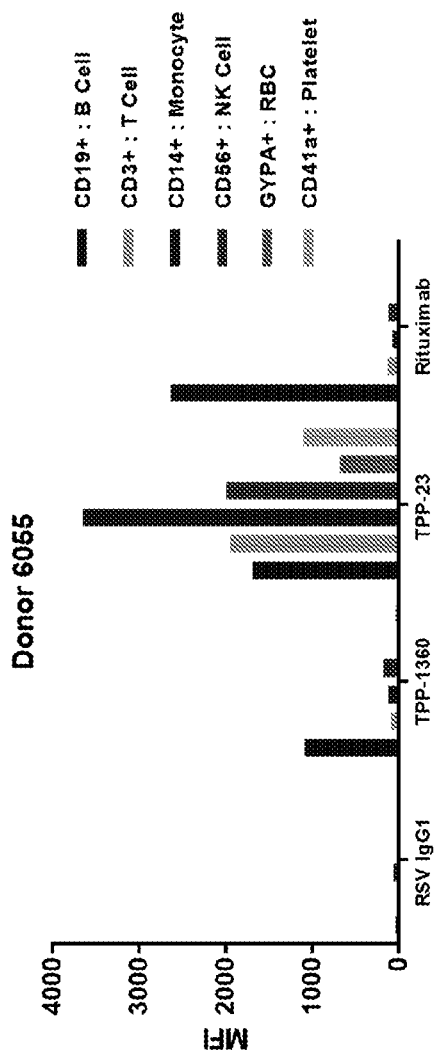
FIG. 7 shows an example species bispecific entity described herein, TPP-1360, that substantially shifted the binding signal to B-cells and rather weakly to T cells, monocytes, and NK cells, with minimal or no binding to platelets or red blood cells as compared to binding of TPP-23 (408_437 Fab (VL: SEQ ID NO:899; VH: SEQ ID NO:900) with IgG1), thereby illustrating selective binding to B-cells in human whole blood.

FIG. 7 shows that the bispecific TPP-1360, for example, binds primarily to B cells, with a very small amount of binding to the other cell types listed possibly because of higher levels of CD47 than what is found on blood cells, or because of the contribution of the Fc which can engage Fc receptors which are expressed on NK cells and monocytes. Conversely TPP-23, a high affinity CD47 monospecific antibody binds to all of these cell types due to the ubiquitous expression of CD47 and the high affinity for CD47 found in TPP-23.

The overall binding profile of TPP-1360 in human whole blood is similar to rituximab. Conversely, the parental CD47 mAb, TPP-23, used as a control for CD47 expression, significantly bound to all cell populations in human blood.

B. Tumor Cell Binding

Furthermore, the RBC binding capacity of TPP-1360, for example, was extensively evaluated in purified human RBCs and in co-culture of human RBCs with tumor cells. As illustrated in FIG. 8, TPP-1360 selectively bound $CD47^+$/$CD20^+$ Raji Cells but not $CD47^+$/$CD20^-$ human RBCs. Moreover, in a co-culture of Raji cells and human RBCs, TPP-1360 displayed dose-dependent binding to $CD47^+$/$CD20^+$ Raji cells but no binding to human RBCs, even at concentration as high as 1 mg/mL. See, FIG. 9. To the contrary, the parental CD47 type/CD20 bispecific, TPP-2, significantly bound to both Raji cells and human RBCs. In addition, TPP-1360 does not show binding to purified cyno RBC from multiple donors.

C. SIRPα Competition

Figure 10:
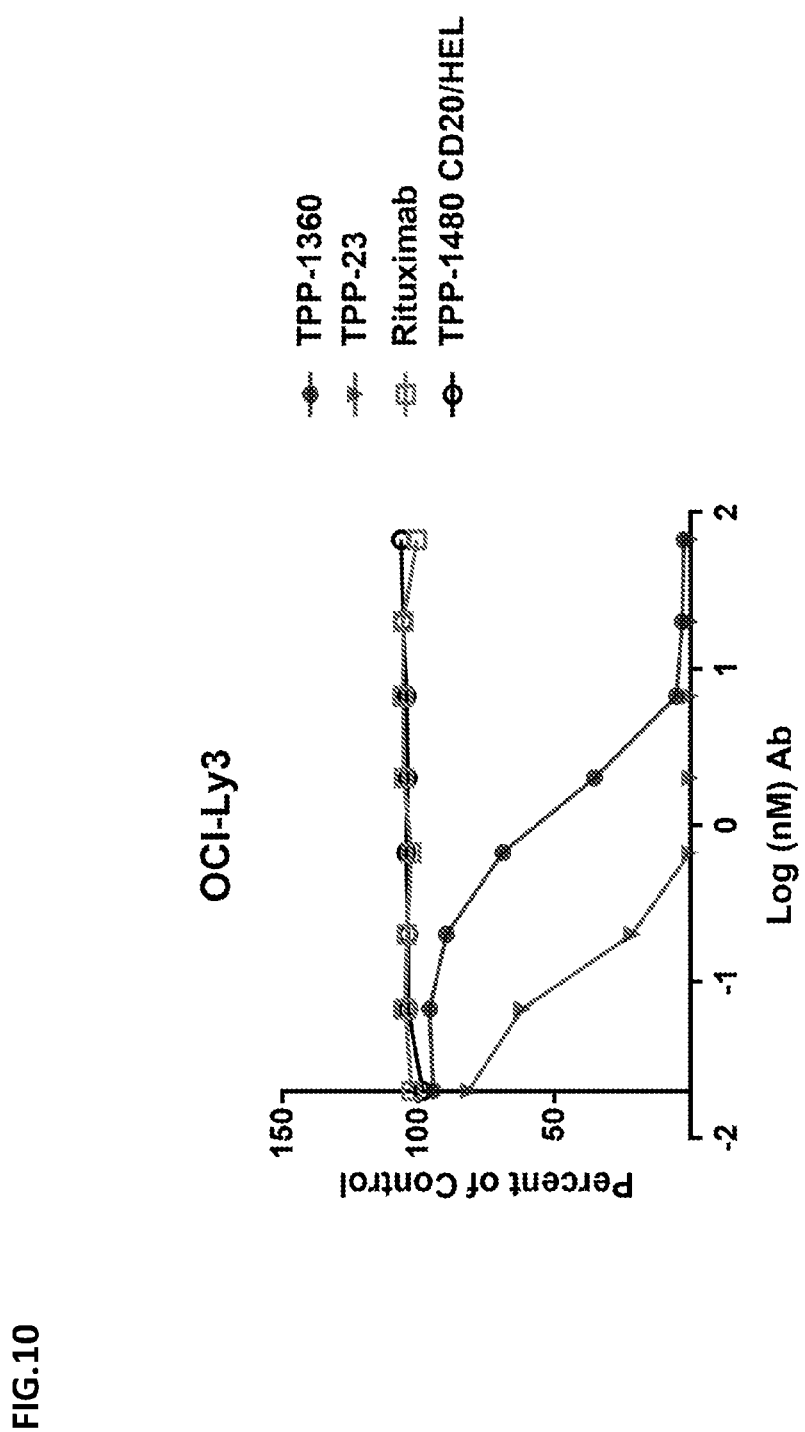
FIG. 10 illustrates that TPP-1360, for example, potently and completely blocked recombinant human SIRPα-Fc binding to human CD47 expressed on the surface of CD20$^+$/CD47$^+$ lymphoma cell line OCI-Ly3.
Figure 11:
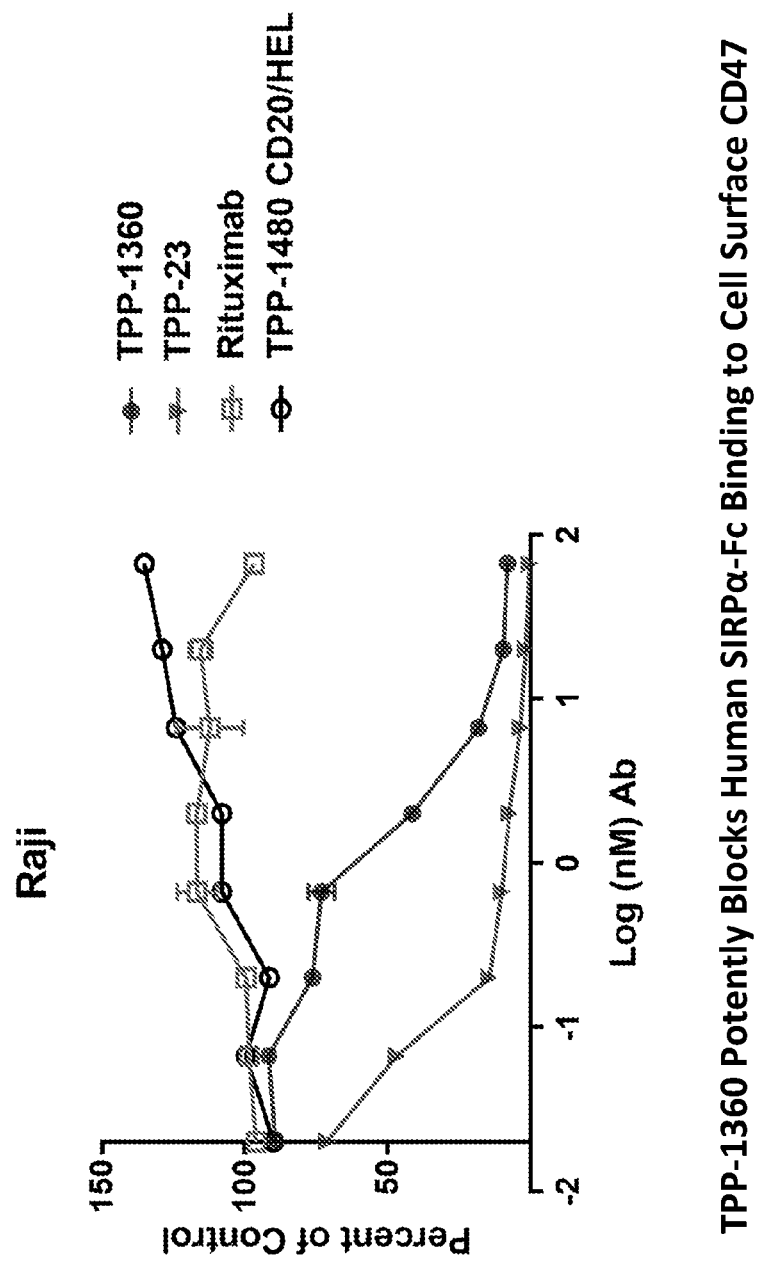
FIG. 11 illustrates that TPP-1360, for example, potently and completely blocked recombinant human SIRPα-Fc binding to human CD47 expressed on the surface of CD20$^+$/CD47$^+$ lymphoma cell line Raji.

Having demonstrated its selective binding to $CD20^+$/$CD47^+$ cells, an assessment was made of the ability of TPP-1360 to antagonize human SIRPα interaction with cell surface CD47 using an in vitro competition assay. TPP-1360 potently and blocked recombinant human SIRPα-Fc binding to human CD47 expressed on the surface of $CD20^+$/$CD47^+$ lymphoma cell lines OCI-Ly3 and Raji, with average EC50 values of 1.30 nM and 1.64 nM, respectively. See, FIG. 10 and FIG. 11. FIG. 10 illustrates the fact that TPP-1360, for example, potently and completely blocked recombinant human SIRPα-Fc binding to human CD47 expressed on the surface of CD20$^+$/CD47$^+$ lymphoma cell line OCI-Ly3. FIG. 11 illustrates the fact that TPP-1360, for example, potently and completely blocked recombinant human SIRPα-Fc binding to human CD47 expressed on the surface of CD20$^+$/CD47$^+$ lymphoma cell line Raji. In contrast, neither rituximab nor control bispecific antibody TPP-1480 (anti-CD20/hen egg lysozyme) were able to compete with human SIRPα-Fc binding to the same cell lines. The data presented herein also demonstrates that TPP-1360 potency to block human SIRPα-CD47 interaction is lower than TPP-23, consistent with the attenuated affinity of TPP-1360 to human CD47.

Example 10: Functional Activities: Human Macrophage Phagocytosis

This Example demonstrates the capacity of TPP-1360 in triggering tumor phagocytosis, as determined in vitro by automated counting of "eaten" CD20$^+$ CD47$^+$ tumor cells inside of labeled macrophages.

Expression of CD20 and CD47 was first verified in each target tumor cell line (OCI-Ly3, Raji, REC-1, and RIVA) by quantifying antibody binding capacity (ABC) using a flow cytometric assay (Denny T N et al., Cytometry. 1996 December; 26(4):265-74). All four cell lines express high levels of CD47 and CD20. Table 1.

TABLE 1

| CD47 and CD20 Antigen Expression on Lymphoma Cell Surface | | |
|---|---|---|
| Cell Line | CD20 ABC | CD47 ABC |
| OCI-Ly3 | 154,000 | 247,000 |
| REC-1 | 510,036 | 453,415 |
| RIVA | 722,000 | 443,000 |
| Raji | 522,596 | 213,927 |

ABC = Antibody binding capacity.

Figure 12:
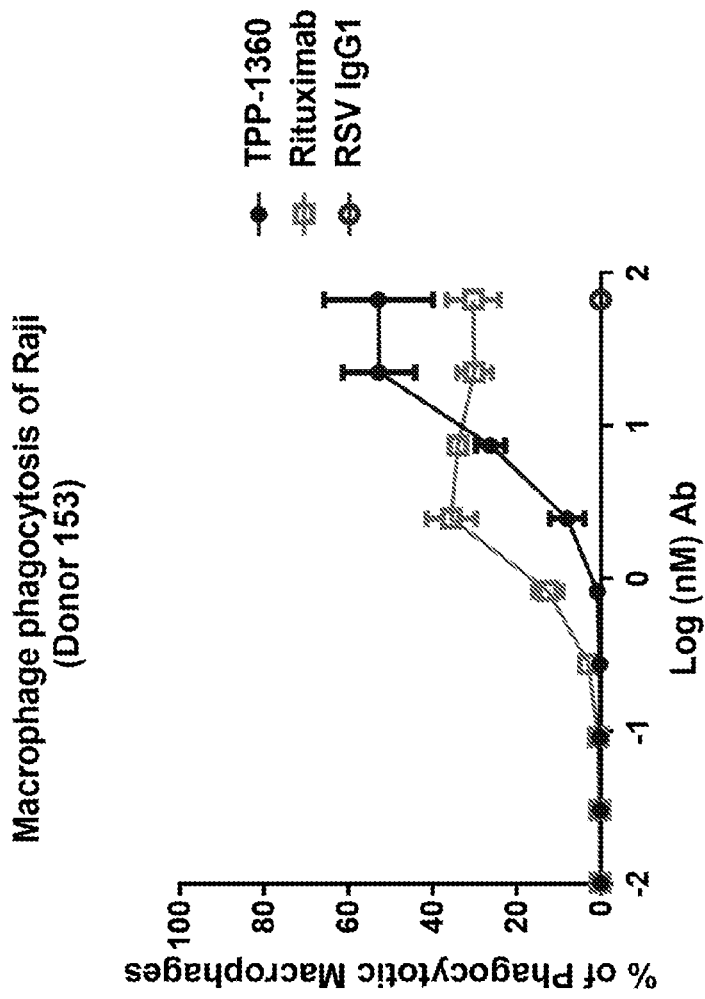
FIG. 12 illustrates that treatment with TPP-1360, for example, induced macrophage-mediated phagocytosis of the CD20$^+$ malignant B cell line, Raji.
Figure 13:
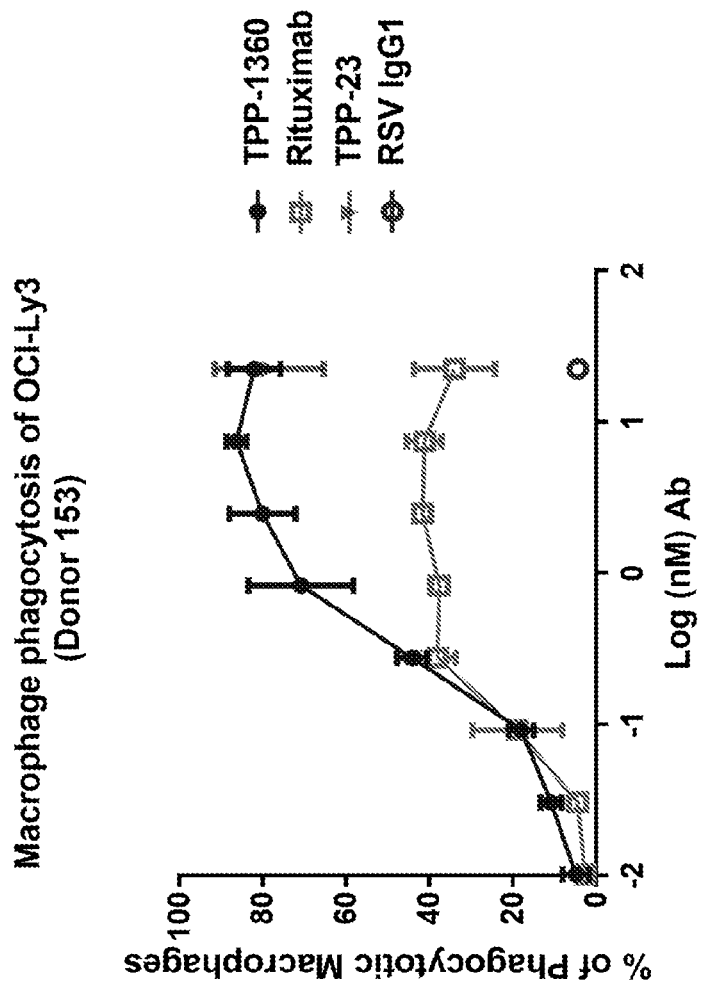
FIG. 13 illustrates that treatment with TPP-1360, for example, induced macrophage-mediated phagocytosis of the CD20$^+$ malignant B cell line, OCI-Ly3.
Figure 14:
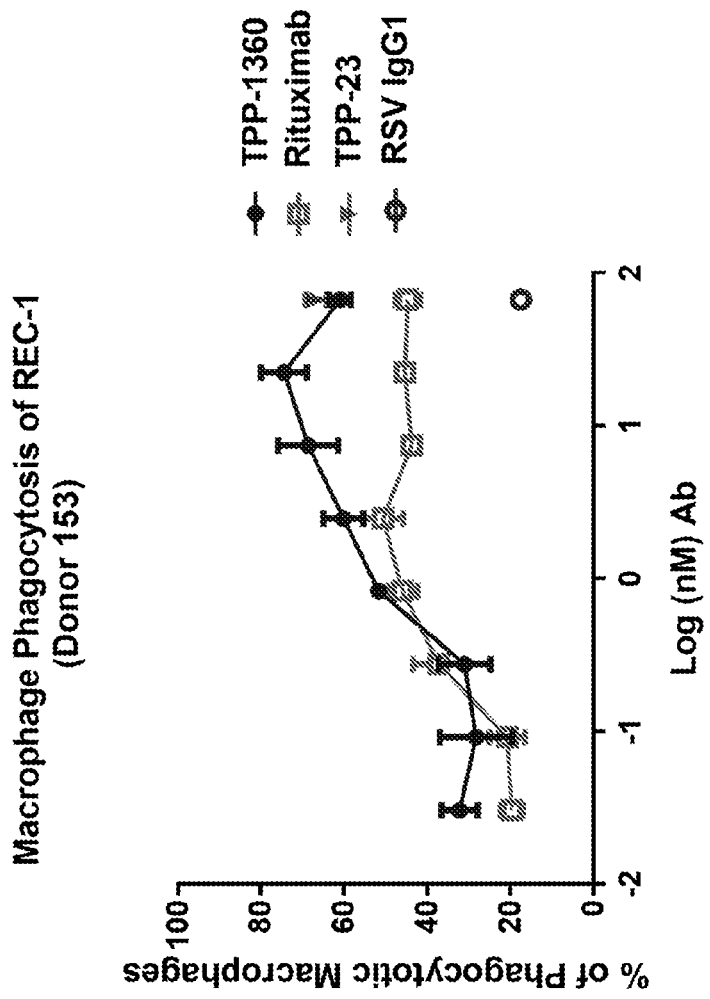
FIG. 14 illustrates that treatment with TPP-1360, for example, induced macrophage-mediated phagocytosis of the CD20$^+$ malignant B cell line, REC-1.
Figure 15:
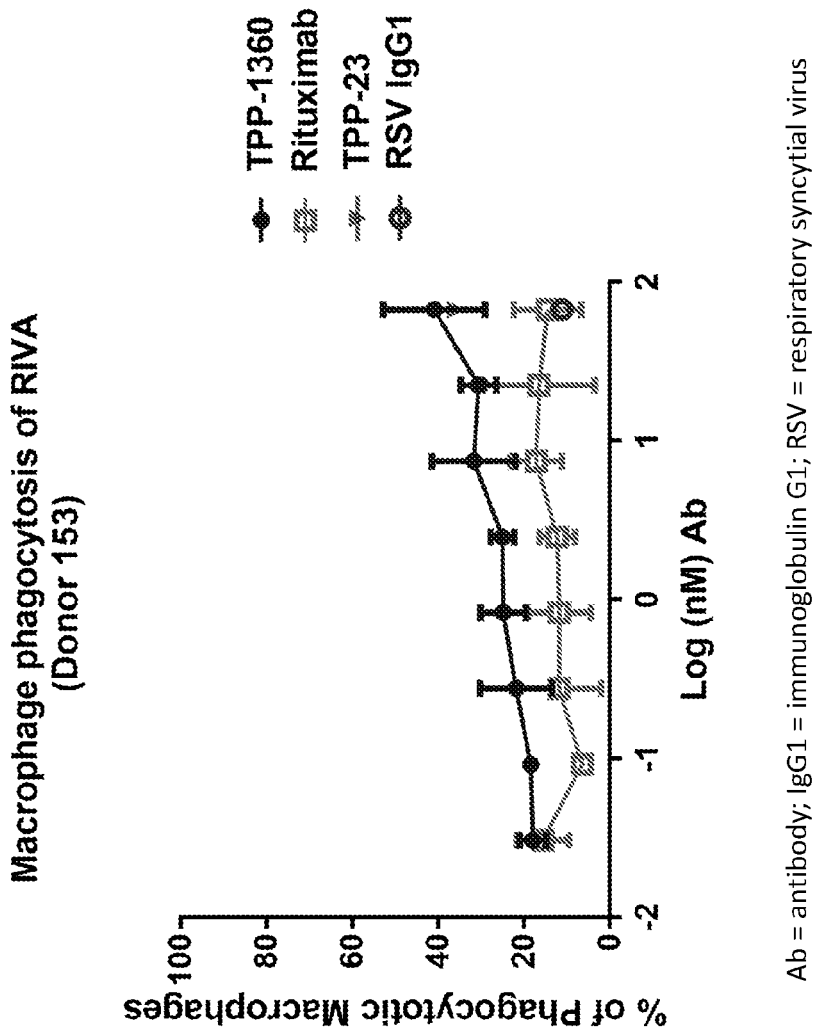
FIG. 15 illustrates that treatment with TPP-1360, for example, induced macrophage-mediated phagocytosis of the CD20$^+$ malignant B cell line, RIVA.
Figure 16:
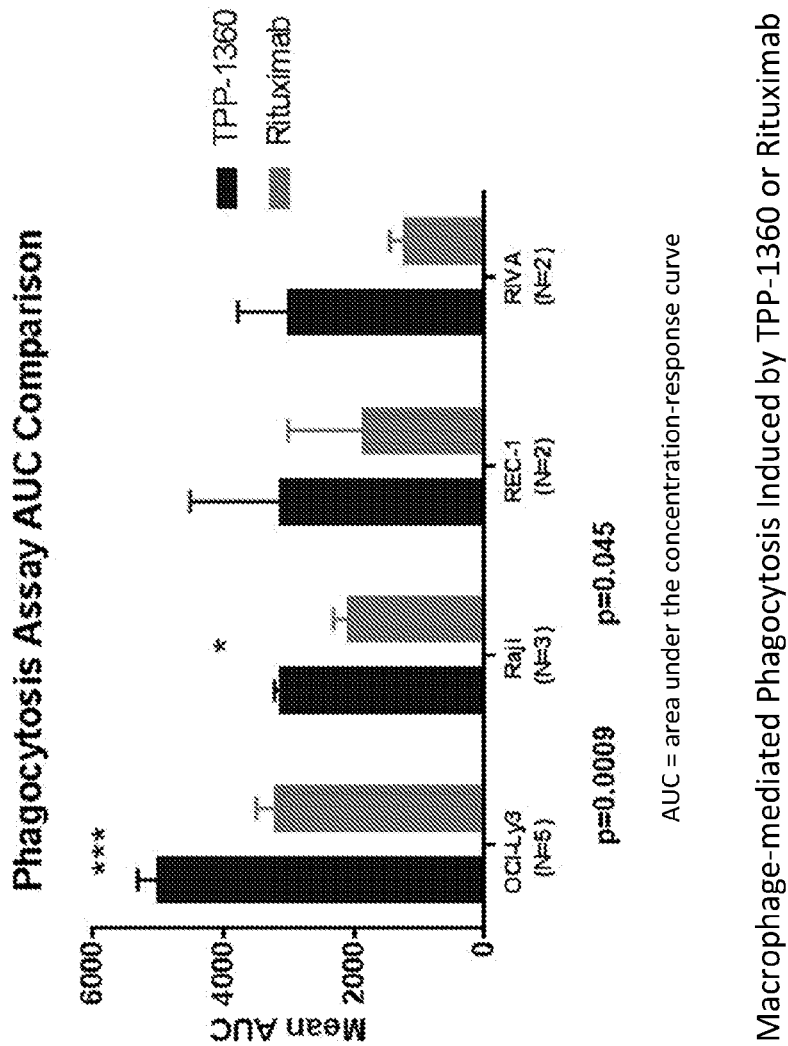
FIG. 16 shows that treatment with TPP-1360, for example, triggered significantly more efficient phagocytosis than rituximab in Raji and OCI-Ly3 cells, likely due to the concomitant blockade of the SIRPα-CD47 interaction and the engagement of activating receptors, such as FcγRs, by TPP-1360.
Figure 17:
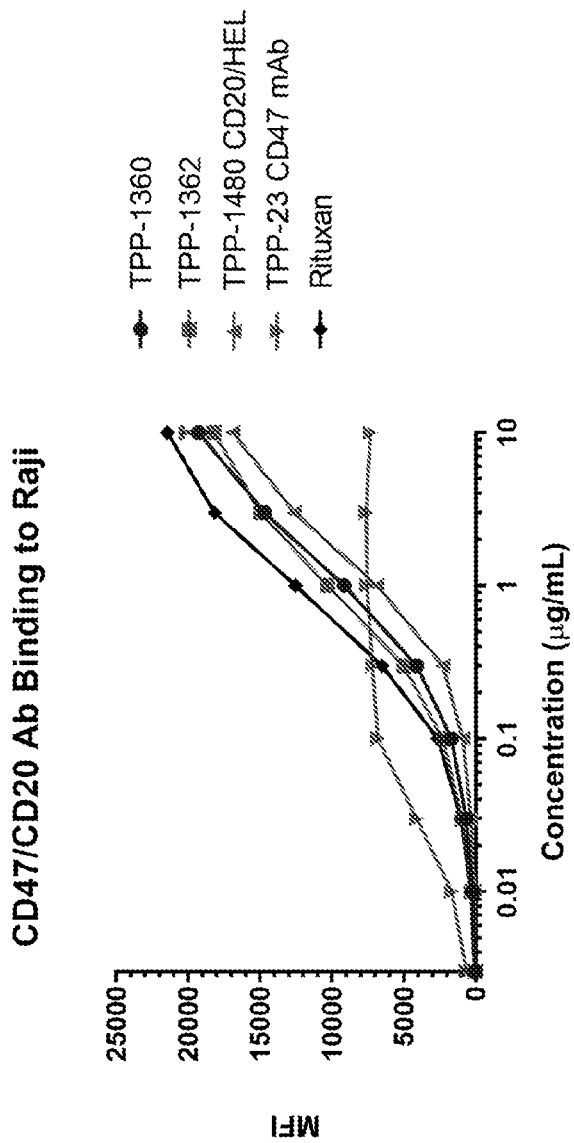
FIG. 17 shows binding of rituxan and bispecific antibodies such as TPP-1360, for example, to Raji cells (CD20$^+$/CD47$^+$) as measured by surface plasmon resonance (SPR).

Next, titrated antibodies were added to pre-differentiated macrophages, followed by co-culture with carboxyfluorescein succinimidyl ester (CSFE)-labeled tumor cells opsonized with TPP-1360. Phagocytosis activity was quantitatively determined by the number of labeled tumor cells within the labeled macrophages. Green intensity (CFSE) was measured in each of the CD14 allophycocyanin (APC)-labeled macrophages, and a threshold gate was used to identify CFSE-positive macrophages. A threshold of approximately 1000 MFI (mean fluorescence intensity), with a variance of no more than a few hundred MFI was observed across the experiments. For each sample, the calculated percentage of phagocytosis was determined as: [(Number of CFSE-positive macrophages)/(number of total macrophage)]×100. Across at least two donors, treatment with TPP-1360 induced macrophage-mediated phagocytosis of four CD20$^+$ malignant B cell lines. Representative data from one donor is shown in FIG. 12 (Raji cells), FIG. 13 (OCI-Ly3 cells), FIG. 14 (REC-1 cells), and FIG. 15 (RIVA cells). Area under the curve was calculated and followed by paired t test to determine statistical significance of TPP-1360 compared with rituximab. See, FIG. 16. The data demonstrates that treatment with TPP-1360 triggered significantly more efficient phagocytosis than rituximab in Raji and OCI-Ly3 cells, likely due to the concomitant blockade of the SIRPα-CD47 interaction and the engagement of activating receptors, such as FcγRs, by TPP-1360.

Example 11: Pharmacokinetics

To determine the pharmacokinetic (PK) profile of the bispecific entities (antibody species, TPP-1360, TPP-1361, TPP-1362 and TPP-1367 described herein, non-GLP studies were conducted in mice and cynomolgus monkeys. A single-dose mouse PK study was performed using naïve, female, NOD/SCID mice with 10 mg/kg of antibody administered via intraperitoneal (IP) injection. Sparse PK sampling (n=4 per timepoint) was performed over the course of 72 hours, and all animals showed detectable antibody species concentrations throughout study duration. The calculated half-life was 3.4 days but may be underestimated considering the sampling duration. To evaluate the PK profiles in cynomolgus monkeys, a repeat-dose exploratory toxicology study was performed, and 20 mg/kg of antibody species was administered via IV bolus injection on Day 1 and Day 15 to three naïve male monkeys. Following repeat-dosing of the antibody species, systemic exposure was achieved, and the antibody species was detectable in the serum of 2 of 3 monkeys throughout study duration (336 hr post Day 15 dose). Samples were also collected as part of the repeat-dose study for hematology and immunophenotyping assessments. The observed depletion of B-lymphocytes demonstrates drug functionality in vivo. Overall, antibody species exposure was maintained throughout study duration in both the single-dose mouse and repeat-dose monkey studies with similar half-lives ranging from 3-3.5 days reported between the two studies.

Example 12: Safety Profile

This example series of highly evaluated species exhibit acceptable toxicology profile, e.g., well tolerated up to 100 mg/kg QW, the highest dose tested. Toxicokinetics were evaluated as part of a 28-day exploratory toxicology study in cynomolgus monkeys. TPP-1360 was administered either BIW or QW via IV injection to cynomolgus monkeys (4/group) at dose levels of 10 mg/kg (BIW) on Days 1, 4, 8, 11, and 15 or at 20 and 100 mg/kg (QW) on Days 1, 8, and 15. Serum concentrations were measured with a sandwich ELISA using an anti-rituximab antibody for capture and a goat anti-human IgG Fc for detection. Following multiple IV doses of 10, 20, or 100 mg/kg, systemic exposure of TPP-1360 was achieved at all dose levels and maintained by all animals throughout study duration. TPP-1360 exhibited linear TK with approximately dose proportional increases in $C_{max}$ and $AUC_{0-168}$ across the 20 and 100 mg/kg dose groups. After first dose, clearance was similar across the 10-100 mg/kg dose range, suggesting target saturation at 10 mg/kg dose. $R_{AUC}$ values indicate some TPP-1360 accumulation by Dose 5 and Dose 3 in the 10 (BIW) and 100 (QW) mg/kg dose groups, respectively. The mean calculated half-life ranged from 2-4 days depending on the dose level and dose regimen. Anti-drug antibody was detected in 5/8 animals tested at Day 15 prior to dose and in 5/6 animals tested on study Day 29. Anti-drug antibodies did affect the exposure of TPP-1360 as evidenced by an observed decrease in exposure for ADA positive animals. TPP-1360 was well-tolerated up to 100 mg/kg QW, the highest dose tested. Decreases in B cells in the peripheral blood and in multiple lymphoid tissues were seen at 10 mg/kg BIW and 20 mg/kg QW, demonstrating robust pharmacodynamic activity. Dosing 10 mg/kg BIW did not provide added benefit over 20 mg/kg QW. In addition to effects on B cells, TPP-1360 also decreased T cells and NK cells at all dose levels, neutrophils at 20 mg/kg QW and red blood cells at 100 mg/kg QW. However, no test article-related decrease of platelets was observed. Decreases in T cells, NK cells, neutrophils and red blood cells are believed to be mediated by the CD47 arm of TPP-1360, since these cells do not express CD20.

Example 13: Immunogenicity

Figure 18:
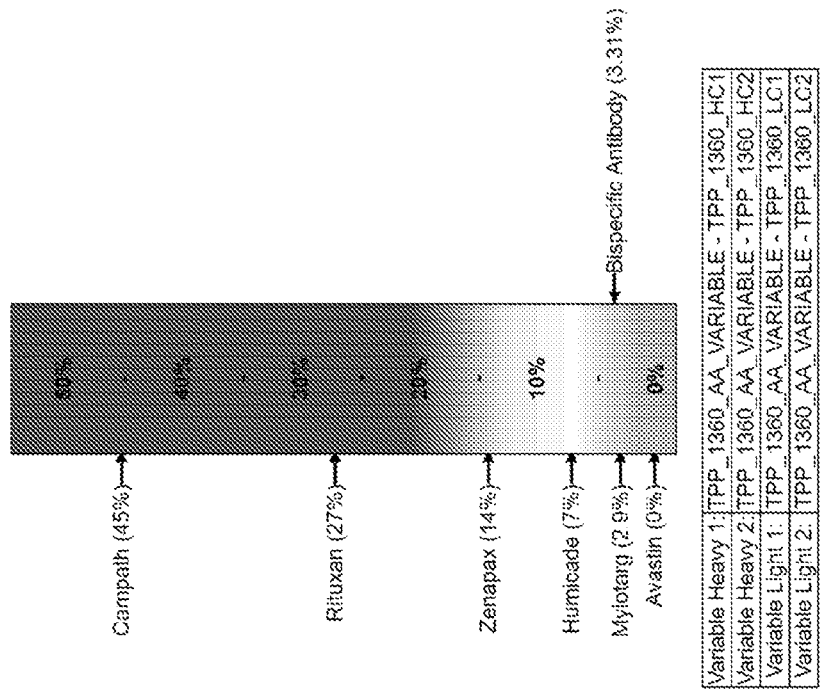
FIG. 18 shows the EpiMatrix antibody immunogenicity scale.

The Interactive Screening and Protein Reengineering Interface (ISPRI) software, developed by EpiVax, is an in silico computational method used to assess potential antibody immunogenicity in humans, and is known to be a clinically well-established T cell-dependent analysis tool (FIG. 18). The VH and VL amino acid sequences of TPP-1360 were analyzed for putative T effector and T regulatory hotspots and were found to have a low risk for immunogenicity.

Example 14: Raji Xenograft Model

Figure 19:
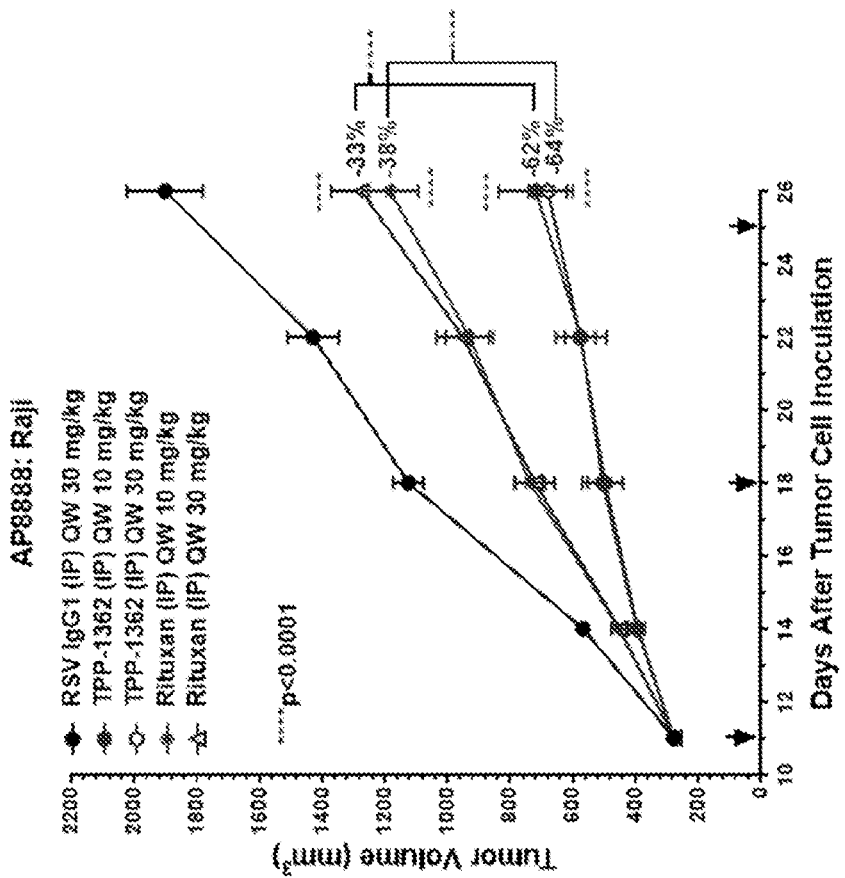
FIG. 19 shows treatment with TPP-1362 and rituxan in a Raji xenograft model.
Figure 20:
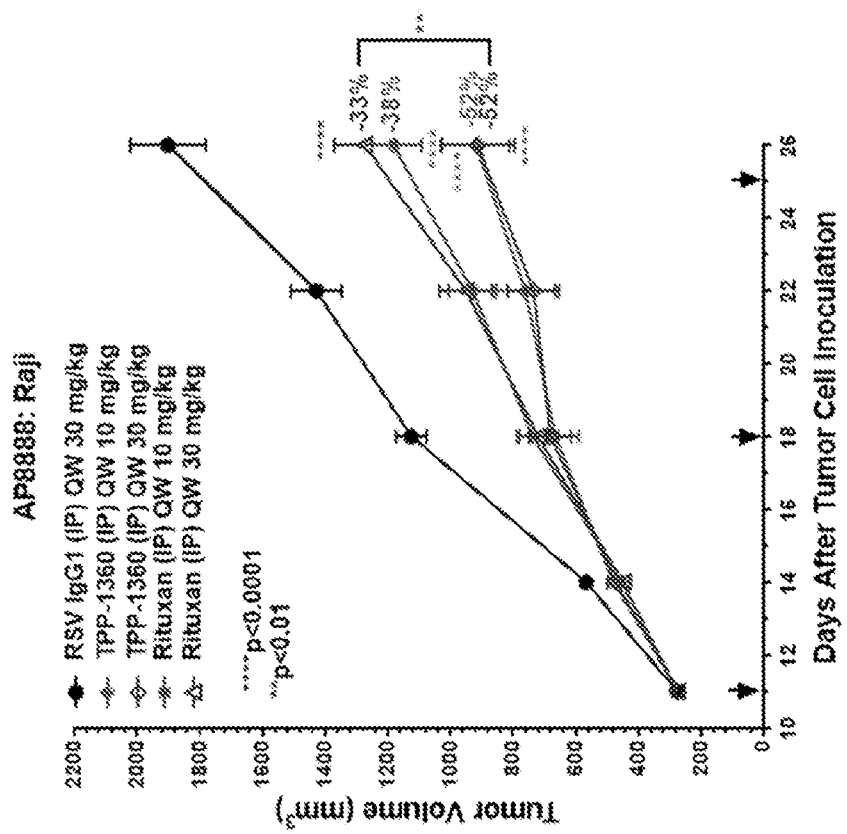
FIG. 20 shows treatment with TPP-1360 and rituxan in a Raji xenograft model.

CD47×CD20 bispecific entities described herein demonstrate better efficacy than rituximab in vivo in a Raji NOD-SCID model. The purpose of this study was to determine the single agent antitumor activity of TPP-1360 or TPP-1362 in a Raji xenograft model expressing lower levels of CD20 and higher levels of CD47. Female NOD-SCID mice were inoculated with Raji cells in the right flank. Dosing was initiated when the tumors were approximately 270 mm$^3$ in size. TPP-1360 and TPP-1362 were tested at 10 and 30 mg/kg with a once a week (QW) dosing for 2 weeks. Rituximab which is bivalent to CD20 was used as a comparator with the same dosing paradigm. The final tumor volume reduction was determined on Day 25 at the time of the termination of the study when the mean tumor volumes in the isotype control (anti-RSV IgG1) group reached approximately 2000 mm$^3$. Significant ($p<0.0001$) antitumor activity of TPP-1360 with a tumor volume reduction of 52% was observed at both 10 and 30 mg/kg, QW, and also significant antitumor activity of TPP-1362 with a tumor reduction of 62% was observed at 10 mg/kg QW or 64% at 30 mg/kg QW. (FIGS. 19-20) In the same dosing regimen, rituximab showed a 33% and 38% TVR at 30 and 10 mg/kg, respectively. The antitumor activity of TPP-1360 at 30 mg/kg, QW was significantly ($p<0.01$) better than rituximab at corresponding dose level, suggesting the contribution of CD47 arm in the antitumor activity of TPP-1360. The antitumor activity of TPP-1362 at 30 mg/kg, QW was also significantly ($p<0.0001$) better than rituximab at corresponding dose level, suggesting the contribution of CD47 arm in the antitumor activity of TPP-1362. There was no significant body weight loss in the animals treated with isotype control, TPP-1360, TPP-1362 or rituximab.

```
                          Sequence Listing

SEQ
ID
NO:   Description   Amino Acid Sequence

1   CG_64_VL      NIQMTQSPSSLSASVGDRVTITCRASQDIHRYLSWFQQKPGKVPKHLIYRANRL
                    VSGVPSRFSGSGSGTEFTLTISSLQPEDFATYYCLQYAEFPYTFGGGTKVEIK

2   CG_64_VH      QMQLVQSGAEVKKPGSSVKVSCKASGFNIKDYYLHWVRQAPGKGLEWMGYI
                    DPEQGDTEYAQKFQGRVTITRDRSTSTAYMELRSLRAEDTAVYYCNAAYGSSSY
                    PMDYWGQGTLVTVSS

3   CG_65_VL      NIQMTQSPSSLSASVGDRVTITCRASQDIHRYLSWFQQKPGKVPKHLIYRANRL
                    VSGVPSRFSGSGSGTEFTLTISSLQPEDFATYYCLQYQEFPYTFGGGTKVEIK

4   CG_65_VH      QMQLVQSGAEVKKPGSSVKVSCKASGFNIKDYYLHWVRQAPGKGLEWMGYI
                    DPTQGDTHYAQKFQGRVTITRDRSTSTAYMELRSLRAEDTAVYYCNAAYGSSSY
                    PMDYWGQGTLVTVSS

5   CG_66_VL      NIQMTQSPSSLSASVGDRVTITCRASQDIHRYLSWFQQKPGKVPKHLIYRANRL
                    VSGVPSRFSGSGSGTEFTLTISSLQPEDFATYYCLQYEEFPYTFGGGTKVEIK

6   CG_66_VH      QMQLVQSGAEVKKPGSSVKVSCKASGFNIKDYYLHWVRQAPGKGLEWMGYI
                    DPSQGDTVYAQKFQGRVTITRDRSTSTAYMELRSLRAEDTAVYYCNAAYGSSSY
                    PMDYWGQGTLVTVSS

7   CG_67_VL      NIQMTQSPSSLSASVGDRVTITCRASQDIHDYLSWFQQKPGKVPKHLIYRANIL
                    VSGVPSRFSGSGSGTEFTLTISSLQPEDFATYYCLQYDEFPYTFGGGTKVEIK

8   CG_67_VH      QMQLVQSGAEVKKPGSSVKVSCKASGFNIKDYYLHWVRQAPGKGLEWMGWI
                    YPDQGVTEYAQKFQGRVTITRDRSTSTAYMELRSLRAEDTAVYYCNAAYGSSSY
                    PMDYWGQGTLVTVSS

9   CG_68_VL      NIQMTQSPSSLSASVGDRVTITCRASQDIHDYLSWFQQKPGKVPKHLIYRANLL
                    VSGVPSRFSGSGSGTEFTLTISSLQPEDFATYYCLQYDEFPYTFGGGTKVEIK

10   CG_68_VH      QMQLVQSGAEVKKPGSSVKVSCKASGFNIKDYYLHWVRQAPGKGLEWMGWI
                    EPDQGATEYAQKFQGRVTITRDRSTSTAYMELRSLRAEDTAVYYCNAAYGSSSY
                    PMDYWGQGTLVTVSS

11   CG_69_VL      NIQMTQSPSSLSASVGDRVTITCRASQDIHDYLSWFQQKPGKVPKHLIYRANYL
                    VSGVPSRFSGSGSGTEFTLTISSLQPEDFATYYCLQYDEFPYTFGGGTKVEIK
```

| SEQ ID NO: | Description | Amino Acid Sequence |
|---|---|---|
| 12 | CG_69_VH | QMQLVQSGAEVKKPGSSVKVSCKASGFNIKDYYLHWVRQAPGKGLEWMGWI HPDQGITEYAQKFQGRVTITRDRSTSTAYMELRSLRAEDTAVYYCNAAYGSSSY PMDYWGQGTLVTVSS |
| 13 | CG_70_VL | NIQMTQSPSSLSASVGDRVTITCRASQDIHEYLSWFQQKPGKVPKHLIYRANAL VSGVPSRFSGSGSGTEFTLTISSLQPEDFATYYCLQYDEFPYTFGGGTKVEIK |
| 14 | CG_70_VH | QMQLVQSGAEVKKPGSSVKVSCKASGFNIKDYYLHWVRQAPGKGLEWMGWI LPDQGVTEYAQKFQGRVTITRDRSTSTAYMELRSLRAEDTAVYYCNAAYGSSSY PMDYWGQGTLVTVSS |
| 15 | CG_71_VL | NIQMTQSPSSLSASVGDRVTITCRASQDIHEYLSWFQQKPGKVPKHLIYRANILV SGVPSRFSGSGSGTEFTLTISSLQPEDFATYYCLQYDEFPYTFGGGTKVEIK |
| 16 | CG_71_VH | QMQLVQSGAEVKKPGSSVKVSCKASGFNIKDYYLHWVRQAPGKGLEWMGWI EPDQGITEYAQKFQGRVTITRDRSTSTAYMELRSLRAEDTAVYYCNAAYGSSSYP MDYWGQGTLVTVSS |
| 17 | CG_72_VL | NIQMTQSPSSLSASVGDRVTITCRASQDIHEYLSWFQQKPGKVPKHLIYRANLL VSGVPSRFSGSGSGTEFTLTISSLQPEDFATYYCLQYDEFPYTFGGGTKVEIK |
| 18 | CG_72_VH | QMQLVQSGAEVKKPGSSVKVSCKASGFNIKDYYLHWVRQAPGKGLEWMGWI LPDQGITEYAQKFQGRVTITRDRSTSTAYMELRSLRAEDTAVYYCNAAYGSSSYP MDYWGQGTLVTVSS |
| 19 | CG_73_VL | NIQMTQSPSSLSASVGDRVTITCRASQDIHEYLSWFQQKPGKVPKHLIYRANQL VSGVPSRFSGSGSGTEFTLTISSLQPEDFATYYCLQYDEFPYTFGGGTKVEIK |
| 20 | CG_73_VH | QMQLVQSGAEVKKPGSSVKVSCKASGFNIKDYYLHWVRQAPGKGLEWMGWI IPDQGMTEYAQKFQGRVTITRDRSTSTAYMELRSLRAEDTAVYYCNAAYGSSSY PMDYWGQGTLVTVSS |
| 21 | CG_74_VL | NIQMTQSPSSLSASVGDRVTITCRASQDIHEYLSWFQQKPGKVPKHLIYRANVL VSGVPSRFSGSGSGTEFTLTISSLQPEDFATYYCLQYDEFPYTFGGGTKVEIK |
| 22 | CG_74_VH | QMQLVQSGAEVKKPGSSVKVSCKASGFNIKDYYLHWVRQAPGKGLEWMGWI MPDQGLTEYAQKFQGRVTITRDRSTSTAYMELRSLRAEDTAVYYCNAAYGSSSY PMDYWGQGTLVTVSS |
| 23 | CG_75_VL | NIQMTQSPSSLSASVGDRVTITCRASQDIHEYLSWFQQKPGKVPKHLIYRANYL VSGVPSRFSGSGSGTEFTLTISSLQPEDFATYYCLQYDEFPYTFGGGTKVEIK |
| 24 | CG_75_VH | QMQLVQSGAEVKKPGSSVKVSCKASGFNIKDYYLHWVRQAPGKGLEWMGWI MPDQGITEYAQKFQGRVTITRDRSTSTAYMELRSLRAEDTAVYYCNAAYGSSSY PMDYWGQGTLVTVSS |
| 25 | CG_76_VL | NIQMTQSPSSLSASVGDRVTITCRASQDIHIYLSWFQQKPGKVPKHLIYRANDL VSGVPSRFSGSGSGTEFTLTISSLQPEDFATYYCLQYDEFPYTFGGGTKVEIK |
| 26 | CG_76_VH | QMQLVQSGAEVKKPGSSVKVSCKASGFNIKDYYLHWVRQAPGKGLEWMGWI MPDQGMTEYAQKFQGRVTITRDRSTSTAYMELRSLRAEDTAVYYCNAAYGSSS YPMDYWGQGTLVTVSS |
| 27 | CG_77_VL | NIQMTQSPSSLSASVGDRVTITCRASQDIHIYLSWFQQKPGKVPKHLIYRANTLV SGVPSRFSGSGSGTEFTLTISSLQPEDFATYYCLQYDEFPYTFGGGTKVEIK |
| 28 | CG_77_VH | QMQLVQSGAEVKKPGSSVKVSCKASGFNIKDYYLHWVRQAPGKGLEWMGWI YPDQGMTEYAQKFQGRVTITRDRSTSTAYMELRSLRAEDTAVYYCNAAYGSSS YPMDYWGQGTLVTVSS |
| 29 | CG_78_VL | NIQMTQSPSSLSASVGDRVTITCRASQDIHLYLSWFQQKPGKVPKHLIYRANDL VSGVPSRFSGSGSGTEFTLTISSLQPEDFATYYCLQYDEFPYTFGGGTKVEIK |
| 30 | CG_78_VH | QMQLVQSGAEVKKPGSSVKVSCKASGFNIKDYYLHWVRQAPGKGLEWMGWI QPDQGLTEYAQKFQGRVTITRDRSTSTAYMELRSLRAEDTAVYYCNAAYGSSSY PMDYWGQGTLVTVSS |
| 31 | CG_79_VL | NIQMTQSPSSLSASVGDRVTITCRASQDIHLYLSWFQQKPGKVPKHLIYRANEL VSGVPSRFSGSGSGTEFTLTISSLQPEDFATYYCLQYDEFPYTFGGGTKVEIK |

Sequence Listing

| SEQ ID NO: | Description | Amino Acid Sequence |
|---|---|---|
| 32 | CG_79_VH | QMQLVQSGAEVKKPGSSVKVSCKASGFNIKDYYLHWVRQAPGKGLEWMGWI EPDQGYTEYAQKFQGRVTITRDRSTSTAYMELRSLRAEDTAVYYCNAAYGSSSY PMDYWGQGTLVTVSS |
| 33 | CG_80_VL | NIQMTQSPSSLSASVGDRVTITCRASQDIHNYLSWFQQKPGKVPKHLIYRANEL VSGVPSRFSGSGSGTEFTLTISSLQPEDFATYYCLQYDEFPYTFGGGTKVEIK |
| 34 | CG_80_VH | QMQLVQSGAEVKKPGSSVKVSCKASGFNIKDYYLHWVRQAPGKGLEWMGWI LPDQGYTEYAQKFQGRVTITRDRSTSTAYMELRSLRAEDTAVYYCNAAYGSSSY PMDYWGQGTLVTVSS |
| 35 | CG_81_VL | NIQMTQSPSSLSASVGDRVTITCRASQDIHNYLSWFQQKPGKVPKHLIYRANVL VSGVPSRFSGSGSGTEFTLTISSLQPEDFATYYCLQYDEFPYTFGGGTKVEIK |
| 36 | CG_81_VH | QMQLVQSGAEVKKPGSSVKVSCKASGFNIKDYYLHWVRQAPGKGLEWMGWI FPDQGMTEYAQKFQGRVTITRDRSTSTAYMELRSLRAEDTAVYYCNAAYGSSS YPMDYWGQGTLVTVSS |
| 37 | CG_82_VL | NIQMTQSPSSLSASVGDRVTITCRASQDIHQYLSWFQQKPGKVPKHLIYRANDL VSGVPSRFSGSGSGTEFTLTISSLQPEDFATYYCLQYDEFPYTFGGGTKVEIK |
| 38 | CG_82_VH | QMQLVQSGAEVKKPGSSVKVSCKASGFNIKDYYLHWVRQAPGKGLEWMGWI YPDQGITEYAQKFQGRVTITRDRSTSTAYMELRSLRAEDTAVYYCNAAYGSSSYP MDYWGQGTLVTVSS |
| 39 | CG_83_VL | NIQMTQSPSSLSASVGDRVTITCRASQDIHQYLSWFQQKPGKVPKHLIYRANEL VSGVPSRFSGSGSGTEFTLTISSLQPEDFATYYCLQYDEFPYTFGGGTKVEIK |
| 40 | CG_83_VH | QMQLVQSGAEVKKPGSSVKVSCKASGFNIKDYYLHWVRQAPGKGLEWMGWI FPDQGQTEYAQKFQGRVTITRDRSTSTAYMELRSLRAEDTAVYYCNAAYGSSSY PMDYWGQGTLVTVSS |
| 41 | CG_84_VL | NIQMTQSPSSLSASVGDRVTITCRASQDIHTYLSWFQQKPGKVPKHLIYRANDL VSGVPSRFSGSGSGTEFTLTISSLQPEDFATYYCLQYDEFPYTFGGGTKVEIK |
| 42 | CG_84_VH | QMQLVQSGAEVKKPGSSVKVSCKASGFNIKDYYLHWVRQAPGKGLEWMGWI YPDQGLTEYAQKFQGRVTITRDRSTSTAYMELRSLRAEDTAVYYCNAAYGSSSY PMDYWGQGTLVTVSS |
| 43 | CG_85_VL | NIQMTQSPSSLSASVGDRVTITCRASQDIHTYLSWFQQKPGKVPKHLIYRANYL VSGVPSRFSGSGSGTEFTLTISSLQPEDFATYYCLQYDEFPYTFGGGTKVEIK |
| 44 | CG_85_VH | QMQLVQSGAEVKKPGSSVKVSCKASGFNIKDYYLHWVRQAPGKGLEWMGWI HPDQGLTEYAQKFQGRVTITRDRSTSTAYMELRSLRAEDTAVYYCNAAYGSSSY PMDYWGQGTLVTVSS |
| 45 | CG_86_VL | NIQMTQSPSSLSASVGDRVTITCRASQDIHVYLSWFQQKPGKVPKHLIYRANDL VSGVPSRFSGSGSGTEFTLTISSLQPEDFATYYCLQYDEFPYTFGGGTKVEIK |
| 46 | CG_86_VH | QMQLVQSGAEVKKPGSSVKVSCKASGFNIKDYYLHWVRQAPGKGLEWMGWI HPDQGVTEYAQKFQGRVTITRDRSTSTAYMELRSLRAEDTAVYYCNAAYGSSSY PMDYWGQGTLVTVSS |
| 47 | CG_87_VL | NIQMTQSPSSLSASVGDRVTITCRASQDIHYYLSWFQQKPGKVPKHLIYRANDL VSGVPSRFSGSGSGTEFTLTISSLQPEDFATYYCLQYDEFPYTFGGGTKVEIK |
| 48 | CG_87_VH | QMQLVQSGAEVKKPGSSVKVSCKASGFNIKDYYLHWVRQAPGKGLEWMGWI YPDQGATEYAQKFQGRVTITRDRSTSTAYMELRSLRAEDTAVYYCNAAYGSSSY PMDYWGQGTLVTVSS |
| 49 | CG_88_VL | NIQMTQSPSSLSASVGDRVTITCRASQDIHVYLSWFQQKPGKVPKHLIYRANQL VSGVPSRFSGSGSGTEFTLTISSLQPEDFATYYCLQYDEFPYTFGGGTKVEIK |
| 50 | CG_88_VH | QMQLVQSGAEVKKPGSSVKVSCKASGFNIKDYYLHWVRQAPGKGLEWMGWI YPDQGATEYAQKFQGRVTITRDRSTSTAYMELRSLRAEDTAVYYCNAAYGSSSY PMDYWGQGTLVTVSS |
| 51 | CG_89_VL | NIQMTQSPSSLSASVGDRVTITCRASQDIHTYLSWFQQKPGKVPKHLIYRANYL VSGVPSRFSGSGSGTEFTLTISSLQPEDFATYYCLQYDEFPYTFGGGTKVEIK |
| 52 | CG_89_VH | QMQLVQSGAEVKKPGSSVKVSCKASGFNIKDYYLHWVRQAPGKGLEWMGWI SPDQGSTEYAQKFQGRVTITRDRSTSTAYMELRSLRAEDTAVYYCNAAYGSSSY PMDYWGQGTLVTVSS |

Sequence Listing

| SEQ ID NO: | Description | Amino Acid Sequence |
|---|---|---|
| 53 | CG_90_VL | NIQMTQSPSSLSASVGDRVTITCRASQDIHEYLSWFQQKPGKVPKHLIYRANYL<br>VSGVPSRFSGSGSGTEFTLTISSLQPEDFATYYCLQYDEFPYTFGGGTKVEIK |
| 54 | CG_90_VH | QMQLVQSGAEVKKPGSSVKVSCKASGFNIKDYYLHWVRQAPGKGLEWMGWI<br>MPDQGYTEYAQKFQGRVTITRDRSTSTAYMELRSLRAEDTAVYYCNAAYGSSS<br>YPMDYWGQGTLVTVSS |
| 55 | CG_91_VL | NIQMTQSPSSLSASVGDRVTITCRASQDIHLYLSWFQQKPGKVPKHLIYRANQL<br>VSGVPSRFSGSGSGTEFTLTISSLQPEDFATYYCLQYDEFPYTFGGGTKVEIK |
| 56 | CG_91_VH | QMQLVQSGAEVKKPGSSVKVSCKASGFNIKDYYLHWVRQAPGKGLEWMGWI<br>IPDQGYTEYAQKFQGRVTITRDRSTSTAYMELRSLRAEDTAVYYCNAAYGSSSYP<br>MDYWGQGTLVTVSS |
| 57 | CG_92_VL | NIQMTQSPSSLSASVGDRVTITCRASQDIHVYLSWFQQKPGKVPKHLIYRANEL<br>VSGVPSRFSGSGSGTEFTLTISSLQPEDFATYYCLQYDEFPYTFGGGTKVEIK |
| 58 | CG_92_VH | QMQLVQSGAEVKKPGSSVKVSCKASGFNIKDYYLHWVRQAPGKGLEWMGWI<br>EPDQGMTEYAQKFQGRVTITRDRSTSTAYMELRSLRAEDTAVYYCNAAYGSSS<br>YPMDYWGQGTLVTVSS |
| 59 | CG_93_VL | NIQMTQSPSSLSASVGDRVTITCRASQDIHHYLSWFQQKPGKVPKHLIYRANYL<br>VSGVPSRFSGSGSGTEFTLTISSLQPEDFATYYCLQYDEFPYTFGGGTKVEIK |
| 60 | CG_93_VH | QMQLVQSGAEVKKPGSSVKVSCKASGFNIKDYYLHWVRQAPGKGLEWMGWI<br>APDQGVTEYAQKFQGRVTITRDRSTSTAYMELRSLRAEDTAVYYCNAAYGSSSY<br>PMDYWGQGTLVTVSS |
| 61 | CG_94_VL | NIQMTQSPSSLSASVGDRVTITCRASQDIHVYLSWFQQKPGKVPKHLIYRANQL<br>VSGVPSRFSGSGSGTEFTLTISSLQPEDFATYYCLQYDEFPYTFGGGTKVEIK |
| 62 | CG_94_VH | QMQLVQSGAEVKKPGSSVKVSCKASGFNIKDYYLHWVRQAPGKGLEWMGWI<br>VPDQGMTEYAQKFQGRVTITRDRSTSTAYMELRSLRAEDTAVYYCNAAYGSSS<br>YPMDYWGQGTLVTVSS |
| 63 | CG_95_VL | NIQMTQSPSSLSASVGDRVTITCRASQDIHTYLSWFQQKPGKVPKHLIYRANYL<br>VSGVPSRFSGSGSGTEFTLTISSLQPEDFATYYCLQYDEFPYTFGGGTKVEIK |
| 64 | CG_95_VH | QMQLVQSGAEVKKPGSSVKVSCKASGFNIKDYYLHWVRQAPGKGLEWMGWI<br>APDQGITEYAQKFQGRVTITRDRSTSTAYMELRSLRAEDTAVYYCNAAYGSSSY<br>PMDYWGQGTLVTVSS |
| 65 | CG_96_VL | NIQMTQSPSSLSASVGDRVTITCRASQDIHIYLSWFQQKPGKVPKHLIYRANELV<br>SGVPSRFSGSGSGTEFTLTISSLQPEDFATYYCLQYDEFPYTFGGGTKVEIK |
| 66 | CG_96_VH | QMQLVQSGAEVKKPGSSVKVSCKASGFNIKDYYLHWVRQAPGKGLEWMGWI<br>MPDQGATEYAQKFQGRVTITRDRSTSTAYMELRSLRAEDTAVYYCNAAYGSSS<br>YPMDYWGQGTLVTVSS |
| 67 | CG_97_VL | NIQMTQSPSSLSASVGDRVTITCRASQDIHYYLSWFQQKPGKVPKHLIYRANEL<br>VSGVPSRFSGSGSGTEFTLTISSLQPEDFATYYCLQYDEFPYTFGGGTKVEIK |
| 68 | CG_97_VH | QMQLVQSGAEVKKPGSSVKVSCKASGFNIKDYYLHWVRQAPGKGLEWMGWI<br>VPDQGITEYAQKFQGRVTITRDRSTSTAYMELRSLRAEDTAVYYCNAAYGSSSY<br>PMDYWGQGTLVTVSS |
| 69 | CG_98_VL | NIQMTQSPSSLSASVGDRVTITCRASQDIHHYLSWFQQKPGKVPKHLIYRANDL<br>VSGVPSRFSGSGSGTEFTLTISSLQPEDFATYYCLQYDEFPYTFGGGTKVEIK |
| 70 | CG_98_VH | QMQLVQSGAEVKKPGSSVKVSCKASGFNIKDYYLHWVRQAPGKGLEWMGWI<br>YPDQGITEYAQKFQGRVTITRDRSTSTAYMELRSLRAEDTAVYYCNAAYGSSSYP<br>MDYWGQGTLVTVSS |
| 71 | CG_99_VL | NIQMTQSPSSLSASVGDRVTITCRASQDIHYYLSWFQQKPGKVPKHLIYRANEL<br>VSGVPSRFSGSGSGTEFTLTISSLQPEDFATYYCLQYDEFPYTFGGGTKVEIK |
| 72 | CG_99_VH | QMQLVQSGAEVKKPGSSVKVSCKASGFNIKDYYLHWVRQAPGKGLEWMGWI<br>YPDQGVTEYAQKFQGRVTITRDRSTSTAYMELRSLRAEDTAVYYCNAAYGSSSY<br>PMDYWGQGTLVTVSS |
| 73 | CG_100_VL | NIQMTQSPSSLSASVGDRVTITCRASQDIHIYLSWFQQKPGKVPKHLIYRANDL<br>VSGVPSRFSGSGSGTEFTLTISSLQPEDFATYYCLQYDEFPYTFGGGTKVEIK |

-continued

Sequence Listing

| SEQ ID NO: | Description | Amino Acid Sequence |
|---|---|---|
| 74 | CG_100_VH | QMQLVQSGAEVKKPGSSVKVSCKASGFNIKDYYLHWVRQAPGKGLEWMGWI EPDQGLTEYAQKFQGRVTITRDRSTSTAYMELRSLRAEDTAVYYCNAAYGSSSY PMDYWGQGTLVTVSS |
| 75 | CG_101_VL | NIQMTQSPSSLSASVGDRVTITCRASQDIHYYLSWFQQKPGKVPKHLIYRANDL VSGVPSRFSGSGSGTEFTLTISSLQPEDFATYYCLQYDEFPYTFGGGTKVEIK |
| 76 | CG_101_VH | QMQLVQSGAEVKKPGSSVKVSCKASGFNIKDYYLHWVRQAPGKGLEWMGWI LPDQGDTEYAQKFQGRVTITRDRSTSTAYMELRSLRAEDTAVYYCNAAYGSSSY PMDYWGQGTLVTVSS |
| 77 | CG_102_VL | NIQMTQSPSSLSASVGDRVTITCRASQDIHVYLSWFQQKPGKVPKHLIYRANDL VSGVPSRFSGSGSGTEFTLTISSLQPEDFATYYCLQYDEFPYTFGGGTKVEIK |
| 78 | CG_102_VH | QMQLVQSGAEVKKPGSSVKVSCKASGFNIKDYYLHWVRQAPGKGLEWMGWI YPDQGSTEYAQKFQGRVTITRDRSTSTAYMELRSLRAEDTAVYYCNAAYGSSSY PMDYWGQGTLVTVSS |
| 79 | CG_103_VL | NIQMTQSPSSLSASVGDRVTITCRASQDIHIYLSWFQQKPGKVPKHLIYRANQL VSGVPSRFSGSGSGTEFTLTISSLQPEDFATYYCLQYDEFPYTFGGGTKVEIK |
| 80 | CG_103_VH | QMQLVQSGAEVKKPGSSVKVSCKASGFNIKDYYLHWVRQAPGKGLEWMGWI DPDQGATEYAQKFQGRVTITRDRSTSTAYMELRSLRAEDTAVYYCNAAYGSSSY PMDYWGQGTLVTVSS |
| 81 | CG_104_VL | NIQMTQSPSSLSASVGDRVTITCRASQDIHLYLSWFQQKPGKVPKHLIYRANDL VSGVPSRFSGSGSGTEFTLTISSLQPEDFATYYCLQYDEFPYTFGGGTKVEIK |
| 82 | CG_104_VH | QMQLVQSGAEVKKPGSSVKVSCKASGFNIKDYYLHWVRQAPGKGLEWMGWI QPDQGVTEYAQKFQGRVTITRDRSTSTAYMELRSLRAEDTAVYYCNAAYGSSSY PMDYWGQGTLVTVSS |
| 83 | CG_105_VL | NIQMTQSPSSLSASVGDRVTITCRASQDIHLYLSWFQQKPGKVPKHLIYRANEL VSGVPSRFSGSGSGTEFTLTISSLQPEDFATYYCLQYDEFPYTFGGGTKVEIK |
| 84 | CG_105_VH | QMQLVQSGAEVKKPGSSVKVSCKASGFNIKDYYLHWVRQAPGKGLEWMGWI IPDQGETEYAQKFQGRVTITRDRSTSTAYMELRSLRAEDTAVYYCNAAYGSSSYP MDYWGQGTLVTVSS |
| 85 | CG_106_VL | NIQMTQSPSSLSASVGDRVTITCRASQDIHDYLSWFQQKPGKVPKHLIYRANYL VSGVPSRFSGSGSGTEFTLTISSLQPEDFATYYCLQYDEFPYTFGGGTKVEIK |
| 86 | CG_106_VH | QMQLVQSGAEVKKPGSSVKVSCKASGFNIKDYYLHWVRQAPGKGLEWMGWI IPDQGTTEYAQKFQGRVTITRDRSTSTAYMELRSLRAEDTAVYYCNAAYGSSSYP MDYWGQGTLVTVSS |
| 87 | CG_107_VL | NIQMTQSPSSLSASVGDRVTITCRASQDIHTYLSWFQQKPGKVPKHLIYRANQL VSGVPSRFSGSGSGTEFTLTISSLQPEDFATYYCLQYDEFPYTFGGGTKVEIK |
| 88 | CG_107_VH | QMQLVQSGAEVKKPGSSVKVSCKASGFNIKDYYLHWVRQAPGKGLEWMGWI IPDQGYTEYAQKFQGRVTITRDRSTSTAYMELRSLRAEDTAVYYCNAAYGSSSYP MDYWGQGTLVTVSS |
| 89 | CG_108_VL | NIQMTQSPSSLSASVGDRVTITCRASQDIHRYLSWFQQKPGKVPKHLIYRANRL VSGVPSRFSGSGSGTEFTLTISSLQPEDFATYYCLQYDEFPYTFGGGTKVEIK |
| 90 | CG_108_VH | QMQLVQSGAEVKKPGSSVKVSCKASGFNIKDYYLHWVRQAPGKGLEWMGWI DPDQGDTYYAQKFQGRVTITRDRSTSTAYMELRSLRAEDTAVYYCNAAYGDSS YPMDYWGQGTLVTVSS |
| 91 | CG_109_VL | NIQMTQSPSSLSASVGDRVTITCRASQDIHRYLSWFQQKPGKVPKHLIYRANRL VSGVPSRFSGSGSGTEFTLTISSLQPEDFATYYCLQYDEFPYTFGGGTKVEIK |
| 92 | CG_109_VH | QMQLVQSGAEVKKPGSSVKVSCKASGFNIKDYYLHWVRQAPGKGLEWMGWI DPDQGDTQYAQKFQGRVTITRDRSTSTAYMELRSLRAEDTAVYYCNAAYGYSS YPMDYWGQGTLVTVSS |
| 93 | CG_110_VL | NIQMTQSPSSLSASVGDRVTITCRASQDIHRYLSWFQQKPGKVPKHLIYRANRL VSGVPSRFSGSGSGTEFTLTISSLQPEDFATYYCLQYDEFPYTFGGGTKVEIK |

-continued

Sequence Listing

| SEQ ID NO: | Description | Amino Acid Sequence |
|---|---|---|
| 94 | CG_110_VH | QMQLVQSGAEVKKPGSSVKVSCKASGFNIKDYYLHWVRQAPGKGLEWMGWI DPDQGDTLYAQKFQGRVTITRDRSTSTAYMELRSLRAEDTAVYYCNAAYGESSY PMDYWGQGTLVTVSS |
| 95 | CG_111_VL | NIQMTQSPSSLSASVGDRVTITCRASQDIHRYLSWFQQKPGKVPKHLIYRANRL VSGVPSRFSGSGSGTEFTLTISSLQPEDFATYYCLQYDEFPYTFGGGTKVEIK |
| 96 | CG_111_VH | QMQLVQSGAEVKKPGSSVKVSCKASGFNIKDYYLHWVRQAPGKGLEWMGWI DPDQGDTVYAQKFQGRVTITRDRSTSTAYMELRSLRAEDTAVYYCNAAYGESS YPMDYWGQGTLVTVSS |
| 97 | CG_112_VL | NIQMTQSPSSLSASVGDRVTITCRASQDIHRYLSWFQQKPGKVPKHLIYRANRL VSGVPSRFSGSGSGTEFTLTISSLQPEDFATYYCLQYDEFPYTFGGGTKVEIK |
| 98 | CG_112_VH | QMQLVQSGAEVKKPGSSVKVSCKASGFNIKDYYLHWVRQAPGKGLEWMGWI DPQQGDTEYAQKFQGRVTITRDRSTSTAYMELRSLRAEDTAVYYCNAAYGVSS YPMDYWGQGTLVTVSS |
| 99 | CG_113_VL | NIQMTQSPSSLSASVGDRVTITCRASQDIHRYLSWFQQKPGKVPKHLIYRANRL VSGVPSRFSGSGSGTEFTLTISSLQPEDFATYYCLQYDEFPYTFGGGTKVEIK |
| 100 | CG_113_VH | QMQLVQSGAEVKKPGSSVKVSCKASGFNIKDYYLHWVRQAPGKGLEWMGWI LPDQGDTEYAQKFQGRVTITRDRSTSTAYMELRSLRAEDTAVYYCNAAYGYSSY PMDYWGQGTLVTVSS |
| 101 | CG_114_VL | NIQMTQSPSSLSASVGDRVTITCRASQDIHRYLSWFQQKPGKVPKHLIYRANRL VSGVPSRFSGSGSGTEFTLTISSLQPEDFATYYCLQYDEFPYTFGGGTKVEIK |
| 102 | CG_114_VH | QMQLVQSGAEVKKPGSSVKVSCKASGFNIKDYYLHWVRQAPGKGLEWMGWI DPDQGATYYAQKFQGRVTITRDRSTSTAYMELRSLRAEDTAVYYCNAAYGSSSY PMDYWGQGTLVTVSS |
| 103 | CG_115_VL | NIQMTQSPSSLSASVGDRVTITCRASQDIHRYLSWFQQKPGKVPKHLIYRANRL VSGVPSRFSGSGSGTEFTLTISSLQPEDFATYYCLQYDEFPYTFGGGTKVEIK |
| 104 | CG_115_VH | QMQLVQSGAEVKKPGSSVKVSCKASGFNIKDYYLHWVRQAPGKGLEWMGWI DPDTGDTEYAQKFQGRVTITRDRSTSTAYMELRSLRAEDTAVYYCNAAYYSSSY PMDYWGQGTLVTVSS |
| 105 | CG_116_VL | NIQMTQSPSSLSASVGDRVTITCRASQDIHRYLSWFQQKPGKVPKHLIYRANRL VSGVPSRFSGSGSGTEFTLTISSLQPEDFATYYCLQYDEFPYTFGGGTKVEIK |
| 106 | CG_116_VH | QMQLVQSGAEVKKPGSSVKVSCKASGFNIKDYYLHWVRQAPGKGLEWMGWI DPDQGDTSYAQKFQGRVTITRDRSTSTAYMELRSLRAEDTAVYYCNAAYGYSSY PMDYWGQGTLVTVSS |
| 107 | CG_117_VL | NIQMTQSPSSLSASVGDRVTITCRASQDIHRYLSWFQQKPGKVPKHLIYRANRL VSGVPSRFSGSGSGTEFTLTISSLQPEDFATYYCLQYDEFPYTFGGGTKVEIK |
| 108 | CG_117_VH | QMQLVQSGAEVKKPGSSVKVSCKASGFNIKDYYLHWVRQAPGKGLEWMGWI DPDQGDTAYAQKFQGRVTITRDRSTSTAYMELRSLRAEDTAVYYCNAAYGLSSY PMDYWGQGTLVTVSS |
| 109 | CG_118_VL | NIQMTQSPSSLSASVGDRVTITCRASQDIHRYLSWFQQKPGKVPKHLIYRANRL VSGVPSRFSGSGSGTEFTLTISSLQPEDFATYYCLQYDEFPYTFGGGTKVEIK |
| 110 | CG_118_VH | QMQLVQSGAEVKKPGSSVKVSCKASGFNIKDYYLHWVRQAPGKGLEWMGWI DPDVGSTEYAQKFQGRVTITRDRSTSTAYMELRSLRAEDTAVYYCNAAYGSSSY PMDYWGQGTLVTVSS |
| 111 | CG_119_VL | NIQMTQSPSSLSASVGDRVTITCRASQDIHRYLSWFQQKPGKVPKHLIYRANRL VSGVPSRFSGSGSGTEFTLTISSLQPEDFATYYCLQYDEFPYTFGGGTKVEIK |
| 112 | CG_119_VH | QMQLVQSGAEVKKPGSSVKVSCKASGFNIKDYYLHWVRQAPGKGLEWMGWI DPDQGATSYAQKFQGRVTITRDRSTSTAYMELRSLRAEDTAVYYCNAAYGSSSY PMDYWGQGTLVTVSS |
| 113 | CG_120_VL | NIQMTQSPSSLSASVGDRVTITCRASQDIHRYLSWFQQKPGKVPKHLIYRANRL VSGVPSRFSGSGSGTEFTLTISSLQPEDFATYYCLQYDEFPYTFGGGTKVEIK |
| 114 | CG_120_VH | QMQLVQSGAEVKKPGSSVKVSCKASGFNIKDYYLHWVRQAPGKGLEWMGWI LPDSGDTEYAQKFQGRVTITRDRSTSTAYMELRSLRAEDTAVYYCNAAYGSSSY PMDYWGQGTLVTVSS |

| SEQ ID NO: | Description | Amino Acid Sequence |
|---|---|---|
| 115 | CG_121_VL | NIQMTQSPSSLSASVGDRVTITCRASQDIHRYLSWFQQKPGKVPKHLIYRANRL VSGVPSRFSGSGSGTEFTLTISSLQPEDFATYYCLQYDEFPYTFGGGTKVEIK |
| 116 | CG_121_VH | QMQLVQSGAEVKKPGSSVKVSCKASGFNIKDYYLHWVRQAPGKGLEWMGWI DPDLGDTSYAQKFQGRVTITRDRSTSTAYMELRSLRAEDTAVYYCNAAYGSSSY PMDYWGQGTLVTVSS |
| 117 | CG_122_VL | NIQMTQSPSSLSASVGDRVTITCRASQDIHRYLSWFQQKPGKVPKHLIYRANRL VSGVPSRFSGSGSGTEFTLTISSLQPEDFATYYCLQYDEFPYTFGGGTKVEIK |
| 118 | CG_122_VH | QMQLVQSGAEVKKPGSSVKVSCKASGFNIKDYYLHWVRQAPGKGLEWMGWI DPDQGLTEYAQKFQGRVTITRDRSTSTAYMELRSLRAEDTAVYYCNAAYDSSSY PMDYWGQGTLVTVSS |
| 119 | CG_123_VL | NIQMTQSPSSLSASVGDRVTITCRASQDIHRYLSWFQQKPGKVPKHLIYRANRL VSGVPSRFSGSGSGTEFTLTISSLQPEDFATYYCLQYDEFPYTFGGGTKVEIK |
| 120 | CG_123_VH | QMQLVQSGAEVKKPGSSVKVSCKASGFNIKDYYLHWVRQAPGKGLEWMGWI DPDVGDTEYAQKFQGRVTITRDRSTSTAYMELRSLRAEDTAVYYCNAAYGVSSY PMDYWGQGTLVTVSS |
| 121 | CG_124_VL | NIQMTQSPSSLSASVGDRVTITCRASQDIHRYLSWFQQKPGKVPKHLIYRANRL VSGVPSRFSGSGSGTEFTLTISSLQPEDFATYYCLQYDEFPYTFGGGTKVEIK |
| 122 | CG_124_VH | QMQLVQSGAEVKKPGSSVKVSCKASGFNIKDYYLHWVRQAPGKGLEWMGWI DPDQGTTYYAQKFQGRVTITRDRSTSTAYMELRSLRAEDTAVYYCNAAYGSSSY PMDYWGQGTLVTVSS |
| 123 | CG_125_VL | NIQMTQSPSSLSASVGDRVTITCRASQDIHRYLSWFQQKPGKVPKHLIYRANRL VSGVPSRFSGSGSGTEFTLTISSLQPEDFATYYCLQYDEFPYTFGGGTKVEIK |
| 124 | CG_125_VH | QMQLVQSGAEVKKPGSSVKVSCKASGFNIKDYYLHWVRQAPGKGLEWMGWI DPDQGDTLYAQKFQGRVTITRDRSTSTAYMELRSLRAEDTAVYYCNAAYGDSS YPMDYWGQGTLVTVSS |
| 125 | CG_126_VL | NIQMTQSPSSLSASVGDRVTITCRASQDIHRYLSWFQQKPGKVPKHLIYRANRL VSGVPSRFSGSGSGTEFTLTISSLQPEDFATYYCLQYDEFPYTFGGGTKVEIK |
| 126 | CG_126_VH | QMQLVQSGAEVKKPGSSVKVSCKASGFNIKDYYLHWVRQAPGKGLEWMGWI DPDLGDTYYAQKFQGRVTITRDRSTSTAYMELRSLRAEDTAVYYCNAAYGSSSY PMDYWGQGTLVTVSS |
| 127 | CG_127_VL | NIQMTQSPSSLSASVGDRVTITCRASQDIHRYLSWFQQKPGKVPKHLIYRANRL VSGVPSRFSGSGSGTEFTLTISSLQPEDFATYYCLQYDEFPYTFGGGTKVEIK |
| 128 | CG_127_VH | QMQLVQSGAEVKKPGSSVKVSCKASGFNIKVYYLHWVRQAPGKGLEWMGWI DPDQGDTEYAQKFQGRVTITRDRSTSTAYMELRSLRAEDTAVYYCNAAYGYSSY PMDYWGQGTLVTVSS |
| 129 | CG_128_VL | NIQMTQSPSSLSASVGDRVTITCRASQDIHRYLSWFQQKPGKVPKHLIYRANRL VSGVPSRFSGSGSGTEFTLTISSLQPEDFATYYCLQYDEFPYTFGGGTKVEIK |
| 130 | CG_128_VH | QMQLVQSGAEVKKPGSSVKVSCKASGFNIKDYYLHWVRQAPGKGLEWMGWI DPDQGHTEYAQKFQGRVTITRDRSTSTAYMELRSLRAEDTAVYYCNAAYYSSSY PMDYWGQGTLVTVSS |
| 131 | CG_129_VL | NIQMTQSPSSLSASVGDRVTITCRASQDIHRYLSWFQQKPGKVPKHLIYRANRL VSGVPSRFSGSGSGTEFTLTISSLQPEDFATYYCLQYDEFPYTFGGGTKVEIK |
| 132 | CG_129_VH | QMQLVQSGAEVKKPGSSVKVSCKASGFNIKDYYLHWVRQAPGKGLEWMGWI DPDQGDTYYAQKFQGRVTITRDRSTSTAYMELRSLRAEDTAVYYCNAAYGYSSY PMDYWGQGTLVTVSS |
| 133 | CG_130_VL | NIQMTQSPSSLSASVGDRVTITCRASQDIHRYLSWFQQKPGKVPKHLIYRANRL VSGVPSRFSGSGSGTEFTLTISSLQPEDFATYYCLQYDEFPYTFGGGTKVEIK |
| 134 | CG_130_VH | QMQLVQSGAEVKKPGSSVKVSCKASGFNIKDYYLHWVRQAPGKGLEWMGWI DPLVGDTEYAQKFQGRVTITRDRSTSTAYMELRSLRAEDTAVYYCNAAYGSSSY PMDYWGQGTLVTVSS |
| 135 | CG_131_VL | NIQMTQSPSSLSASVGDRVTITCRASQDIHRYLSWFQQKPGKVPKHLIYRANRL VSGVPSRFSGSGSGTEFTLTISSLQPEDFATYYCLQYDEFPYTFGGGTKVEIK |

| SEQ ID NO: | Description | Amino Acid Sequence |
|---|---|---|
| 136 | CG_131_VH | QMQLVQSGAEVKKPGSSVKVSCKASGFNIKDYVLHWVRQAPGKGLEWMGW IDPDLGDTEYAQKFQGRVTITRDRSTSTAYMELRSLRAEDTAVYYCNAAYGSSSY PMDYWGQGTLVTVSS |
| 137 | CG_132_VL | NIQMTQSPSSLSASVGDRVTITCRASQDIHRYLSWFQQKPGKVPKHLIYRANRL VSGVPSRFSGSGSGTEFTLTISSLQPEDFATYYCLQYDEFPYTFGGGTKVEIK |
| 138 | CG_132_VH | QMQLVQSGAEVKKPGSSVKVSCKASGFNIKDYYLHWVRQAPGKGLEWMGWI DPDEGLTEYAQKFQGRVTITRDRSTSTAYMELRSLRAEDTAVYYCNAAYGSSSY PMDYWGQGTLVTVSS |
| 139 | CG_133_VL | NIQMTQSPSSLSASVGDRVTITCRASQDIHRYLSWFQQKPGKVPKHLIYRANRL VSGVPSRFSGSGSGTEFTLTISSLQPEDFATYYCLQYDEFPYTFGGGTKVEIK |
| 140 | CG_133_VH | QMQLVQSGAEVKKPGSSVKVSCKASGFNIKDYYLHWVRQAPGKGLEWMGWI DPDQGDTYYAQKFQGRVTITRDRSTSTAYMELRSLRAEDTAVYYCNAAYGKSSY PMDYWGQGTLVTVSS |
| 141 | CG_134_VL | NIQMTQSPSSLSASVGDRVTITCRASQDIHRYLSWFQQKPGKVPKHLIYRANRL VSGVPSRFSGSGSGTEFTLTISSLQPEDFATYYCLQYDEFPYTFGGGTKVEIK |
| 142 | CG_134_VH | QMQLVQSGAEVKKPGSSVKVSCKASGFNIKDYYLHWVRQAPGKGLEWMGWI LPDQGDSEYAQKFQGRVTITRDRSTSTAYMELRSLRAEDTAVYYCNAAYGSSSY PMDYWGQGTLVTVSS |
| 143 | CG_135_VL | NIQMTQSPSSLSASVGDRVTITCRASQDIHRYLSWFQQKPGKVPKHLIYRANRL VSGVPSRFSGSGSGTEFTLTISSLQPEDFATYYCLQYDEFPYTFGGGTKVEIK |
| 144 | CG_135_VH | QMQLVQSGAEVKKPGSSVKVSCKASGFNIKDYYLHWVRQAPGKGLEWMGWI QPDQGDTAYAQKFQGRVTITRDRSTSTAYMELRSLRAEDTAVYYCNAAYGSSS YPMDYWGQGTLVTVSS |
| 145 | CG_136_VL | NIQMTQSPSSLSASVGDRVTITCRASQDIHRYLSWFQQKPGKVPKHLIYRANRL VSGVPSRFSGSGSGTEFTLTISSLQPEDFATYYCLQYDEFPYTFGGGTKVEIK |
| 146 | CG_136_VH | QMQLVQSGAEVKKPGSSVKVSCKASGFNIKDYYLHWVRQAPGKGLEWMGWI LPDVGDTEYAQKFQGRVTITRDRSTSTAYMELRSLRAEDTAVYYCNAAYGSSSY PMDYWGQGTLVTVSS |
| 147 | CG_137_VL | NIQMTQSPSSLSASVGDRVTITCRASQDIHRYLSWFQQKPGKVPKHLIYRANRL VSGVPSRFSGSGSGTEFTLTISSLQPEDFATYYCLQYDEFPYTFGGGTKVEIK |
| 148 | CG_137_VH | QMQLVQSGAEVKKPGSSVKVSCKASGFNIKEYYLHWVRQAPGKGLEWMGWI DPDTGDTEYAQKFQGRVTITRDRSTSTAYMELRSLRAEDTAVYYCNAAYGSSSY PMDYWGQGTLVTVSS |
| 149 | CG_138_VL | NIQMTQSPSSLSASVGDRVTITCRASQDIHRYLSWFQQKPGKVPKHLIYRANRL VSGVPSRFSGSGSGTEFTLTISSLQPEDFATYYCLQYDEFPYTFGGGTKVEIK |
| 150 | CG_138_VH | QMQLVQSGAEVKKPGSSVKVSCKASGFNIKDYYLHWVRQAPGKGLEWMGWI LPDGGDTEYAQKFQGRVTITRDRSTSTAYMELRSLRAEDTAVYYCNAAYGSSSY PMDYWGQGTLVTVSS |
| 151 | CG_139_VL | NIQMTQSPSSLSASVGDRVTITCRASQDIHRYLSWFQQKPGKVPKHLIYRANRL VSGVPSRFSGSGSGTEFTLTISSLQPEDFATYYCLQYDEFPYTFGGGTKVEIK |
| 152 | CG_139_VH | QMQLVQSGAEVKKPGSSVKVSCKASGFNIKDYYLHWVRQAPGKGLEWMGWI DPDQGDTYYAQKFQGRVTITRDRSTSTAYMELRSLRAEDTAVYYCNAAYGESSY PMDYWGQGTLVTVSS |
| 153 | CG_140_VL | NIQMTQSPSSLSASVGDRVTITCRASQDIHRYLSWFQQKPGKVPKHLIYRANRL VSGVPSRFSGSGSGTEFTLTISSLQPEDFATYYCLQYDEFPYTFGGGTKVEIK |
| 154 | CG_140_VH | QMQLVQSGAEVKKPGSSVKVSCKASGFNIKDYYLHWVRQAPGKGLEWMGWI DPDQGDTYYAQKFQGRVTITRDRSTSTAYMELRSLRAEDTAVYYCNAAYGVSS YPMDYWGQGTLVTVSS |
| 155 | CG_141_VL | NIQMTQSPSSLSASVGDRVTITCRASQDIHRYLSWFQQKPGKVPKHLIYRANRL VSGVPSRFSGSGSGTEFTLTISSLQPEDFATYYCLQYDEFPYTFGGGTKVEIK |

| SEQ ID NO: | Description | Amino Acid Sequence |
|---|---|---|
| 156 | CG_141_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYYYSSY PMDYWGQGTLVTVSS |
| 157 | CG_142_VL | NIQMTQSPSSLSASVGDRVTITCRASQDIHRYLSWFQQKPGKVPKHLIYRANYL VSGVPSRFSGSGSGTEFTLTISSLQPEDFATYYCLQYDQFPYTFGGGTKVEIK |
| 158 | CG_142_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 159 | CG_143_VL | NIQMTQSPSSLSASVGDRVTITCRASQDIQRYLSWFQQKPGKVPKHLIYYANRL VSGVPSRFSGSGSGTEFTLTISSLQPEDFATYYCLQYDEFPYTFGGGTKVEIK |
| 160 | CG_143_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 161 | CG_144_VL | NIQMTQSPSSLSASVGDRVTITCRASQDISRYLSWFQQKPGKVPKHLIYYANRL VSGVPSRFSGSGSGTEFTLTISSLQPEDFATYYCLQYDEFPYTFGGGTKVEIK |
| 162 | CG_144_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 163 | CG_145_VL | NIQMTQSPSSLSASVGDRVTITCRASQDIHRYLSWFQQKPGKVPKHLIYRANYL VSGVPSRFSGSGSGTEFTLTISSLQPEDFATYYCLQYDHFPYTFGGGTKVEIK |
| 164 | CG_145_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 165 | CG_146_VL | NIQMTQSPSSLSASVGDRVTITCRASQDIHRYLSWFQQKPGKVPKHLIYYANRL VSGVPSRFSGSGSGTEFTLTISSLQPEDFATYYCLQYYEFPYTFGGGTKVEIK |
| 166 | CG_146_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 167 | CG_147_VL | NIQMTQSPSSLSASVGDRVTITCRASQDIARYLSWFQQKPGKVPKHLIYRANRL VSGVPSRFSGSGSGTEFTLTISSLQPEDFATYYCLQYDVFPYTFGGGTKVEIK |
| 168 | CG_147_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 169 | CG_148_VL | NIQMTQSPSSLSASVGDRVTITCRASQDIHRYLSWFQQKPGKVPKHLIYRANYL VSGVPSRFSGSGSGTEFTLTISSLQPEDFATYYCLQYDLFPYTFGGGTKVEIK |
| 170 | CG_148_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 171 | CG_149_VL | NIQMTQSPSSLSASVGDRVTITCRASQDIHRYLSWFQQKPGKVPKHLIYRANYL VSGVPSRFSGSGSGTEFTLTISSLQPEDFATYYCLQYQEFPYTFGGGTKVEIK |
| 172 | CG_149_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 173 | CG_150_VL | NIQMTQSPSSLSASVGDRVTITCRASQDIYYYLSWFQQKPGKVPKHLIYRANRL VSGVPSRFSGSGSGTEFTLTISSLQPEDFATYYCLQYDEFPYTFGGGTKVEIK |
| 174 | CG_150_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 175 | CG_151_VL | NIQMTQSPSSLSASVGDRVTITCRASQDIHRYLSWFQQKPGKVPKHLIYRANYL VSGVPSRFSGSGSGTEFTLTISSLQPEDFATYYCLQYVEFPYTFGGGTKVEIK |
| 176 | CG_151_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |

-continued

| SEQ ID NO: | Description | Amino Acid Sequence |
|---|---|---|
| 177 | CG_152_VL | NIQMTQSPSSLSASVGDRVTITCRASQDIHRYLSWFQQKPGKVPKHLIYYANRL VSGVPSRFSGSGSGTEFTLTISSLQPEDFATYYCLQYHEFPYTFGGGTKVEIK |
| 178 | CG_152_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 179 | CG_153_VL | NIQMTQSPSSLSASVGDRVTITCRASQDIERYLSWFQQKPGKVPKHLIYYANRL VSGVPSRFSGSGSGTEFTLTISSLQPEDFATYYCLQYDEFPYTFGGGTKVEIK |
| 180 | CG_153_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 181 | CG_154_VL | NIQMTQSPSSLSASVGDRVTITCRASQDIHRYLSWFQQKPGKVPKHLIYRANYL VSGVPSRFSGSGSGTEFTLTISSLQPEDFATYYCLQYDKFPYTFGGGTKVEIK |
| 182 | CG_154_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 183 | CG_155_VL | NIQMTQSPSSLSASVGDRVTITCRASQDIYTYLSWFQQKPGKVPKHLIYRANRL VSGVPSRFSGSGSGTEFTLTISSLQPEDFATYYCLQYDEFPYTFGGGTKVEIK |
| 184 | CG_155_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 185 | CG_156_VL | NIQMTQSPSSLSASVGDRVTITCRASQDILRYLSWFQQKPGKVPKHLIYYANRLV SGVPSRFSGSGSGTEFTLTISSLQPEDFATYYCLQYDEFPYTFGGGTKVEIK |
| 186 | CG_156_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 187 | CG_157_VL | NIQMTQSPSSLSASVGDRVTITCRASQDITRYLSWFQQKPGKVPKHLIYYANRL VSGVPSRFSGSGSGTEFTLTISSLQPEDFATYYCLQYDEFPYTFGGGTKVEIK |
| 188 | CG_157_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 189 | CG_158_VL | NIQMTQSPSSLSASVGDRVTITCRASQDIDRYLSWFQQKPGKVPKHLIYRANRL VSGVPSRFSGSGSGTEFTLTISSLQPEDFATYYCLQYDLFPYTFGGGTKVEIK |
| 190 | CG_158_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 191 | CG_159_VL | NIQMTQSPSSLSASVGDRVTITCRASQDIHVYLSWFQQKPGKVPKHLIYRANRL VSGVPSRFSGSGSGTEFTLTISSLQPEDFATYYCLQYYEFPYTFGGGTKVEIK |
| 192 | CG_159_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 193 | CG_160_VL | NIQMTQSPSSLSASVGDRVTITCRASQDIHRYLSWFQQKPGKVPKHLIYRANYL VSGVPSRFSGSGSGTEFTLTISSLQPEDFATYYCLQYAEFPYTFGGGTKVEIK |
| 194 | CG_160_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 195 | CG_161_VL | NIQMTQSPSSLSASVGDRVTITCRASQDILTYLSWFQQKPGKVPKHLIYRANRLV SGVPSRFSGSGSGTEFTLTISSLQPEDFATYYCLQYDEFPYTFGGGTKVEIK |
| 196 | CG_161_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 197 | CG_162_VL | NIQMTQSPSSLSASVGDRVTITCRASQDIARYLSWFQQKPGKVPKHLIYYANRL VSGVPSRFSGSGSGTEFTLTISSLQPEDFATYYCLQYDEFPYTFGGGTKVEIK |

| SEQ ID NO: | Description | Amino Acid Sequence |
|---|---|---|
| 198 | CG_162_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 199 | CG_163_VL | NIQMTQSPSSLSASVGDRVTITCRASQDIVTYLSWFQQKPGKVPKHLIYRANRL VSGVPSRFSGSGSGTEFTLTISSLQPEDFATYYCLQYDEFPYTFGGGTKVEIK |
| 200 | CG_163_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 201 | CG_164_VL | NIQMTQSPSSLSASVGDRVTITCRASQDILEYLSWFQQKPGKVPKHLIYRANRLV SGVPSRFSGSGSGTEFTLTISSLQPEDFATYYCLQYDEFPYTFGGGTKVEIK |
| 202 | CG_164_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 203 | CG_165_VL | NIQMTQSPSSLSASVGDRVTITCRASQDIHRYLSWFQQKPGKVPKHLIYRANYL VSGVPSRFSGSGSGTEFTLTISSLQPEDFATYYCLQYYEFPYTFGGGTKVEIK |
| 204 | CG_165_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 205 | CG_166_VL | NIQMTQSPSSLSASVGDRVTITCRASQDIHRYLSWFQQKPGKVPKHLIYYANRL VSGVPSRFSGSGSGTEFTLTISSLQPEDFATYYCLQYDVFPYTFGGGTKVEIK |
| 206 | CG_166_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 207 | CG_167_VL | NIQMTQSPSSLSASVGDRVTITCRASQDILVYLSWFQQKPGKVPKHLIYRANRL VSGVPSRFSGSGSGTEFTLTISSLQPEDFATYYCLQYDEFPYTFGGGTKVEIK |
| 208 | CG_167_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 209 | CG_168_VL | NIQMTQSPSSLSASVGDRVTITCRASQDIHRYLSWFQQKPGKVPKHLIYRANRL VSGVPSRFSGSGSGTEFTLTISSLQPEDFATYYCLQYAEFPYTFGGGTKVEIK |
| 210 | CG_168_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 211 | CG_169_VL | NIQMTQSPSSLSASVGDRVTITCRASQDIHRYLSWFQQKPGKVPKHLIYRANRL VSGVPSRFSGSGSGTEFTLTISSLQPEDFATYYCLQYQEFPYTFGGGTKVEIK |
| 212 | CG_169_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 213 | CG_170_VL | NIQMTQSPSSLSASVGDRVTITCRASQDIHRYLSWFQQKPGKVPKHLIYRANRL VSGVPSRFSGSGSGTEFTLTISSLQPEDFATYYCLQYEEFPYTFGGGTKVEIK |
| 214 | CG_170_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 215 | CG_171_VL | NIQMTQSPSSLSASVGDRVTITCRASQDIHDYLSWFQQKPGKVPKHLIYRANIL VSGVPSRFSGSGSGTEFTLTISSLQPEDFATYYCLQYDEFPYTFGGGTKVEIK |
| 216 | CG_171_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 217 | CG_172_VL | NIQMTQSPSSLSASVGDRVTITCRASQDIHDYLSWFQQKPGKVPKHLIYRANLL VSGVPSRFSGSGSGTEFTLTISSLQPEDFATYYCLQYDEFPYTFGGGTKVEIK |

Sequence Listing

| SEQ ID NO: | Description | Amino Acid Sequence |
|---|---|---|
| 218 | CG_172_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 219 | CG_173_VL | NIQMTQSPSSLSASVGDRVTITCRASQDIHDYLSWFQQKPGKVPKHLIYRANYL VSGVPSRFSGSGSGTEFTLTISSLQPEDFATYYCLQYDEFPYTFGGGTKVEIK |
| 220 | CG_173_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 221 | CG_174_VL | NIQMTQSPSSLSASVGDRVTITCRASQDIHEYLSWFQQKPGKVPKHLIYRANAL VSGVPSRFSGSGSGTEFTLTISSLQPEDFATYYCLQYDEFPYTFGGGTKVEIK |
| 222 | CG_174_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 223 | CG_175_VL | NIQMTQSPSSLSASVGDRVTITCRASQDIHEYLSWFQQKPGKVPKHLIYRANILV SGVPSRFSGSGSGTEFTLTISSLQPEDFATYYCLQYDEFPYTFGGGTKVEIK |
| 224 | CG_175_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 225 | CG_176_VL | NIQMTQSPSSLSASVGDRVTITCRASQDIHEYLSWFQQKPGKVPKHLIYRANLL VSGVPSRFSGSGSGTEFTLTISSLQPEDFATYYCLQYDEFPYTFGGGTKVEIK |
| 226 | CG_176_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 227 | CG_177_VL | NIQMTQSPSSLSASVGDRVTITCRASQDIHEYLSWFQQKPGKVPKHLIYRANQL VSGVPSRFSGSGSGTEFTLTISSLQPEDFATYYCLQYDEFPYTFGGGTKVEIK |
| 228 | CG_177_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 229 | CG_178_VL | NIQMTQSPSSLSASVGDRVTITCRASQDIHEYLSWFQQKPGKVPKHLIYRANVL VSGVPSRFSGSGSGTEFTLTISSLQPEDFATYYCLQYDEFPYTFGGGTKVEIK |
| 230 | CG_178_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 231 | CG_179_VL | NIQMTQSPSSLSASVGDRVTITCRASQDIHIYLSWFQQKPGKVPKHLIYRANDL VSGVPSRFSGSGSGTEFTLTISSLQPEDFATYYCLQYDEFPYTFGGGTKVEIK |
| 232 | CG_179_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 233 | CG_180_VL | NIQMTQSPSSLSASVGDRVTITCRASQDIHIYLSWFQQKPGKVPKHLIYRANTLV SGVPSRFSGSGSGTEFTLTISSLQPEDFATYYCLQYDEFPYTFGGGTKVEIK |
| 234 | CG_180_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 235 | CG_181_VL | NIQMTQSPSSLSASVGDRVTITCRASQDIHLYLSWFQQKPGKVPKHLIYRANDL VSGVPSRFSGSGSGTEFTLTISSLQPEDFATYYCLQYDEFPYTFGGGTKVEIK |
| 236 | CG_181_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 237 | CG_182_VL | NIQMTQSPSSLSASVGDRVTITCRASQDIHLYLSWFQQKPGKVPKHLIYRANEL VSGVPSRFSGSGSGTEFTLTISSLQPEDFATYYCLQYDEFPYTFGGGTKVEIK |
| 238 | CG_182_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |

Sequence Listing

| SEQ ID NO: | Description | Amino Acid Sequence |
|---|---|---|
| 239 | CG_183_VL | NIQMTQSPSSLSASVGDRVTITCRASQDIHNYLSWFQQKPGKVPKHLIYRANEL VSGVPSRFSGSGSGTEFTLTISSLQPEDFATYYCLQYDEFPYTFGGGTKVEIK |
| 240 | CG_183_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 241 | CG_184_VL | NIQMTQSPSSLSASVGDRVTITCRASQDIHNYLSWFQQKPGKVPKHLIYRANVL VSGVPSRFSGSGSGTEFTLTISSLQPEDFATYYCLQYDEFPYTFGGGTKVEIK |
| 242 | CG_184_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 243 | CG_185_VL | NIQMTQSPSSLSASVGDRVTITCRASQDIHQYLSWFQQKPGKVPKHLIYRANDL VSGVPSRFSGSGSGTEFTLTISSLQPEDFATYYCLQYDEFPYTFGGGTKVEIK |
| 244 | CG_185_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 245 | CG_186_VL | NIQMTQSPSSLSASVGDRVTITCRASQDIHVYLSWFQQKPGKVPKHLIYRANQL VSGVPSRFSGSGSGTEFTLTISSLQPEDFATYYCLQYDEFPYTFGGGTKVEIK |
| 246 | CG_186_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 247 | CG_187_VL | NIQMTQSPSSLSASVGDRVTITCRASQDIHTYLSWFQQKPGKVPKHLIYRANYL VSGVPSRFSGSGSGTEFTLTISSLQPEDFATYYCLQYDEFPYTFGGGTKVEIK |
| 248 | CG_187_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 249 | CG_188_VL | NIQMTQSPSSLSASVGDRVTITCRASQDIHEYLSWFQQKPGKVPKHLIYRANYL VSGVPSRFSGSGSGTEFTLTISSLQPEDFATYYCLQYDEFPYTFGGGTKVEIK |
| 250 | CG_188_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 251 | CG_189_VL | NIQMTQSPSSLSASVGDRVTITCRASQDIHLYLSWFQQKPGKVPKHLIYRANQL VSGVPSRFSGSGSGTEFTLTISSLQPEDFATYYCLQYDEFPYTFGGGTKVEIK |
| 252 | CG_189_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 253 | CG_190_VL | NIQMTQSPSSLSASVGDRVTITCRASQDIHVYLSWFQQKPGKVPKHLIYRANEL VSGVPSRFSGSGSGTEFTLTISSLQPEDFATYYCLQYDEFPYTFGGGTKVEIK |
| 254 | CG_190_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 255 | CG_191_VL | NIQMTQSPSSLSASVGDRVTITCRASQDIHHYLSWFQQKPGKVPKHLIYRANYL VSGVPSRFSGSGSGTEFTLTISSLQPEDFATYYCLQYDEFPYTFGGGTKVEIK |
| 256 | CG_191_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 257 | CG_192_VL | NIQMTQSPSSLSASVGDRVTITCRASQDIHIYLSWFQQKPGKVPKHLIYRANELV SGVPSRFSGSGSGTEFTLTISSLQPEDFATYYCLQYDEFPYTFGGGTKVEIK |
| 258 | CG_192_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 259 | CG_193_VL | NIQMTQSPSSLSASVGDRVTITCRASQDIHYYLSWFQQKPGKVPKHLIYRANEL VSGVPSRFSGSGSGTEFTLTISSLQPEDFATYYCLQYDEFPYTFGGGTKVEIK |

Sequence Listing

| SEQ ID NO: | Description | Amino Acid Sequence |
|---|---|---|
| 260 | CG_193_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 261 | CG_194_VL | NIQMTQSPSSLSASVGDRVTITCRASQDIHHYLSWFQQKPGKVPKHLIYRANDL VSGVPSRFSGSGSGTEFTLTISSLQPEDFATYYCLQYDEFPYTFGGGTKVEIK |
| 262 | CG_194_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 263 | CG_195_VL | NIQMTQSPSSLSASVGDRVTITCRASQDIHIYLSWFQQKPGKVPKHLIYRANDL VSGVPSRFSGSGSGTEFTLTISSLQPEDFATYYCLQYDEFPYTFGGGTKVEIK |
| 264 | CG_195_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 265 | CG_196_VL | NIQMTQSPSSLSASVGDRVTITCRASQDIHYYLSWFQQKPGKVPKHLIYRANDL VSGVPSRFSGSGSGTEFTLTISSLQPEDFATYYCLQYDEFPYTFGGGTKVEIK |
| 266 | CG_196_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 267 | CG_197_VL | NIQMTQSPSSLSASVGDRVTITCRASQDIHVYLSWFQQKPGKVPKHLIYRANDL VSGVPSRFSGSGSGTEFTLTISSLQPEDFATYYCLQYDEFPYTFGGGTKVEIK |
| 268 | CG_197_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 269 | CG_198_VL | NIQMTQSPSSLSASVGDRVTITCRASQDIHIYLSWFQQKPGKVPKHLIYRANQL VSGVPSRFSGSGSGTEFTLTISSLQPEDFATYYCLQYDEFPYTFGGGTKVEIK |
| 270 | CG_198_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 271 | CG_199_VL | NIQMTQSPSSLSASVGDRVTITCRASQDIHTYLSWFQQKPGKVPKHLIYRANQL VSGVPSRFSGSGSGTEFTLTISSLQPEDFATYYCLQYDEFPYTFGGGTKVEIK |
| 272 | CG_199_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 273 | CG_200_VL | NIQMTQSPSSLSASVGDRVTITCRASQDIHRYLSWFQQKPGKVPKHLIYRANRL VSGVPSRFSGSGSGTEFTLTISSLQPEDFATYYCLQYDEFPYTFGGGTKVEIK |
| 274 | CG_200_VH | QMQLVQSGAEVKKPGSSVKVSCKASGFNIKDYYLHWVRQAPGKGLEWMGWI DPDQGDTEYAQKFQGRVTITRDRSTSTAYMELRSLRAEDTAVYYCNAAYGSSSY PMDYWGQGTLVTVSS |
| 275 | CG_201_VL | NIQMTQSPSSLSASVGDRVTITCRASQDIHRYLSWFQQKPGKVPKHLIYRESRFV DGVPSRFSGSGSGTEFTLTISSLQPEDFATYYCLQYDEFPYTFGGGTKVEIK |
| 276 | CG_201_VH | QMQLVQSGAEVKKPGSSVKVSCKASGFNIKDYYLHWVRQAPGKGLEWMGWI DPDQGDTYYAQKFQGRVTITRDRSTSTAYMELRSLRAEDTAVYYCNAAYGESSY PMDYWGQGTLVTVSS |
| 277 | CG_202_VL | NIQMTQSPSSLSASVGDRVTITCQASQDIHRYLSWFQQDPGTVPQHLIYRESRF VDGVPSRFSGSGSGTEFTLTISSLQPEDFATYYCLQYDEFPYTFGGGTKVEIK |
| 278 | CG_202_VH | QMQLVQSGAEVKKPGSSVKVSCKASGFNIKDYYLHWVRQAPGQGLEWMGW IDPDQGDTYYAQKFQGRVTITRDRSTSTAYMELASLTAEDTAVYYCNAAYGESS YPMDYWGQGTLVTVSS |
| 279 | CG_203_VL | NIQMTQSPSSLSASVGDRVTITCRASQDIHRYLSWFQQKPGKVPKHLIYRANRL VSGVPSRFSGSGSGTEFTLTISSLQPEDFATYYCLQYDEFPYTFGGGTKVEIK |

Sequence Listing

| SEQ ID NO: | Description | Amino Acid Sequence |
|---|---|---|
| 280 | CG_203_VH | QMQLVQSGAEVKKPGSSVKVSCKASGFNIKDYYLHWVRQAPGKGLEWMGWI DPDQGDTYYAQKFQGRVTITRDRSTSTAYMELRSLRAEDTAVYYCNAAYGESSY PMDYWGQGTLVTVSS |
| 281 | CG_204_VL | NIQMTQSPSSLSASVGDRVTITCQASQDIHRYLSWFQQDPGTVPQHLIYRESRF VDGVPSRFSGSGSGTEFTLTISSLQPEDFATYYCLQYDEFPYTFGGGTKVEIK |
| 282 | CG_204_VH | QMQLVQSGAEVKKPGSSVKVSCKASGFNIKDYYLHWVRQAPGQGLEWMGW IDPDQGDTYYAQKFQGRVTITRDRSTSTAYMELASLTAEDTAVYYCNAAYGDSS YPMDYWGQGTLVTVSS |
| 283 | CG_205_VL | NIQMTQSPSSLSASVGDRVTITCRASQDIHRYLSWFQQKPGKVPKHLIYRESRFV DGVPSRFSGSGSGTEFTLTISSLQPEDFATYYCLQYDEFPYTFGGGTKVEIK |
| 284 | CG_205_VH | QMQLVQSGAEVKKPGSSVKVSCKASGFNIKDYYLHWVRQAPGKGLEWMGWI DPDQGDTYYAQKFQGRVTITRDRSTSTAYMELRSLRAEDTAVYYCNAAYGDSS YPMDYWGQGTLVTVSS |
| 285 | CG_206_VL | NIQMTQSPSSLSASVGDRVTITCQASQDIHRYLSWFQQDPGTVPQHLIYRESRF VDGVPSRFSGSGSGTEFTLTISSLQPEDFATYYCLQYDEFPYTFGGGTKVEIK |
| 286 | CG_206_VH | QMQLVQSGAEVKKPGSSVKVSCKASGFNIKDYYLHWVRQAPGQGLEWMGYI DPSQGDTVYAQKFQGRVTITRDRSTSTAYMELASLTAEDTAVYYCNAAYGSSSY PMDYWGQGTLVTVSS |
| 287 | CG_207_VL | NIQMTQSPSSLSASVGDRVTITCQASQDIHEYLSWFQQDPGTVPQHLIYRESLF VDGVPSRFSGSGSGTEFTLTISSLQPEDFATYYCLQYDEFPYTFGGGTKVEIK |
| 288 | CG_207_VH | QMQLVQSGAEVKKPGSSVKVSCKASGFNIKDYYLHWVRQAPGQGLEWMGW IDPDQGDTEYAQKFQGRVTITRDRSTSTAYMELASLTAEDTAVYYCNAAYGSSS YPMDYWGQGTLVTVSS |
| 289 | CG_208_VL | NIQMTQSPSSLSASVGDRVTITCQASQDIHRYLSWFQQDPGTVPQHLIYRESRF VDGVPSRFSGSGSGTEFTLTISSLQPEDFATYYCLQYDEFPYTFGGGTKVEIK |
| 290 | CG_208_VH | QMQLVQSGAEVKKPGSSVKVSCKASGFNIKDYYLHWVRQAPGQGLEWMGW IDPDQGDTAYAQKFQGRVTITRDRSTSTAYMELASLTAEDTAVYYCNAAYGLSS YPMDYWGQGTLVTVSS |
| 291 | CG_209_VL | NIQMTQSPSSLSASVGDRVTITCQASQDIHRYLSWFQQDPGTVPQHLIYRESRF VDGVPSRFSGSGSGTEFTLTISSLQPEDFATYYCLQYDEFPYTFGGGTKVEIK |
| 292 | CG_209_VH | QMQLVQSGAEVKKPGSSVKVSCKASGFNIKDYYLHWVRQAPGQGLEWMGW IDPDQGATYYAQKFQGRVTITRDRSTSTAYMELASLTAEDTAVYYCNAAYGSSS YPMDYWGQGTLVTVSS |
| 293 | CG_210_VL | NIQMTQSPSSLSASVGDRVTITCQASQDIHRYLSWFQQDPGTVPQHLIYRESRF VDGVPSRFSGSGSGTEFTLTISSLQPEDFATYYCLQYDEFPYTFGGGTKVEIK |
| 294 | CG_210_VH | QMQLVQSGAEVKKPGSSVKVSCKASGFNIKDYYLHWVRQAPGQGLEWMGW IDPDVGSTEYAQKFQGRVTITRDRSTSTAYMELASLTAEDTAVYYCNAAYGSSSY PMDYWGQGTLVTVSS |
| 295 | CG_211_VL | NIQMTQSPSSLSASVGDRVTITCQASQDIHRYLSWFQQDPGTVPQHLIYRESRF VDGVPSRFSGSGSGTEFTLTISSLQPEDFATYYCLQYDEFPYTFGGGTKVEIK |
| 296 | CG_211_VH | QMQLVQSGAEVKKPGSSVKVSCKASGFNIKDYYLHWVRQAPGQGLEWMGW IDPDQGDTEYAQKFQGRVTITRDRSTSTAYMELASLTAEDTAVYYCNAAYGSSS YPMDYWGQGTLVTVSS |
| 297 | CG_212_VL | NIQMTQSPSSLSASVGDRVTITCRASQDIHRYLSWFQQKPGKVPKHLIYRESRFV DGVPSRFSGSGSGTEFTLTISSLQPEDFATYYCLQYEEFPYTFGGGTKVEIK |
| 298 | CG_212_VH | QMQLVQSGAEVKKPGSSVKVSCKASGFNIKDYYLHWVRQAPGKGLEWMGWI DPDQGLTEYAQKFQGRVTITRDRSTSTAYMELRSLRAEDTAVYYCNAAYGSSSY PMDYWGQGTLVTVSS |
| 299 | CG_213_VL | NIQMTQSPSSLSASVGDRVTITCQASQDIHRYLSWFQQDPGTVPQHLIYRESRF VDGVPSRFSGSGSGTEFTLTISSLQPEDFATYYCLQYEEFPYTFGGGTKVEIK |
| 300 | CG_213_VH | QMQLVQSGAEVKKPGSSVKVSCKASGFNIKDYYLHWVRQAPGQGLEWMGW IDPDQGDTEYAQKFQGRVTITRDRSTSTAYMELASLTAEDTAVYYCNAAYGSSS YPMDYWGQGTLVTVSS |

-continued

| SEQ ID NO: | Description | Amino Acid Sequence |
|---|---|---|
| 301 | CG_214_VL | NIQMTQSPSSLSASVGDRVTITCRASQDIHRYLSWFQQKPGKVPKHLIYRESRFV<br>DGVPSRFSGSGSGTEFTLTISSLQPEDFATYYCLQYAEFPYTFGGGTKVEIK |
| 302 | CG_214_VH | QMQLVQSGAEVKKPGSSVKVSCKASGFNIKDYYLHWVRQAPGKGLEWMGWI<br>DPDQGLTEYAQKFQGRVTITRDRSTSTAYMELRSLRAEDTAVYYCNAAYGSSSY<br>PMDYWGQGTLVTVSS |
| 303 | CG_215_VL | NIQMTQSPSSLSASVGDRVTITCQASQDIHRYLSWFQQDPGTVPQHLIYRESRF<br>VDGVPSRFSGSGSGTEFTLTISSLQPEDFATYYCLQYAEFPYTFGGGTKVEIK |
| 304 | CG_215_VH | QMQLVQSGAEVKKPGSSVKVSCKASGFNIKDYYLHWVRQAPGQGLEWMGW<br>IDPDQGDTEYAQKFQGRVTITRDRSTSTAYMELASLTAEDTAVYYCNAAYGSSS<br>YPMDYWGQGTLVTVSS |
| 305 | CG_216_VL | NIQMTQSPSSLSASVGDRVTITCRASQDIHRYLSWFQQKPGKVPKHLIYRANRL<br>VSGVPSRFSGSGSGTEFTLTISSLQPEDFATYYCLQYAEFPYTFGGGTKVEIK |
| 306 | CG_216_VH | QMQLVQSGAEVKKPGSSVKVSCKASGFNIKDYYLHWVRQAPGKGLEWMGWI<br>DPDQGDTEYAQKFQGRVTITRDRSTSTAYMELRSLRAEDTAVYYCNAAYGSSSY<br>PMDYWGQGTLVTVSS |
| 307 | CG_217_VL | NIQMTQSPSSLSASVGDRVTITCRASQDIHRYLSWFQQKPGKVPKHLIYRESRFV<br>DGVPSRFSGSGSGTEFTLTISSLQPEDFATYYCLQYDEFPYTFGGGTKVEIK |
| 308 | CG_217_VH | QMQLVQSGAEVKKPGSSVKVSCKASGFNIKDYYLHWVRQAPGKGLEWMGWI<br>DPDEGLTEYAQKFQGRVTITRDRSTSTAYMELRSLRAEDTAVYYCNAAYGSSSY<br>PMDYWGQGTLVTVSS |
| 309 | CG_218_VL | NIQMTQSPSSLSASVGDRVTITCQASQDIHRYLSWFQQDPGTVPQHLIYRESRF<br>VDGVPSRFSGSGSGTEFTLTISSLQPEDFATYYCLQYDEFPYTFGGGTKVEIK |
| 310 | CG_218_VH | QMQLVQSGAEVKKPGSSVKVSCKASGFNIKDYYLHWVRQAPGQGLEWMGW<br>IDPDEGLTEYAQKFQGRVTITRDRSTSTAYMELASLTAEDTAVYYCNAAYGSSSY<br>PMDYWGQGTLVTVSS |
| 311 | CG_219_VL | NIQMTQSPSSLSASVGDRVTITCQASQDIHRYLSWFQQDPGTVPQHLIYRESRF<br>VDGVPSRFSGSGSGTEFTLTISSLQPEDFATYYCLQYDEFPYTFGGGTKVEIK |
| 312 | CG_219_VH | QMQLVQSGAEVKKPGSSVKVSCKASGFNIKDYYLHWVRQAPGQGLEWMGW<br>IDPDQGDTYYAQKFQGRVTITRDRSTSTAYMELASLTAEDTAVYYCNAAYGDSS<br>YPMDYWGQGTLVTVSS |
| 313 | CG_220_VL | NIQMTQSPSSLSASVGDRVTITCQASQDIHRYLSWFQQDPGTVPQHLIYRESRF<br>VDGVPSRFSGSGSGTEFTLTISSLQPEDFATYYCLQYDEFPYTFGGGTKVEIK |
| 314 | CG_220_VH | QMQLVQSGAEVKKPGSSVKVSCKASGFNIKDYYLHWVRQAPGQGLEWMGW<br>IDPDQGDTVYAQKFQGRVTITRDRSTSTAYMELASLTAEDTAVYYCNAAYGESS<br>YPMDYWGQGTLVTVSS |
| 315 | CG_221_VL | NIQMTQSPSSLSASVGDRVTITCRASQDIHRYLSWFQQKPGKVPKHLIYRESRFV<br>DGVPSRFSGSGSGTEFTLTISSLQPEDFATYYCLQYDEFPYTFGGGTKVEIK |
| 316 | CG_221_VH | QMQLVQSGAEVKKPGSSVKVSCKASGFNIKDYYLHWVRQAPGKGLEWMGWI<br>DPDQGDTYYAQKFQGRVTITRDRSTSTAYMELRSLRAEDTAVYYCNAAYGDSS<br>YPMDYWGQGTLVTVSS |
| 317 | TPP-1361<br>CD47 VL | NIQMTQSPSSLSASVGDRVTITCQASQDIHRYLSWFQQDPGTVPQHLIYRESRF<br>VDGVPSRFSGSGSGTEFTLTISSLQPEDFATYYCLQYDEFPYTFGGGTKVEIK |
| 318 | TPP-1361<br>CD47 VH | QMQLVQSGAEVKKPGSSVKVSCKASGFNIKDYYLHWVRQAPGQGLEWMGW<br>IDPDQGDTYYAQKFQGRVTITRDRSTSTAYMELASLTAEDTAVYYCNAAYGESS<br>YPMDYWGQGTLVTVSS |
| 319 | TPP-1360<br>CD47 VL | NIQMTQSPSSLSASVGDRVTITCRASQDIHRYLSWFQQKPGKVPKHLIYRESRFV<br>DGVPSRFSGSGSGTEFTLTISSLQPEDFATYYCLQYDEFPYTFGGGTKVEIK |
| 320 | TPP-1360<br>CD47 VH | QMQLVQSGAEVKKPGSSVKVSCKASGFNIKDYYLHWVRQAPGKGLEWMGWI<br>DPDQGDTYYAQKFQGRVTITRDRSTSTAYMELRSLRAEDTAVYYCNAAYGESSY<br>PMDYWGQGTLVTVSS |
| 321 | TPP-1367<br>CD47 VL | NIQMTQSPSSLSASVGDRVTITCRASQDIHRYLSWFQQKPGKVPKHLIYRANRL<br>VSGVPSRFSGSGSGTEFTLTISSLQPEDFATYYCLQYDEFPYTFGGGTKVEIK |

Sequence Listing

| SEQ ID NO: | Description | Amino Acid Sequence |
|---|---|---|
| 322 | TPP-1367 CD47 VH | QMQLVQSGAEVKKPGSSVKVSCKASGFNIKDYYLHWVRQAPGKGLEWMGWI DPDQGDTYYAQKFQGRVTITRDRSTSTAYMELRSLRAEDTAVYYCNAAYGESSY PMDYWGQGTLVTVSS |
| 323 | CD20 VL | QIVLSQSPAILSASPGEKVTMTCRASSSVSYIHWFQQKPGSSPKPWIYATSNLAS GVPVRFSGSGSGTSYSLTISRVEAEDAATYYCQQWTSNPPTFGGGTKLEIK |
| 324 | CD20 VH | QVQLQQPGAELVKPGASVKMSCKASGYTFTSYNMHWVKQTPGRGLEWIGAI YPGNGDTSYNQKFKGKATLTADKSSSTAYMQLSSLTSEDSAVYYCARSTYYGGD WYFNVWGAGTTVTVSA |
| 325 | 90002 VL | NIQMTQSPSAMSASVGDRVTITCKASQDIHRYLSWFQQKPGKVPKHLIYRANR LVSGVPSRFSGSGSGTEFTLTISSLQPEDFATYYCLQYDEFPYTFGGGTKVEIK |
| 326 | 90002 VH | QMQLVQSGAEVKKTGSSVKVSCKASGFNIKDYYLHWVRQAPGQALEWMGW IDPDQGDTEYAQKFQDRVTITRDRSMSTAYMELSSLRSEDTAMYYCNAAYGSS SYPMDYWGQGTTVTVSS |
| 327 | 90002 WHOLE LC/ IgG1 | NIQMTQSPSAMSASVGDRVTITCKASQDIHRYLSWFQQKPGKVPKHLIYRANRLV SGVPSRFSGSGSGTEFTLTISSLQPEDFATYYCLQYDEFPYTFGGGTKVEIKRTV AAPSVFIFPPSDEQLKSGTASVVCLLNNFYPREAKVQWKVDNALQSGNSQESV TEQDSKDSTYSLSSTLTLSKADYEKHKVYACEVTHQGLSSPVTKSFNRGEC |
| 328 | 90002 WHOLE HC/ IgG1 | QMQLVQSGAEVKKTGSSVKVSCKASGFNIKDYYLHWVRQAPGQALEWMGW IDPDQGDTEYAQKFQDRVTITRDRSMSTAYMELSSLRSEDTAMYYCNAAYGSS SYPMDYWGQGTTVTVSSASTKGPSVFPLAPSSKSTSGGTAALGCLVKDYFPEPV TVSWNSGALTSGVHTFPAVLQSSGLYSLSSVVTVPSSSLGTQTYICNVNHKPSNT KVDKKVEPKSCDKTHTCPPCPAPELLGGPSVFLFPPKPKDTLMISRTPEVTCVVV DVSHEDPEVKFNWYVDGVEVHNAKTKPREEQYNSTYRVVSVLTVLHQDWLN GKEYKCKVSNKALPAPIEKTISKAKGQPREPQVYTLPPSREEMTKNQVSLTCLVK GFYPSDIAVEWESNGQPENNYKTTPPVLDSDGSFFLYSKLTVDKSRWQQGNVF SCSVMHEALHNHYTQKSLSLSPGK |
| 329 | LC-WHOLE RITUXIMAB | QIVLSQSPAILSASPGEKVTMTCRASSSVSYIHWFQQKPGSSPKPWIYATSNLAS GVPVRFSGSGSGTSYSLTISRVEAEDAATYYCQQWTSNPPTFGGGTKLEIKRTVA APSVFIFPPSDEQLKSGTASVVCLLNNFYPREAKVQWKVDNALQSGNSVTE QDSKDSTYSLSSTLTLSKADYEKHKVYACEVTHQGLSSPVTKSFNRGEC |
| 330 | HC-WHOLE RITUXIMAB | QVQLQQPGAELVKPGASVKMSCKASGYTFTSYNMHWVKQTPGRGLEWIGAI YPGNGDTSYNQKFKGKATLTADKSSSTAYMQLSSLTSEDSAVYYCARSTYYGGD WYFNVWGAGTTVTVSAASTKGPSVFPLAPSSKSTSGGTAALGCLVKDYFPEPV TVSWNSGALTSGVHTFPAVLQSSGLYSLSSVVTVPSSSLGTQTYICNVNHKPSNT KVDKKVEPKSCDKTHTCPPCPAPELLGGPSVFLFPPKPKDTLMISRTPEVTCVVV DVSHEDPEVKFNWYVDGVEVHNAKTKPREEQYNSTYRVVSVLTVLHQDWLN GKEYKCKVSNKALPAPIEKTISKAKGQPREPQVYTLPPSREEMTKNQVSLTCLVK GFYPSDIAVEWESNGQPENNYKTTPPVLDSDGSFFLYSKLTVDKSRWQQGNVF SCSVMHEALHNHYTQKSLSLSPGK |
| 331 | CD20 WHOLE LC | QIVLSQSPAILSASPGEKVTMTCRASSSVSYIHWFQQKPGSSPKPWIYATSNLAS GVPVRFSGSGSGTSYSLTISRVEAEDAATYYCQQWTSNPPTFGGGTKLEIKRTVA APSVAIFPPSDERLKSGTASVVCLNNFYPREAKVQWKVDNALQSGNSQESVT EQDSKDSTYSLSSRLTLSKADYEKHKVYACEVTHQGLSSPVTKSFNRGEC |
| 332 | CD20 WHOLE HC | QVQLQQPGAELVKPGASVKMSCKASGYTFTSYNMHWVKQTPGRGLEWIGAI YPGNGDTSYNQKFKGKATLTADKSSSTAYMQLSSLTSEDSAVYYCARSTYYGGD WYFNVWGAGTTVTVSAASTKGPSVFPLAPSSKSTSGGTAWLGCEVTDYFPEPV TVSWNSGALTSGVHTFPAVLESSGLYSLSSVVTVPSSSLGTQTYICNVNHKPSNT KVDKKVEPKSCDKTHTCPPCPAPELLGGPSVFLFPPKPKDTLMISRTPEVTCVVV DVSHEDPEVKFNWYVDGVEVHNAKTKPREEQYNSTYRVVSVLTVLHQDWLN GKEYKCKVSNKALPAPIEKTISKAKGQPREPQVYYPPSREEMTKNQVSLTCLVK GFYPSDIAVEWESNGQPENNYKTTPPVLDSDGSFALVSKLTVDKSRWQQGNVF SCSVMHEALHNHYTQKSLSLSPGK |
| 333 | TPP-1361 CD47 WHOLE LC | NIQMTQSPSSLSASVGDRVTITCQASQDIHRYLSWFQQDPGTVPQHLIYRESRF VDGVPSRFSGSGSGTEFTLTISSLQPEDFATYYCLQYDEFPYTFGGGTKVEIKRTV AAPSVFIFPPSDEELKSGTASVVCWLNNFYPREAKVQWKVDNALQSGNSEESV TEQDSKDSTYSLSSTLELSKADYEKHKVYACEVTHQGLSSPVTKSFNRGEC |
| 334 | TPP-1361 CD47 WHOLE HC | QMQLVQSGAEVKKPGSSVKVSCKASGFNIKDYYLHWVRQAPGQGLEWMGW IDPDQGDTYYAQKFQGRVTITRDRSTSTAYMELASLTAEDTAVYYCNAAYGESS YPMDYWGQGTLVTVSSASTKGPSVFPLAPSSKSTSGGTAALGCLVKDYFPEPVT VSWNSGALTSGVHTFPAVLKSSGLYSLSSVVTVPSSSLGTQTYICNVNHKPSNTK |

| SEQ ID NO: | Description | Amino Acid Sequence |
|---|---|---|
| | | VDKKVEPKSCDKTHTCPPCPAPELLGGPSVFLFPPKPKDTLMISRTPEVTCVVVD VSHEDPEVKFNWYVDGVEVHNAKTKPREEQYNSTYRVVSVLTVLHQDWLNGK EYKCKVSNKALPAPIEKTISKAKGQPREPQVYVLPPSREEMTKNQVSLLCLVKGF YPSDIAVEWESNGQPENNYLTWPPVLDSDGSFFLYSKLTVDKSRWQQGNVFS CSVMHEALHNHYTQKSLSLSPGK |
| 335 | TPP-1360 CD47 WHOLE LC | NIQMTQSPSSLSASVGDRVTITCRASQDIHRYLSWFQQKPGKVPKHLIYRESRFV DGVPSRFSGSGSGTEFTLTISSLQPEDFATYYCLQYDEFPYTFGGGTKVEIKRTVA APSVFIFPPSDEELKSGTASVVCWLNNFYPREAKVQWKVDNALQSGNSEESVT EQDSKDSTYSLSSTLELSKADYEKHKVYACEVTHQGLSSPVTKSFNRGEC |
| 336 | TPP-1360 CD47 WHOLE HC | QMQLVQSGAEVKKPGSSVKVSCKASGFNIKDYYLHWVRQAPGKGLEWMGWI DPDQGDTYYAQKFQGRVTITRDRSTSTAYMELRSLRAEDTAVYYCNAAYGESSY PMDYWGQGTLVTVSSASTKGPSVFPLAPSSKSTSGGTAALGCLVKDYFPEPVTV SWNSGALTSGVHTFPAVLKSSGLYSLSSVVTVPSSSLGTQTYICNVNHKPSNTKV DKKVEPKSCDKTHTCPPCPAPELLGGPSVFLFPPKPKDTLMISRTPEVTCVVVD VSHEDPEVKFNWYVDGVEVHNAKTKPREEQYNSTYRVVSVLTVLHQDWLNGKEY KCKVSNKALPAPIEKTISKAKGQPREPQVYVLPPSREEMTKNQVSLLCLVKGFY PSDIAVEWESNGQPENNYLTWPPVLDSDGSFFLYSKLTVDKSRWQQGNVFSCS VMHEALHNHYTQKSLSLSPGK |
| 337 | TPP-1367 CD47 WHOLE LC | NIQMTQSPSSLSASVGDRVTITCRASQDIHRYLSWFQQKPGKVPKHLIYRANRL VSGVPSRFSGSGSGTEFTLTISSLQPEDFATYYCLQYDEFPYTFGGGTKVEIKRT VAAPSVFIFPPSDEELKSGTASVVCWLNNFYPREAKVQWKVDNALQSGNSEESV TEQDSKDSTYSLSSTLELSKADYEKHKVYACEVTHQGLSSPVTKSFNRGEC |
| 338 | TPP-1367 CD47 WHOLE HC | QMQLVQSGAEVKKPGSSVKVSCKASGFNIKDYYLHWVRQAPGKGLEWMGWI DPDQGDTYYAQKFQGRVTITRDRSTSTAYMELRSLRAEDTAVYYCNAAYGESSY PMDYWGQGTLVTVSSASTKGPSVFPLAPSSKSTSGGTAALGCLVKDYFPEPVTV SWNSGALTSGVHTFPAVLKSSGLYSLSSVVTVPSSSLGTQTYICNVNHKPSNTKV DKKVEPKSCDKTHTCPPCPAPELLGGPSVFLFPPKPKDTLMISRTPEVTCVVVDV SHEDPEVKFNWYVDGVEVHNAKTKPREEQYNSTYRVVSVLTVLHQDWLNGKE YKCKVSNKALPAPIEKTISKAKGQPREPQVYVLPPSREEMTKNQVSLLCLVKGFY PSDIAVEWESNGQPENNYLTWPPVLDSDGSFFLYSKLTVDKSRWQQGNVFSCS VMHEALHNHYTQKSLSLSPGK |
| 339 | anti-CD47 IgG1 LC Constant Region | RTVAAPSVFIFPPSDEELKSGTASVVCWLNNFYPREAKVQWKVDNALQSGNSE ESVTEQDSKDSTYSLSSTLELSKADYEKHKVYACEVTHQGLSSPVTKSFNRGEC |
| 340 | anti-CD47 IgG1 LC Constant Region-underlined portion of SEQ ID NO: 339 | ELKSGTASVVCWLNNFYPREAKVQWKVDNALQSGNSEESVTEQDSKDSTYSLS STLE |
| 341 | anti-CD47 IgG1 HC Constant Region | ASTKGPSVFPLAPSSKSTSGGTAALGCLVKDYFPEPVTVSWNSGALTSGVHTFP AVLKSSGLYSLSSVVTVPSSSLGTQTYICNVNHKPSNTKVDKKVEPKSCDKTHTC PPCPAPELLGGPSVFLFPPKPKDTLMISRTPEVTCVVVDVSHEDPEVKFNWYVD GVEVHNAKTKPREEQYNSTYRVVSVLTVLHQDWLNGKEYKCKVSNKALPAPIE KTISKAKGQPREPQVYVLPPSREEMTKNQVSLLCLVKGFYPSDIAVEWESNGQP ENNYLTWPPVLDSDGSFFLYSKLTVDKSRWQQGNVFSCSVMHEALHNHYTQK SLSLSPGK |
| 342 | anti-CD47 IgG1 HC Constant Region-underlined portion of SEQ ID NO: 341 | KSSGLYSLSSVVTVPSSSLGTQTYICNVNHKPSNTKVDKKVEPKSCDKTHTCPPC PAPELLGGPSVFLFPPKPKDTLMISRTPEVTCVVVDVSHEDPEVKFNWYVDGVE VHNAKTKPREEQYNSTYRVVSVLTVLHQDWLNGKEYKCKVSNKALPAPIEKTIS KAKGQPREPQVYVLPPSREEMTKNQVSLLCLVKGFYPSDIAVEWESNGQPENN YLTW |
| 343 | anti-CD20 IgG1 LC Constant Region | RTVAAPSVAIFPPSDERLKSGTASVVCVLNNFYPREAKVQWKVDNALQSGNSQ ESVTEQDSKDSTYSLSSRLTLSKADYEKHKVYACEVTHQGLSSPVTKSFNRGEC |

-continued

Sequence Listing

| SEQ ID NO: | Description | Amino Acid Sequence |
|---|---|---|
| 344 | anti-CD20 IgG1 LC Constant Region- underlined portion of SEQ ID NO: 343 | AIFPPSDERLKSGTASVVCVLNNFYPREAKVQWKVDNALQSGNSQESVTEQDS KDSTYSLSSR |
| 345 | anti-CD20 IgG1 HC Constant Region | ASTKGPSVFPLAPSSKSTSGGTAWLGCEVTDYFPEPVTVSWNSGALTSGVHTFP AVLESSGLYSLSSVVTVPSSSLGTQTYICNVNHKPSNTKVDKKVEPKSCDKTHTC PPCPAPELLGGPSVFLFPPKPKDTLMISRTPEVTCVVVDVSHEDPEVKFNWYVD GVEVHNAKTKPREEQYNSTYRVVSVLTVLHQDWLNGKEYKCKVSNKALPAPIE KTISKAKGQPREPQVYVYPPSREEMTKNQVSLTCLVKGFYPSDIAVEWESNGQP ENNYKTTPPVLDSDGSFALVSKLTVDKSRWQQGNVFSCSVMHEALHNHYTQK SLSLSPGK |
| 346 |  | WLGCEVTDYFPEPVTVSWNSGALTSGVHTFPAVLESSGLYSLSSVVTVPSSSLGT QTYICNVNHKPSNTKVDKKVEPKSCDKTHTCPPCPAPELLGGPSVFLFPPKPKDT LMISRTPEVTCVVVDVSHEDPEVKFNWYVDGVEVHNAKTKPREEQYNSTYRVV SVLTVLHQDWLNGKEYKCKVSNKALPAPIEKTISKAKGQPREPQVYVYPPSREE MTKNQVSLTCLVKGFYPSDIAVEWESNGQPENNYKTTPPVLDSDGSFALV |
| 347 | 90002 VL CDR1 | KASQDIHRYLS |
| 348 | 90002 VL CDR2 | RANRLVS |
| 349 | 90002 VL CDR3 | LQYDEFPYT |
| 350 | 90002 VH CDR1 | DYYLH |
| 351 | 90002 VH CDR2 | WIDPDQGDTEYAQKFQD |
| 352 | 90002 VH CDR3 | AAYGSSSYPMDY |
| 353 | Rituximab CD20 VL CDR1 | RASSSVSYIH |
| 354 | Rituximab CD20 VL CDR2 | ATSNLAS |
| 355 | Rituximab CD20 VL CDR3 | QQWTSNPPT |
| 356 | Rituximab CD20 VH CDR1 | SYNMH |
| 357 | Rituximab CD20 VH CDR2 | AIYPGNGDTSYNQKFKG |
| 358 | Rituximab CD20 VH CDR3 | STYYGGDWYFNV |
| 359 | TPP-1361 CD47 VL CDR1 | QASQDIHRYLS |
| 360 | TPP-1361 CD47 VL CDR2 | RESRFVD |

Sequence Listing

| SEQ ID NO: | Description | Amino Acid Sequence |
|---|---|---|
| 361 | TPP-1361 CD47 VL CDR3 | LQYDEFPYT |
| 362 | TPP-1361 CD47 VH CDR1 | DYYLH |
| 363 | TPP-1361 CD47 VH CDR2 | WIDPDQGDTYYAQKFQG |
| 364 | TPP-1361 CD47 VH CDR3 | AYGESSYPMDY |
| 365 | TPP-1360 CD47 VL CDR1 | RASQDIHRYLS |
| 366 | TPP-1360 CD47 VL CDR2 | RESRFVD |
| 367 | TPP-1360 CD47 VL CDR3 | LQYDEFPYT |
| 368 | TPP-1360 CD47 VH CDR1 | DYYLH |
| 369 | TPP-1360 CD47 VH CDR2 | WIDPDQGDTYYAQKFQG |
| 370 | TPP-1360 CD47 VH CDR3 | AYGESSYPMDY |
| 371 | TPP-1367 CD47 VL CDR1 | RASQDIHRYLS |
| 372 | TPP-1367 CD47 VL CDR2 | RANRLVS |
| 373 | TPP-1367 CD47 VL CDR3 | LQYDEFPYT |
| 374 | TPP-1367 CD47 VH CDR1 | DYYLH |
| 375 | TPP-1367 CD47 VH CDR2 | WIDPDQGDTYYAQKFQG |
| 376 | TPP-1367 CD47 VH CDR3 | AYGESSYPMDY |
| 377 | TPP-1362 CD47 VL CDR1 | RASQGISSWLA |
| 378 | TPP-1362 CD47 VL CDR2 | AASVLES |

-continued

Sequence Listing

| SEQ ID NO: | Description | Amino Acid Sequence |
|---|---|---|
| 379 | TPP-1362 CD47 VL CDR3 | QQANSFPYT |
| 380 | TPP-1362 CD47 VH CDR1 | NFVMS |
| 381 | TPP-1362 CD47 VH CDR2 | TISGSGGSTYYADSVKG |
| 382 | TPP-1362 CD47 VH CDR3 | HYILRYFD |
| 383 | TPP-1362 CD47 VL | DIQMTQSPSSVSASVGDRVTITCRASQGISSWLAWYQQKPGKAPKLLIYAASVL ESGVPSRFSGSGSGTDFTLTISSLQPEDFATYYCQQANSFPYTFGQGTKLEIK |
| 384 | TPP1362 CD47 VH | EVCILLESGGGLVQPGGSLRLSCAASGFTFPNFVMSWVRQAPGKGLEWVSTISG SGGSTYYADSVKGRFTISRDNSKNMLYLQMNSLRAEDTAVYYCAKHYILRYFD WLAGTLVTVSS |
| 385 | TPP-1362 CD47 WHOLE LC | DIQMTQSPSSVSASVGDRVTITCRASQGISSWLAWYQQKPGKAPKLLIYAASVLE SGVPSRFSGSGSGTDFTLTISSLQPEDFATYYCQQANSFPYTFGQGTKLEIKRTV AAPSVFIFPPSDEELKSGTASVVCWLNNFYPREAKVQWKVDNALQSGNSEESV TEQDSKDSTYSLSSTLELSKADYEKHKVYACEVTHQGLSSPVTKSFNRGEC |
| 386 | TPP-1362 CD47 WHOLE HC | EVCILLESGGGLVQPGGSLRLSCAASGFTFPNFVMSWVRQAPGKGLEWVSTISG SGGSTYYADSVKGRFTISRDNSKNMLYLQMNSLRAEDTAVYYCAKHYILRYFD WLAGTLVTVSSASTKGPSVFPLAPSSKSTSGGTAALGCLVKDYFPEPVTVSWNS GALTSGVHTFPAVLKSSGLYSLSSVVTVPSSSLGTQTYICNVNHKPSNTKVDKKV EPKSCDKTHTCPPCPAPELLGGPSVFLFPPKPKDTLMISRTPEVTCVVVDVSHED PEVKFNWYVDGVEVHNAKTKPREEQYNSTYRVVSVLTVLHQDWLNGKEYKCKVS NKALPAPIEKTISKAKGQPREPQVYVLPPSREEMTKNQVSLLCLVKGFYPSDIA VEWESNGQPENNYLTWPPVLDSDGSFFLYSKLTVDKSRWQQGNVFSCSVMH EALHNHYTQKSLSLSPGK |
| 387 | 408_437 VL | NIQMTQSPSSLSASVGDRVTITCRASQDIHRYLSWFQQKPGKVPKHLIYRANRL VSGVPSRFSGSGSGTEFTLTISSLQPEDFATYYCLQYDEFPYTFGGGTKVEIK |
| 388 | 408_437 VH | QMQLVQSGAEVKKPGSSVKVSCKASGFNIKDYYLHWVRQAPGKGLEWMGWIDP DQGDTEYAQKFQGRVTITRDRSTSTAYMELRSLRAEDTAVYYCNAAYGSSSY PMDYWGQGTLVTVSS |

All publications and patents referred to herein are incorporated by reference. Various modifications and variations of the described subject matter will be apparent to those skilled in the art without departing from the scope and spirit of the invention. Although the invention has been described in connection with specific embodiments, it should be understood that the invention as claimed should not be unduly limited to these embodiments. Indeed, various modifications for carrying out the invention are obvious to those skilled in the art and are intended to be within the scope of the following claims.

What is claimed is:

1. A bispecific antibody of IgG1 1+1 heterodimer format comprising at least one Fab portion that binds CD47 and at least one Fab portion that binds CD20; wherein the Fab portion that binds CD47 exhibits low affinity Kd for CD47, from about 0.1 µM to about 5.0 µM; and, wherein the Fab portion that binds CD20 comprises VL CDRs: SEQ ID NO:353 (CDRL1), SEQ ID NO:354 (CDRL2), and SEQ ID NO:355 (CDRL3); and, VH CDRs: SEQ ID NO:356 (CDRH1), SEQ ID NO:357 (CDRH2), and SEQ ID NO:358 (CDRH3); and, wherein the bispecific antibody selectively binds CD47 comprises:
  (a) a light chain variable region (VL) region comprising VL CDRs SEQ ID NO:359 (CDRL1), SEQ ID NO:360 (CDRL2), and SEQ ID NO:361 (CDRL3); and a heavy chain variable region (VH) region comprising VH CDRs SEQ ID NO:362 (CDRH1), SEQ ID NO:363 (CDRH2), SEQ ID NO:364 (CDRH3);
  (b) a light chain variable region (VL) region comprising VL CDRs SEQ ID NO:365 (CDRL1), SEQ ID NO:366 (CDRL2), SEQ ID NO:367 (CDRL3); and a heavy chain variable region (VH) region comprising VH CDRs SEQ ID NO:368 (CDRH1), SEQ ID NO:369 (CDRH2), SEQ ID NO:370 (CDRH3); or
  (c) a light chain variable region (VL) region comprising VL CDRs SEQ ID NO:371 (CDRL1), SEQ ID NO:372 (CDRL2), SEQ ID NO:373 (CDRL3); and a heavy chain variable region (VH) region comprising VH CDRs SEQ ID NO:374 (CDRH1), SEQ ID NO:375 (CDRH2), SEQ ID NO:376 (CDRH3);
  and, wherein the bispecific antibody selectively binds CD47 in tumor cells and binds less than 5% of CD47 on CD20−/CD47+ cells.

2. A bispecific antibody according to claim 1 that selectively binds B cells.

3. A bispecific antibody according to claim 2 wherein the bispecific antibody comprises an anti-CD47 light chain (LC) constant region comprising SEQ ID NO:340.

4. A bispecific antibody according to claim 3 wherein the bispecific antibody comprises an anti-CD47 heavy chain (HC) constant region comprising SEQ ID NO:342.

5. A bispecific antibody according to claim 2 that selectively binds malignant B cells.

6. A bispecific antibody according to claim 4 that selectively binds malignant B cells.

7. A bispecific antibody according to claim 6 wherein the bispecific antibody comprises an anti-CD20 light chain (LC) constant region comprising SEQ ID NO:344.

8. A bispecific antibody according to claim 7 wherein the bispecific antibody comprises an anti-CD20 heavy chain (HC) constant region comprising SEQ ID NO: 346.

9. A bispecific antibody according to claim 2 wherein the Fab portion that binds CD47 comprises:
  (i) a light chain variable region (VL) region selected from the group consisting of SEQ ID NO:317, SEQ ID NO:319, and SEQ ID NO:321; and
  (ii) a heavy chain variable region (VH) region, selected from the group consisting of SEQ ID NO:318, SEQ ID NO:320, and SEQ ID NO:322.

10. A bispecific antibody according to claim 8 wherein the Fab portion that binds CD47 comprises:
  (i) a light chain variable region (VL) region selected from the group consisting of SEQ ID NO:317, SEQ ID NO:319, and SEQ ID NO:321; and
  (ii) a heavy chain variable region (VH) region, selected from the group consisting of SEQ ID NO:318, SEQ ID NO:320, and SEQ ID NO:322.

11. A bispecific antibody according to claim 2 wherein the Fab portion that binds CD47 comprises a light chain variable region (VL) region comprising VL CDRs QASQDIHRYLS (SEQ ID NO:359), RESRFVD (SEQ ID NO:360), and LQYDEFPYT (SEQ ID NO:361); and, a heavy chain variable region (VH) region comprising VH CDRs DYYLH (SEQ ID NO:362), WIDPDQGDTYYAQKFQG (SEQ ID NO:363), AYGESSYPMDY (SEQ ID NO:364).

12. A bispecific antibody according to claim 2 wherein the Fab portion that binds CD47 comprises a light chain variable region (VL) region comprising VL CDRs RASQDIHRYLS (SEQ ID NO:365), RESRFVD (SEQ ID NO:366), LQYDEFPYT (SEQ ID NO:367); and, a heavy chain variable region (VH) region comprising VH CDRs DYYLH (SEQ ID NO:368), WIDPDQGDTYYAQKFQG (SEQ ID NO:369), AYGESSYPMDY (SEQ ID NO:370).

13. A bispecific antibody according to claim 2 wherein the Fab portion that binds CD47 comprises a light chain variable region (VL) region comprising VL CDRs RASQDIHRYLS (SEQ ID NO:371), RANRLVS (SEQ ID NO:372), LQYDEFPYT (SEQ ID NO:373); and, a heavy chain variable region (VH) region comprising VH CDRs DYYLH (SEQ ID NO:374), WIDPDQGDTYYAQKFQG (SEQ ID NO:375), AYGESSYPMDY (SEQ ID NO:376).

14. A bispecific antibody according to claim 8 wherein the Fab portion that binds CD47 comprises a light chain variable region (VL) region comprising VL CDRs QASQDIHRYLS (SEQ ID NO:359), RESRFVD (SEQ ID NO:360), and LQYDEFPYT (SEQ ID NO:361); and, a heavy chain variable region (VH) region comprising VH CDRs DYYLH (SEQ ID NO:362), WIDPDQGDTYYAQKFQG (SEQ ID NO:363), AYGESSYPMDY (SEQ ID NO:364).

15. A bispecific antibody according to claim 8 wherein the Fab portion that binds CD47 comprises a light chain variable region (VL) region comprising VL CDRs RASQDIHRYLS (SEQ ID NO:365), RESRFVD (SEQ ID NO:366), LQYDEFPYT (SEQ ID NO:367); and, a heavy chain variable region (VH) region comprising VH CDRs DYYLH (SEQ ID NO:368), WIDPDQGDTYYAQKFQG (SEQ ID NO:369), AYGESSYPMDY (SEQ ID NO:370).

16. A bispecific antibody according to claim 8 wherein the Fab portion that binds CD47 comprises a light chain variable region (VL) region comprising VL CDRs RASQDIHRYLS (SEQ ID NO:371), RANRLVS (SEQ ID NO:372), LQYDEFPYT (SEQ ID NO:373); and, a heavy chain variable region (VH) region comprising VH CDRs DYYLH (SEQ ID NO:374), WIDPDQGDTYYAQKFQG (SEQ ID NO:375), AYGESSYPMDY (SEQ ID NO:376).

17. A bispecific antibody according to claim 11 comprising a VL region comprising SEQ ID NO:317; and, a VH region comprising SEQ ID NO:318.

18. A bispecific antibody according to claim 12 comprising a VL region comprising SEQ ID NO:319; and, a VH region comprising SEQ ID NO:320.

19. A bispecific antibody according to claim 13 comprising a VL region comprising SEQ ID NO:321; and, a VH region comprising SEQ ID NO:322.

20. A bispecific antibody according to claim 14 comprising a VL region comprising SEQ ID NO:317; and, a VH region comprising SEQ ID NO:318.

21. A bispecific antibody according to claim 15 comprising a VL region comprising SEQ ID NO:319; and, a VH region comprising SEQ ID NO:320.

22. A bispecific antibody according to claim 16 comprising a VL region comprising SEQ ID NO:321; and, a VH region comprising SEQ ID NO:322.

23. A bispecific antibody according to claim 1 comprising an anti-CD47 VL region comprising SEQ ID NO:319 and an anti-CD47 VH region comprising SEQ ID NO:320.

24. A bispecific antibody according to claim 23 comprising an anti-CD47 LC region comprising SEQ ID NO:335 and an anti-CD47 HC region comprising SEQ ID NO:336.

25. A bispecific antibody according to claim 8 comprising an anti-CD20 VL region comprising SEQ ID NO: 323 and a VH region comprising SEQ ID NO: 324.

26. A bispecific antibody according to claim 25 comprising an anti-CD20 LC region comprising SEQ ID NO:331 and an anti-CD20 HC region comprising SEQ ID NO:332.

27. A bispecific antibody according to claim 10 comprising an anti-CD20 VL region comprising SEQ ID NO: 323 and a VH region comprising SEQ ID NO: 324.

28. A bispecific antibody according to claim 27 comprising an anti-CD20 LC region comprising SEQ ID NO:331 and an anti-CD20 HC region comprising SEQ ID NO:332.

29. A bispecific antibody according to claim 28 comprising an anti-CD47 LC region comprising SEQ ID NO:333 and an anti-CD47 HC region comprising SEQ ID NO:334.

30. A bispecific antibody according to claim 26 comprising an anti-CD47 LC region comprising SEQ ID NO:335 and an anti-CD47 HC region comprising SEQ ID NO:336.

31. A bispecific antibody according to claim 28 comprising an anti-CD47 LC region comprising SEQ ID NO:337 and an anti-CD47 HC region comprising SEQ ID NO:338.

32. A pharmaceutical composition for administration to a patient in need thereof comprising
  i) the bispecific antibody of claim 1; and
  ii) at least one pharmaceutically acceptable carrier.

33. A method of treating tumors, tumor cells or cancer in a patient comprising administering an effective amount of the bispecific antibody of claim 1.

34. A method according to claim 33, wherein the cancer is a hematological malignancy, a B-cell disorder or a B-cell malignancy.

* * * * *

SEQUENCE LISTING

```
<160> NUMBER OF SEQ ID NOS: 388

<210> SEQ ID NO 1
<211> LENGTH: 107
<212> TYPE: PRT
<213> ORGANISM: Artificial Sequence
<220> FEATURE:
<223> OTHER INFORMATION: CG_64_VL

<400> SEQUENCE: 1

Asn Ile Gln Met Thr Gln Ser Pro Ser Ser Leu Ser Ala Ser Val Gly
1               5                   10                  15
```

```
Asp Arg Val Thr Ile Thr Cys Arg Ala Ser Gln Asp Ile His Arg Tyr
            20                  25                  30

Leu Ser Trp Phe Gln Gln Lys Pro Gly Lys Val Pro Lys His Leu Ile
        35                  40                  45

Tyr Arg Ala Asn Arg Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Ala Glu Phe Pro Tyr
                85                  90                  95

Thr Phe Gly Gly Gly Thr Lys Val Glu Ile Lys
            100                 105

<210> SEQ ID NO 2
<211> LENGTH: 120
<212> TYPE: PRT
<213> ORGANISM: Artificial Sequence
<220> FEATURE:
<223> OTHER INFORMATION: CG_64_VH

<400> SEQUENCE: 2

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Tyr Ile Asp Pro Glu Gly Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
            100                 105                 110

Gly Thr Leu Val Thr Val Ser Ser
        115                 120

<210> SEQ ID NO 3
<211> LENGTH: 107
<212> TYPE: PRT
<213> ORGANISM: Artificial Sequence
<220> FEATURE:
<223> OTHER INFORMATION: CG_65_VL

<400> SEQUENCE: 3

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
            20                  25                  30

Leu Ser Trp Phe Gln Gln Lys Pro Gly Lys Val Pro Lys His Leu Ile
        35                  40                  45

Tyr Arg Ala Asn Arg Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Gln Glu Phe Pro Tyr
                85                  90                  95
```

Thr Phe Gly Gly Gly Thr Lys Val Glu Ile Lys
              100                 105

<210> SEQ ID NO 4
<211> LENGTH: 120
<212> TYPE: PRT
<213> ORGANISM: Artificial Sequence
<220> FEATURE:
<223> OTHER INFORMATION: CG_65_VH

<400> SEQUENCE: 4

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
                20                  25                  30

Tyr Leu His Trp Val Arg Gln Ala Pro Gly Lys Gly Leu Glu Trp Met
            35                  40                  45

Gly Tyr Ile Asp Pro Thr Gln Gly Asp Thr His Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
                100                 105                 110

Gly Thr Leu Val Thr Val Ser Ser
            115                 120

<210> SEQ ID NO 5
<211> LENGTH: 107
<212> TYPE: PRT
<213> ORGANISM: Artificial Sequence
<220> FEATURE:
<223> OTHER INFORMATION: CG_66_VL

<400> SEQUENCE: 5

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
                20                  25                  30

Leu Ser Trp Phe Gln Gln Lys Pro Gly Lys Val Pro Lys His Leu Ile
            35                  40                  45

Tyr Arg Ala Asn Arg Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Glu Phe Pro Tyr
                85                  90                  95

Thr Phe Gly Gly Gly Thr Lys Val Glu Ile Lys
              100                 105

<210> SEQ ID NO 6
<211> LENGTH: 120
<212> TYPE: PRT
<213> ORGANISM: Artificial Sequence
<220> FEATURE:
<223> OTHER INFORMATION: CG_66_VH

<400> SEQUENCE: 6

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
            35                  40                  45

Gly Tyr Ile Asp Pro Ser Gln Gly Asp Thr Val Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
            100                 105                 110

Gly Thr Leu Val Thr Val Ser Ser
            115                 120

<210> SEQ ID NO 7
<211> LENGTH: 107
<212> TYPE: PRT
<213> ORGANISM: Artificial Sequence
<220> FEATURE:
<223> OTHER INFORMATION: CG_67_VL

<400> SEQUENCE: 7

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Asp Tyr
            20                  25                  30

Leu Ser Trp Phe Gln Gln Lys Pro Gly Lys Val Pro Lys His Leu Ile
            35                  40                  45

Tyr Arg Ala Asn Ile Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 8
<211> LENGTH: 120
<212> TYPE: PRT
<213> ORGANISM: Artificial Sequence
<220> FEATURE:
<223> OTHER INFORMATION: CG_67_VH

<400> SEQUENCE: 8

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
            35                  40                  45

Gly Trp Ile Tyr Pro Asp Gln Gly Val Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

```
Met Glu Leu Arg Ser Leu Arg Ala Glu Asp Thr Ala Val Tyr Tyr Cys
                85                  90                  95

Asn Ala Ala Tyr Gly Ser Ser Tyr Pro Met Asp Tyr Trp Gly Gln
            100                 105                 110

Gly Thr Leu Val Thr Val Ser Ser
        115                 120

<210> SEQ ID NO 9
<211> LENGTH: 107
<212> TYPE: PRT
<213> ORGANISM: Artificial Sequence
<220> FEATURE:
<223> OTHER INFORMATION: CG_68_VL

<400> SEQUENCE: 9

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Asp Tyr
            20                  25                  30

Leu Ser Trp Phe Gln Gln Lys Pro Gly Lys Val Pro Lys His Leu Ile
        35                  40                  45

Tyr Arg Ala Asn Leu Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 10
<211> LENGTH: 120
<212> TYPE: PRT
<213> ORGANISM: Artificial Sequence
<220> FEATURE:
<223> OTHER INFORMATION: CG_68_VH

<400> SEQUENCE: 10

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Glu Pro Asp Gln Gly Ala Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Tyr Pro Met Asp Tyr Trp Gly Gln
            100                 105                 110

Gly Thr Leu Val Thr Val Ser Ser
        115                 120

<210> SEQ ID NO 11
<211> LENGTH: 107
<212> TYPE: PRT
```

<213> ORGANISM: Artificial Sequence
<220> FEATURE:
<223> OTHER INFORMATION: CG_69_VL

<400> SEQUENCE: 11

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Asp Tyr
            20                  25                  30

Leu Ser Trp Phe Gln Gln Lys Pro Gly Lys Val Pro Lys His Leu Ile
        35                  40                  45

Tyr Arg Ala Asn Tyr Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 12
<211> LENGTH: 120
<212> TYPE: PRT
<213> ORGANISM: Artificial Sequence
<220> FEATURE:
<223> OTHER INFORMATION: CG_69_VH

<400> SEQUENCE: 12

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile His Pro Asp Gln Gly Ile Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
            100                 105                 110

Gly Thr Leu Val Thr Val Ser Ser
        115                 120

<210> SEQ ID NO 13
<211> LENGTH: 107
<212> TYPE: PRT
<213> ORGANISM: Artificial Sequence
<220> FEATURE:
<223> OTHER INFORMATION: CG_70_VL

<400> SEQUENCE: 13

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Glu Tyr
            20                  25                  30

Leu Ser Trp Phe Gln Gln Lys Pro Gly Lys Val Pro Lys His Leu Ile
        35                  40                  45

```
Tyr Arg Ala Asn Ala Leu Val Ser Gly Val Pro Ser Arg Phe Ser Gly
        50                  55                  60

Ser Gly Ser Gly Thr Glu Phe Thr Leu Thr Ile Ser Ser Leu Gln Pro
 65                  70                  75                  80

Glu Asp Phe Ala Thr Tyr Tyr Cys Leu Gln Tyr Asp Glu Phe Pro Tyr
                    85                  90                  95

Thr Phe Gly Gly Gly Thr Lys Val Glu Ile Lys
                100                 105

<210> SEQ ID NO 14
<211> LENGTH: 120
<212> TYPE: PRT
<213> ORGANISM: Artificial Sequence
<220> FEATURE:
<223> OTHER INFORMATION: CG_70_VH

<400> SEQUENCE: 14

Gln Met Gln Leu Val Gln Ser Gly Ala Glu Val Lys Lys Pro Gly Ser
 1               5                  10                  15

Ser Val Lys Val Ser Cys Lys Ala Ser Gly Phe Asn Ile Lys Asp Tyr
                20                  25                  30

Tyr Leu His Trp Val Arg Gln Ala Pro Gly Lys Gly Leu Glu Trp Met
            35                  40                  45

Gly Trp Ile Leu Pro Asp Gln Gly Val Thr Gly Tyr Ala Gln Lys Phe
        50                  55                  60

Gln Gly Arg Val Thr Ile Thr Arg Asp Arg Ser Thr Ser Thr Ala Tyr
 65                  70                  75                  80

Met Glu Leu Arg Ser Leu Arg Ala Glu Asp Thr Ala Val Tyr Tyr Cys
                    85                  90                  95

Asn Ala Ala Tyr Gly Ser Ser Tyr Pro Met Asp Tyr Trp Gly Gln
                100                 105                 110

Gly Thr Leu Val Thr Val Ser Ser
            115                 120

<210> SEQ ID NO 15
<211> LENGTH: 107
<212> TYPE: PRT
<213> ORGANISM: Artificial Sequence
<220> FEATURE:
<223> OTHER INFORMATION: CG_71_VL

<400> SEQUENCE: 15

Asn Ile Gln Met Thr Gln Ser Pro Ser Ser Leu Ser Ala Ser Val Gly
 1               5                  10                  15

Asp Arg Val Thr Ile Thr Cys Arg Ala Ser Gln Asp Ile His Glu Tyr
                20                  25                  30

Leu Ser Trp Phe Gln Gln Lys Pro Gly Lys Val Pro Lys His Leu Ile
            35                  40                  45

Tyr Arg Ala Asn Ile Leu Val Ser Gly Val Pro Ser Arg Phe Ser Gly
        50                  55                  60

Ser Gly Ser Gly Thr Glu Phe Thr Leu Thr Ile Ser Ser Leu Gln Pro
 65                  70                  75                  80

Glu Asp Phe Ala Thr Tyr Tyr Cys Leu Gln Tyr Asp Glu Phe Pro Tyr
                    85                  90                  95

Thr Phe Gly Gly Gly Thr Lys Val Glu Ile Lys
                100                 105
```

```
<210> SEQ ID NO 16
<211> LENGTH: 120
<212> TYPE: PRT
<213> ORGANISM: Artificial Sequence
<220> FEATURE:
<223> OTHER INFORMATION: CG_71_VH

<400> SEQUENCE: 16
```

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Glu Pro Asp Gln Gly Ile Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
            100                 105                 110

Gly Thr Leu Val Thr Val Ser Ser
        115                 120

```
<210> SEQ ID NO 17
<211> LENGTH: 107
<212> TYPE: PRT
<213> ORGANISM: Artificial Sequence
<220> FEATURE:
<223> OTHER INFORMATION: CG_72_VL

<400> SEQUENCE: 17
```

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Glu Tyr
            20                  25                  30

Leu Ser Trp Phe Gln Gln Lys Pro Gly Lys Val Pro Lys His Leu Ile
        35                  40                  45

Tyr Arg Ala Asn Leu Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

```
<210> SEQ ID NO 18
<211> LENGTH: 120
<212> TYPE: PRT
<213> ORGANISM: Artificial Sequence
<220> FEATURE:
<223> OTHER INFORMATION: CG_72_VH

<400> SEQUENCE: 18
```

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

```
Tyr Leu His Trp Val Arg Gln Ala Pro Gly Lys Gly Leu Glu Trp Met
        35                  40                  45

Gly Trp Ile Leu Pro Asp Gln Gly Ile Thr Glu Tyr Ala Gln Lys Phe
 50                  55                  60

Gln Gly Arg Val Thr Ile Thr Arg Asp Arg Ser Thr Ser Thr Ala Tyr
 65                  70                  75                  80

Met Glu Leu Arg Ser Leu Arg Ala Glu Asp Thr Ala Val Tyr Tyr Cys
                 85                  90                  95

Asn Ala Ala Tyr Gly Ser Ser Ser Tyr Pro Met Asp Tyr Trp Gly Gln
                100                 105                 110

Gly Thr Leu Val Thr Val Ser Ser
        115                 120

<210> SEQ ID NO 19
<211> LENGTH: 107
<212> TYPE: PRT
<213> ORGANISM: Artificial Sequence
<220> FEATURE:
<223> OTHER INFORMATION: CG_73_VL

<400> SEQUENCE: 19

Asn Ile Gln Met Thr Gln Ser Pro Ser Ser Leu Ser Ala Ser Val Gly
 1               5                  10                  15

Asp Arg Val Thr Ile Thr Cys Arg Ala Ser Gln Asp Ile His Glu Tyr
             20                  25                  30

Leu Ser Trp Phe Gln Gln Lys Pro Gly Lys Val Pro Lys His Leu Ile
        35                  40                  45

Tyr Arg Ala Asn Gln Leu Val Ser Gly Val Pro Ser Arg Phe Ser Gly
 50                  55                  60

Ser Gly Ser Gly Thr Glu Phe Thr Leu Thr Ile Ser Ser Leu Gln Pro
 65                  70                  75                  80

Glu Asp Phe Ala Thr Tyr Tyr Cys Leu Gln Tyr Asp Glu Phe Pro Tyr
                 85                  90                  95

Thr Phe Gly Gly Gly Thr Lys Val Glu Ile Lys
                100                 105

<210> SEQ ID NO 20
<211> LENGTH: 120
<212> TYPE: PRT
<213> ORGANISM: Artificial Sequence
<220> FEATURE:
<223> OTHER INFORMATION: CG_73_VH

<400> SEQUENCE: 20

Gln Met Gln Leu Val Gln Ser Gly Ala Glu Val Lys Lys Pro Gly Ser
 1               5                  10                  15

Ser Val Lys Val Ser Cys Lys Ala Ser Gly Phe Asn Ile Lys Asp Tyr
             20                  25                  30

Tyr Leu His Trp Val Arg Gln Ala Pro Gly Lys Gly Leu Glu Trp Met
        35                  40                  45

Gly Trp Ile Ile Pro Asp Gln Gly Met Thr Glu Tyr Ala Gln Lys Phe
 50                  55                  60

Gln Gly Arg Val Thr Ile Thr Arg Asp Arg Ser Thr Ser Thr Ala Tyr
 65                  70                  75                  80

Met Glu Leu Arg Ser Leu Arg Ala Glu Asp Thr Ala Val Tyr Tyr Cys
                 85                  90                  95

Asn Ala Ala Tyr Gly Ser Ser Ser Tyr Pro Met Asp Tyr Trp Gly Gln
```

```
                100             105             110
Gly Thr Leu Val Thr Val Ser Ser
        115                 120

<210> SEQ ID NO 21
<211> LENGTH: 107
<212> TYPE: PRT
<213> ORGANISM: Artificial Sequence
<220> FEATURE:
<223> OTHER INFORMATION: CG_74_VL

<400> SEQUENCE: 21

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Glu Tyr
            20                  25                  30

Leu Ser Trp Phe Gln Gln Lys Pro Gly Lys Val Pro Lys His Leu Ile
        35                  40                  45

Tyr Arg Ala Asn Val Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 22
<211> LENGTH: 120
<212> TYPE: PRT
<213> ORGANISM: Artificial Sequence
<220> FEATURE:
<223> OTHER INFORMATION: CG_74_VH

<400> SEQUENCE: 22

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Met Pro Asp Gln Gly Leu Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
            100                 105                 110

Gly Thr Leu Val Thr Val Ser Ser
        115                 120

<210> SEQ ID NO 23
<211> LENGTH: 107
<212> TYPE: PRT
<213> ORGANISM: Artificial Sequence
<220> FEATURE:
<223> OTHER INFORMATION: CG_75_VL

<400> SEQUENCE: 23
```

```
Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Glu Tyr
            20                  25                  30

Leu Ser Trp Phe Gln Gln Lys Pro Gly Lys Val Pro Lys His Leu Ile
                35                  40                  45

Tyr Arg Ala Asn Tyr Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
                100                 105
```

<210> SEQ ID NO 24
<211> LENGTH: 120
<212> TYPE: PRT
<213> ORGANISM: Artificial Sequence
<220> FEATURE:
<223> OTHER INFORMATION: CG_75_VH

<400> SEQUENCE: 24

```
Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
                35                  40                  45

Gly Trp Ile Met Pro Asp Gln Gly Ile Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Tyr Pro Met Asp Tyr Trp Gly Gln
                100                 105                 110

Gly Thr Leu Val Thr Val Ser Ser
        115                 120
```

<210> SEQ ID NO 25
<211> LENGTH: 107
<212> TYPE: PRT
<213> ORGANISM: Artificial Sequence
<220> FEATURE:
<223> OTHER INFORMATION: CG_76_VL

<400> SEQUENCE: 25

```
Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Ile Tyr
            20                  25                  30

Leu Ser Trp Phe Gln Gln Lys Pro Gly Lys Val Pro Lys His Leu Ile
                35                  40                  45

Tyr Arg Ala Asn Asp Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
```

```
                65                  70                  75                  80
Glu Asp Phe Ala Thr Tyr Tyr Cys Leu Gln Tyr Asp Glu Phe Pro Tyr
                    85                  90                  95

Thr Phe Gly Gly Gly Thr Lys Val Glu Ile Lys
                100                 105
```

<210> SEQ ID NO 26
<211> LENGTH: 120
<212> TYPE: PRT
<213> ORGANISM: Artificial Sequence
<220> FEATURE:
<223> OTHER INFORMATION: CG_76_VH

<400> SEQUENCE: 26

```
Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Met Pro Asp Gln Gly Met Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
                100                 105                 110

Gly Thr Leu Val Thr Val Ser Ser
        115                 120
```

<210> SEQ ID NO 27
<211> LENGTH: 107
<212> TYPE: PRT
<213> ORGANISM: Artificial Sequence
<220> FEATURE:
<223> OTHER INFORMATION: CG_77_VL

<400> SEQUENCE: 27

```
Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Ile Tyr
            20                  25                  30

Leu Ser Trp Phe Gln Gln Lys Pro Gly Lys Val Pro Lys His Leu Ile
        35                  40                  45

Tyr Arg Ala Asn Thr Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
                100                 105
```

<210> SEQ ID NO 28
<211> LENGTH: 120
<212> TYPE: PRT
<213> ORGANISM: Artificial Sequence
<220> FEATURE:

<223> OTHER INFORMATION: CG_77_VH

<400> SEQUENCE: 28

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Tyr Pro Asp Gln Gly Met Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
            100                 105                 110

Gly Thr Leu Val Thr Val Ser Ser
        115                 120

<210> SEQ ID NO 29
<211> LENGTH: 107
<212> TYPE: PRT
<213> ORGANISM: Artificial Sequence
<220> FEATURE:
<223> OTHER INFORMATION: CG_78_VL

<400> SEQUENCE: 29

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Leu Tyr
            20                  25                  30

Leu Ser Trp Phe Gln Gln Lys Pro Gly Lys Val Pro Lys His Leu Ile
        35                  40                  45

Tyr Arg Ala Asn Asp Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 30
<211> LENGTH: 120
<212> TYPE: PRT
<213> ORGANISM: Artificial Sequence
<220> FEATURE:
<223> OTHER INFORMATION: CG_78_VH

<400> SEQUENCE: 30

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Gln Pro Asp Gln Gly Leu Thr Glu Tyr Ala Gln Lys Phe

```
                 50                  55                  60
Gln Gly Arg Val Thr Ile Thr Arg Asp Arg Ser Thr Ser Thr Ala Tyr
 65                  70                  75                  80

Met Glu Leu Arg Ser Leu Arg Ala Glu Asp Thr Ala Val Tyr Tyr Cys
                     85                  90                  95

Asn Ala Ala Tyr Gly Ser Ser Tyr Pro Met Asp Tyr Trp Gly Gln
                100                 105                 110

Gly Thr Leu Val Thr Val Ser Ser
            115                 120
```

<210> SEQ ID NO 31
<211> LENGTH: 107
<212> TYPE: PRT
<213> ORGANISM: Artificial Sequence
<220> FEATURE:
<223> OTHER INFORMATION: CG_79_VL

<400> SEQUENCE: 31

```
Asn Ile Gln Met Thr Gln Ser Pro Ser Ser Leu Ser Ala Ser Val Gly
  1               5                  10                  15

Asp Arg Val Thr Ile Thr Cys Arg Ala Ser Gln Asp Ile His Leu Tyr
                 20                  25                  30

Leu Ser Trp Phe Gln Gln Lys Pro Gly Lys Val Pro Lys His Leu Ile
             35                  40                  45

Tyr Arg Ala Asn Glu Leu Val Ser Gly Val Pro Ser Arg Phe Ser Gly
 50                  55                  60

Ser Gly Ser Gly Thr Glu Phe Thr Leu Thr Ile Ser Ser Leu Gln Pro
 65                  70                  75                  80

Glu Asp Phe Ala Thr Tyr Tyr Cys Leu Gln Tyr Asp Glu Phe Pro Tyr
                 85                  90                  95

Thr Phe Gly Gly Gly Thr Lys Val Glu Ile Lys
                100                 105
```

<210> SEQ ID NO 32
<211> LENGTH: 120
<212> TYPE: PRT
<213> ORGANISM: Artificial Sequence
<220> FEATURE:
<223> OTHER INFORMATION: CG_79_VH

<400> SEQUENCE: 32

```
Gln Met Gln Leu Val Gln Ser Gly Ala Glu Val Lys Lys Pro Gly Ser
  1               5                  10                  15

Ser Val Lys Val Ser Cys Lys Ala Ser Gly Phe Asn Ile Lys Asp Tyr
                 20                  25                  30

Tyr Leu His Trp Val Arg Gln Ala Pro Gly Lys Gly Leu Glu Trp Met
             35                  40                  45

Gly Trp Ile Glu Pro Asp Gln Gly Tyr Thr Glu Tyr Ala Gln Lys Phe
 50                  55                  60

Gln Gly Arg Val Thr Ile Thr Arg Asp Arg Ser Thr Ser Thr Ala Tyr
 65                  70                  75                  80

Met Glu Leu Arg Ser Leu Arg Ala Glu Asp Thr Ala Val Tyr Tyr Cys
                 85                  90                  95

Asn Ala Ala Tyr Gly Ser Ser Tyr Pro Met Asp Tyr Trp Gly Gln
                100                 105                 110

Gly Thr Leu Val Thr Val Ser Ser
            115                 120
```

<210> SEQ ID NO 33
<211> LENGTH: 107
<212> TYPE: PRT
<213> ORGANISM: Artificial Sequence
<220> FEATURE:
<223> OTHER INFORMATION: CG_80_VL

<400> SEQUENCE: 33

```
Asn Ile Gln Met Thr Gln Ser Pro Ser Leu Ser Ala Ser Val Gly
1               5                   10                  15

Asp Arg Val Thr Ile Thr Cys Arg Ala Ser Gln Asp Ile His Asn Tyr
            20                  25                  30

Leu Ser Trp Phe Gln Gln Lys Pro Gly Lys Val Pro Lys His Leu Ile
        35                  40                  45

Tyr Arg Ala Asn Glu Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105
```

<210> SEQ ID NO 34
<211> LENGTH: 120
<212> TYPE: PRT
<213> ORGANISM: Artificial Sequence
<220> FEATURE:
<223> OTHER INFORMATION: CG_80_VH

<400> SEQUENCE: 34

```
Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Leu Pro Asp Gln Gly Tyr Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
            100                 105                 110

Gly Thr Leu Val Thr Val Ser Ser
        115                 120
```

<210> SEQ ID NO 35
<211> LENGTH: 107
<212> TYPE: PRT
<213> ORGANISM: Artificial Sequence
<220> FEATURE:
<223> OTHER INFORMATION: CG_81_VL

<400> SEQUENCE: 35

```
Asn Ile Gln Met Thr Gln Ser Pro Ser Leu Ser Ala Ser Val Gly
1               5                   10                  15

Asp Arg Val Thr Ile Thr Cys Arg Ala Ser Gln Asp Ile His Asn Tyr
```

```
                 20                  25                  30

Leu Ser Trp Phe Gln Gln Lys Pro Gly Lys Val Pro Lys His Leu Ile
         35                  40                  45

Tyr Arg Ala Asn Val Leu Val Ser Gly Val Pro Ser Arg Phe Ser Gly
 50                  55                  60

Ser Gly Ser Gly Thr Glu Phe Thr Leu Thr Ile Ser Ser Leu Gln Pro
 65                  70                  75                  80

Glu Asp Phe Ala Thr Tyr Tyr Cys Leu Gln Tyr Asp Glu Phe Pro Tyr
                 85                  90                  95

Thr Phe Gly Gly Gly Thr Lys Val Glu Ile Lys
                100                 105

<210> SEQ ID NO 36
<211> LENGTH: 120
<212> TYPE: PRT
<213> ORGANISM: Artificial Sequence
<220> FEATURE:
<223> OTHER INFORMATION: CG_81_VH

<400> SEQUENCE: 36

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
                 20                  25                  30

Tyr Leu His Trp Val Arg Gln Ala Pro Gly Lys Gly Leu Glu Trp Met
         35                  40                  45

Gly Trp Ile Phe Pro Asp Gln Gly Met Thr Glu Tyr Ala Gln Lys Phe
 50                  55                  60

Gln Gly Arg Val Thr Ile Thr Arg Asp Arg Ser Thr Ser Thr Ala Tyr
 65                  70                  75                  80

Met Glu Leu Arg Ser Leu Arg Ala Glu Asp Thr Ala Val Tyr Tyr Cys
                 85                  90                  95

Asn Ala Ala Tyr Gly Ser Ser Tyr Pro Met Asp Tyr Trp Gly Gln Gly
                100                 105                 110

Gly Thr Leu Val Thr Val Ser Ser
         115                 120

<210> SEQ ID NO 37
<211> LENGTH: 107
<212> TYPE: PRT
<213> ORGANISM: Artificial Sequence
<220> FEATURE:
<223> OTHER INFORMATION: CG_82_VL

<400> SEQUENCE: 37

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Gln Tyr
                 20                  25                  30

Leu Ser Trp Phe Gln Gln Lys Pro Gly Lys Val Pro Lys His Leu Ile
         35                  40                  45

Tyr Arg Ala Asn Asp Leu Val Ser Gly Val Pro Ser Arg Phe Ser Gly
 50                  55                  60

Ser Gly Ser Gly Thr Glu Phe Thr Leu Thr Ile Ser Ser Leu Gln Pro
 65                  70                  75                  80

Glu Asp Phe Ala Thr Tyr Tyr Cys Leu Gln Tyr Asp Glu Phe Pro Tyr
                 85                  90                  95
```

Thr Phe Gly Gly Gly Thr Lys Val Glu Ile Lys
            100                 105

<210> SEQ ID NO 38
<211> LENGTH: 120
<212> TYPE: PRT
<213> ORGANISM: Artificial Sequence
<220> FEATURE:
<223> OTHER INFORMATION: CG_82_VH

<400> SEQUENCE: 38

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Tyr Pro Asp Gln Gly Ile Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Tyr Pro Met Asp Tyr Trp Gly Gln
            100                 105                 110

Gly Thr Leu Val Thr Val Ser Ser
        115                 120

<210> SEQ ID NO 39
<211> LENGTH: 107
<212> TYPE: PRT
<213> ORGANISM: Artificial Sequence
<220> FEATURE:
<223> OTHER INFORMATION: CG_83_VL

<400> SEQUENCE: 39

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Gln Tyr
            20                  25                  30

Leu Ser Trp Phe Gln Gln Lys Pro Gly Lys Val Pro Lys His Leu Ile
        35                  40                  45

Tyr Arg Ala Asn Glu Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 40
<211> LENGTH: 120
<212> TYPE: PRT
<213> ORGANISM: Artificial Sequence
<220> FEATURE:
<223> OTHER INFORMATION: CG_83_VH

<400> SEQUENCE: 40

Gln Met Gln Leu Val Gln Ser Gly Ala Glu Val Lys Lys Pro Gly Ser

```
1               5                   10                  15
Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
            35                  40                  45

Gly Trp Ile Phe Pro Asp Gln Gly Gln Thr Glu Tyr Ala Gln Lys Phe
            50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Tyr Pro Met Asp Tyr Trp Gly Gln
                100                 105                 110

Gly Thr Leu Val Thr Val Ser Ser
            115                 120

<210> SEQ ID NO 41
<211> LENGTH: 107
<212> TYPE: PRT
<213> ORGANISM: Artificial Sequence
<220> FEATURE:
<223> OTHER INFORMATION: CG_84_VL

<400> SEQUENCE: 41

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Thr Tyr
            20                  25                  30

Leu Ser Trp Phe Gln Gln Lys Pro Gly Lys Val Pro Lys His Leu Ile
            35                  40                  45

Tyr Arg Ala Asn Asp Leu Val Ser Gly Val Pro Ser Arg Phe Ser Gly
            50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 42
<211> LENGTH: 120
<212> TYPE: PRT
<213> ORGANISM: Artificial Sequence
<220> FEATURE:
<223> OTHER INFORMATION: CG_84_VH

<400> SEQUENCE: 42

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
            35                  40                  45

Gly Trp Ile Tyr Pro Asp Gln Gly Leu Thr Glu Tyr Ala Gln Lys Phe
            50                  55                  60

Gln Gly Arg Val Thr Ile Thr Arg Asp Arg Ser Thr Ser Thr Ala Tyr
65                  70                  75                  80
```

-continued

```
Met Glu Leu Arg Ser Leu Arg Ala Glu Asp Thr Ala Val Tyr Tyr Cys
            85                  90                  95

Asn Ala Ala Tyr Gly Ser Ser Ser Tyr Pro Met Asp Tyr Trp Gly Gln
        100                 105                 110

Gly Thr Leu Val Thr Val Ser Ser
        115                 120

<210> SEQ ID NO 43
<211> LENGTH: 107
<212> TYPE: PRT
<213> ORGANISM: Artificial Sequence
<220> FEATURE:
<223> OTHER INFORMATION: CG_85_VL

<400> SEQUENCE: 43

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Thr Tyr
            20                  25                  30

Leu Ser Trp Phe Gln Gln Lys Pro Gly Lys Val Pro Lys His Leu Ile
        35                  40                  45

Tyr Arg Ala Asn Tyr Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 44
<211> LENGTH: 120
<212> TYPE: PRT
<213> ORGANISM: Artificial Sequence
<220> FEATURE:
<223> OTHER INFORMATION: CG_85_VH

<400> SEQUENCE: 44

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile His Pro Asp Gln Gly Leu Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
            100                 105                 110

Gly Thr Leu Val Thr Val Ser Ser
        115                 120

<210> SEQ ID NO 45
<211> LENGTH: 107
<212> TYPE: PRT
<213> ORGANISM: Artificial Sequence
```

<220> FEATURE:
<223> OTHER INFORMATION: CG_86_VL

<400> SEQUENCE: 45

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Val Tyr
            20                  25                  30

Leu Ser Trp Phe Gln Gln Lys Pro Gly Lys Val Pro Lys His Leu Ile
        35                  40                  45

Tyr Arg Ala Asn Asp Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 46
<211> LENGTH: 120
<212> TYPE: PRT
<213> ORGANISM: Artificial Sequence
<220> FEATURE:
<223> OTHER INFORMATION: CG_86_VH

<400> SEQUENCE: 46

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile His Pro Asp Gln Gly Val Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Tyr Pro Met Asp Tyr Trp Gly Gln
            100                 105                 110

Gly Thr Leu Val Thr Val Ser Ser
        115                 120

<210> SEQ ID NO 47
<211> LENGTH: 107
<212> TYPE: PRT
<213> ORGANISM: Artificial Sequence
<220> FEATURE:
<223> OTHER INFORMATION: CG_87_VL

<400> SEQUENCE: 47

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Tyr Tyr
            20                  25                  30

Leu Ser Trp Phe Gln Gln Lys Pro Gly Lys Val Pro Lys His Leu Ile
        35                  40                  45

```
Tyr Arg Ala Asn Asp Leu Val Ser Gly Val Pro Ser Arg Phe Ser Gly
        50                  55                  60

Ser Gly Ser Gly Thr Glu Phe Thr Leu Thr Ile Ser Ser Leu Gln Pro
 65              70                  75                      80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
                100                 105
```

<210> SEQ ID NO 48
<211> LENGTH: 120
<212> TYPE: PRT
<213> ORGANISM: Artificial Sequence
<220> FEATURE:
<223> OTHER INFORMATION: CG_87_VH

<400> SEQUENCE: 48

```
Gln Met Gln Leu Val Gln Ser Gly Ala Glu Val Lys Lys Pro Gly Ser
 1               5                  10                  15

Ser Val Lys Val Ser Cys Lys Ala Ser Gly Phe Asn Ile Lys Asp Tyr
                20                  25                  30

Tyr Leu His Trp Val Arg Gln Ala Pro Gly Lys Gly Leu Glu Trp Met
            35                  40                  45

Gly Trp Ile Tyr Pro Asp Gln Gly Ala Thr Glu Tyr Ala Gln Lys Phe
        50                  55                  60

Gln Gly Arg Val Thr Ile Thr Arg Asp Arg Ser Thr Ser Thr Ala Tyr
 65              70                  75                      80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
                100                 105                 110

Gly Thr Leu Val Thr Val Ser Ser
            115                 120
```

<210> SEQ ID NO 49
<211> LENGTH: 107
<212> TYPE: PRT
<213> ORGANISM: Artificial Sequence
<220> FEATURE:
<223> OTHER INFORMATION: CG_88_VL

<400> SEQUENCE: 49

```
Asn Ile Gln Met Thr Gln Ser Pro Ser Ser Leu Ser Ala Ser Val Gly
 1               5                  10                  15

Asp Arg Val Thr Ile Thr Cys Arg Ala Ser Gln Asp Ile His Val Tyr
                20                  25                  30

Leu Ser Trp Phe Gln Gln Lys Pro Gly Lys Val Pro Lys His Leu Ile
            35                  40                  45

Tyr Arg Ala Asn Gln Leu Val Ser Gly Val Pro Ser Arg Phe Ser Gly
        50                  55                  60

Ser Gly Ser Gly Thr Glu Phe Thr Leu Thr Ile Ser Ser Leu Gln Pro
 65              70                  75                      80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
                100                 105
```

<210> SEQ ID NO 50

```
<211> LENGTH: 120
<212> TYPE: PRT
<213> ORGANISM: Artificial Sequence
<220> FEATURE:
<223> OTHER INFORMATION: CG_88_VH

<400> SEQUENCE: 50

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Tyr Pro Asp Gln Gly Ala Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
            100                 105                 110

Gly Thr Leu Val Thr Val Ser Ser
        115                 120

<210> SEQ ID NO 51
<211> LENGTH: 107
<212> TYPE: PRT
<213> ORGANISM: Artificial Sequence
<220> FEATURE:
<223> OTHER INFORMATION: CG_89_VL

<400> SEQUENCE: 51

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Thr Tyr
            20                  25                  30

Leu Ser Trp Phe Gln Gln Lys Pro Gly Lys Val Pro Lys His Leu Ile
        35                  40                  45

Tyr Arg Ala Asn Tyr Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 52
<211> LENGTH: 120
<212> TYPE: PRT
<213> ORGANISM: Artificial Sequence
<220> FEATURE:
<223> OTHER INFORMATION: CG_90_VH

<400> SEQUENCE: 52

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30
```

```
Tyr Leu His Trp Val Arg Gln Ala Pro Gly Lys Gly Leu Glu Trp Met
        35                  40                  45
Gly Trp Ile Met Pro Asp Gln Gly Tyr Thr Glu Tyr Ala Gln Lys Phe
    50                  55                  60
Gln Gly Arg Val Thr Ile Thr Arg Asp Arg Ser Thr Ser Thr Ala Tyr
65                  70                  75                  80
Met Glu Leu Arg Ser Leu Arg Ala Glu Asp Thr Ala Val Tyr Tyr Cys
                85                  90                  95
Asn Ala Ala Tyr Gly Ser Ser Tyr Pro Met Asp Tyr Trp Gly Gln
                100                 105                 110
Gly Thr Leu Val Thr Val Ser Ser
        115                 120
```

<210> SEQ ID NO 53
<211> LENGTH: 107
<212> TYPE: PRT
<213> ORGANISM: Artificial Sequence
<220> FEATURE:
<223> OTHER INFORMATION: CG_90_VL

<400> SEQUENCE: 53

```
Asn Ile Gln Met Thr Gln Ser Pro Ser Ser Leu Ser Ala Ser Val Gly
1               5                   10                  15
Asp Arg Val Thr Ile Thr Cys Arg Ala Ser Gln Asp Ile His Glu Tyr
            20                  25                  30
Leu Ser Trp Phe Gln Gln Lys Pro Gly Lys Val Pro Lys His Leu Ile
        35                  40                  45
Tyr Arg Ala Asn Tyr Leu Val Ser Gly Val Pro Ser Arg Phe Ser Gly
    50                  55                  60
Ser Gly Ser Gly Thr Glu Phe Thr Leu Thr Ile Ser Ser Leu Gln Pro
65                  70                  75                  80
Glu Asp Phe Ala Thr Tyr Tyr Cys Leu Gln Tyr Asp Glu Phe Pro Tyr
                85                  90                  95
Thr Phe Gly Gly Gly Thr Lys Val Glu Ile Lys
                100                 105
```

<210> SEQ ID NO 54
<211> LENGTH: 120
<212> TYPE: PRT
<213> ORGANISM: Artificial Sequence
<220> FEATURE:
<223> OTHER INFORMATION: CG_90_VH

<400> SEQUENCE: 54

```
Gln Met Gln Leu Val Gln Ser Gly Ala Glu Val Lys Lys Pro Gly Ser
1               5                   10                  15
Ser Val Lys Val Ser Cys Lys Ala Ser Gly Phe Asn Ile Lys Asp Tyr
            20                  25                  30
Tyr Leu His Trp Val Arg Gln Ala Pro Gly Lys Gly Leu Glu Trp Met
        35                  40                  45
Gly Trp Ile Met Pro Asp Gln Gly Tyr Thr Glu Tyr Ala Gln Lys Phe
    50                  55                  60
Gln Gly Arg Val Thr Ile Thr Arg Asp Arg Ser Thr Ser Thr Ala Tyr
65                  70                  75                  80
Met Glu Leu Arg Ser Leu Arg Ala Glu Asp Thr Ala Val Tyr Tyr Cys
                85                  90                  95
Asn Ala Ala Tyr Gly Ser Ser Tyr Pro Met Asp Tyr Trp Gly Gln
                100                 105                 110
```

```
Gly Thr Leu Val Thr Val Ser Ser
        115                 120

<210> SEQ ID NO 55
<211> LENGTH: 107
<212> TYPE: PRT
<213> ORGANISM: Artificial Sequence
<220> FEATURE:
<223> OTHER INFORMATION: CG_91_VL

<400> SEQUENCE: 55

Asn Ile Gln Met Thr Gln Ser Pro Ser Leu Ser Ala Ser Val Gly
1               5                   10                  15

Asp Arg Val Thr Ile Thr Cys Arg Ala Ser Gln Asp Ile His Leu Tyr
                20                  25                  30

Leu Ser Trp Phe Gln Gln Lys Pro Gly Lys Val Pro Lys His Leu Ile
            35                  40                  45

Tyr Arg Ala Asn Gln Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 56
<211> LENGTH: 120
<212> TYPE: PRT
<213> ORGANISM: Artificial Sequence
<220> FEATURE:
<223> OTHER INFORMATION: CG_91_VH

<400> SEQUENCE: 56

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
                20                  25                  30

Tyr Leu His Trp Val Arg Gln Ala Pro Gly Lys Gly Leu Glu Trp Met
            35                  40                  45

Gly Trp Ile Ile Pro Asp Gln Gly Tyr Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
            100                 105                 110

Gly Thr Leu Val Thr Val Ser Ser
        115                 120

<210> SEQ ID NO 57
<211> LENGTH: 107
<212> TYPE: PRT
<213> ORGANISM: Artificial Sequence
<220> FEATURE:
<223> OTHER INFORMATION: CG_92_VL

<400> SEQUENCE: 57
```

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Val Tyr
            20                  25                  30

Leu Ser Trp Phe Gln Gln Lys Pro Gly Lys Val Pro Lys His Leu Ile
            35                  40                  45

Tyr Arg Ala Asn Glu Leu Val Ser Gly Val Pro Ser Arg Phe Ser Gly
50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 58
<211> LENGTH: 120
<212> TYPE: PRT
<213> ORGANISM: Artificial Sequence
<220> FEATURE:
<223> OTHER INFORMATION: CG_92_VH

<400> SEQUENCE: 58

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
            35                  40                  45

Gly Trp Ile Glu Pro Asp Gln Gly Met Thr Glu Tyr Ala Gln Lys Phe
50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Tyr Pro Met Asp Tyr Trp Gly Gln
            100                 105                 110

Gly Thr Leu Val Thr Val Ser Ser
            115                 120

<210> SEQ ID NO 59
<211> LENGTH: 107
<212> TYPE: PRT
<213> ORGANISM: Artificial Sequence
<220> FEATURE:
<223> OTHER INFORMATION: CG_93_VL

<400> SEQUENCE: 59

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His His Tyr
            20                  25                  30

Leu Ser Trp Phe Gln Gln Lys Pro Gly Lys Val Pro Lys His Leu Ile
            35                  40                  45

Tyr Arg Ala Asn Tyr Leu Val Ser Gly Val Pro Ser Arg Phe Ser Gly
50                  55                  60

Ser Gly Ser Gly Thr Glu Phe Thr Leu Thr Ile Ser Ser Leu Gln Pro
65                  70                  75                  80

```
Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 60
<211> LENGTH: 120
<212> TYPE: PRT
<213> ORGANISM: Artificial Sequence
<220> FEATURE:
<223> OTHER INFORMATION: CG_93_VH

<400> SEQUENCE: 60

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
                20                  25                  30

Tyr Leu His Trp Val Arg Gln Ala Pro Gly Lys Gly Leu Glu Trp Met
            35                  40                  45

Gly Trp Ile Ala Pro Asp Gln Gly Val Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
            100                 105                 110

Gly Thr Leu Val Thr Val Ser Ser
            115                 120

<210> SEQ ID NO 61
<211> LENGTH: 107
<212> TYPE: PRT
<213> ORGANISM: Artificial Sequence
<220> FEATURE:
<223> OTHER INFORMATION: CG_94_VL

<400> SEQUENCE: 61

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Val Tyr
                20                  25                  30

Leu Ser Trp Phe Gln Gln Lys Pro Gly Lys Val Pro Lys His Leu Ile
            35                  40                  45

Tyr Arg Ala Asn Gln Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 62
<211> LENGTH: 120
<212> TYPE: PRT
<213> ORGANISM: Artificial Sequence
<220> FEATURE:
<223> OTHER INFORMATION: CG_94_VH
```

<400> SEQUENCE: 62

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Val Pro Asp Gln Gly Met Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Tyr Pro Met Asp Tyr Trp Gly Gln
            100                 105                 110

Gly Thr Leu Val Thr Val Ser Ser
            115                 120

<210> SEQ ID NO 63
<211> LENGTH: 107
<212> TYPE: PRT
<213> ORGANISM: Artificial Sequence
<220> FEATURE:
<223> OTHER INFORMATION: CG_95_VL

<400> SEQUENCE: 63

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Thr Tyr
            20                  25                  30

Leu Ser Trp Phe Gln Gln Lys Pro Gly Lys Val Pro Lys His Leu Ile
        35                  40                  45

Tyr Arg Ala Asn Tyr Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 64
<211> LENGTH: 120
<212> TYPE: PRT
<213> ORGANISM: Artificial Sequence
<220> FEATURE:
<223> OTHER INFORMATION: CG_95_VH

<400> SEQUENCE: 64

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Ala Pro Asp Gln Gly Ile Thr Glu Tyr Ala Gln Lys Phe
    50                  55                  60

```
Gln Gly Arg Val Thr Ile Thr Arg Asp Arg Ser Thr Ser Thr Ala Tyr
 65                  70                  75                  80

Met Glu Leu Arg Ser Leu Arg Ala Glu Asp Thr Ala Val Tyr Tyr Cys
                 85                  90                  95

Asn Ala Ala Tyr Gly Ser Ser Tyr Pro Met Asp Tyr Trp Gly Gln
                100                 105                 110

Gly Thr Leu Val Thr Val Ser Ser
            115                 120

<210> SEQ ID NO 65
<211> LENGTH: 107
<212> TYPE: PRT
<213> ORGANISM: Artificial Sequence
<220> FEATURE:
<223> OTHER INFORMATION: CG_96_VL

<400> SEQUENCE: 65

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Ile Tyr
                20                  25                  30

Leu Ser Trp Phe Gln Gln Lys Pro Gly Lys Val Pro Lys His Leu Ile
            35                  40                  45

Tyr Arg Ala Asn Glu Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
                100                 105

<210> SEQ ID NO 66
<211> LENGTH: 120
<212> TYPE: PRT
<213> ORGANISM: Artificial Sequence
<220> FEATURE:
<223> OTHER INFORMATION: CG_96_VH

<400> SEQUENCE: 66

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
                20                  25                  30

Tyr Leu His Trp Val Arg Gln Ala Pro Gly Lys Gly Leu Glu Trp Met
            35                  40                  45

Gly Trp Ile Met Pro Asp Gln Gly Ala Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Tyr Pro Met Asp Tyr Trp Gly Gln
                100                 105                 110

Gly Thr Leu Val Thr Val Ser Ser
            115                 120
```

```
<210> SEQ ID NO 67
<211> LENGTH: 107
<212> TYPE: PRT
<213> ORGANISM: Artificial Sequence
<220> FEATURE:
<223> OTHER INFORMATION: CG_97_VL

<400> SEQUENCE: 67

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Tyr Tyr
            20                  25                  30

Leu Ser Trp Phe Gln Gln Lys Pro Gly Lys Val Pro Lys His Leu Ile
        35                  40                  45

Tyr Arg Ala Asn Glu Leu Val Ser Gly Val Pro Ser Arg Phe Ser Gly
50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 68
<211> LENGTH: 120
<212> TYPE: PRT
<213> ORGANISM: Artificial Sequence
<220> FEATURE:
<223> OTHER INFORMATION: CG_97_VH

<400> SEQUENCE: 68

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Val Pro Asp Gln Gly Ile Thr Glu Tyr Ala Gln Lys Phe
50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Tyr Pro Met Asp Tyr Trp Gly Gln
            100                 105                 110

Gly Thr Leu Val Thr Val Ser Ser
        115                 120

<210> SEQ ID NO 69
<211> LENGTH: 107
<212> TYPE: PRT
<213> ORGANISM: Artificial Sequence
<220> FEATURE:
<223> OTHER INFORMATION: CG_98_VL

<400> SEQUENCE: 69

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His His Tyr
            20                  25                  30
```

Leu Ser Trp Phe Gln Gln Lys Pro Gly Lys Val Pro Lys His Leu Ile
                35                  40                  45

Tyr Arg Ala Asn Asp Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
                100                 105

<210> SEQ ID NO 70
<211> LENGTH: 120
<212> TYPE: PRT
<213> ORGANISM: Artificial Sequence
<220> FEATURE:
<223> OTHER INFORMATION: CG_98_VH

<400> SEQUENCE: 70

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
                20                  25                  30

Tyr Leu His Trp Val Arg Gln Ala Pro Gly Lys Gly Leu Glu Trp Met
                35                  40                  45

Gly Trp Ile Tyr Pro Asp Gln Gly Ile Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
                100                 105                 110

Gly Thr Leu Val Thr Val Ser Ser
            115                 120

<210> SEQ ID NO 71
<211> LENGTH: 107
<212> TYPE: PRT
<213> ORGANISM: Artificial Sequence
<220> FEATURE:
<223> OTHER INFORMATION: CG_99_VL

<400> SEQUENCE: 71

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Tyr Tyr
                20                  25                  30

Leu Ser Trp Phe Gln Gln Lys Pro Gly Lys Val Pro Lys His Leu Ile
                35                  40                  45

Tyr Arg Ala Asn Glu Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys

<210> SEQ ID NO 72
<211> LENGTH: 120
<212> TYPE: PRT
<213> ORGANISM: Artificial Sequence
<220> FEATURE:
<223> OTHER INFORMATION: CG_99_VH

<400> SEQUENCE: 72

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Tyr Pro Asp Gln Gly Val Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
            100                 105                 110

Gly Thr Leu Val Thr Val Ser Ser
        115                 120

<210> SEQ ID NO 73
<211> LENGTH: 107
<212> TYPE: PRT
<213> ORGANISM: Artificial Sequence
<220> FEATURE:
<223> OTHER INFORMATION: CG_100_VL

<400> SEQUENCE: 73

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Ile Tyr
            20                  25                  30

Leu Ser Trp Phe Gln Gln Lys Pro Gly Lys Val Pro Lys His Leu Ile
        35                  40                  45

Tyr Arg Ala Asn Asp Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 74
<211> LENGTH: 120
<212> TYPE: PRT
<213> ORGANISM: Artificial Sequence
<220> FEATURE:
<223> OTHER INFORMATION: CG_100_VH

<400> SEQUENCE: 74

Gln Met Gln Leu Val Gln Ser Gly Ala Glu Val Lys Lys Pro Gly Ser
1               5                   10                  15

```
Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
            35                  40                  45

Gly Trp Ile Glu Pro Asp Gln Gly Leu Thr Tyr Ala Gln Lys Phe
 50                  55                  60

Gln Gly Arg Val Thr Ile Thr Arg Asp Arg Ser Thr Ser Thr Ala Tyr
 65                  70                  75                  80

Met Glu Leu Arg Ser Leu Arg Ala Glu Asp Thr Ala Val Tyr Tyr Cys
                 85                  90                  95

Asn Ala Ala Tyr Gly Ser Ser Tyr Pro Met Asp Tyr Trp Gly Gln
                100                 105                 110

Gly Thr Leu Val Thr Val Ser Ser
            115                 120
```

```
<210> SEQ ID NO 75
<211> LENGTH: 107
<212> TYPE: PRT
<213> ORGANISM: Artificial Sequence
<220> FEATURE:
<223> OTHER INFORMATION: CG_101_VL

<400> SEQUENCE: 75

Asn Ile Gln Met Thr Gln Ser Pro Ser Ser Leu Ser Ala Ser Val Gly
 1               5                  10                  15

Asp Arg Val Thr Ile Thr Cys Arg Ala Ser Gln Asp Ile His Tyr Tyr
            20                  25                  30

Leu Ser Trp Phe Gln Gln Lys Pro Gly Lys Val Pro Lys His Leu Ile
            35                  40                  45

Tyr Arg Ala Asn Asp Leu Val Ser Gly Val Pro Ser Arg Phe Ser Gly
 50                  55                  60

Ser Gly Ser Gly Thr Glu Phe Thr Leu Thr Ile Ser Ser Leu Gln Pro
 65                  70                  75                  80

Glu Asp Phe Ala Thr Tyr Tyr Cys Leu Gln Tyr Asp Glu Phe Pro Tyr
                 85                  90                  95

Thr Phe Gly Gly Gly Thr Lys Val Glu Ile Lys
                100                 105
```

```
<210> SEQ ID NO 76
<211> LENGTH: 120
<212> TYPE: PRT
<213> ORGANISM: Artificial Sequence
<220> FEATURE:
<223> OTHER INFORMATION: CG_101_VH

<400> SEQUENCE: 76

Gln Met Gln Leu Val Gln Ser Gly Ala Glu Val Lys Lys Pro Gly Ser
 1               5                  10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
            35                  40                  45

Gly Trp Ile Leu Pro Asp Gln Gly Asp Thr Glu Tyr Ala Gln Lys Phe
 50                  55                  60

Gln Gly Arg Val Thr Ile Thr Arg Asp Arg Ser Thr Ser Thr Ala Tyr
 65                  70                  75                  80

Met Glu Leu Arg Ser Leu Arg Ala Glu Asp Thr Ala Val Tyr Tyr Cys
```

-continued

```
                85                  90                  95
Asn Ala Ala Tyr Gly Ser Ser Tyr Pro Met Asp Tyr Trp Gln
            100                 105                 110
Gly Thr Leu Val Thr Val Ser Ser
            115                 120

<210> SEQ ID NO 77
<211> LENGTH: 107
<212> TYPE: PRT
<213> ORGANISM: Artificial Sequence
<220> FEATURE:
<223> OTHER INFORMATION: CG_102_VL

<400> SEQUENCE: 77

Asn Ile Gln Met Thr Gln Ser Pro Ser Ser Leu Ser Ala Ser Val Gly
1               5                   10                  15
Asp Arg Val Thr Ile Thr Cys Arg Ala Ser Gln Asp Ile His Val Tyr
            20                  25                  30
Leu Ser Trp Phe Gln Gln Lys Pro Gly Lys Val Pro Lys His Leu Ile
        35                  40                  45
Tyr Arg Ala Asn Asp Leu Val Ser Gly Val Pro Ser Arg Phe Ser Gly
    50                  55                  60
Ser Gly Ser Gly Thr Glu Phe Thr Leu Thr Ile Ser Ser Leu Gln Pro
65                  70                  75                  80
Glu Asp Phe Ala Thr Tyr Tyr Cys Leu Gln Tyr Asp Glu Phe Pro Tyr
                85                  90                  95
Thr Phe Gly Gly Gly Thr Lys Val Glu Ile Lys
            100                 105

<210> SEQ ID NO 78
<211> LENGTH: 120
<212> TYPE: PRT
<213> ORGANISM: Artificial Sequence
<220> FEATURE:
<223> OTHER INFORMATION: CG_102_VH

<400> SEQUENCE: 78

Gln Met Gln Leu Val Gln Ser Gly Ala Glu Val Lys Lys Pro Gly Ser
1               5                   10                  15
Ser Val Lys Val Ser Cys Lys Ala Ser Gly Phe Asn Ile Lys Asp Tyr
            20                  25                  30
Tyr Leu His Trp Val Arg Gln Ala Pro Gly Lys Gly Leu Glu Trp Met
        35                  40                  45
Gly Trp Ile Tyr Pro Asp Gln Gly Ser Thr Glu Tyr Ala Gln Lys Phe
    50                  55                  60
Gln Gly Arg Val Thr Ile Thr Arg Asp Arg Ser Thr Ser Thr Ala Tyr
65                  70                  75                  80
Met Glu Leu Arg Ser Leu Arg Ala Glu Asp Thr Ala Val Tyr Tyr Cys
                85                  90                  95
Asn Ala Ala Tyr Gly Ser Ser Tyr Pro Met Asp Tyr Trp Gln
            100                 105                 110
Gly Thr Leu Val Thr Val Ser Ser
            115                 120

<210> SEQ ID NO 79
<211> LENGTH: 107
<212> TYPE: PRT
<213> ORGANISM: Artificial Sequence
<220> FEATURE:
```

-continued

<223> OTHER INFORMATION: CG_103_VL

<400> SEQUENCE: 79

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Ile Tyr
            20                  25                  30

Leu Ser Trp Phe Gln Gln Lys Pro Gly Lys Val Pro Lys His Leu Ile
        35                  40                  45

Tyr Arg Ala Asn Gln Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 80
<211> LENGTH: 120
<212> TYPE: PRT
<213> ORGANISM: Artificial Sequence
<220> FEATURE:
<223> OTHER INFORMATION: CG_103_VH

<400> SEQUENCE: 80

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Ala Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
            100                 105                 110

Gly Thr Leu Val Thr Val Ser Ser
        115                 120

<210> SEQ ID NO 81
<211> LENGTH: 107
<212> TYPE: PRT
<213> ORGANISM: Artificial Sequence
<220> FEATURE:
<223> OTHER INFORMATION: CG_104_VL

<400> SEQUENCE: 81

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Leu Tyr
            20                  25                  30

Leu Ser Trp Phe Gln Gln Lys Pro Gly Lys Val Pro Lys His Leu Ile
        35                  40                  45

Tyr Arg Ala Asn Asp Leu Val Ser Gly Val Pro Ser Arg Phe Ser Gly

```
                  50                  55                  60

Ser Gly Ser Gly Thr Glu Phe Thr Leu Thr Ile Ser Ser Leu Gln Pro
 65                  70                  75                  80

Glu Asp Phe Ala Thr Tyr Tyr Cys Leu Gln Tyr Asp Glu Phe Pro Tyr
                     85                  90                  95

Thr Phe Gly Gly Gly Thr Lys Val Glu Ile Lys
                100                 105

<210> SEQ ID NO 82
<211> LENGTH: 120
<212> TYPE: PRT
<213> ORGANISM: Artificial Sequence
<220> FEATURE:
<223> OTHER INFORMATION: CG_104_VH

<400> SEQUENCE: 82

Gln Met Gln Leu Val Gln Ser Gly Ala Glu Val Lys Lys Pro Gly Ser
 1               5                  10                  15

Ser Val Lys Val Ser Cys Lys Ala Ser Gly Phe Asn Ile Lys Asp Tyr
                20                  25                  30

Tyr Leu His Trp Val Arg Gln Ala Pro Gly Lys Gly Leu Glu Trp Met
             35                  40                  45

Gly Trp Ile Gln Pro Asp Gln Gly Val Thr Glu Tyr Ala Gln Lys Phe
 50                  55                  60

Gln Gly Arg Val Thr Ile Thr Arg Asp Arg Ser Thr Ser Thr Ala Tyr
 65                  70                  75                  80

Met Glu Leu Arg Ser Leu Arg Ala Glu Asp Thr Ala Val Tyr Tyr Cys
                 85                  90                  95

Asn Ala Ala Tyr Gly Ser Ser Ser Tyr Pro Met Asp Tyr Trp Gly Gln
                100                 105                 110

Gly Thr Leu Val Thr Val Ser Ser
            115                 120

<210> SEQ ID NO 83
<211> LENGTH: 107
<212> TYPE: PRT
<213> ORGANISM: Artificial Sequence
<220> FEATURE:
<223> OTHER INFORMATION: CG_105_VL

<400> SEQUENCE: 83

Asn Ile Gln Met Thr Gln Ser Pro Ser Ser Leu Ser Ala Ser Val Gly
 1               5                  10                  15

Asp Arg Val Thr Ile Thr Cys Arg Ala Ser Gln Asp Ile His Leu Tyr
                20                  25                  30

Leu Ser Trp Phe Gln Gln Lys Pro Gly Lys Val Pro Lys His Leu Ile
             35                  40                  45

Tyr Arg Ala Asn Glu Leu Val Ser Gly Val Pro Ser Arg Phe Ser Gly
 50                  55                  60

Ser Gly Ser Gly Thr Glu Phe Thr Leu Thr Ile Ser Ser Leu Gln Pro
 65                  70                  75                  80

Glu Asp Phe Ala Thr Tyr Tyr Cys Leu Gln Tyr Asp Glu Phe Pro Tyr
                 85                  90                  95

Thr Phe Gly Gly Gly Thr Lys Val Glu Ile Lys
                100                 105

<210> SEQ ID NO 84
<211> LENGTH: 120
```

```
<212> TYPE: PRT
<213> ORGANISM: Artificial Sequence
<220> FEATURE:
<223> OTHER INFORMATION: CG_105_VH

<400> SEQUENCE: 84

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Ile Pro Asp Gln Gly Glu Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Tyr Pro Met Asp Tyr Trp Gly Gln
            100                 105                 110

Gly Thr Leu Val Thr Val Ser Ser
        115                 120

<210> SEQ ID NO 85
<211> LENGTH: 107
<212> TYPE: PRT
<213> ORGANISM: Artificial Sequence
<220> FEATURE:
<223> OTHER INFORMATION: CG_106_VL

<400> SEQUENCE: 85

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Asp Tyr
            20                  25                  30

Leu Ser Trp Phe Gln Gln Lys Pro Gly Lys Val Pro Lys His Leu Ile
        35                  40                  45

Tyr Arg Ala Asn Tyr Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 86
<211> LENGTH: 120
<212> TYPE: PRT
<213> ORGANISM: Artificial Sequence
<220> FEATURE:
<223> OTHER INFORMATION: CG_106_VH

<400> SEQUENCE: 86

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
```

```
            35                  40                  45
Gly Trp Ile Ile Pro Asp Gln Gly Thr Thr Glu Tyr Ala Gln Lys Phe
        50                  55                  60
Gln Gly Arg Val Thr Ile Thr Arg Asp Arg Ser Thr Ser Thr Ala Tyr
65                  70                  75                  80
Met Glu Leu Arg Ser Leu Arg Ala Glu Asp Thr Ala Val Tyr Tyr Cys
                85                  90                  95
Asn Ala Ala Tyr Gly Ser Ser Ser Tyr Pro Met Asp Tyr Trp Gly Gln
            100                 105                 110
Gly Thr Leu Val Thr Val Ser Ser
        115                 120
```

```
<210> SEQ ID NO 87
<211> LENGTH: 107
<212> TYPE: PRT
<213> ORGANISM: Artificial Sequence
<220> FEATURE:
<223> OTHER INFORMATION: CG_107_VL

<400> SEQUENCE: 87

Asn Ile Gln Met Thr Gln Ser Pro Ser Ser Leu Ser Ala Ser Val Gly
1               5                   10                  15
Asp Arg Val Thr Ile Thr Cys Arg Ala Ser Gln Asp Ile His Thr Tyr
            20                  25                  30
Leu Ser Trp Phe Gln Gln Lys Pro Gly Lys Val Pro Lys His Leu Ile
        35                  40                  45
Tyr Arg Ala Asn Gln Leu Val Ser Gly Val Pro Ser Arg Phe Ser Gly
    50                  55                  60
Ser Gly Ser Gly Thr Glu Phe Thr Leu Thr Ile Ser Ser Leu Gln Pro
65                  70                  75                  80
Glu Asp Phe Ala Thr Tyr Tyr Cys Leu Gln Tyr Asp Glu Phe Pro Tyr
                85                  90                  95
Thr Phe Gly Gly Gly Thr Lys Val Glu Ile Lys
            100                 105
```

```
<210> SEQ ID NO 88
<211> LENGTH: 120
<212> TYPE: PRT
<213> ORGANISM: Artificial Sequence
<220> FEATURE:
<223> OTHER INFORMATION: CG_107_VH

<400> SEQUENCE: 88

Gln Met Gln Leu Val Gln Ser Gly Ala Glu Val Lys Lys Pro Gly Ser
1               5                   10                  15
Ser Val Lys Val Ser Cys Lys Ala Ser Gly Phe Asn Ile Lys Asp Tyr
            20                  25                  30
Tyr Leu His Trp Val Arg Gln Ala Pro Gly Lys Gly Leu Glu Trp Met
        35                  40                  45
Gly Trp Ile Ile Pro Asp Gln Gly Tyr Thr Glu Tyr Ala Gln Lys Phe
    50                  55                  60
Gln Gly Arg Val Thr Ile Thr Arg Asp Arg Ser Thr Ser Thr Ala Tyr
65                  70                  75                  80
Met Glu Leu Arg Ser Leu Arg Ala Glu Asp Thr Ala Val Tyr Tyr Cys
                85                  90                  95
Asn Ala Ala Tyr Gly Ser Ser Ser Tyr Pro Met Asp Tyr Trp Gly Gln
            100                 105                 110
```

```
Gly Thr Leu Val Thr Val Ser Ser
        115             120

<210> SEQ ID NO 89
<211> LENGTH: 107
<212> TYPE: PRT
<213> ORGANISM: Artificial Sequence
<220> FEATURE:
<223> OTHER INFORMATION: CG_108_VL

<400> SEQUENCE: 89

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
            20                  25                  30

Leu Ser Trp Phe Gln Gln Lys Pro Gly Lys Val Pro Lys His Leu Ile
        35                  40                  45

Tyr Arg Ala Asn Arg Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 90
<211> LENGTH: 120
<212> TYPE: PRT
<213> ORGANISM: Artificial Sequence
<220> FEATURE:
<223> OTHER INFORMATION: CG_108_VH

<400> SEQUENCE: 90

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Tyr Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Asp Ser Ser Tyr Pro Met Asp Tyr Trp Gly Gln
            100                 105                 110

Gly Thr Leu Val Thr Val Ser Ser
        115             120

<210> SEQ ID NO 91
<211> LENGTH: 107
<212> TYPE: PRT
<213> ORGANISM: Artificial Sequence
<220> FEATURE:
<223> OTHER INFORMATION: CG_109_VL

<400> SEQUENCE: 91

Asn Ile Gln Met Thr Gln Ser Pro Ser Ser Leu Ser Ala Ser Val Gly
```

```
                1               5                  10                 15
Asp Arg Val Thr Ile Thr Cys Arg Ala Ser Gln Asp Ile His Arg Tyr
                    20                 25                 30

Leu Ser Trp Phe Gln Gln Lys Pro Gly Lys Val Pro Lys His Leu Ile
            35                 40                 45

Tyr Arg Ala Asn Arg Leu Val Ser Gly Val Pro Ser Arg Phe Ser Gly
        50                 55                 60

Ser Gly Ser Gly Thr Glu Phe Thr Leu Thr Ile Ser Ser Leu Gln Pro
65                  70                 75                 80

Glu Asp Phe Ala Thr Tyr Tyr Cys Leu Gln Tyr Asp Glu Phe Pro Tyr
                    85                 90                 95

Thr Phe Gly Gly Gly Thr Lys Val Glu Ile Lys
                100                105
```

<210> SEQ ID NO 92
<211> LENGTH: 120
<212> TYPE: PRT
<213> ORGANISM: Artificial Sequence
<220> FEATURE:
<223> OTHER INFORMATION: CG_109_VH

<400> SEQUENCE: 92

```
Gln Met Gln Leu Val Gln Ser Gly Ala Glu Val Lys Lys Pro Gly Ser
1               5                  10                 15

Ser Val Lys Val Ser Cys Lys Ala Ser Gly Phe Asn Ile Lys Asp Tyr
                    20                 25                 30

Tyr Leu His Trp Val Arg Gln Ala Pro Gly Lys Gly Leu Glu Trp Met
            35                 40                 45

Gly Trp Ile Asp Pro Asp Gln Gly Asp Thr Gln Tyr Ala Gln Lys Phe
        50                 55                 60

Gln Gly Arg Val Thr Ile Thr Arg Asp Arg Ser Thr Ser Thr Ala Tyr
65                  70                 75                 80

Met Glu Leu Arg Ser Leu Arg Ala Glu Asp Thr Ala Val Tyr Tyr Cys
                    85                 90                 95

Asn Ala Ala Tyr Gly Tyr Ser Ser Tyr Pro Met Asp Tyr Trp Gly Gln
                100                105                110

Gly Thr Leu Val Thr Val Ser Ser
            115                120
```

<210> SEQ ID NO 93
<211> LENGTH: 107
<212> TYPE: PRT
<213> ORGANISM: Artificial Sequence
<220> FEATURE:
<223> OTHER INFORMATION: CG_110_VL

<400> SEQUENCE: 93

```
Asn Ile Gln Met Thr Gln Ser Pro Ser Ser Leu Ser Ala Ser Val Gly
1               5                  10                 15

Asp Arg Val Thr Ile Thr Cys Arg Ala Ser Gln Asp Ile His Arg Tyr
                    20                 25                 30

Leu Ser Trp Phe Gln Gln Lys Pro Gly Lys Val Pro Lys His Leu Ile
            35                 40                 45

Tyr Arg Ala Asn Arg Leu Val Ser Gly Val Pro Ser Arg Phe Ser Gly
        50                 55                 60

Ser Gly Ser Gly Thr Glu Phe Thr Leu Thr Ile Ser Ser Leu Gln Pro
65                  70                 75                 80
```

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 94
<211> LENGTH: 120
<212> TYPE: PRT
<213> ORGANISM: Artificial Sequence
<220> FEATURE:
<223> OTHER INFORMATION: CG_110_VH

<400> SEQUENCE: 94

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
                20                  25                  30

Tyr Leu His Trp Val Arg Gln Ala Pro Gly Lys Gly Leu Glu Trp Met
            35                  40                  45

Gly Trp Ile Asp Pro Asp Gln Gly Asp Thr Leu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Glu Ser Ser Tyr Pro Met Asp Tyr Trp Gly Gln
            100                 105                 110

Gly Thr Leu Val Thr Val Ser Ser
        115                 120

<210> SEQ ID NO 95
<211> LENGTH: 107
<212> TYPE: PRT
<213> ORGANISM: Artificial Sequence
<220> FEATURE:
<223> OTHER INFORMATION: CG_111_VL

<400> SEQUENCE: 95

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
                20                  25                  30

Leu Ser Trp Phe Gln Gln Lys Pro Gly Lys Val Pro Lys His Leu Ile
            35                  40                  45

Tyr Arg Ala Asn Arg Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 96
<211> LENGTH: 120
<212> TYPE: PRT
<213> ORGANISM: Artificial Sequence
<220> FEATURE:
<223> OTHER INFORMATION: CG_111_VH -continued

```
<400> SEQUENCE: 96

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Val Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Glu Ser Ser Tyr Pro Met Asp Tyr Trp Gly Gln
            100                 105                 110

Gly Thr Leu Val Thr Val Ser Ser
        115                 120

<210> SEQ ID NO 97
<211> LENGTH: 107
<212> TYPE: PRT
<213> ORGANISM: Artificial Sequence
<220> FEATURE:
<223> OTHER INFORMATION: CG_112_VL

<400> SEQUENCE: 97

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
            20                  25                  30

Leu Ser Trp Phe Gln Gln Lys Pro Gly Lys Val Pro Lys His Leu Ile
        35                  40                  45

Tyr Arg Ala Asn Arg Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 98
<211> LENGTH: 120
<212> TYPE: PRT
<213> ORGANISM: Artificial Sequence
<220> FEATURE:
<223> OTHER INFORMATION: CG_112_VH

<400> SEQUENCE: 98

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Gln Gly Asp Thr Glu Tyr Ala Gln Lys Phe
    50                  55                  60
```

```
Gln Gly Arg Val Thr Ile Thr Arg Asp Arg Ser Thr Ser Thr Ala Tyr
 65                  70                  75                  80

Met Glu Leu Arg Ser Leu Arg Ala Glu Asp Thr Ala Val Tyr Tyr Cys
                 85                  90                  95

Asn Ala Ala Tyr Gly Val Ser Ser Tyr Pro Met Asp Tyr Trp Gly Gln
            100                 105                 110

Gly Thr Leu Val Thr Val Ser Ser
        115                 120

<210> SEQ ID NO 99
<211> LENGTH: 107
<212> TYPE: PRT
<213> ORGANISM: Artificial Sequence
<220> FEATURE:
<223> OTHER INFORMATION: CG_113_VL

<400> SEQUENCE: 99

Asn Ile Gln Met Thr Gln Ser Pro Ser Ser Leu Ser Ala Ser Val Gly
  1               5                  10                  15

Asp Arg Val Thr Ile Thr Cys Arg Ala Ser Gln Asp Ile His Arg Tyr
                 20                  25                  30

Leu Ser Trp Phe Gln Gln Lys Pro Gly Lys Val Pro Lys His Leu Ile
             35                  40                  45

Tyr Arg Ala Asn Arg Leu Val Ser Gly Val Pro Ser Arg Phe Ser Gly
 50                  55                  60

Ser Gly Ser Gly Thr Glu Phe Thr Leu Thr Ile Ser Ser Leu Gln Pro
 65                  70                  75                  80

Glu Asp Phe Ala Thr Tyr Tyr Cys Leu Gln Tyr Asp Glu Phe Pro Tyr
                 85                  90                  95

Thr Phe Gly Gly Gly Thr Lys Val Glu Ile Lys
            100                 105

<210> SEQ ID NO 100
<211> LENGTH: 120
<212> TYPE: PRT
<213> ORGANISM: Artificial Sequence
<220> FEATURE:
<223> OTHER INFORMATION: CG_113_VH

<400> SEQUENCE: 100

Gln Met Gln Leu Val Gln Ser Gly Ala Glu Val Lys Lys Pro Gly Ser
  1               5                  10                  15

Ser Val Lys Val Ser Cys Lys Ala Ser Gly Phe Asn Ile Lys Asp Tyr
                 20                  25                  30

Tyr Leu His Trp Val Arg Gln Ala Pro Gly Lys Gly Leu Glu Trp Met
             35                  40                  45

Gly Trp Ile Leu Pro Asp Gly Asp Thr Glu Tyr Ala Gln Lys Phe
 50                  55                  60

Gln Gly Arg Val Thr Ile Thr Arg Asp Arg Ser Thr Ser Thr Ala Tyr
 65                  70                  75                  80

Met Glu Leu Arg Ser Leu Arg Ala Glu Asp Thr Ala Val Tyr Tyr Cys
                 85                  90                  95

Asn Ala Ala Tyr Gly Tyr Ser Ser Tyr Pro Met Asp Tyr Trp Gly Gln
            100                 105                 110

Gly Thr Leu Val Thr Val Ser Ser
        115                 120

<210> SEQ ID NO 101
```

<211> LENGTH: 107
<212> TYPE: PRT
<213> ORGANISM: Artificial Sequence
<220> FEATURE:
<223> OTHER INFORMATION: CG_114_VL

<400> SEQUENCE: 101

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
            20                  25                  30

Leu Ser Trp Phe Gln Gln Lys Pro Gly Lys Val Pro Lys His Leu Ile
        35                  40                  45

Tyr Arg Ala Asn Arg Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 102
<211> LENGTH: 120
<212> TYPE: PRT
<213> ORGANISM: Artificial Sequence
<220> FEATURE:
<223> OTHER INFORMATION: CG_114_VH

<400> SEQUENCE: 102

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Ala Thr Tyr Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
            100                 105                 110

Gly Thr Leu Val Thr Val Ser Ser
        115                 120

<210> SEQ ID NO 103
<211> LENGTH: 107
<212> TYPE: PRT
<213> ORGANISM: Artificial Sequence
<220> FEATURE:
<223> OTHER INFORMATION: CG_115_VL

<400> SEQUENCE: 103

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
            20                  25                  30

```
Leu Ser Trp Phe Gln Gln Lys Pro Gly Lys Val Pro Lys His Leu Ile
        35                  40                  45

Tyr Arg Ala Asn Arg Leu Val Ser Gly Val Pro Ser Arg Phe Ser Gly
 50                  55                  60

Ser Gly Ser Gly Thr Glu Phe Thr Leu Thr Ile Ser Ser Leu Gln Pro
 65                  70                  75                  80

Glu Asp Phe Ala Thr Tyr Tyr Cys Leu Gln Tyr Asp Glu Phe Pro Tyr
                 85                  90                  95

Thr Phe Gly Gly Gly Thr Lys Val Glu Ile Lys
                100                 105
```

<210> SEQ ID NO 104
<211> LENGTH: 120
<212> TYPE: PRT
<213> ORGANISM: Artificial Sequence
<220> FEATURE:
<223> OTHER INFORMATION: CG_115_VH

<400> SEQUENCE: 104

```
Gln Met Gln Leu Val Gln Ser Gly Ala Glu Val Lys Lys Pro Gly Ser
 1               5                  10                  15

Ser Val Lys Val Ser Cys Lys Ala Ser Gly Phe Asn Ile Lys Asp Tyr
                 20                  25                  30

Tyr Leu His Trp Val Arg Gln Ala Pro Gly Lys Gly Leu Glu Trp Met
             35                  40                  45

Gly Trp Ile Asp Pro Asp Thr Gly Asp Thr Glu Tyr Ala Gln Lys Phe
 50                  55                  60

Gln Gly Arg Val Thr Ile Thr Arg Asp Arg Ser Thr Ser Thr Ala Tyr
 65                  70                  75                  80

Met Glu Leu Arg Ser Leu Arg Ala Glu Asp Thr Ala Val Tyr Tyr Cys
                 85                  90                  95

Asn Ala Ala Tyr Tyr Ser Ser Ser Tyr Pro Met Asp Tyr Trp Gly Gln
                100                 105                 110

Gly Thr Leu Val Thr Val Ser Ser
            115                 120
```

<210> SEQ ID NO 105
<211> LENGTH: 107
<212> TYPE: PRT
<213> ORGANISM: Artificial Sequence
<220> FEATURE:
<223> OTHER INFORMATION: CG_116_VL

<400> SEQUENCE: 105

```
Asn Ile Gln Met Thr Gln Ser Pro Ser Ser Leu Ser Ala Ser Val Gly
 1               5                  10                  15

Asp Arg Val Thr Ile Thr Cys Arg Ala Ser Gln Asp Ile His Arg Tyr
                 20                  25                  30

Leu Ser Trp Phe Gln Gln Lys Pro Gly Lys Val Pro Lys His Leu Ile
            35                  40                  45

Tyr Arg Ala Asn Arg Leu Val Ser Gly Val Pro Ser Arg Phe Ser Gly
 50                  55                  60

Ser Gly Ser Gly Thr Glu Phe Thr Leu Thr Ile Ser Ser Leu Gln Pro
 65                  70                  75                  80

Glu Asp Phe Ala Thr Tyr Tyr Cys Leu Gln Tyr Asp Glu Phe Pro Tyr
                 85                  90                  95

Thr Phe Gly Gly Gly Thr Lys Val Glu Ile Lys
                100                 105
```

<210> SEQ ID NO 106
<211> LENGTH: 120
<212> TYPE: PRT
<213> ORGANISM: Artificial Sequence
<220> FEATURE:
<223> OTHER INFORMATION: CG_116_VH

<400> SEQUENCE: 106

```
Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
                20                  25                  30

Tyr Leu His Trp Val Arg Gln Ala Pro Gly Lys Gly Leu Glu Trp Met
            35                  40                  45

Gly Trp Ile Asp Pro Asp Gln Gly Asp Thr Ser Tyr Ala Gln Lys Phe
        50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Tyr Ser Ser Tyr Pro Met Asp Tyr Trp Gly Gln
                100                 105                 110

Gly Thr Leu Val Thr Val Ser Ser
            115                 120
```

<210> SEQ ID NO 107
<211> LENGTH: 107
<212> TYPE: PRT
<213> ORGANISM: Artificial Sequence
<220> FEATURE:
<223> OTHER INFORMATION: CG_117_VL

<400> SEQUENCE: 107

```
Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
                20                  25                  30

Leu Ser Trp Phe Gln Gln Lys Pro Gly Lys Val Pro Lys His Leu Ile
            35                  40                  45

Tyr Arg Ala Asn Arg Leu Val Ser Gly Val Pro Ser Arg Phe Ser Gly
        50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105
```

<210> SEQ ID NO 108
<211> LENGTH: 120
<212> TYPE: PRT
<213> ORGANISM: Artificial Sequence
<220> FEATURE:
<223> OTHER INFORMATION: CG_117_VH

<400> SEQUENCE: 108

```
Gln Met Gln Leu Val Gln Ser Gly Ala Glu Val Lys Lys Pro Gly Ser
1               5                   10                  15
```

-continued

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Ala Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Leu Ser Ser Tyr Pro Met Asp Tyr Trp Gly Gln
            100                 105                 110

Gly Thr Leu Val Thr Val Ser Ser
        115                 120

<210> SEQ ID NO 109
<211> LENGTH: 107
<212> TYPE: PRT
<213> ORGANISM: Artificial Sequence
<220> FEATURE:
<223> OTHER INFORMATION: CG_118_VL

<400> SEQUENCE: 109

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
            20                  25                  30

Leu Ser Trp Phe Gln Gln Lys Pro Gly Lys Val Pro Lys His Leu Ile
        35                  40                  45

Tyr Arg Ala Asn Arg Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 110
<211> LENGTH: 120
<212> TYPE: PRT
<213> ORGANISM: Artificial Sequence
<220> FEATURE:
<223> OTHER INFORMATION: CG_118_VH

<400> SEQUENCE: 110

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Val Gly Ser Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

```
Asn Ala Ala Tyr Gly Ser Ser Tyr Pro Met Asp Tyr Trp Gly Gln
            100                 105                 110

Gly Thr Leu Val Thr Val Ser Ser
        115                 120

<210> SEQ ID NO 111
<211> LENGTH: 107
<212> TYPE: PRT
<213> ORGANISM: Artificial Sequence
<220> FEATURE:
<223> OTHER INFORMATION: CG_119_VL

<400> SEQUENCE: 111

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
            20                  25                  30

Leu Ser Trp Phe Gln Gln Lys Pro Gly Lys Val Pro Lys His Leu Ile
        35                  40                  45

Tyr Arg Ala Asn Arg Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 112
<211> LENGTH: 120
<212> TYPE: PRT
<213> ORGANISM: Artificial Sequence
<220> FEATURE:
<223> OTHER INFORMATION: CG_119_VH

<400> SEQUENCE: 112

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Ala Thr Ser Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Tyr Pro Met Asp Tyr Trp Gly Gln
            100                 105                 110

Gly Thr Leu Val Thr Val Ser Ser
        115                 120

<210> SEQ ID NO 113
<211> LENGTH: 107
<212> TYPE: PRT
<213> ORGANISM: Artificial Sequence
<220> FEATURE:
<223> OTHER INFORMATION: CG_120_VL
```

<400> SEQUENCE: 113

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
            20                  25                  30

Leu Ser Trp Phe Gln Gln Lys Pro Gly Lys Val Pro Lys His Leu Ile
        35                  40                  45

Tyr Arg Ala Asn Arg Leu Val Ser Gly Val Pro Ser Arg Phe Ser Gly
50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 114
<211> LENGTH: 120
<212> TYPE: PRT
<213> ORGANISM: Artificial Sequence
<220> FEATURE:
<223> OTHER INFORMATION: CG_120_VH

<400> SEQUENCE: 114

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Leu Pro Asp Ser Gly Asp Thr Glu Tyr Ala Gln Lys Phe
50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Tyr Pro Met Asp Tyr Trp Gly Gln
            100                 105                 110

Gly Thr Leu Val Thr Val Ser Ser
        115                 120

<210> SEQ ID NO 115
<211> LENGTH: 107
<212> TYPE: PRT
<213> ORGANISM: Artificial Sequence
<220> FEATURE:
<223> OTHER INFORMATION: CG_121_VL

<400> SEQUENCE: 115

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
            20                  25                  30

Leu Ser Trp Phe Gln Gln Lys Pro Gly Lys Val Pro Lys His Leu Ile
        35                  40                  45

Tyr Arg Ala Asn Arg Leu Val Ser Gly Val Pro Ser Arg Phe Ser Gly
50                  55                  60

```
Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 116
<211> LENGTH: 120
<212> TYPE: PRT
<213> ORGANISM: Artificial Sequence
<220> FEATURE:
<223> OTHER INFORMATION: CG_121_VH

<400> SEQUENCE: 116

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
                20                  25                  30

Tyr Leu His Trp Val Arg Gln Ala Pro Gly Lys Gly Leu Glu Trp Met
            35                  40                  45

Gly Trp Ile Asp Pro Asp Leu Gly Asp Thr Ser Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
            100                 105                 110

Gly Thr Leu Val Thr Val Ser Ser
        115                 120

<210> SEQ ID NO 117
<211> LENGTH: 107
<212> TYPE: PRT
<213> ORGANISM: Artificial Sequence
<220> FEATURE:
<223> OTHER INFORMATION: CG_122_VL

<400> SEQUENCE: 117

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
                20                  25                  30

Leu Ser Trp Phe Gln Gln Lys Pro Gly Lys Val Pro Lys His Leu Ile
            35                  40                  45

Tyr Arg Ala Asn Arg Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 118
<211> LENGTH: 120
<212> TYPE: PRT
```

```
<213> ORGANISM: Artificial Sequence
<220> FEATURE:
<223> OTHER INFORMATION: CG_122_VH

<400> SEQUENCE: 118

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Leu Thr Glu Tyr Ala Gln Lys Phe
50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Asp Ser Ser Tyr Pro Met Asp Tyr Trp Gly Gln
                100                 105                 110

Gly Thr Leu Val Thr Val Ser Ser
        115                 120

<210> SEQ ID NO 119
<211> LENGTH: 107
<212> TYPE: PRT
<213> ORGANISM: Artificial Sequence
<220> FEATURE:
<223> OTHER INFORMATION: CG_123_VL

<400> SEQUENCE: 119

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
            20                  25                  30

Leu Ser Trp Phe Gln Gln Lys Pro Gly Lys Val Pro Lys His Leu Ile
        35                  40                  45

Tyr Arg Ala Asn Arg Leu Val Ser Gly Val Pro Ser Arg Phe Ser Gly
50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
                100                 105

<210> SEQ ID NO 120
<211> LENGTH: 120
<212> TYPE: PRT
<213> ORGANISM: Artificial Sequence
<220> FEATURE:
<223> OTHER INFORMATION: CG_123_VH

<400> SEQUENCE: 120

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45
```

```
Gly Trp Ile Asp Pro Asp Val Gly Asp Thr Glu Tyr Ala Gln Lys Phe
            50                  55                  60

Gln Gly Arg Val Thr Ile Thr Arg Asp Arg Ser Thr Ser Thr Ala Tyr
 65                  70                  75                  80

Met Glu Leu Arg Ser Leu Arg Ala Glu Asp Thr Ala Val Tyr Tyr Cys
                 85                  90                  95

Asn Ala Ala Tyr Gly Val Ser Ser Tyr Pro Met Asp Tyr Trp Gly Gln
                100                 105                 110

Gly Thr Leu Val Thr Val Ser Ser
            115                 120

<210> SEQ ID NO 121
<211> LENGTH: 107
<212> TYPE: PRT
<213> ORGANISM: Artificial Sequence
<220> FEATURE:
<223> OTHER INFORMATION: CG_124_VL

<400> SEQUENCE: 121

Asn Ile Gln Met Thr Gln Ser Pro Ser Ser Leu Ser Ala Ser Val Gly
 1               5                  10                  15

Asp Arg Val Thr Ile Thr Cys Arg Ala Ser Gln Asp Ile His Arg Tyr
                 20                  25                  30

Leu Ser Trp Phe Gln Gln Lys Pro Gly Lys Val Pro Lys His Leu Ile
            35                  40                  45

Tyr Arg Ala Asn Arg Leu Val Ser Gly Val Pro Ser Arg Phe Ser Gly
 50                  55                  60

Ser Gly Ser Gly Thr Glu Phe Thr Leu Thr Ile Ser Ser Leu Gln Pro
 65                  70                  75                  80

Glu Asp Phe Ala Thr Tyr Tyr Cys Leu Gln Tyr Asp Glu Phe Pro Tyr
                 85                  90                  95

Thr Phe Gly Gly Gly Thr Lys Val Glu Ile Lys
            100                 105

<210> SEQ ID NO 122
<211> LENGTH: 120
<212> TYPE: PRT
<213> ORGANISM: Artificial Sequence
<220> FEATURE:
<223> OTHER INFORMATION: CG_124_VH

<400> SEQUENCE: 122

Gln Met Gln Leu Val Gln Ser Gly Ala Glu Val Lys Lys Pro Gly Ser
 1               5                  10                  15

Ser Val Lys Val Ser Cys Lys Ala Ser Gly Phe Asn Ile Lys Asp Tyr
                 20                  25                  30

Tyr Leu His Trp Val Arg Gln Ala Pro Gly Lys Gly Leu Glu Trp Met
            35                  40                  45

Gly Trp Ile Asp Pro Asp Gln Gly Thr Thr Tyr Ala Gln Lys Phe
            50                  55                  60

Gln Gly Arg Val Thr Ile Thr Arg Asp Arg Ser Thr Ser Thr Ala Tyr
 65                  70                  75                  80

Met Glu Leu Arg Ser Leu Arg Ala Glu Asp Thr Ala Val Tyr Tyr Cys
                 85                  90                  95

Asn Ala Ala Tyr Gly Ser Ser Tyr Pro Met Asp Tyr Trp Gly Gln
                100                 105                 110

Gly Thr Leu Val Thr Val Ser Ser
```

```
            115                 120

<210> SEQ ID NO 123
<211> LENGTH: 107
<212> TYPE: PRT
<213> ORGANISM: Artificial Sequence
<220> FEATURE:
<223> OTHER INFORMATION: CG_125_VL

<400> SEQUENCE: 123

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
            20                  25                  30

Leu Ser Trp Phe Gln Gln Lys Pro Gly Lys Val Pro Lys His Leu Ile
        35                  40                  45

Tyr Arg Ala Asn Arg Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 124
<211> LENGTH: 120
<212> TYPE: PRT
<213> ORGANISM: Artificial Sequence
<220> FEATURE:
<223> OTHER INFORMATION: CG_125_VH

<400> SEQUENCE: 124

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Leu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Asp Ser Ser Tyr Pro Met Asp Tyr Trp Gly Gln
            100                 105                 110

Gly Thr Leu Val Thr Val Ser Ser
        115                 120

<210> SEQ ID NO 125
<211> LENGTH: 107
<212> TYPE: PRT
<213> ORGANISM: Artificial Sequence
<220> FEATURE:
<223> OTHER INFORMATION: CG_126_VL

<400> SEQUENCE: 125

Asn Ile Gln Met Thr Gln Ser Pro Ser Ser Leu Ser Ala Ser Val Gly
1               5                   10                  15
```

```
Asp Arg Val Thr Ile Thr Cys Arg Ala Ser Gln Asp Ile His Arg Tyr
            20                  25                  30

Leu Ser Trp Phe Gln Gln Lys Pro Gly Lys Val Pro Lys His Leu Ile
        35                  40                  45

Tyr Arg Ala Asn Arg Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
                100                 105

<210> SEQ ID NO 126
<211> LENGTH: 120
<212> TYPE: PRT
<213> ORGANISM: Artificial Sequence
<220> FEATURE:
<223> OTHER INFORMATION: CG_126_VH

<400> SEQUENCE: 126

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Leu Gly Asp Thr Tyr Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
                100                 105                 110

Gly Thr Leu Val Thr Val Ser Ser
        115                 120

<210> SEQ ID NO 127
<211> LENGTH: 107
<212> TYPE: PRT
<213> ORGANISM: Artificial Sequence
<220> FEATURE:
<223> OTHER INFORMATION: CG_127_VL

<400> SEQUENCE: 127

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
            20                  25                  30

Leu Ser Trp Phe Gln Gln Lys Pro Gly Lys Val Pro Lys His Leu Ile
        35                  40                  45

Tyr Arg Ala Asn Arg Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
```

```
                    85                  90                  95

Thr Phe Gly Gly Gly Thr Lys Val Glu Ile Lys
                100                 105

<210> SEQ ID NO 128
<211> LENGTH: 120
<212> TYPE: PRT
<213> ORGANISM: Artificial Sequence
<220> FEATURE:
<223> OTHER INFORMATION: CG_127_VH

<400> SEQUENCE: 128

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Val Tyr
                20                  25                  30

Tyr Leu His Trp Val Arg Gln Ala Pro Gly Lys Gly Leu Glu Trp Met
            35                  40                  45

Gly Trp Ile Asp Pro Asp Gln Gly Asp Thr Glu Tyr Ala Gln Lys Phe
        50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Tyr Ser Ser Tyr Pro Met Asp Tyr Trp Gly Gln
                100                 105                 110

Gly Thr Leu Val Thr Val Ser Ser
        115                 120

<210> SEQ ID NO 129
<211> LENGTH: 107
<212> TYPE: PRT
<213> ORGANISM: Artificial Sequence
<220> FEATURE:
<223> OTHER INFORMATION: CG_128_VL

<400> SEQUENCE: 129

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
                20                  25                  30

Leu Ser Trp Phe Gln Gln Lys Pro Gly Lys Val Pro Lys His Leu Ile
            35                  40                  45

Tyr Arg Ala Asn Arg Leu Val Ser Gly Val Pro Ser Arg Phe Ser Gly
        50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
                100                 105

<210> SEQ ID NO 130
<211> LENGTH: 120
<212> TYPE: PRT
<213> ORGANISM: Artificial Sequence
<220> FEATURE:
<223> OTHER INFORMATION: CG_128_VH

<400> SEQUENCE: 130
```

```
Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
                35                  40                  45

Gly Trp Ile Asp Pro Asp Gln Gly His Thr Glu Tyr Ala Gln Lys Phe
    50                  55                  60

Gln Gly Arg Val Thr Ile Thr Arg Asp Arg Ser Thr Ser Thr Ala Tyr
65              70                  75                  80

Met Glu Leu Arg Ser Leu Arg Ala Glu Asp Thr Ala Val Tyr Tyr Cys
                85                  90                  95

Asn Ala Ala Tyr Tyr Ser Ser Tyr Pro Met Asp Tyr Trp Gly Gln
                100                 105                 110

Gly Thr Leu Val Thr Val Ser Ser
        115                 120

<210> SEQ ID NO 131
<211> LENGTH: 107
<212> TYPE: PRT
<213> ORGANISM: Artificial Sequence
<220> FEATURE:
<223> OTHER INFORMATION: CG_129_VL

<400> SEQUENCE: 131

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
            20                  25                  30

Leu Ser Trp Phe Gln Gln Lys Pro Gly Lys Val Pro Lys His Leu Ile
                35                  40                  45

Tyr Arg Ala Asn Arg Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65              70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 132
<211> LENGTH: 120
<212> TYPE: PRT
<213> ORGANISM: Artificial Sequence
<220> FEATURE:
<223> OTHER INFORMATION: CG_129_VH

<400> SEQUENCE: 132

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
                35                  40                  45

Gly Trp Ile Asp Pro Asp Gln Gly Asp Thr Tyr Tyr Ala Gln Lys Phe
    50                  55                  60

Gln Gly Arg Val Thr Ile Thr Arg Asp Arg Ser Thr Ser Thr Ala Tyr
```

```
                65                  70                  75                  80
Met Glu Leu Arg Ser Leu Arg Ala Glu Asp Thr Ala Val Tyr Tyr Cys
                    85                  90                  95

Asn Ala Ala Tyr Gly Tyr Ser Ser Tyr Pro Met Asp Tyr Trp Gly Gln
                100                 105                 110

Gly Thr Leu Val Thr Val Ser Ser
            115                 120

<210> SEQ ID NO 133
<211> LENGTH: 107
<212> TYPE: PRT
<213> ORGANISM: Artificial Sequence
<220> FEATURE:
<223> OTHER INFORMATION: CG_130_VL

<400> SEQUENCE: 133

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
            20                  25                  30

Leu Ser Trp Phe Gln Gln Lys Pro Gly Lys Val Pro Lys His Leu Ile
        35                  40                  45

Tyr Arg Ala Asn Arg Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
                100                 105

<210> SEQ ID NO 134
<211> LENGTH: 120
<212> TYPE: PRT
<213> ORGANISM: Artificial Sequence
<220> FEATURE:
<223> OTHER INFORMATION: CG_130_VH

<400> SEQUENCE: 134

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Leu Val Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
                100                 105                 110

Gly Thr Leu Val Thr Val Ser Ser
            115                 120

<210> SEQ ID NO 135
<211> LENGTH: 107
```

```
<212> TYPE: PRT
<213> ORGANISM: Artificial Sequence
<220> FEATURE:
<223> OTHER INFORMATION: CG_131_VL

<400> SEQUENCE: 135

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
            20                  25                  30

Leu Ser Trp Phe Gln Gln Lys Pro Gly Lys Val Pro Lys His Leu Ile
        35                  40                  45

Tyr Arg Ala Asn Arg Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 136
<211> LENGTH: 120
<212> TYPE: PRT
<213> ORGANISM: Artificial Sequence
<220> FEATURE:
<223> OTHER INFORMATION: CG_131_VH

<400> SEQUENCE: 136

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Val Leu His Trp Val Arg Gln Ala Pro Gly Lys Gly Leu Glu Trp Met
        35                  40                  45

Gly Trp Ile Asp Pro Asp Leu Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
            100                 105                 110

Gly Thr Leu Val Thr Val Ser Ser
        115                 120

<210> SEQ ID NO 137
<211> LENGTH: 107
<212> TYPE: PRT
<213> ORGANISM: Artificial Sequence
<220> FEATURE:
<223> OTHER INFORMATION: CG_132_VL

<400> SEQUENCE: 137

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
            20                  25                  30

Leu Ser Trp Phe Gln Gln Lys Pro Gly Lys Val Pro Lys His Leu Ile
```

```
            35                  40                  45
Tyr Arg Ala Asn Arg Leu Val Ser Gly Val Pro Ser Arg Phe Ser Gly
        50                  55                  60
Ser Gly Ser Gly Thr Glu Phe Thr Leu Thr Ile Ser Ser Leu Gln Pro
 65                  70                  75                  80
Glu Asp Phe Ala Thr Tyr Tyr Cys Leu Gln Tyr Asp Glu Phe Pro Tyr
                85                  90                  95
Thr Phe Gly Gly Gly Thr Lys Val Glu Ile Lys
            100                 105

<210> SEQ ID NO 138
<211> LENGTH: 120
<212> TYPE: PRT
<213> ORGANISM: Artificial Sequence
<220> FEATURE:
<223> OTHER INFORMATION: CG_132_VH

<400> SEQUENCE: 138

Gln Met Gln Leu Val Gln Ser Gly Ala Glu Val Lys Lys Pro Gly Ser
  1               5                  10                  15
Ser Val Lys Val Ser Cys Lys Ala Ser Gly Phe Asn Ile Lys Asp Tyr
                20                  25                  30
Tyr Leu His Trp Val Arg Gln Ala Pro Gly Lys Gly Leu Glu Trp Met
            35                  40                  45
Gly Trp Ile Asp Pro Asp Glu Gly Leu Thr Glu Tyr Ala Gln Lys Phe
        50                  55                  60
Gln Gly Arg Val Thr Ile Thr Arg Asp Arg Ser Thr Ser Thr Ala Tyr
 65                  70                  75                  80
Met Glu Leu Arg Ser Leu Arg Ala Glu Asp Thr Ala Val Tyr Tyr Cys
                85                  90                  95
Asn Ala Ala Tyr Gly Ser Ser Tyr Pro Met Asp Tyr Trp Gly Gln
            100                 105                 110
Gly Thr Leu Val Thr Val Ser Ser
            115                 120

<210> SEQ ID NO 139
<211> LENGTH: 107
<212> TYPE: PRT
<213> ORGANISM: Artificial Sequence
<220> FEATURE:
<223> OTHER INFORMATION: CG_133_VL

<400> SEQUENCE: 139

Asn Ile Gln Met Thr Gln Ser Pro Ser Ser Leu Ser Ala Ser Val Gly
  1               5                  10                  15
Asp Arg Val Thr Ile Thr Cys Arg Ala Ser Gln Asp Ile His Arg Tyr
                20                  25                  30
Leu Ser Trp Phe Gln Gln Lys Pro Gly Lys Val Pro Lys His Leu Ile
            35                  40                  45
Tyr Arg Ala Asn Arg Leu Val Ser Gly Val Pro Ser Arg Phe Ser Gly
        50                  55                  60
Ser Gly Ser Gly Thr Glu Phe Thr Leu Thr Ile Ser Ser Leu Gln Pro
 65                  70                  75                  80
Glu Asp Phe Ala Thr Tyr Tyr Cys Leu Gln Tyr Asp Glu Phe Pro Tyr
                85                  90                  95
Thr Phe Gly Gly Gly Thr Lys Val Glu Ile Lys
            100                 105
```

```
<210> SEQ ID NO 140
<211> LENGTH: 120
<212> TYPE: PRT
<213> ORGANISM: Artificial Sequence
<220> FEATURE:
<223> OTHER INFORMATION: CG_133_VH

<400> SEQUENCE: 140

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Tyr Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Lys Ser Ser Tyr Pro Met Asp Tyr Trp Gly Gln
            100                 105                 110

Gly Thr Leu Val Thr Val Ser Ser
        115                 120

<210> SEQ ID NO 141
<211> LENGTH: 107
<212> TYPE: PRT
<213> ORGANISM: Artificial Sequence
<220> FEATURE:
<223> OTHER INFORMATION: CG_134_VL

<400> SEQUENCE: 141

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
            20                  25                  30

Leu Ser Trp Phe Gln Gln Lys Pro Gly Lys Val Pro Lys His Leu Ile
        35                  40                  45

Tyr Arg Ala Asn Arg Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 142
<211> LENGTH: 120
<212> TYPE: PRT
<213> ORGANISM: Artificial Sequence
<220> FEATURE:
<223> OTHER INFORMATION: CG_134_VH

<400> SEQUENCE: 142

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
```

```
                    20                  25                  30

Tyr Leu His Trp Val Arg Gln Ala Pro Gly Lys Gly Leu Glu Trp Met
            35                  40                  45

Gly Trp Ile Leu Pro Asp Gln Gly Asp Ser Glu Tyr Ala Gln Lys Phe
        50                  55                  60

Gln Gly Arg Val Thr Ile Thr Arg Asp Arg Ser Thr Ser Thr Ala Tyr
 65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
                100                 105                 110

Gly Thr Leu Val Thr Val Ser Ser
                115                 120

<210> SEQ ID NO 143
<211> LENGTH: 107
<212> TYPE: PRT
<213> ORGANISM: Artificial Sequence
<220> FEATURE:
<223> OTHER INFORMATION: CG_135_VL

<400> SEQUENCE: 143

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
                20                  25                  30

Leu Ser Trp Phe Gln Gln Lys Pro Gly Lys Val Pro Lys His Leu Ile
            35                  40                  45

Tyr Arg Ala Asn Arg Leu Val Ser Gly Val Pro Ser Arg Phe Ser Gly
        50                  55                  60

Ser Gly Ser Gly Thr Glu Phe Thr Leu Thr Ile Ser Ser Leu Gln Pro
 65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
                100                 105

<210> SEQ ID NO 144
<211> LENGTH: 120
<212> TYPE: PRT
<213> ORGANISM: Artificial Sequence
<220> FEATURE:
<223> OTHER INFORMATION: CG_135_VH

<400> SEQUENCE: 144

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
                20                  25                  30

Tyr Leu His Trp Val Arg Gln Ala Pro Gly Lys Gly Leu Glu Trp Met
            35                  40                  45

Gly Trp Ile Gln Pro Asp Gln Gly Asp Thr Ala Tyr Ala Gln Lys Phe
        50                  55                  60

Gln Gly Arg Val Thr Ile Thr Arg Asp Arg Ser Thr Ser Thr Ala Tyr
 65                  70                  75                  80

Met Glu Leu Arg Ser Leu Arg Ala Glu Asp Thr Ala Val Tyr Tyr Cys
                85                  90                  95
```

Asn Ala Ala Tyr Gly Ser Ser Tyr Pro Met Asp Tyr Trp Gly Gln
                100                 105                 110

Gly Thr Leu Val Thr Val Ser Ser
        115                 120

<210> SEQ ID NO 145
<211> LENGTH: 107
<212> TYPE: PRT
<213> ORGANISM: Artificial Sequence
<220> FEATURE:
<223> OTHER INFORMATION: CG_136_VL

<400> SEQUENCE: 145

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
            20                  25                  30

Leu Ser Trp Phe Gln Gln Lys Pro Gly Lys Val Pro Lys His Leu Ile
        35                  40                  45

Tyr Arg Ala Asn Arg Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 146
<211> LENGTH: 120
<212> TYPE: PRT
<213> ORGANISM: Artificial Sequence
<220> FEATURE:
<223> OTHER INFORMATION: CG_136_VH

<400> SEQUENCE: 146

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Leu Pro Asp Val Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Tyr Pro Met Asp Tyr Trp Gly Gln
            100                 105                 110

Gly Thr Leu Val Thr Val Ser Ser
        115                 120

<210> SEQ ID NO 147
<211> LENGTH: 107
<212> TYPE: PRT
<213> ORGANISM: Artificial Sequence
<220> FEATURE:
<223> OTHER INFORMATION: CG_137_VL

```
<400> SEQUENCE: 147

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
            20                  25                  30

Leu Ser Trp Phe Gln Gln Lys Pro Gly Lys Val Pro Lys His Leu Ile
        35                  40                  45

Tyr Arg Ala Asn Arg Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 148
<211> LENGTH: 120
<212> TYPE: PRT
<213> ORGANISM: Artificial Sequence
<220> FEATURE:
<223> OTHER INFORMATION: CG_137_VH

<400> SEQUENCE: 148

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Glu Tyr
            20                  25                  30

Tyr Leu His Trp Val Arg Gln Ala Pro Gly Lys Gly Leu Glu Trp Met
        35                  40                  45

Gly Trp Ile Asp Pro Asp Thr Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
            100                 105                 110

Gly Thr Leu Val Thr Val Ser Ser
        115                 120

<210> SEQ ID NO 149
<211> LENGTH: 107
<212> TYPE: PRT
<213> ORGANISM: Artificial Sequence
<220> FEATURE:
<223> OTHER INFORMATION: CG_138_VL

<400> SEQUENCE: 149

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
            20                  25                  30

Leu Ser Trp Phe Gln Gln Lys Pro Gly Lys Val Pro Lys His Leu Ile
        35                  40                  45

Tyr Arg Ala Asn Arg Leu Val Ser Gly Val Pro Ser Arg Phe Ser Gly
    50                  55                  60
```

```
Ser Gly Ser Gly Thr Glu Phe Thr Leu Thr Ile Ser Ser Leu Gln Pro
 65                  70                  75                  80

Glu Asp Phe Ala Thr Tyr Tyr Cys Leu Gln Tyr Asp Glu Phe Pro Tyr
                 85                  90                  95

Thr Phe Gly Gly Gly Thr Lys Val Glu Ile Lys
                100                 105
```

<210> SEQ ID NO 150
<211> LENGTH: 120
<212> TYPE: PRT
<213> ORGANISM: Artificial Sequence
<220> FEATURE:
<223> OTHER INFORMATION: CG_138_VH

<400> SEQUENCE: 150

```
Gln Met Gln Leu Val Gln Ser Gly Ala Glu Val Lys Lys Pro Gly Ser
 1               5                  10                  15

Ser Val Lys Val Ser Cys Lys Ala Ser Gly Phe Asn Ile Lys Asp Tyr
                20                  25                  30

Tyr Leu His Trp Val Arg Gln Ala Pro Gly Lys Gly Leu Glu Trp Met
             35                  40                  45

Gly Trp Ile Leu Pro Asp Gly Gly Asp Thr Glu Tyr Ala Gln Lys Phe
 50                  55                  60

Gln Gly Arg Val Thr Ile Thr Arg Asp Arg Ser Thr Ser Thr Ala Tyr
 65                  70                  75                  80

Met Glu Leu Arg Ser Leu Arg Ala Glu Asp Thr Ala Val Tyr Tyr Cys
                 85                  90                  95

Asn Ala Ala Tyr Gly Ser Ser Tyr Pro Met Asp Tyr Trp Gly Gln
                100                 105                 110

Gly Thr Leu Val Thr Val Ser Ser
            115                 120
```

<210> SEQ ID NO 151
<211> LENGTH: 107
<212> TYPE: PRT
<213> ORGANISM: Artificial Sequence
<220> FEATURE:
<223> OTHER INFORMATION: CG_139_VL

<400> SEQUENCE: 151

```
Asn Ile Gln Met Thr Gln Ser Pro Ser Ser Leu Ser Ala Ser Val Gly
 1               5                  10                  15

Asp Arg Val Thr Ile Thr Cys Arg Ala Ser Gln Asp Ile His Arg Tyr
                20                  25                  30

Leu Ser Trp Phe Gln Gln Lys Pro Gly Lys Val Pro Lys His Leu Ile
             35                  40                  45

Tyr Arg Ala Asn Arg Leu Val Ser Gly Val Pro Ser Arg Phe Ser Gly
     50                  55                  60

Ser Gly Ser Gly Thr Glu Phe Thr Leu Thr Ile Ser Ser Leu Gln Pro
 65                  70                  75                  80

Glu Asp Phe Ala Thr Tyr Tyr Cys Leu Gln Tyr Asp Glu Phe Pro Tyr
                 85                  90                  95

Thr Phe Gly Gly Gly Thr Lys Val Glu Ile Lys
                100                 105
```

<210> SEQ ID NO 152
<211> LENGTH: 120
<212> TYPE: PRT
<213> ORGANISM: Artificial Sequence

<220> FEATURE:
<223> OTHER INFORMATION: CG_139_VH

<400> SEQUENCE: 152

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Tyr Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Glu Ser Ser Tyr Pro Met Asp Tyr Trp Gly Gln
            100                 105                 110

Gly Thr Leu Val Thr Val Ser Ser
        115                 120

<210> SEQ ID NO 153
<211> LENGTH: 107
<212> TYPE: PRT
<213> ORGANISM: Artificial Sequence
<220> FEATURE:
<223> OTHER INFORMATION: CG_140_VL

<400> SEQUENCE: 153

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
            20                  25                  30

Leu Ser Trp Phe Gln Gln Lys Pro Gly Lys Val Pro Lys His Leu Ile
        35                  40                  45

Tyr Arg Ala Asn Arg Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 154
<211> LENGTH: 120
<212> TYPE: PRT
<213> ORGANISM: Artificial Sequence
<220> FEATURE:
<223> OTHER INFORMATION: CG_140_VH

<400> SEQUENCE: 154

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Tyr Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Val Ser Ser Tyr Pro Met Asp Tyr Trp Gly Gln
                100                 105                 110

Gly Thr Leu Val Thr Val Ser Ser
            115                 120

<210> SEQ ID NO 155
<211> LENGTH: 107
<212> TYPE: PRT
<213> ORGANISM: Artificial Sequence
<220> FEATURE:
<223> OTHER INFORMATION: CG_141_VL

<400> SEQUENCE: 155

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
                20                  25                  30

Leu Ser Trp Phe Gln Gln Lys Pro Gly Lys Val Pro Lys His Leu Ile
            35                  40                  45

Tyr Arg Ala Asn Arg Leu Val Ser Gly Val Pro Ser Arg Phe Ser Gly
        50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
                100                 105

<210> SEQ ID NO 156
<211> LENGTH: 120
<212> TYPE: PRT
<213> ORGANISM: Artificial Sequence
<220> FEATURE:
<223> OTHER INFORMATION: CG_141_VH

<400> SEQUENCE: 156

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
                20                  25                  30

Tyr Leu His Trp Val Arg Gln Ala Pro Gly Lys Gly Leu Glu Trp Met
            35                  40                  45

Gly Trp Ile Asp Pro Asp Gln Gly Asp Thr Glu Tyr Ala Gln Lys Phe
        50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Tyr Tyr Ser Ser Tyr Pro Met Asp Tyr Trp Gly Gln
                100                 105                 110

Gly Thr Leu Val Thr Val Ser Ser
            115                 120

<210> SEQ ID NO 157
<211> LENGTH: 107
<212> TYPE: PRT
<213> ORGANISM: Artificial Sequence
<220> FEATURE:
<223> OTHER INFORMATION: CG_142_VL

<400> SEQUENCE: 157

```
Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
            20                  25                  30

Leu Ser Trp Phe Gln Gln Lys Pro Gly Lys Val Pro Lys His Leu Ile
        35                  40                  45

Tyr Arg Ala Asn Tyr Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Gln Phe Pro Tyr
                85                  90                  95

Thr Phe Gly Gly Gly Thr Lys Val Glu Ile Lys
            100                 105
```

<210> SEQ ID NO 158
<211> LENGTH: 120
<212> TYPE: PRT
<213> ORGANISM: Artificial Sequence
<220> FEATURE:
<223> OTHER INFORMATION: CG_142_VH

<400> SEQUENCE: 158

```
Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
            100                 105                 110

Gly Thr Leu Val Thr Val Ser Ser
        115                 120
```

<210> SEQ ID NO 159
<211> LENGTH: 107
<212> TYPE: PRT
<213> ORGANISM: Artificial Sequence
<220> FEATURE:
<223> OTHER INFORMATION: CG_143_VL

<400> SEQUENCE: 159

```
Asn Ile Gln Met Thr Gln Ser Pro Ser Ser Leu Ser Ala Ser Val Gly
1               5                   10                  15
```

```
Asp Arg Val Thr Ile Thr Cys Arg Ala Ser Gln Asp Ile Gln Arg Tyr
            20                  25                  30

Leu Ser Trp Phe Gln Gln Lys Pro Gly Lys Val Pro Lys His Leu Ile
        35                  40                  45

Tyr Tyr Ala Asn Arg Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
                100                 105

<210> SEQ ID NO 160
<211> LENGTH: 120
<212> TYPE: PRT
<213> ORGANISM: Artificial Sequence
<220> FEATURE:
<223> OTHER INFORMATION: CG_143_VH

<400> SEQUENCE: 160

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Tyr Pro Met Asp Tyr Trp Gly Gln
                100                 105                 110

Gly Thr Leu Val Thr Val Ser Ser
        115                 120

<210> SEQ ID NO 161
<211> LENGTH: 107
<212> TYPE: PRT
<213> ORGANISM: Artificial Sequence
<220> FEATURE:
<223> OTHER INFORMATION: CG_144_VL

<400> SEQUENCE: 161

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile Ser Arg Tyr
            20                  25                  30

Leu Ser Trp Phe Gln Gln Lys Pro Gly Lys Val Pro Lys His Leu Ile
        35                  40                  45

Tyr Tyr Ala Asn Arg Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95
```

```
Thr Phe Gly Gly Gly Thr Lys Val Glu Ile Lys
            100                 105
```

<210> SEQ ID NO 162
<211> LENGTH: 120
<212> TYPE: PRT
<213> ORGANISM: Artificial Sequence
<220> FEATURE:
<223> OTHER INFORMATION: CG_144_VH

<400> SEQUENCE: 162

```
Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Tyr Pro Met Asp Tyr Trp Gly Gln
            100                 105                 110

Gly Thr Leu Val Thr Val Ser Ser
        115                 120
```

<210> SEQ ID NO 163
<211> LENGTH: 107
<212> TYPE: PRT
<213> ORGANISM: Artificial Sequence
<220> FEATURE:
<223> OTHER INFORMATION: CG_145_VL

<400> SEQUENCE: 163

```
Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
            20                  25                  30

Leu Ser Trp Phe Gln Gln Lys Pro Gly Lys Val Pro Lys His Leu Ile
        35                  40                  45

Tyr Arg Ala Asn Tyr Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp His Pro Tyr
                85                  90                  95

Thr Phe Gly Gly Gly Thr Lys Val Glu Ile Lys
            100                 105
```

<210> SEQ ID NO 164
<211> LENGTH: 120
<212> TYPE: PRT
<213> ORGANISM: Artificial Sequence
<220> FEATURE:
<223> OTHER INFORMATION: CG_145_VH

<400> SEQUENCE: 164

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
            35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
            100                 105                 110

Gly Thr Leu Val Thr Val Ser Ser
            115                 120

<210> SEQ ID NO 165
<211> LENGTH: 107
<212> TYPE: PRT
<213> ORGANISM: Artificial Sequence
<220> FEATURE:
<223> OTHER INFORMATION: CG_146_VL

<400> SEQUENCE: 165

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
            20                  25                  30

Leu Ser Trp Phe Gln Gln Lys Pro Gly Lys Val Pro Lys His Leu Ile
            35                  40                  45

Tyr Tyr Ala Asn Arg Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Tyr Glu Phe Pro Tyr
                85                  90                  95

Thr Phe Gly Gly Gly Thr Lys Val Glu Ile Lys
            100                 105

<210> SEQ ID NO 166
<211> LENGTH: 120
<212> TYPE: PRT
<213> ORGANISM: Artificial Sequence
<220> FEATURE:
<223> OTHER INFORMATION: CG_146_VH

<400> SEQUENCE: 166

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
            35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

```
Met Glu Leu Arg Ser Leu Arg Ala Glu Asp Thr Ala Val Tyr Tyr Cys
            85                  90                  95

Asn Ala Ala Tyr Gly Ser Ser Tyr Pro Met Asp Tyr Trp Gly Gln
        100                 105                 110

Gly Thr Leu Val Thr Val Ser Ser
        115                 120

<210> SEQ ID NO 167
<211> LENGTH: 107
<212> TYPE: PRT
<213> ORGANISM: Artificial Sequence
<220> FEATURE:
<223> OTHER INFORMATION: CG_147_VL

<400> SEQUENCE: 167

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile Ala Arg Tyr
            20                  25                  30

Leu Ser Trp Phe Gln Gln Lys Pro Gly Lys Val Pro Lys His Leu Ile
        35                  40                  45

Tyr Arg Ala Asn Arg Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Val Phe Pro Tyr
                85                  90                  95

Thr Phe Gly Gly Gly Thr Lys Val Glu Ile Lys
            100                 105

<210> SEQ ID NO 168
<211> LENGTH: 120
<212> TYPE: PRT
<213> ORGANISM: Artificial Sequence
<220> FEATURE:
<223> OTHER INFORMATION: CG_147_VH

<400> SEQUENCE: 168

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Tyr Pro Met Asp Tyr Trp Gly Gln
            100                 105                 110

Gly Thr Leu Val Thr Val Ser Ser
        115                 120

<210> SEQ ID NO 169
<211> LENGTH: 107
<212> TYPE: PRT
```

<213> ORGANISM: Artificial Sequence
<220> FEATURE:
<223> OTHER INFORMATION: CG_148_VL

<400> SEQUENCE: 169

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
            20                  25                  30

Leu Ser Trp Phe Gln Gln Lys Pro Gly Lys Val Pro Lys His Leu Ile
        35                  40                  45

Tyr Arg Ala Asn Tyr Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Leu Phe Pro Tyr
                85                  90                  95

Thr Phe Gly Gly Gly Thr Lys Val Glu Ile Lys
            100                 105

<210> SEQ ID NO 170
<211> LENGTH: 120
<212> TYPE: PRT
<213> ORGANISM: Artificial Sequenceq
<220> FEATURE:
<223> OTHER INFORMATION: CG_148_VH

<400> SEQUENCE: 170

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
            100                 105                 110

Gly Thr Leu Val Thr Val Ser Ser
        115                 120

<210> SEQ ID NO 171
<211> LENGTH: 107
<212> TYPE: PRT
<213> ORGANISM: Artificial Sequence
<220> FEATURE:
<223> OTHER INFORMATION: CG_149_VL

<400> SEQUENCE: 171

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
            20                  25                  30

Leu Ser Trp Phe Gln Gln Lys Pro Gly Lys Val Pro Lys His Leu Ile
        35                  40                  45

```
Tyr Arg Ala Asn Tyr Leu Val Ser Gly Val Pro Ser Arg Phe Ser Gly
        50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Gln Glu Phe Pro Tyr
                    85                  90                  95

Thr Phe Gly Gly Gly Thr Lys Val Glu Ile Lys
            100                 105
```

<210> SEQ ID NO 172
<211> LENGTH: 120
<212> TYPE: PRT
<213> ORGANISM: Artificial Sequence
<220> FEATURE:
<223> OTHER INFORMATION: CG_149_VH

<400> SEQUENCE: 172

```
Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
                20                  25                  30

Tyr Leu His Trp Val Arg Gln Ala Pro Gly Lys Gly Leu Glu Trp Met
            35                  40                  45

Gly Trp Ile Asp Pro Asp Gln Gly Asp Thr Tyr Ala Gln Lys Phe
        50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Tyr Pro Met Asp Tyr Trp Gly Gln
            100                 105                 110

Gly Thr Leu Val Thr Val Ser Ser
        115                 120
```

<210> SEQ ID NO 173
<211> LENGTH: 107
<212> TYPE: PRT
<213> ORGANISM: Artificial Sequence
<220> FEATURE:
<223> OTHER INFORMATION: CG_150_VL

<400> SEQUENCE: 173

```
Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile Tyr Tyr Tyr
                20                  25                  30

Leu Ser Trp Phe Gln Gln Lys Pro Gly Lys Val Pro Lys His Leu Ile
            35                  40                  45

Tyr Arg Ala Asn Arg Leu Val Ser Gly Val Pro Ser Arg Phe Ser Gly
        50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                    85                  90                  95

Thr Phe Gly Gly Gly Thr Lys Val Glu Ile Lys
            100                 105
```

-continued

```
<210> SEQ ID NO 174
<211> LENGTH: 120
<212> TYPE: PRT
<213> ORGANISM: Artificial Sequence
<220> FEATURE:
<223> OTHER INFORMATION: CG_150_VH

<400> SEQUENCE: 174
```

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Tyr Pro Met Asp Tyr Trp Gly Gln
            100                 105                 110

Gly Thr Leu Val Thr Val Ser Ser
        115                 120

```
<210> SEQ ID NO 175
<211> LENGTH: 107
<212> TYPE: PRT
<213> ORGANISM: Artificial Sequence
<220> FEATURE:
<223> OTHER INFORMATION: CG_151_VL

<400> SEQUENCE: 175
```

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
            20                  25                  30

Leu Ser Trp Phe Gln Gln Lys Pro Gly Lys Val Pro Lys His Leu Ile
        35                  40                  45

Tyr Arg Ala Asn Tyr Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Val Glu Phe Pro Tyr
                85                  90                  95

Thr Phe Gly Gly Gly Thr Lys Val Glu Ile Lys
            100                 105

```
<210> SEQ ID NO 176
<211> LENGTH: 120
<212> TYPE: PRT
<213> ORGANISM: Artificial Sequence
<220> FEATURE:
<223> OTHER INFORMATION: CG_151_VH

<400> SEQUENCE: 176
```

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
            35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
            100                 105                 110

Gly Thr Leu Val Thr Val Ser Ser
            115                 120

<210> SEQ ID NO 177
<211> LENGTH: 107
<212> TYPE: PRT
<213> ORGANISM: Artificial Sequence
<220> FEATURE:
<223> OTHER INFORMATION: CG_152_VL

<400> SEQUENCE: 177

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
            20                  25                  30

Leu Ser Trp Phe Gln Gln Lys Pro Gly Lys Val Pro Lys His Leu Ile
            35                  40                  45

Tyr Tyr Ala Asn Arg Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr His Glu Phe Pro Tyr
                85                  90                  95

Thr Phe Gly Gly Gly Thr Lys Val Glu Ile Lys
            100                 105

<210> SEQ ID NO 178
<211> LENGTH: 120
<212> TYPE: PRT
<213> ORGANISM: Artificial Sequence
<220> FEATURE:
<223> OTHER INFORMATION: CG_152_VH

<400> SEQUENCE: 178

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
            35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln

-continued

```
                      100                 105                 110

Gly Thr Leu Val Thr Val Ser Ser
            115                 120

<210> SEQ ID NO 179
<211> LENGTH: 107
<212> TYPE: PRT
<213> ORGANISM: Artificial Sequence
<220> FEATURE:
<223> OTHER INFORMATION: CG_153_VL

<400> SEQUENCE: 179

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile Glu Arg Tyr
            20                  25                  30

Leu Ser Trp Phe Gln Gln Lys Pro Gly Lys Val Pro Lys His Leu Ile
        35                  40                  45

Tyr Tyr Ala Asn Arg Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 180
<211> LENGTH: 120
<212> TYPE: PRT
<213> ORGANISM: Artificial Sequence
<220> FEATURE:
<223> OTHER INFORMATION: CG_153_VH

<400> SEQUENCE: 180

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
            100                 105                 110

Gly Thr Leu Val Thr Val Ser Ser
            115                 120

<210> SEQ ID NO 181
<211> LENGTH: 107
<212> TYPE: PRT
<213> ORGANISM: Artificial Sequence
<220> FEATURE:
<223> OTHER INFORMATION: CG_154_VL

<400> SEQUENCE: 181
```

-continued

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
            20                  25                  30

Leu Ser Trp Phe Gln Gln Lys Pro Gly Lys Val Pro Lys His Leu Ile
        35                  40                  45

Tyr Arg Ala Asn Tyr Leu Val Ser Gly Val Pro Ser Arg Phe Ser Gly
50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Lys Phe Pro Tyr
                85                  90                  95

Thr Phe Gly Gly Gly Thr Lys Val Glu Ile Lys
            100                 105

<210> SEQ ID NO 182
<211> LENGTH: 120
<212> TYPE: PRT
<213> ORGANISM: Artificial Sequence
<220> FEATURE:
<223> OTHER INFORMATION: CG_154_VH

<400> SEQUENCE: 182

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Tyr Pro Met Asp Tyr Trp Gly Gln
            100                 105                 110

Gly Thr Leu Val Thr Val Ser Ser
        115                 120

<210> SEQ ID NO 183
<211> LENGTH: 107
<212> TYPE: PRT
<213> ORGANISM: Artificial Sequence
<220> FEATURE:
<223> OTHER INFORMATION: CG_155_VL

<400> SEQUENCE: 183

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile Tyr Thr Tyr
            20                  25                  30

Leu Ser Trp Phe Gln Gln Lys Pro Gly Lys Val Pro Lys His Leu Ile
        35                  40                  45

Tyr Arg Ala Asn Arg Leu Val Ser Gly Val Pro Ser Arg Phe Ser Gly
50                  55                  60

Ser Gly Ser Gly Thr Glu Phe Thr Leu Thr Ile Ser Ser Leu Gln Pro

```
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 184
<211> LENGTH: 120
<212> TYPE: PRT
<213> ORGANISM: Artificial Sequence
<220> FEATURE:
<223> OTHER INFORMATION: CG_155_VH

<400> SEQUENCE: 184

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
                20                  25                  30

Tyr Leu His Trp Val Arg Gln Ala Pro Gly Lys Gly Leu Glu Trp Met
            35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
            100                 105                 110

Gly Thr Leu Val Thr Val Ser Ser
        115                 120

<210> SEQ ID NO 185
<211> LENGTH: 107
<212> TYPE: PRT
<213> ORGANISM: Artificial Sequence
<220> FEATURE:
<223> OTHER INFORMATION: CG_156_VL

<400> SEQUENCE: 185

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile Leu Arg Tyr
                20                  25                  30

Leu Ser Trp Phe Gln Gln Lys Pro Gly Lys Val Pro Lys His Leu Ile
            35                  40                  45

Tyr Tyr Ala Asn Arg Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 186
<211> LENGTH: 120
<212> TYPE: PRT
<213> ORGANISM: Artificial Sequence
<220> FEATURE:
```

<223> OTHER INFORMATION: CG_156_VH

<400> SEQUENCE: 186

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
            100                 105                 110

Gly Thr Leu Val Thr Val Ser Ser
        115                 120

<210> SEQ ID NO 187
<211> LENGTH: 107
<212> TYPE: PRT
<213> ORGANISM: Artificial Sequence
<220> FEATURE:
<223> OTHER INFORMATION: CG_157_VL

<400> SEQUENCE: 187

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile Thr Arg Tyr
            20                  25                  30

Leu Ser Trp Phe Gln Gln Lys Pro Gly Lys Val Pro Lys His Leu Ile
        35                  40                  45

Tyr Tyr Ala Asn Arg Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 188
<211> LENGTH: 120
<212> TYPE: PRT
<213> ORGANISM: Artificial Sequence
<220> FEATURE:
<223> OTHER INFORMATION: CG_157_VH

<400> SEQUENCE: 188

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Glu Tyr Ala Gln Lys Phe

```
                50                  55                  60
Gln Gly Arg Val Thr Ile Thr Arg Asp Arg Ser Thr Ser Thr Ala Tyr
 65                  70                  75                  80

Met Glu Leu Arg Ser Leu Arg Ala Glu Asp Thr Ala Val Tyr Tyr Cys
                 85                  90                  95

Asn Ala Ala Tyr Gly Ser Ser Tyr Pro Met Asp Tyr Trp Gly Gln
                100                 105                 110

Gly Thr Leu Val Thr Val Ser Ser
        115                 120

<210> SEQ ID NO 189
<211> LENGTH: 107
<212> TYPE: PRT
<213> ORGANISM: Artificial Sequence
<220> FEATURE:
<223> OTHER INFORMATION: CG_158_VL

<400> SEQUENCE: 189

Asn Ile Gln Met Thr Gln Ser Pro Ser Ser Leu Ser Ala Ser Val Gly
  1               5                  10                  15

Asp Arg Val Thr Ile Thr Cys Arg Ala Ser Gln Asp Ile Asp Arg Tyr
                 20                  25                  30

Leu Ser Trp Phe Gln Gln Lys Pro Gly Lys Val Pro Lys His Leu Ile
             35                  40                  45

Tyr Arg Ala Asn Arg Leu Val Ser Gly Val Pro Ser Arg Phe Ser Gly
 50                  55                  60

Ser Gly Ser Gly Thr Glu Phe Thr Leu Thr Ile Ser Ser Leu Gln Pro
 65                  70                  75                  80

Glu Asp Phe Ala Thr Tyr Tyr Cys Leu Gln Tyr Asp Leu Phe Pro Tyr
                 85                  90                  95

Thr Phe Gly Gly Gly Thr Lys Val Glu Ile Lys
                100                 105

<210> SEQ ID NO 190
<211> LENGTH: 120
<212> TYPE: PRT
<213> ORGANISM: Artificial Sequence
<220> FEATURE:
<223> OTHER INFORMATION: CG_158_VH

<400> SEQUENCE: 190

Gln Met Gln Leu Val Gln Ser Gly Ala Glu Val Lys Lys Pro Gly Ser
  1               5                  10                  15

Ser Val Lys Val Ser Cys Lys Ala Ser Gly Phe Asn Ile Lys Asp Tyr
                 20                  25                  30

Tyr Leu His Trp Val Arg Gln Ala Pro Gly Lys Gly Leu Glu Trp Met
             35                  40                  45

Gly Trp Ile Asp Pro Asp Gln Gly Asp Thr Glu Tyr Ala Gln Lys Phe
 50                  55                  60

Gln Gly Arg Val Thr Ile Thr Arg Asp Arg Ser Thr Ser Thr Ala Tyr
 65                  70                  75                  80

Met Glu Leu Arg Ser Leu Arg Ala Glu Asp Thr Ala Val Tyr Tyr Cys
                 85                  90                  95

Asn Ala Ala Tyr Gly Ser Ser Tyr Pro Met Asp Tyr Trp Gly Gln
                100                 105                 110

Gly Thr Leu Val Thr Val Ser Ser
        115                 120
```

<210> SEQ ID NO 191
<211> LENGTH: 107
<212> TYPE: PRT
<213> ORGANISM: Artificial Sequence
<220> FEATURE:
<223> OTHER INFORMATION: CG_159_VL

<400> SEQUENCE: 191

```
Asn Ile Gln Met Thr Gln Ser Pro Ser Leu Ser Ala Ser Val Gly
1               5                   10                  15

Asp Arg Val Thr Ile Thr Cys Arg Ala Ser Gln Asp Ile His Val Tyr
                20                  25                  30

Leu Ser Trp Phe Gln Gln Lys Pro Gly Lys Val Pro Lys His Leu Ile
            35                  40                  45

Tyr Arg Ala Asn Arg Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Tyr Glu Phe Pro Tyr
                85                  90                  95

Thr Phe Gly Gly Gly Thr Lys Val Glu Ile Lys
            100                 105
```

<210> SEQ ID NO 192
<211> LENGTH: 120
<212> TYPE: PRT
<213> ORGANISM: Artificial Sequence
<220> FEATURE:
<223> OTHER INFORMATION: CG_159_VH

<400> SEQUENCE: 192

```
Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
                20                  25                  30

Tyr Leu His Trp Val Arg Gln Ala Pro Gly Lys Gly Leu Glu Trp Met
            35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
            100                 105                 110

Gly Thr Leu Val Thr Val Ser Ser
        115                 120
```

<210> SEQ ID NO 193
<211> LENGTH: 107
<212> TYPE: PRT
<213> ORGANISM: Artificial Sequence
<220> FEATURE:
<223> OTHER INFORMATION: CG_160_VL

<400> SEQUENCE: 193

```
Asn Ile Gln Met Thr Gln Ser Pro Ser Leu Ser Ala Ser Val Gly
1               5                   10                  15

Asp Arg Val Thr Ile Thr Cys Arg Ala Ser Gln Asp Ile His Arg Tyr
```

```
                    20                  25                  30

Leu Ser Trp Phe Gln Gln Lys Pro Gly Lys Val Pro Lys His Leu Ile
        35                  40                  45

Tyr Arg Ala Asn Tyr Leu Val Ser Gly Val Pro Ser Arg Phe Ser Gly
 50                  55                  60

Ser Gly Ser Gly Thr Glu Phe Thr Leu Thr Ile Ser Ser Leu Gln Pro
 65                  70                  75                  80

Glu Asp Phe Ala Thr Tyr Tyr Cys Leu Gln Tyr Ala Glu Phe Pro Tyr
                    85                  90                  95

Thr Phe Gly Gly Gly Thr Lys Val Glu Ile Lys
                100                 105

<210> SEQ ID NO 194
<211> LENGTH: 120
<212> TYPE: PRT
<213> ORGANISM: Artificial Sequence
<220> FEATURE:
<223> OTHER INFORMATION: CG_160_VH

<400> SEQUENCE: 194

Gln Met Gln Leu Val Gln Ser Gly Ala Glu Val Lys Lys Pro Gly Ser
1                5                  10                  15

Ser Val Lys Val Ser Cys Lys Ala Ser Gly Phe Asn Ile Lys Asp Tyr
                20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Glu Tyr Ala Gln Lys Phe
 50                  55                  60

Gln Gly Arg Val Thr Ile Thr Arg Asp Arg Ser Thr Ser Thr Ala Tyr
 65                  70                  75                  80

Met Glu Leu Arg Ser Leu Arg Ala Glu Asp Thr Ala Val Tyr Tyr Cys
                    85                  90                  95

Asn Ala Ala Tyr Gly Ser Ser Ser Tyr Pro Met Asp Tyr Trp Gly Gln
                100                 105                 110

Gly Thr Leu Val Thr Val Ser Ser
        115                 120

<210> SEQ ID NO 195
<211> LENGTH: 107
<212> TYPE: PRT
<213> ORGANISM: Artificial Sequence
<220> FEATURE:
<223> OTHER INFORMATION: CG_161_VL

<400> SEQUENCE: 195

Asn Ile Gln Met Thr Gln Ser Pro Ser Ser Leu Ser Ala Ser Val Gly
1                5                  10                  15

Asp Arg Val Thr Ile Thr Cys Arg Ala Ser Gln Asp Ile Leu Thr Tyr
                20                  25                  30

Leu Ser Trp Phe Gln Gln Lys Pro Gly Lys Val Pro Lys His Leu Ile
        35                  40                  45

Tyr Arg Ala Asn Arg Leu Val Ser Gly Val Pro Ser Arg Phe Ser Gly
 50                  55                  60

Ser Gly Ser Gly Thr Glu Phe Thr Leu Thr Ile Ser Ser Leu Gln Pro
 65                  70                  75                  80

Glu Asp Phe Ala Thr Tyr Tyr Cys Leu Gln Tyr Asp Glu Phe Pro Tyr
                    85                  90                  95
```

```
Thr Phe Gly Gly Gly Thr Lys Val Glu Ile Lys
            100                 105
```

<210> SEQ ID NO 196
<211> LENGTH: 120
<212> TYPE: PRT
<213> ORGANISM: Artificial Sequence
<220> FEATURE:
<223> OTHER INFORMATION: CG_161_VH

<400> SEQUENCE: 196

```
Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Tyr Pro Met Asp Tyr Trp Gly Gln
            100                 105                 110

Gly Thr Leu Val Thr Val Ser Ser
        115                 120
```

<210> SEQ ID NO 197
<211> LENGTH: 107
<212> TYPE: PRT
<213> ORGANISM: Artificial Sequence
<220> FEATURE:
<223> OTHER INFORMATION: CG_162_VL

<400> SEQUENCE: 197

```
Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile Ala Arg Tyr
            20                  25                  30

Leu Ser Trp Phe Gln Gln Lys Pro Gly Lys Val Pro Lys His Leu Ile
        35                  40                  45

Tyr Tyr Ala Asn Arg Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105
```

<210> SEQ ID NO 198
<211> LENGTH: 120
<212> TYPE: PRT
<213> ORGANISM: Artificial Sequence
<220> FEATURE:
<223> OTHER INFORMATION: CG_162_VH

<400> SEQUENCE: 198

```
Gln Met Gln Leu Val Gln Ser Gly Ala Glu Val Lys Lys Pro Gly Ser
```

```
1               5                   10                  15
Ser Val Lys Val Ser Cys Lys Ala Ser Gly Phe Asn Ile Lys Asp Tyr
                20                  25                  30

Tyr Leu His Trp Val Arg Gln Ala Pro Gly Lys Gly Leu Glu Trp Met
            35                  40                  45

Gly Trp Ile Asp Pro Asp Gln Gly Asp Thr Glu Tyr Ala Gln Lys Phe
        50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Tyr Pro Met Asp Tyr Trp Gly Gln
                100                 105                 110

Gly Thr Leu Val Thr Val Ser Ser
            115                 120

<210> SEQ ID NO 199
<211> LENGTH: 107
<212> TYPE: PRT
<213> ORGANISM: Artificial Sequence
<220> FEATURE:
<223> OTHER INFORMATION: CG_163_VL

<400> SEQUENCE: 199

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile Val Thr Tyr
                20                  25                  30

Leu Ser Trp Phe Gln Gln Lys Pro Gly Lys Val Pro Lys His Leu Ile
            35                  40                  45

Tyr Arg Ala Asn Arg Leu Val Ser Gly Val Pro Ser Arg Phe Ser Gly
        50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 200
<211> LENGTH: 120
<212> TYPE: PRT
<213> ORGANISM: Artificial Sequence
<220> FEATURE:
<223> OTHER INFORMATION: CG_163_VH

<400> SEQUENCE: 200

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
                20                  25                  30

Tyr Leu His Trp Val Arg Gln Ala Pro Gly Lys Gly Leu Glu Trp Met
            35                  40                  45

Gly Trp Ile Asp Pro Asp Gln Gly Asp Thr Glu Tyr Ala Gln Lys Phe
        50                  55                  60

Gln Gly Arg Val Thr Ile Thr Arg Asp Arg Ser Thr Ser Thr Ala Tyr
65                  70                  75                  80
```

Met Glu Leu Arg Ser Leu Arg Ala Glu Asp Thr Ala Val Tyr Tyr Cys
            85                  90                  95

Asn Ala Ala Tyr Gly Ser Ser Tyr Pro Met Asp Tyr Trp Gly Gln
        100                 105                 110

Gly Thr Leu Val Thr Val Ser Ser
        115                 120

<210> SEQ ID NO 201
<211> LENGTH: 107
<212> TYPE: PRT
<213> ORGANISM: Artificial Sequence
<220> FEATURE:
<223> OTHER INFORMATION: CG_164_VL

<400> SEQUENCE: 201

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile Leu Glu Tyr
            20                  25                  30

Leu Ser Trp Phe Gln Gln Lys Pro Gly Lys Val Pro Lys His Leu Ile
        35                  40                  45

Tyr Arg Ala Asn Arg Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
            85                  90                  95

Thr Phe Gly Gly Gly Thr Lys Val Glu Ile Lys
        100                 105

<210> SEQ ID NO 202
<211> LENGTH: 120
<212> TYPE: PRT
<213> ORGANISM: Artificial Sequence
<220> FEATURE:
<223> OTHER INFORMATION: CG_164_VH

<400> SEQUENCE: 202

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
            85                  90                  95

Asn Ala Ala Tyr Gly Ser Ser Tyr Pro Met Asp Tyr Trp Gly Gln
        100                 105                 110

Gly Thr Leu Val Thr Val Ser Ser
        115                 120

<210> SEQ ID NO 203
<211> LENGTH: 107
<212> TYPE: PRT
<213> ORGANISM: Artificial Sequence

<220> FEATURE:
<223> OTHER INFORMATION: CG_165_VL

<400> SEQUENCE: 203

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
            20                  25                  30

Leu Ser Trp Phe Gln Gln Lys Pro Gly Lys Val Pro Lys His Leu Ile
        35                  40                  45

Tyr Arg Ala Asn Tyr Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Tyr Glu Phe Pro Tyr
                85                  90                  95

Thr Phe Gly Gly Gly Thr Lys Val Glu Ile Lys
            100                 105

<210> SEQ ID NO 204
<211> LENGTH: 120
<212> TYPE: PRT
<213> ORGANISM: Artificial Sequence
<220> FEATURE:
<223> OTHER INFORMATION: CG_165_VH

<400> SEQUENCE: 204

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Tyr Pro Met Asp Tyr Trp Gly Gln
            100                 105                 110

Gly Thr Leu Val Thr Val Ser Ser
        115                 120

<210> SEQ ID NO 205
<211> LENGTH: 107
<212> TYPE: PRT
<213> ORGANISM: Artificial Sequence
<220> FEATURE:
<223> OTHER INFORMATION: CG_166_VL

<400> SEQUENCE: 205

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
            20                  25                  30

Leu Ser Trp Phe Gln Gln Lys Pro Gly Lys Val Pro Lys His Leu Ile
        35                  40                  45

-continued

Tyr Tyr Ala Asn Arg Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Val Phe Pro Tyr
                85                  90                  95

Thr Phe Gly Gly Gly Thr Lys Val Glu Ile Lys
                100                 105

<210> SEQ ID NO 206
<211> LENGTH: 120
<212> TYPE: PRT
<213> ORGANISM: Artificial Sequence
<220> FEATURE:
<223> OTHER INFORMATION: CG_166_VH

<400> SEQUENCE: 206

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
                20                  25                  30

Tyr Leu His Trp Val Arg Gln Ala Pro Gly Lys Gly Leu Glu Trp Met
            35                  40                  45

Gly Trp Ile Asp Pro Asp Gln Gly Asp Thr Glu Tyr Ala Gln Lys Phe
        50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
                100                 105                 110

Gly Thr Leu Val Thr Val Ser Ser
            115                 120

<210> SEQ ID NO 207
<211> LENGTH: 107
<212> TYPE: PRT
<213> ORGANISM: Artificial Sequence
<220> FEATURE:
<223> OTHER INFORMATION: CG_167_VL

<400> SEQUENCE: 207

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile Leu Val Tyr
                20                  25                  30

Leu Ser Trp Phe Gln Gln Lys Pro Gly Lys Val Pro Lys His Leu Ile
            35                  40                  45

Tyr Arg Ala Asn Arg Leu Val Ser Gly Val Pro Ser Arg Phe Ser Gly
        50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
                100                 105

<210> SEQ ID NO 208

<211> LENGTH: 120
<212> TYPE: PRT
<213> ORGANISM: Artificial Sequence
<220> FEATURE:
<223> OTHER INFORMATION: CG_167_VH

<400> SEQUENCE: 208

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Tyr Pro Met Asp Tyr Trp Gly Gln
            100                 105                 110

Gly Thr Leu Val Thr Val Ser Ser
        115                 120

<210> SEQ ID NO 209
<211> LENGTH: 107
<212> TYPE: PRT
<213> ORGANISM: Artificial Sequence
<220> FEATURE:
<223> OTHER INFORMATION: CG_168_VL

<400> SEQUENCE: 209

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
            20                  25                  30

Leu Ser Trp Phe Gln Gln Lys Pro Gly Lys Val Pro Lys His Leu Ile
        35                  40                  45

Tyr Arg Ala Asn Arg Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Ala Glu Phe Pro Tyr
                85                  90                  95

Thr Phe Gly Gly Gly Thr Lys Val Glu Ile Lys
            100                 105

<210> SEQ ID NO 210
<211> LENGTH: 120
<212> TYPE: PRT
<213> ORGANISM: Artificial Sequence
<220> FEATURE:
<223> OTHER INFORMATION: CG_168_VH

<400> SEQUENCE: 210

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

```
Tyr Leu His Trp Val Arg Gln Ala Pro Gly Lys Gly Leu Glu Trp Met
        35                  40                  45

Gly Trp Ile Asp Pro Asp Gln Gly Asp Thr Glu Tyr Ala Gln Lys Phe
 50                  55                  60

Gln Gly Arg Val Thr Ile Thr Arg Asp Arg Ser Thr Ser Thr Ala Tyr
 65                  70                  75                  80

Met Glu Leu Arg Ser Leu Arg Ala Glu Asp Thr Ala Val Tyr Tyr Cys
                 85                  90                  95

Asn Ala Ala Tyr Gly Ser Ser Tyr Pro Met Asp Tyr Trp Gly Gln
                100                 105                 110

Gly Thr Leu Val Thr Val Ser Ser
                115                 120
```

```
<210> SEQ ID NO 211
<211> LENGTH: 107
<212> TYPE: PRT
<213> ORGANISM: Artificial Sequence
<220> FEATURE:
<223> OTHER INFORMATION: CG_169_VL

<400> SEQUENCE: 211

Asn Ile Gln Met Thr Gln Ser Pro Ser Ser Leu Ser Ala Ser Val Gly
 1               5                  10                  15

Asp Arg Val Thr Ile Thr Cys Arg Ala Ser Gln Asp Ile His Arg Tyr
             20                  25                  30

Leu Ser Trp Phe Gln Gln Lys Pro Gly Lys Val Pro Lys His Leu Ile
         35                  40                  45

Tyr Arg Ala Asn Arg Leu Val Ser Gly Val Pro Ser Arg Phe Ser Gly
 50                  55                  60

Ser Gly Ser Gly Thr Glu Phe Thr Leu Thr Ile Ser Ser Leu Gln Pro
 65                  70                  75                  80

Glu Asp Phe Ala Thr Tyr Tyr Cys Leu Gln Tyr Gln Glu Phe Pro Tyr
                 85                  90                  95

Thr Phe Gly Gly Gly Thr Lys Val Glu Ile Lys
                100                 105
```

```
<210> SEQ ID NO 212
<211> LENGTH: 120
<212> TYPE: PRT
<213> ORGANISM: Artificial Sequence
<220> FEATURE:
<223> OTHER INFORMATION: CG_169_VH

<400> SEQUENCE: 212

Gln Met Gln Leu Val Gln Ser Gly Ala Glu Val Lys Lys Pro Gly Ser
 1               5                  10                  15

Ser Val Lys Val Ser Cys Lys Ala Ser Gly Phe Asn Ile Lys Asp Tyr
             20                  25                  30

Tyr Leu His Trp Val Arg Gln Ala Pro Gly Lys Gly Leu Glu Trp Met
         35                  40                  45

Gly Trp Ile Asp Pro Asp Gln Gly Asp Thr Glu Tyr Ala Gln Lys Phe
 50                  55                  60

Gln Gly Arg Val Thr Ile Thr Arg Asp Arg Ser Thr Ser Thr Ala Tyr
 65                  70                  75                  80

Met Glu Leu Arg Ser Leu Arg Ala Glu Asp Thr Ala Val Tyr Tyr Cys
                 85                  90                  95

Asn Ala Ala Tyr Gly Ser Ser Tyr Pro Met Asp Tyr Trp Gly Gln
                100                 105                 110
```

Gly Thr Leu Val Thr Val Ser Ser
        115                 120

<210> SEQ ID NO 213
<211> LENGTH: 107
<212> TYPE: PRT
<213> ORGANISM: Artificial Sequence
<220> FEATURE:
<223> OTHER INFORMATION: CG_170_VL

<400> SEQUENCE: 213

Asn Ile Gln Met Thr Gln Ser Pro Ser Leu Ser Ala Ser Val Gly
1               5                   10                  15

Asp Arg Val Thr Ile Thr Cys Arg Ala Ser Gln Asp Ile His Arg Tyr
            20                  25                  30

Leu Ser Trp Phe Gln Gln Lys Pro Gly Lys Val Pro Lys His Leu Ile
        35                  40                  45

Tyr Arg Ala Asn Arg Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Glu Glu Phe Pro Tyr
                85                  90                  95

Thr Phe Gly Gly Gly Thr Lys Val Glu Ile Lys
            100                 105

<210> SEQ ID NO 214
<211> LENGTH: 120
<212> TYPE: PRT
<213> ORGANISM: Artificial Sequence
<220> FEATURE:
<223> OTHER INFORMATION: CG_170_VH

<400> SEQUENCE: 214

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
            100                 105                 110

Gly Thr Leu Val Thr Val Ser Ser
        115                 120

<210> SEQ ID NO 215
<211> LENGTH: 107
<212> TYPE: PRT
<213> ORGANISM: Artificial Sequence
<220> FEATURE:
<223> OTHER INFORMATION: CG_171_VL

<400> SEQUENCE: 215

```
Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Asp Tyr
            20                  25                  30

Leu Ser Trp Phe Gln Gln Lys Pro Gly Lys Val Pro Lys His Leu Ile
        35                  40                  45

Tyr Arg Ala Asn Ile Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105
```

<210> SEQ ID NO 216
<211> LENGTH: 120
<212> TYPE: PRT
<213> ORGANISM: Artificial Sequence
<220> FEATURE:
<223> OTHER INFORMATION: CG_171_VH

<400> SEQUENCE: 216

```
Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Tyr Pro Met Asp Tyr Trp Gly Gln
            100                 105                 110

Gly Thr Leu Val Thr Val Ser Ser
        115                 120
```

<210> SEQ ID NO 217
<211> LENGTH: 107
<212> TYPE: PRT
<213> ORGANISM: Artificial Sequence
<220> FEATURE:
<223> OTHER INFORMATION: CG_172_VL

<400> SEQUENCE: 217

```
Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Asp Tyr
            20                  25                  30

Leu Ser Trp Phe Gln Gln Lys Pro Gly Lys Val Pro Lys His Leu Ile
        35                  40                  45

Tyr Arg Ala Asn Leu Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80
```

```
Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 218
<211> LENGTH: 120
<212> TYPE: PRT
<213> ORGANISM: Artificial Sequence
<220> FEATURE:
<223> OTHER INFORMATION: CG_172_VH

<400> SEQUENCE: 218

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
            100                 105                 110

Gly Thr Leu Val Thr Val Ser Ser
        115                 120

<210> SEQ ID NO 219
<211> LENGTH: 107
<212> TYPE: PRT
<213> ORGANISM: Artificial Sequence
<220> FEATURE:
<223> OTHER INFORMATION: CG_173_VL

<400> SEQUENCE: 219

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Asp Tyr
            20                  25                  30

Leu Ser Trp Phe Gln Gln Lys Pro Gly Lys Val Pro Lys His Leu Ile
        35                  40                  45

Tyr Arg Ala Asn Tyr Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 220
<211> LENGTH: 120
<212> TYPE: PRT
<213> ORGANISM: Artificial Sequence
<220> FEATURE:
<223> OTHER INFORMATION: CG_173_VH
```

```
<400> SEQUENCE: 220

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Tyr Pro Met Asp Tyr Trp Gly Gln Gly
                100                 105                 110

Gly Thr Leu Val Thr Val Ser Ser
            115                 120

<210> SEQ ID NO 221
<211> LENGTH: 107
<212> TYPE: PRT
<213> ORGANISM: Artificial Sequence
<220> FEATURE:
<223> OTHER INFORMATION: CG_174_VL

<400> SEQUENCE: 221

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Glu Tyr
            20                  25                  30

Leu Ser Trp Phe Gln Gln Lys Pro Gly Lys Val Pro Lys His Leu Ile
        35                  40                  45

Tyr Arg Ala Asn Ala Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
                100                 105

<210> SEQ ID NO 222
<211> LENGTH: 120
<212> TYPE: PRT
<213> ORGANISM: Artificial Sequence
<220> FEATURE:
<223> OTHER INFORMATION: CG_174_VH

<400> SEQUENCE: 222

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Glu Tyr Ala Gln Lys Phe
    50                  55                  60
```

```
Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Tyr Pro Met Asp Tyr Trp Gly Gln
            100                 105                 110

Gly Thr Leu Val Thr Val Ser Ser
        115                 120

<210> SEQ ID NO 223
<211> LENGTH: 107
<212> TYPE: PRT
<213> ORGANISM: Artificial Sequence
<220> FEATURE:
<223> OTHER INFORMATION: CG_175_VL

<400> SEQUENCE: 223

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Glu Tyr
            20                  25                  30

Leu Ser Trp Phe Gln Gln Lys Pro Gly Lys Val Pro Lys His Leu Ile
        35                  40                  45

Tyr Arg Ala Asn Ile Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 224
<211> LENGTH: 120
<212> TYPE: PRT
<213> ORGANISM: Artificial Sequence
<220> FEATURE:
<223> OTHER INFORMATION: CG_175_VH

<400> SEQUENCE: 224

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Tyr Pro Met Asp Tyr Trp Gly Gln
            100                 105                 110

Gly Thr Leu Val Thr Val Ser Ser
        115                 120
```

<210> SEQ ID NO 225
<211> LENGTH: 107
<212> TYPE: PRT
<213> ORGANISM: Artificial Sequence
<220> FEATURE:
<223> OTHER INFORMATION: CG_176_VL

<400> SEQUENCE: 225

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Glu Tyr
            20                  25                  30

Leu Ser Trp Phe Gln Gln Lys Pro Gly Lys Val Pro Lys His Leu Ile
        35                  40                  45

Tyr Arg Ala Asn Leu Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 226
<211> LENGTH: 120
<212> TYPE: PRT
<213> ORGANISM: Artificial Sequence
<220> FEATURE:
<223> OTHER INFORMATION: CG_176_VH

<400> SEQUENCE: 226

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Tyr Pro Met Asp Tyr Trp Gly Gln
            100                 105                 110

Gly Thr Leu Val Thr Val Ser Ser
        115                 120

<210> SEQ ID NO 227
<211> LENGTH: 107
<212> TYPE: PRT
<213> ORGANISM: Artificial Sequence
<220> FEATURE:
<223> OTHER INFORMATION: CG_177_VL

<400> SEQUENCE: 227

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Glu Tyr
            20                  25                  30

Leu Ser Trp Phe Gln Gln Lys Pro Gly Lys Val Pro Lys His Leu Ile
        35                  40                  45

Tyr Arg Ala Asn Gln Leu Val Ser Gly Val Pro Ser Arg Phe Ser Gly
        50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
                100                 105

<210> SEQ ID NO 228
<211> LENGTH: 120
<212> TYPE: PRT
<213> ORGANISM: Artificial Sequence
<220> FEATURE:
<223> OTHER INFORMATION: CG_177_VH

<400> SEQUENCE: 228

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
                20                  25                  30

Tyr Leu His Trp Val Arg Gln Ala Pro Gly Lys Gly Leu Glu Trp Met
            35                  40                  45

Gly Trp Ile Asp Pro Asp Gln Gly Asp Thr Glu Tyr Ala Gln Lys Phe
        50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Tyr Pro Met Asp Tyr Trp Gly Gln
                100                 105                 110

Gly Thr Leu Val Thr Val Ser Ser
        115                 120

<210> SEQ ID NO 229
<211> LENGTH: 107
<212> TYPE: PRT
<213> ORGANISM: Artificial Sequence
<220> FEATURE:
<223> OTHER INFORMATION: CG_178_VL

<400> SEQUENCE: 229

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Glu Tyr
                20                  25                  30

Leu Ser Trp Phe Gln Gln Lys Pro Gly Lys Val Pro Lys His Leu Ile
        35                  40                  45

Tyr Arg Ala Asn Val Leu Val Ser Gly Val Pro Ser Arg Phe Ser Gly
        50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys

<210> SEQ ID NO 230
<211> LENGTH: 120
<212> TYPE: PRT
<213> ORGANISM: Artificial Sequence
<220> FEATURE:
<223> OTHER INFORMATION: CG_178_VH

<400> SEQUENCE: 230

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Tyr Pro Met Asp Tyr Trp Gly Gln Gly
            100                 105                 110

Gly Thr Leu Val Thr Val Ser Ser
        115                 120

<210> SEQ ID NO 231
<211> LENGTH: 107
<212> TYPE: PRT
<213> ORGANISM: Artificial Sequence
<220> FEATURE:
<223> OTHER INFORMATION: CG_179_VL

<400> SEQUENCE: 231

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Ile Tyr
            20                  25                  30

Leu Ser Trp Phe Gln Gln Lys Pro Gly Lys Val Pro Lys His Leu Ile
        35                  40                  45

Tyr Arg Ala Asn Asp Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 232
<211> LENGTH: 120
<212> TYPE: PRT
<213> ORGANISM: Artificial Sequence
<220> FEATURE:
<223> OTHER INFORMATION: CG_179_VH

<400> SEQUENCE: 232

Gln Met Gln Leu Val Gln Ser Gly Ala Glu Val Lys Lys Pro Gly Ser
1               5                   10                  15

```
Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
            35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Tyr Pro Met Asp Tyr Trp Gly Gln
                100                 105                 110

Gly Thr Leu Val Thr Val Ser Ser
        115                 120
```

<210> SEQ ID NO 233
<211> LENGTH: 107
<212> TYPE: PRT
<213> ORGANISM: Artificial Sequence
<220> FEATURE:
<223> OTHER INFORMATION: CG_180_VL

<400> SEQUENCE: 233

```
Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Ile Tyr
            20                  25                  30

Leu Ser Trp Phe Gln Gln Lys Pro Gly Lys Val Pro Lys His Leu Ile
            35                  40                  45

Tyr Arg Ala Asn Thr Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
                100                 105
```

<210> SEQ ID NO 234
<211> LENGTH: 120
<212> TYPE: PRT
<213> ORGANISM: Artificial Sequence
<220> FEATURE:
<223> OTHER INFORMATION: CG_180_VH

<400> SEQUENCE: 234

```
Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
            35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
```

Asn Ala Ala Tyr Gly Ser Ser Tyr Pro Met Asp Tyr Trp Gly Gln
            100                 105                 110

Gly Thr Leu Val Thr Val Ser Ser
        115                 120

<210> SEQ ID NO 235
<211> LENGTH: 107
<212> TYPE: PRT
<213> ORGANISM: Artificial Sequence
<220> FEATURE:
<223> OTHER INFORMATION: CG_181_VL

<400> SEQUENCE: 235

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Leu Tyr
            20                  25                  30

Leu Ser Trp Phe Gln Gln Lys Pro Gly Lys Val Pro Lys His Leu Ile
        35                  40                  45

Tyr Arg Ala Asn Asp Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 236
<211> LENGTH: 120
<212> TYPE: PRT
<213> ORGANISM: Artificial Sequence
<220> FEATURE:
<223> OTHER INFORMATION: CG_181_VH

<400> SEQUENCE: 236

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Tyr Pro Met Asp Tyr Trp Gly Gln
            100                 105                 110

Gly Thr Leu Val Thr Val Ser Ser
        115                 120

<210> SEQ ID NO 237
<211> LENGTH: 107
<212> TYPE: PRT
<213> ORGANISM: Artificial Sequence
<220> FEATURE:

<223> OTHER INFORMATION: CG_182_VL

<400> SEQUENCE: 237

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Leu Tyr
            20                  25                  30

Leu Ser Trp Phe Gln Gln Lys Pro Gly Lys Val Pro Lys His Leu Ile
        35                  40                  45

Tyr Arg Ala Asn Glu Leu Val Ser Gly Val Pro Ser Arg Phe Ser Gly
50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 238
<211> LENGTH: 120
<212> TYPE: PRT
<213> ORGANISM: Artificial Sequence
<220> FEATURE:
<223> OTHER INFORMATION: CG_182_VH

<400> SEQUENCE: 238

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Glu Tyr Ala Gln Lys Phe
50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
            100                 105                 110

Gly Thr Leu Val Thr Val Ser Ser
        115                 120

<210> SEQ ID NO 239
<211> LENGTH: 107
<212> TYPE: PRT
<213> ORGANISM: Artificial Sequence
<220> FEATURE:
<223> OTHER INFORMATION: CG_183_VL

<400> SEQUENCE: 239

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Asn Tyr
            20                  25                  30

Leu Ser Trp Phe Gln Gln Lys Pro Gly Lys Val Pro Lys His Leu Ile
        35                  40                  45

Tyr Arg Ala Asn Glu Leu Val Ser Gly Val Pro Ser Arg Phe Ser Gly

```
                    50                  55                  60
Ser Gly Ser Gly Thr Glu Phe Thr Leu Thr Ile Ser Ser Leu Gln Pro
 65                  70                  75                  80

Glu Asp Phe Ala Thr Tyr Tyr Cys Leu Gln Tyr Asp Glu Phe Pro Tyr
                     85                  90                  95

Thr Phe Gly Gly Gly Thr Lys Val Glu Ile Lys
                100                 105

<210> SEQ ID NO 240
<211> LENGTH: 120
<212> TYPE: PRT
<213> ORGANISM: Artificial Sequence
<220> FEATURE:
<223> OTHER INFORMATION: CG_183_VH

<400> SEQUENCE: 240

Gln Met Gln Leu Val Gln Ser Gly Ala Glu Val Lys Lys Pro Gly Ser
  1               5                  10                  15

Ser Val Lys Val Ser Cys Lys Ala Ser Gly Phe Asn Ile Lys Asp Tyr
                 20                  25                  30

Tyr Leu His Trp Val Arg Gln Ala Pro Gly Lys Gly Leu Glu Trp Met
             35                  40                  45

Gly Trp Ile Asp Pro Asp Gln Gly Asp Thr Glu Tyr Ala Gln Lys Phe
         50                  55                  60

Gln Gly Arg Val Thr Ile Thr Arg Asp Arg Ser Thr Ser Thr Ala Tyr
 65                  70                  75                  80

Met Glu Leu Arg Ser Leu Arg Ala Glu Asp Thr Ala Val Tyr Tyr Cys
                 85                  90                  95

Asn Ala Ala Tyr Gly Ser Ser Tyr Pro Met Asp Tyr Trp Gly Gln
                100                 105                 110

Gly Thr Leu Val Thr Val Ser Ser
            115                 120

<210> SEQ ID NO 241
<211> LENGTH: 107
<212> TYPE: PRT
<213> ORGANISM: Artificial Sequence
<220> FEATURE:
<223> OTHER INFORMATION: CG_184_VL

<400> SEQUENCE: 241

Asn Ile Gln Met Thr Gln Ser Pro Ser Ser Leu Ser Ala Ser Val Gly
  1               5                  10                  15

Asp Arg Val Thr Ile Thr Cys Arg Ala Ser Gln Asp Ile His Asn Tyr
                 20                  25                  30

Leu Ser Trp Phe Gln Gln Lys Pro Gly Lys Val Pro Lys His Leu Ile
             35                  40                  45

Tyr Arg Ala Asn Val Leu Val Ser Gly Val Pro Ser Arg Phe Ser Gly
         50                  55                  60

Ser Gly Ser Gly Thr Glu Phe Thr Leu Thr Ile Ser Ser Leu Gln Pro
 65                  70                  75                  80

Glu Asp Phe Ala Thr Tyr Tyr Cys Leu Gln Tyr Asp Glu Phe Pro Tyr
                     85                  90                  95

Thr Phe Gly Gly Gly Thr Lys Val Glu Ile Lys
                100                 105

<210> SEQ ID NO 242
<211> LENGTH: 120
```

```
<212> TYPE: PRT
<213> ORGANISM: Artificial Sequence
<220> FEATURE:
<223> OTHER INFORMATION: CG_184_VH

<400> SEQUENCE: 242

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Tyr Pro Met Asp Tyr Trp Gly Gln
            100                 105                 110

Gly Thr Leu Val Thr Val Ser Ser
        115                 120

<210> SEQ ID NO 243
<211> LENGTH: 107
<212> TYPE: PRT
<213> ORGANISM: Artificial Sequence
<220> FEATURE:
<223> OTHER INFORMATION: CG_185_VL

<400> SEQUENCE: 243

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Gln Tyr
            20                  25                  30

Leu Ser Trp Phe Gln Gln Lys Pro Gly Lys Val Pro Lys His Leu Ile
        35                  40                  45

Tyr Arg Ala Asn Asp Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 244
<211> LENGTH: 120
<212> TYPE: PRT
<213> ORGANISM: Artificial Sequence
<220> FEATURE:
<223> OTHER INFORMATION: CG_185_VH

<400> SEQUENCE: 244

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
```

```
            35                  40                  45
Gly Trp Ile Asp Pro Asp Gln Gly Asp Thr Glu Tyr Ala Gln Lys Phe
        50                  55                  60
Gln Gly Arg Val Thr Ile Thr Arg Asp Arg Ser Thr Ser Thr Ala Tyr
 65                  70                  75                  80
Met Glu Leu Arg Ser Leu Arg Ala Glu Asp Thr Ala Val Tyr Tyr Cys
                85                  90                  95
Asn Ala Ala Tyr Gly Ser Ser Tyr Pro Met Asp Tyr Trp Gly Gln
                    100                 105                 110
Gly Thr Leu Val Thr Val Ser Ser
            115                 120
```

<210> SEQ ID NO 245
<211> LENGTH: 107
<212> TYPE: PRT
<213> ORGANISM: Artificial Sequence
<220> FEATURE:
<223> OTHER INFORMATION: CG_186_VL

<400> SEQUENCE: 245

```
Asn Ile Gln Met Thr Gln Ser Pro Ser Ser Leu Ser Ala Ser Val Gly
  1               5                  10                  15
Asp Arg Val Thr Ile Thr Cys Arg Ala Ser Gln Asp Ile His Val Tyr
             20                  25                  30
Leu Ser Trp Phe Gln Gln Lys Pro Gly Lys Val Pro Lys His Leu Ile
         35                  40                  45
Tyr Arg Ala Asn Gln Leu Val Ser Gly Val Pro Ser Arg Phe Ser Gly
     50                  55                  60
Ser Gly Ser Gly Thr Glu Phe Thr Leu Thr Ile Ser Ser Leu Gln Pro
 65                  70                  75                  80
Glu Asp Phe Ala Thr Tyr Tyr Cys Leu Gln Tyr Asp Glu Phe Pro Tyr
                85                  90                  95
Thr Phe Gly Gly Gly Thr Lys Val Glu Ile Lys
                    100                 105
```

<210> SEQ ID NO 246
<211> LENGTH: 120
<212> TYPE: PRT
<213> ORGANISM: Artificial Sequence
<220> FEATURE:
<223> OTHER INFORMATION: CG_186_VH

<400> SEQUENCE: 246

```
Gln Met Gln Leu Val Gln Ser Gly Ala Glu Val Lys Lys Pro Gly Ser
  1               5                  10                  15
Ser Val Lys Val Ser Cys Lys Ala Ser Gly Phe Asn Ile Lys Asp Tyr
             20                  25                  30
Tyr Leu His Trp Val Arg Gln Ala Pro Gly Lys Gly Leu Glu Trp Met
         35                  40                  45
Gly Trp Ile Asp Pro Asp Gln Gly Asp Thr Glu Tyr Ala Gln Lys Phe
     50                  55                  60
Gln Gly Arg Val Thr Ile Thr Arg Asp Arg Ser Thr Ser Thr Ala Tyr
 65                  70                  75                  80
Met Glu Leu Arg Ser Leu Arg Ala Glu Asp Thr Ala Val Tyr Tyr Cys
                85                  90                  95
Asn Ala Ala Tyr Gly Ser Ser Tyr Pro Met Asp Tyr Trp Gly Gln
                    100                 105                 110
```

```
Gly Thr Leu Val Thr Val Ser Ser
        115             120

<210> SEQ ID NO 247
<211> LENGTH: 107
<212> TYPE: PRT
<213> ORGANISM: Artificial Sequence
<220> FEATURE:
<223> OTHER INFORMATION: CG_187_VL

<400> SEQUENCE: 247

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Thr Tyr
            20                  25                  30

Leu Ser Trp Phe Gln Gln Lys Pro Gly Lys Val Pro Lys His Leu Ile
        35                  40                  45

Tyr Arg Ala Asn Tyr Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 248
<211> LENGTH: 120
<212> TYPE: PRT
<213> ORGANISM: Artificial Sequence
<220> FEATURE:
<223> OTHER INFORMATION: CG_187_VH

<400> SEQUENCE: 248

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Tyr Pro Met Asp Tyr Trp Gly Gln
            100                 105                 110

Gly Thr Leu Val Thr Val Ser Ser
        115             120

<210> SEQ ID NO 249
<211> LENGTH: 107
<212> TYPE: PRT
<213> ORGANISM: Artificial Sequence
<220> FEATURE:
<223> OTHER INFORMATION: CG_188_VL

<400> SEQUENCE: 249

Asn Ile Gln Met Thr Gln Ser Pro Ser Ser Leu Ser Ala Ser Val Gly
```

-continued

```
                1               5                       10                      15
Asp Arg Val Thr Ile Thr Cys Arg Ala Ser Gln Asp Ile His Glu Tyr
                20                      25                      30

Leu Ser Trp Phe Gln Gln Lys Pro Gly Lys Val Pro Lys His Leu Ile
                35                      40                      45

Tyr Arg Ala Asn Tyr Leu Val Ser Gly Val Pro Ser Arg Phe Ser Gly
                50                      55                      60

Ser Gly Ser Gly Thr Glu Phe Thr Leu Thr Ile Ser Ser Leu Gln Pro
65                      70                      75                      80

Glu Asp Phe Ala Thr Tyr Tyr Cys Leu Gln Tyr Asp Glu Phe Pro Tyr
                85                      90                      95

Thr Phe Gly Gly Gly Thr Lys Val Glu Ile Lys
                100                     105
```

<210> SEQ ID NO 250
<211> LENGTH: 120
<212> TYPE: PRT
<213> ORGANISM: Artificial Sequence
<220> FEATURE:
<223> OTHER INFORMATION: CG_188_VH

<400> SEQUENCE: 250

```
Gln Met Gln Leu Val Gln Ser Gly Ala Glu Val Lys Lys Pro Gly Ser
1               5                       10                      15

Ser Val Lys Val Ser Cys Lys Ala Ser Gly Phe Asn Ile Lys Asp Tyr
                20                      25                      30

Tyr Leu His Trp Val Arg Gln Ala Pro Gly Lys Gly Leu Glu Trp Met
                35                      40                      45

Gly Trp Ile Asp Pro Asp Gln Gly Asp Thr Glu Tyr Ala Gln Lys Phe
                50                      55                      60

Gln Gly Arg Val Thr Ile Thr Arg Asp Arg Ser Thr Ser Thr Ala Tyr
65                      70                      75                      80

Met Glu Leu Arg Ser Leu Arg Ala Glu Asp Thr Ala Val Tyr Tyr Cys
                85                      90                      95

Asn Ala Ala Tyr Gly Ser Ser Tyr Pro Met Asp Tyr Trp Gly Gln
                100                     105                     110

Gly Thr Leu Val Thr Val Ser Ser
                115                     120
```

<210> SEQ ID NO 251
<211> LENGTH: 107
<212> TYPE: PRT
<213> ORGANISM: Artificial Sequence
<220> FEATURE:
<223> OTHER INFORMATION: CG_189_VL

<400> SEQUENCE: 251

```
Asn Ile Gln Met Thr Gln Ser Pro Ser Ser Leu Ser Ala Ser Val Gly
1               5                       10                      15

Asp Arg Val Thr Ile Thr Cys Arg Ala Ser Gln Asp Ile His Leu Tyr
                20                      25                      30

Leu Ser Trp Phe Gln Gln Lys Pro Gly Lys Val Pro Lys His Leu Ile
                35                      40                      45

Tyr Arg Ala Asn Gln Leu Val Ser Gly Val Pro Ser Arg Phe Ser Gly
                50                      55                      60

Ser Gly Ser Gly Thr Glu Phe Thr Leu Thr Ile Ser Ser Leu Gln Pro
65                      70                      75                      80
```

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 252
<211> LENGTH: 120
<212> TYPE: PRT
<213> ORGANISM: Artificial Sequence
<220> FEATURE:
<223> OTHER INFORMATION: CG_189_VH

<400> SEQUENCE: 252

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
            35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
            100                 105                 110

Gly Thr Leu Val Thr Val Ser Ser
            115                 120

<210> SEQ ID NO 253
<211> LENGTH: 107
<212> TYPE: PRT
<213> ORGANISM: Artificial Sequence
<220> FEATURE:
<223> OTHER INFORMATION: CG_190_VL

<400> SEQUENCE: 253

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Val Tyr
            20                  25                  30

Leu Ser Trp Phe Gln Gln Lys Pro Gly Lys Val Pro Lys His Leu Ile
            35                  40                  45

Tyr Arg Ala Asn Glu Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 254
<211> LENGTH: 120
<212> TYPE: PRT
<213> ORGANISM: Artificial Sequence
<220> FEATURE:
<223> OTHER INFORMATION: CG_190_VH

```
<400> SEQUENCE: 254

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
                20                  25                  30

Tyr Leu His Trp Val Arg Gln Ala Pro Gly Lys Gly Leu Glu Trp Met
            35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Tyr Pro Met Asp Tyr Trp Gly Gln
                100                 105                 110

Gly Thr Leu Val Thr Val Ser Ser
        115                 120

<210> SEQ ID NO 255
<211> LENGTH: 107
<212> TYPE: PRT
<213> ORGANISM: Artificial Sequence
<220> FEATURE:
<223> OTHER INFORMATION: CG_191_VL

<400> SEQUENCE: 255

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His His Tyr
                20                  25                  30

Leu Ser Trp Phe Gln Gln Lys Pro Gly Lys Val Pro Lys His Leu Ile
            35                  40                  45

Tyr Arg Ala Asn Tyr Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
                100                 105

<210> SEQ ID NO 256
<211> LENGTH: 120
<212> TYPE: PRT
<213> ORGANISM: Artificial Sequence
<220> FEATURE:
<223> OTHER INFORMATION: CG_191_VH

<400> SEQUENCE: 256

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
                20                  25                  30

Tyr Leu His Trp Val Arg Gln Ala Pro Gly Lys Gly Leu Glu Trp Met
            35                  40                  45

Gly Trp Ile Asp Pro Asp Gln Gly Asp Thr Glu Tyr Ala Gln Lys Phe
    50                  55                  60
```

```
Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
            100                 105                 110

Gly Thr Leu Val Thr Val Ser Ser
        115                 120

<210> SEQ ID NO 257
<211> LENGTH: 107
<212> TYPE: PRT
<213> ORGANISM: Artificial Sequence
<220> FEATURE:
<223> OTHER INFORMATION: CG_192_VL

<400> SEQUENCE: 257

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Ile Tyr
            20                  25                  30

Leu Ser Trp Phe Gln Gln Lys Pro Gly Lys Val Pro Lys His Leu Ile
        35                  40                  45

Tyr Arg Ala Asn Glu Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 258
<211> LENGTH: 120
<212> TYPE: PRT
<213> ORGANISM: Artificial Sequence
<220> FEATURE:
<223> OTHER INFORMATION: CG_192_VH

<400> SEQUENCE: 258

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
            100                 105                 110

Gly Thr Leu Val Thr Val Ser Ser
        115                 120

<210> SEQ ID NO 259
```

```
<211> LENGTH: 107
<212> TYPE: PRT
<213> ORGANISM: Artificial Sequence
<220> FEATURE:
<223> OTHER INFORMATION: CG_193_VL

<400> SEQUENCE: 259

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Tyr Tyr
            20                  25                  30

Leu Ser Trp Phe Gln Gln Lys Pro Gly Lys Val Pro Lys His Leu Ile
        35                  40                  45

Tyr Arg Ala Asn Glu Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 260
<211> LENGTH: 120
<212> TYPE: PRT
<213> ORGANISM: Artificial Sequence
<220> FEATURE:
<223> OTHER INFORMATION: CG_193_VH

<400> SEQUENCE: 260

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
            100                 105                 110

Gly Thr Leu Val Thr Val Ser Ser
        115                 120

<210> SEQ ID NO 261
<211> LENGTH: 107
<212> TYPE: PRT
<213> ORGANISM: Artificial Sequence
<220> FEATURE:
<223> OTHER INFORMATION: CG_194_VL

<400> SEQUENCE: 261

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His His Tyr
            20                  25                  30
```

```
Leu Ser Trp Phe Gln Gln Lys Pro Gly Lys Val Pro Lys His Leu Ile
        35                  40                  45

Tyr Arg Ala Asn Asp Leu Val Ser Gly Val Pro Ser Arg Phe Ser Gly
 50                  55                  60

Ser Gly Ser Gly Thr Glu Phe Thr Leu Thr Ile Ser Ser Leu Gln Pro
 65                  70                  75                  80

Glu Asp Phe Ala Thr Tyr Tyr Cys Leu Gln Tyr Asp Glu Phe Pro Tyr
                 85                  90                  95

Thr Phe Gly Gly Gly Thr Lys Val Glu Ile Lys
                100                 105
```

<210> SEQ ID NO 262
<211> LENGTH: 120
<212> TYPE: PRT
<213> ORGANISM: Artificial Sequence
<220> FEATURE:
<223> OTHER INFORMATION: CG_194_VH

<400> SEQUENCE: 262

```
Gln Met Gln Leu Val Gln Ser Gly Ala Glu Val Lys Lys Pro Gly Ser
 1               5                  10                  15

Ser Val Lys Val Ser Cys Lys Ala Ser Gly Phe Asn Ile Lys Asp Tyr
                 20                  25                  30

Tyr Leu His Trp Val Arg Gln Ala Pro Gly Lys Gly Leu Glu Trp Met
             35                  40                  45

Gly Trp Ile Asp Pro Asp Gln Gly Asp Thr Glu Tyr Ala Gln Lys Phe
 50                  55                  60

Gln Gly Arg Val Thr Ile Thr Arg Asp Arg Ser Thr Ser Thr Ala Tyr
 65                  70                  75                  80

Met Glu Leu Arg Ser Leu Arg Ala Glu Asp Thr Ala Val Tyr Tyr Cys
                 85                  90                  95

Asn Ala Ala Tyr Gly Ser Ser Tyr Pro Met Asp Tyr Trp Gly Gln
                100                 105                 110

Gly Thr Leu Val Thr Val Ser Ser
            115                 120
```

<210> SEQ ID NO 263
<211> LENGTH: 107
<212> TYPE: PRT
<213> ORGANISM: Artificial Sequence
<220> FEATURE:
<223> OTHER INFORMATION: CG_195_VL

<400> SEQUENCE: 263

```
Asn Ile Gln Met Thr Gln Ser Pro Ser Ser Leu Ser Ala Ser Val Gly
 1               5                  10                  15

Asp Arg Val Thr Ile Thr Cys Arg Ala Ser Gln Asp Ile His Ile Tyr
                 20                  25                  30

Leu Ser Trp Phe Gln Gln Lys Pro Gly Lys Val Pro Lys His Leu Ile
             35                  40                  45

Tyr Arg Ala Asn Asp Leu Val Ser Gly Val Pro Ser Arg Phe Ser Gly
 50                  55                  60

Ser Gly Ser Gly Thr Glu Phe Thr Leu Thr Ile Ser Ser Leu Gln Pro
 65                  70                  75                  80

Glu Asp Phe Ala Thr Tyr Tyr Cys Leu Gln Tyr Asp Glu Phe Pro Tyr
                 85                  90                  95

Thr Phe Gly Gly Gly Thr Lys Val Glu Ile Lys
                100                 105
```

<210> SEQ ID NO 264
<211> LENGTH: 120
<212> TYPE: PRT
<213> ORGANISM: Artificial Sequence
<220> FEATURE:
<223> OTHER INFORMATION: CG_195_VH

<400> SEQUENCE: 264

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Tyr Pro Met Asp Tyr Trp Gly Gln
            100                 105                 110

Gly Thr Leu Val Thr Val Ser Ser
        115                 120

<210> SEQ ID NO 265
<211> LENGTH: 107
<212> TYPE: PRT
<213> ORGANISM: Artificial Sequence
<220> FEATURE:
<223> OTHER INFORMATION: CG_196_VL

<400> SEQUENCE: 265

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Tyr Tyr
            20                  25                  30

Leu Ser Trp Phe Gln Gln Lys Pro Gly Lys Val Pro Lys His Leu Ile
        35                  40                  45

Tyr Arg Ala Asn Asp Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 266
<211> LENGTH: 120
<212> TYPE: PRT
<213> ORGANISM: Artificial Sequence
<220> FEATURE:
<223> OTHER INFORMATION: CG_196_VH

<400> SEQUENCE: 266

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
                100                 105                 110

Gly Thr Leu Val Thr Val Ser Ser
            115                 120

<210> SEQ ID NO 267
<211> LENGTH: 107
<212> TYPE: PRT
<213> ORGANISM: Artificial Sequence
<220> FEATURE:
<223> OTHER INFORMATION: CG_197_VL

<400> SEQUENCE: 267

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Val Tyr
            20                  25                  30

Leu Ser Trp Phe Gln Gln Lys Pro Gly Lys Val Pro Lys His Leu Ile
        35                  40                  45

Tyr Arg Ala Asn Asp Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
                100                 105

<210> SEQ ID NO 268
<211> LENGTH: 120
<212> TYPE: PRT
<213> ORGANISM: Artificial Sequence
<220> FEATURE:
<223> OTHER INFORMATION: CG_197_VH

<400> SEQUENCE: 268

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Tyr Pro Met Asp Tyr Trp Gly Gln
            100                 105                 110

Gly Thr Leu Val Thr Val Ser Ser
        115                 120

<210> SEQ ID NO 269
<211> LENGTH: 107
<212> TYPE: PRT
<213> ORGANISM: Artificial Sequence
<220> FEATURE:
<223> OTHER INFORMATION: CG_198_VL

<400> SEQUENCE: 269

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Ile Tyr
            20                  25                  30

Leu Ser Trp Phe Gln Gln Lys Pro Gly Lys Val Pro Lys His Leu Ile
        35                  40                  45

Tyr Arg Ala Asn Gln Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 270
<211> LENGTH: 120
<212> TYPE: PRT
<213> ORGANISM: Artificial Sequence
<220> FEATURE:
<223> OTHER INFORMATION: CG_198_VH

<400> SEQUENCE: 270

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Tyr Pro Met Asp Tyr Trp Gly Gln
            100                 105                 110

Gly Thr Leu Val Thr Val Ser Ser
        115                 120

<210> SEQ ID NO 271
<211> LENGTH: 107
<212> TYPE: PRT
<213> ORGANISM: Artificial Sequence
<220> FEATURE:
<223> OTHER INFORMATION: CG_199_VL

```
<400> SEQUENCE: 271

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Thr Tyr
            20                  25                  30

Leu Ser Trp Phe Gln Gln Lys Pro Gly Lys Val Pro Lys His Leu Ile
        35                  40                  45

Tyr Arg Ala Asn Gln Leu Val Ser Gly Val Pro Ser Arg Phe Ser Gly
50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 272
<211> LENGTH: 120
<212> TYPE: PRT
<213> ORGANISM: Artificial Sequence
<220> FEATURE:
<223> OTHER INFORMATION: CG_199_VH

<400> SEQUENCE: 272

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Tyr Pro Met Asp Tyr Trp Gly Gln
            100                 105                 110

Gly Thr Leu Val Thr Val Ser Ser
        115                 120

<210> SEQ ID NO 273
<211> LENGTH: 107
<212> TYPE: PRT
<213> ORGANISM: Artificial Sequence
<220> FEATURE:
<223> OTHER INFORMATION: CG_200_VL

<400> SEQUENCE: 273

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
            20                  25                  30

Leu Ser Trp Phe Gln Gln Lys Pro Gly Lys Val Pro Lys His Leu Ile
        35                  40                  45

Tyr Arg Ala Asn Arg Leu Val Ser Gly Val Pro Ser Arg Phe Ser Gly
50                  55                  60
```

```
Ser Gly Ser Gly Thr Glu Phe Thr Leu Thr Ile Ser Ser Leu Gln Pro
 65                  70                  75                  80

Glu Asp Phe Ala Thr Tyr Tyr Cys Leu Gln Tyr Asp Glu Phe Pro Tyr
                 85                  90                  95

Thr Phe Gly Gly Gly Thr Lys Val Glu Ile Lys
            100                 105
```

<210> SEQ ID NO 274
<211> LENGTH: 120
<212> TYPE: PRT
<213> ORGANISM: Artificial Sequence
<220> FEATURE:
<223> OTHER INFORMATION: CG_200_VH

<400> SEQUENCE: 274

```
Gln Met Gln Leu Val Gln Ser Gly Ala Glu Val Lys Lys Pro Gly Ser
 1               5                  10                  15

Ser Val Lys Val Ser Cys Lys Ala Ser Gly Phe Asn Ile Lys Asp Tyr
                 20                  25                  30

Tyr Leu His Trp Val Arg Gln Ala Pro Gly Lys Gly Leu Glu Trp Met
             35                  40                  45

Gly Trp Ile Asp Pro Asp Gln Gly Asp Thr Glu Tyr Ala Gln Lys Phe
         50                  55                  60

Gln Gly Arg Val Thr Ile Thr Arg Asp Arg Ser Thr Ser Thr Ala Tyr
 65                  70                  75                  80

Met Glu Leu Arg Ser Leu Arg Ala Glu Asp Thr Ala Val Tyr Tyr Cys
                 85                  90                  95

Asn Ala Ala Tyr Gly Ser Ser Tyr Pro Met Asp Tyr Trp Gly Gln
                100                 105                 110

Gly Thr Leu Val Thr Val Ser Ser
            115                 120
```

<210> SEQ ID NO 275
<211> LENGTH: 107
<212> TYPE: PRT
<213> ORGANISM: Artificial Sequence
<220> FEATURE:
<223> OTHER INFORMATION: CG_201_VL

<400> SEQUENCE: 275

```
Asn Ile Gln Met Thr Gln Ser Pro Ser Ser Leu Ser Ala Ser Val Gly
 1               5                  10                  15

Asp Arg Val Thr Ile Thr Cys Arg Ala Ser Gln Asp Ile His Arg Tyr
                 20                  25                  30

Leu Ser Trp Phe Gln Gln Lys Pro Gly Lys Val Pro Lys His Leu Ile
             35                  40                  45

Tyr Arg Glu Ser Arg Phe Val Asp Gly Val Pro Ser Arg Phe Ser Gly
         50                  55                  60

Ser Gly Ser Gly Thr Glu Phe Thr Leu Thr Ile Ser Ser Leu Gln Pro
 65                  70                  75                  80

Glu Asp Phe Ala Thr Tyr Tyr Cys Leu Gln Tyr Asp Glu Phe Pro Tyr
                 85                  90                  95

Thr Phe Gly Gly Gly Thr Lys Val Glu Ile Lys
            100                 105
```

<210> SEQ ID NO 276
<211> LENGTH: 120
<212> TYPE: PRT

```
<213> ORGANISM: Artificial Sequence
<220> FEATURE:
<223> OTHER INFORMATION: CG_201_VH

<400> SEQUENCE: 276

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Tyr Ala Gln Lys Phe
50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Glu Ser Ser Tyr Pro Met Asp Tyr Trp Gly Gln
            100                 105                 110

Gly Thr Leu Val Thr Val Ser Ser
        115                 120

<210> SEQ ID NO 277
<211> LENGTH: 107
<212> TYPE: PRT
<213> ORGANISM: Artificial Sequence
<220> FEATURE:
<223> OTHER INFORMATION: CG_202_VL

<400> SEQUENCE: 277

Asn Ile Gln Met Thr Gln Ser Pro Ser Ser Leu Ser Ala Ser Val Gly
1               5                   10                  15

Asp Arg Val Thr Ile Thr Cys Gln Ala Ser Gln Asp Ile His Arg Tyr
            20                  25                  30

Leu Ser Trp Phe Gln Gln Asp Pro Gly Thr Val Pro Gln His Leu Ile
        35                  40                  45

Tyr Arg Glu Ser Arg Phe Val Asp Gly Val Pro Ser Arg Phe Ser Gly
50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 278
<211> LENGTH: 120
<212> TYPE: PRT
<213> ORGANISM: Artificial Sequence
<220> FEATURE:
<223> OTHER INFORMATION: CG_202_VH

<400> SEQUENCE: 278

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Gln Gly Leu Glu Trp Met
        35                  40                  45
```

```
Gly Trp Ile Asp Pro Asp Gln Gly Asp Thr Tyr Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Ala Ser Leu Thr Ala Glu Asp Thr Ala Val Tyr Tyr Cys
                85                  90                  95

Asn Ala Ala Tyr Gly Glu Ser Ser Tyr Pro Met Asp Tyr Trp Gly Gln
            100                 105                 110

Gly Thr Leu Val Thr Val Ser Ser
            115                 120

<210> SEQ ID NO 279
<211> LENGTH: 107
<212> TYPE: PRT
<213> ORGANISM: Artificial Sequence
<220> FEATURE:
<223> OTHER INFORMATION: CG_203_VL

<400> SEQUENCE: 279

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
                20                  25                  30

Leu Ser Trp Phe Gln Lys Pro Gly Lys Val Pro Lys His Leu Ile
            35                  40                  45

Tyr Arg Ala Asn Arg Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 280
<211> LENGTH: 120
<212> TYPE: PRT
<213> ORGANISM: Artificial Sequence
<220> FEATURE:
<223> OTHER INFORMATION: CG_203_VH

<400> SEQUENCE: 280

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
                20                  25                  30

Tyr Leu His Trp Val Arg Gln Ala Pro Gly Lys Gly Leu Glu Trp Met
            35                  40                  45

Gly Trp Ile Asp Pro Asp Gln Gly Asp Thr Tyr Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Glu Ser Ser Tyr Pro Met Asp Tyr Trp Gly Gln
            100                 105                 110

Gly Thr Leu Val Thr Val Ser Ser
```

```
                   115                 120

<210> SEQ ID NO 281
<211> LENGTH: 107
<212> TYPE: PRT
<213> ORGANISM: Artificial Sequence
<220> FEATURE:
<223> OTHER INFORMATION: CG_204_VL

<400> SEQUENCE: 281

Asn Ile Gln Met Thr Gln Ser Pro Ser Ser Leu Ser Ala Ser Val Gly
1               5                   10                  15

Asp Arg Val Thr Ile Thr Cys Gln Ala Ser Gln Asp Ile His Arg Tyr
            20                  25                  30

Leu Ser Trp Phe Gln Gln Asp Pro Gly Thr Val Pro Gln His Leu Ile
        35                  40                  45

Tyr Arg Glu Ser Arg Phe Val Asp Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 282
<211> LENGTH: 120
<212> TYPE: PRT
<213> ORGANISM: Artificial Sequence
<220> FEATURE:
<223> OTHER INFORMATION: CG_204_VH

<400> SEQUENCE: 282

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Gln Gly Leu Glu Trp Met
        35                  40                  45

Gly Trp Ile Asp Pro Asp Gln Gly Asp Thr Tyr Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Ala Ser Leu Thr Ala Glu Asp Thr Ala Val Tyr Tyr Cys
                85                  90                  95

Asn Ala Ala Tyr Gly Asp Ser Ser Tyr Pro Met Asp Tyr Trp Gly Gln
            100                 105                 110

Gly Thr Leu Val Thr Val Ser Ser
        115                 120

<210> SEQ ID NO 283
<211> LENGTH: 107
<212> TYPE: PRT
<213> ORGANISM: Artificial Sequence
<220> FEATURE:
<223> OTHER INFORMATION: CG_205_VL

<400> SEQUENCE: 283

Asn Ile Gln Met Thr Gln Ser Pro Ser Ser Leu Ser Ala Ser Val Gly
1               5                   10                  15
```

Asp Arg Val Thr Ile Thr Cys Arg Ala Ser Gln Asp Ile His Arg Tyr
             20                  25                  30

Leu Ser Trp Phe Gln Gln Lys Pro Gly Lys Val Pro Lys His Leu Ile
         35                  40                  45

Tyr Arg Glu Ser Arg Phe Val Asp Gly Val Pro Ser Arg Phe Ser Gly
 50                  55                  60

Ser Gly Ser Gly Thr Glu Phe Thr Leu Thr Ile Ser Ser Leu Gln Pro
 65                  70                  75                  80

Glu Asp Phe Ala Thr Tyr Tyr Cys Leu Gln Tyr Asp Glu Phe Pro Tyr
                 85                  90                  95

Thr Phe Gly Gly Gly Thr Lys Val Glu Ile Lys
                100                 105

<210> SEQ ID NO 284
<211> LENGTH: 120
<212> TYPE: PRT
<213> ORGANISM: Artificial Sequence
<220> FEATURE:
<223> OTHER INFORMATION: CG_205_VH

<400> SEQUENCE: 284

Gln Met Gln Leu Val Gln Ser Gly Ala Glu Val Lys Lys Pro Gly Ser
1                5                  10                  15

Ser Val Lys Val Ser Cys Lys Ala Ser Gly Phe Asn Ile Lys Asp Tyr
             20                  25                  30

Tyr Leu His Trp Val Arg Gln Ala Pro Gly Lys Gly Leu Glu Trp Met
         35                  40                  45

Gly Trp Ile Asp Pro Asp Gln Gly Asp Thr Tyr Tyr Ala Gln Lys Phe
 50                  55                  60

Gln Gly Arg Val Thr Ile Thr Arg Asp Arg Ser Thr Ser Thr Ala Tyr
 65                  70                  75                  80

Met Glu Leu Arg Ser Leu Arg Ala Glu Asp Thr Ala Val Tyr Tyr Cys
                 85                  90                  95

Asn Ala Ala Tyr Gly Asp Ser Ser Tyr Pro Met Asp Tyr Trp Gly Gln
                100                 105                 110

Gly Thr Leu Val Thr Val Ser Ser
        115                 120

<210> SEQ ID NO 285
<211> LENGTH: 107
<212> TYPE: PRT
<213> ORGANISM: Artificial Sequence
<220> FEATURE:
<223> OTHER INFORMATION: CG_206_VL

<400> SEQUENCE: 285

Asn Ile Gln Met Thr Gln Ser Pro Ser Ser Leu Ser Ala Ser Val Gly
1                5                  10                  15

Asp Arg Val Thr Ile Thr Cys Gln Ala Ser Gln Asp Ile His Arg Tyr
             20                  25                  30

Leu Ser Trp Phe Gln Gln Asp Pro Gly Thr Val Pro Gln His Leu Ile
         35                  40                  45

Tyr Arg Glu Ser Arg Phe Val Asp Gly Val Pro Ser Arg Phe Ser Gly
 50                  55                  60

Ser Gly Ser Gly Thr Glu Phe Thr Leu Thr Ile Ser Ser Leu Gln Pro
 65                  70                  75                  80

Glu Asp Phe Ala Thr Tyr Tyr Cys Leu Gln Tyr Asp Glu Phe Pro Tyr

```
                    85                  90                  95

Thr Phe Gly Gly Gly Thr Lys Val Glu Ile Lys
            100                 105

<210> SEQ ID NO 286
<211> LENGTH: 120
<212> TYPE: PRT
<213> ORGANISM: Artificial Sequence
<220> FEATURE:
<223> OTHER INFORMATION: CG_206_VH

<400> SEQUENCE: 286

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Gln Gly Leu Glu Trp Met
        35                  40                  45

Gly Tyr Ile Asp Pro Ser Gln Gly Asp Thr Val Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Ala Ser Leu Thr Ala Glu Asp Thr Ala Val Tyr Tyr Cys
                85                  90                  95

Asn Ala Ala Tyr Gly Ser Ser Tyr Pro Met Asp Tyr Trp Gly Gln
            100                 105                 110

Gly Thr Leu Val Thr Val Ser Ser
        115                 120

<210> SEQ ID NO 287
<211> LENGTH: 107
<212> TYPE: PRT
<213> ORGANISM: Artificial Sequence
<220> FEATURE:
<223> OTHER INFORMATION: CG_207_VL

<400> SEQUENCE: 287

Asn Ile Gln Met Thr Gln Ser Pro Ser Ser Leu Ser Ala Ser Val Gly
1               5                   10                  15

Asp Arg Val Thr Ile Thr Cys Gln Ala Ser Gln Asp Ile His Glu Tyr
            20                  25                  30

Leu Ser Trp Phe Gln Gln Asp Pro Gly Thr Val Pro Gln His Leu Ile
        35                  40                  45

Tyr Arg Glu Ser Leu Phe Val Asp Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 288
<211> LENGTH: 120
<212> TYPE: PRT
<213> ORGANISM: Artificial Sequence
<220> FEATURE:
<223> OTHER INFORMATION: CG_207_VH

<400> SEQUENCE: 288
```

```
Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Gln Gly Leu Glu Trp Met
        35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Ala Ser Leu Thr Ala Glu Asp Thr Ala Val Tyr Tyr Cys
                85                  90                  95

Asn Ala Ala Tyr Gly Ser Ser Ser Tyr Pro Met Asp Tyr Trp Gly Gln
                100                 105                 110

Gly Thr Leu Val Thr Val Ser Ser
            115                 120

<210> SEQ ID NO 289
<211> LENGTH: 107
<212> TYPE: PRT
<213> ORGANISM: Artificial Sequence
<220> FEATURE:
<223> OTHER INFORMATION: CG_208_VL

<400> SEQUENCE: 289

Asn Ile Gln Met Thr Gln Ser Pro Ser Ser Leu Ser Ala Ser Val Gly
1               5                   10                  15

Asp Arg Val Thr Ile Thr Cys Gln Ala Ser Gln Asp Ile His Arg Tyr
            20                  25                  30

Leu Ser Trp Phe Gln Gln Asp Pro Gly Thr Val Pro Gln His Leu Ile
        35                  40                  45

Tyr Arg Glu Ser Arg Phe Val Asp Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
                100                 105

<210> SEQ ID NO 290
<211> LENGTH: 120
<212> TYPE: PRT
<213> ORGANISM: Artificial Sequence
<220> FEATURE:
<223> OTHER INFORMATION: CG_208_VH

<400> SEQUENCE: 290

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Gln Gly Leu Glu Trp Met
        35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
```

```
                65                  70                  75                  80
Met Glu Leu Ala Ser Leu Thr Ala Glu Asp Thr Ala Val Tyr Tyr Cys
                    85                  90                  95

Asn Ala Ala Tyr Gly Leu Ser Ser Tyr Pro Met Asp Tyr Trp Gly Gln
                100                 105                 110

Gly Thr Leu Val Thr Val Ser Ser
            115                 120

<210> SEQ ID NO 291
<211> LENGTH: 107
<212> TYPE: PRT
<213> ORGANISM: Artificial Sequence
<220> FEATURE:
<223> OTHER INFORMATION: CG_209_VL

<400> SEQUENCE: 291

Asn Ile Gln Met Thr Gln Ser Pro Ser Ser Leu Ser Ala Ser Val Gly
1               5                   10                  15

Asp Arg Val Thr Ile Thr Cys Gln Ala Ser Gln Asp Ile His Arg Tyr
            20                  25                  30

Leu Ser Trp Phe Gln Gln Asp Pro Gly Thr Val Pro Gln His Leu Ile
        35                  40                  45

Tyr Arg Glu Ser Arg Phe Val Asp Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
                100                 105

<210> SEQ ID NO 292
<211> LENGTH: 120
<212> TYPE: PRT
<213> ORGANISM: Artificial Sequence
<220> FEATURE:
<223> OTHER INFORMATION: CG_209_VH

<400> SEQUENCE: 292

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Gln Gly Leu Glu Trp Met
        35                  40                  45

Gly Trp Ile Asp Pro Asp Gln Gly Ala Thr Tyr Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Ala Ser Leu Thr Ala Glu Asp Thr Ala Val Tyr Tyr Cys
                85                  90                  95

Asn Ala Ala Tyr Gly Ser Ser Tyr Pro Met Asp Tyr Trp Gly Gln
                100                 105                 110

Gly Thr Leu Val Thr Val Ser Ser
            115                 120

<210> SEQ ID NO 293
<211> LENGTH: 107
```

-continued

```
<212> TYPE: PRT
<213> ORGANISM: Artificial Sequence
<220> FEATURE:
<223> OTHER INFORMATION: CG_210_VL

<400> SEQUENCE: 293

Asn Ile Gln Met Thr Gln Ser Pro Ser Ser Leu Ser Ala Ser Val Gly
1               5                   10                  15

Asp Arg Val Thr Ile Thr Cys Gln Ala Ser Gln Asp Ile His Arg Tyr
            20                  25                  30

Leu Ser Trp Phe Gln Gln Asp Pro Gly Thr Val Pro Gln His Leu Ile
        35                  40                  45

Tyr Arg Glu Ser Arg Phe Val Asp Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 294
<211> LENGTH: 120
<212> TYPE: PRT
<213> ORGANISM: Artificial Sequence
<220> FEATURE:
<223> OTHER INFORMATION: CG_210_VH

<400> SEQUENCE: 294

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Gln Gly Leu Glu Trp Met
        35                  40                  45

Gly Trp Ile Asp Pro Asp Val Gly Ser Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Ala Ser Leu Thr Ala Glu Asp Thr Ala Val Tyr Tyr Cys
                85                  90                  95

Asn Ala Ala Tyr Gly Ser Ser Ser Tyr Pro Met Asp Tyr Trp Gly Gln
            100                 105                 110

Gly Thr Leu Val Thr Val Ser Ser
        115                 120

<210> SEQ ID NO 295
<211> LENGTH: 107
<212> TYPE: PRT
<213> ORGANISM: Artificial Sequence
<220> FEATURE:
<223> OTHER INFORMATION: CG_211_VL

<400> SEQUENCE: 295

Asn Ile Gln Met Thr Gln Ser Pro Ser Ser Leu Ser Ala Ser Val Gly
1               5                   10                  15

Asp Arg Val Thr Ile Thr Cys Gln Ala Ser Gln Asp Ile His Arg Tyr
            20                  25                  30

Leu Ser Trp Phe Gln Gln Asp Pro Gly Thr Val Pro Gln His Leu Ile
```

```
            35                  40                  45
Tyr Arg Glu Ser Arg Phe Val Asp Gly Val Pro Ser Arg Phe Ser Gly
        50                  55                  60
Ser Gly Ser Gly Thr Glu Phe Thr Leu Thr Ile Ser Ser Leu Gln Pro
65                  70                  75                  80
Glu Asp Phe Ala Thr Tyr Tyr Cys Leu Gln Tyr Asp Glu Phe Pro Tyr
                85                  90                  95
Thr Phe Gly Gly Gly Thr Lys Val Glu Ile Lys
            100                 105

<210> SEQ ID NO 296
<211> LENGTH: 120
<212> TYPE: PRT
<213> ORGANISM: Artificial Sequence
<220> FEATURE:
<223> OTHER INFORMATION: CG_211_VH

<400> SEQUENCE: 296

Gln Met Gln Leu Val Gln Ser Gly Ala Glu Val Lys Lys Pro Gly Ser
1               5                   10                  15
Ser Val Lys Val Ser Cys Lys Ala Ser Gly Phe Asn Ile Lys Asp Tyr
            20                  25                  30
Tyr Leu His Trp Val Arg Gln Ala Pro Gly Gln Gly Leu Glu Trp Met
        35                  40                  45
Gly Trp Ile Asp Pro Asp Gln Gly Asp Thr Glu Tyr Ala Gln Lys Phe
    50                  55                  60
Gln Gly Arg Val Thr Ile Thr Arg Asp Arg Ser Thr Ser Thr Ala Tyr
65                  70                  75                  80
Met Glu Leu Ala Ser Leu Thr Ala Glu Asp Thr Ala Val Tyr Tyr Cys
                85                  90                  95
Asn Ala Ala Tyr Gly Ser Ser Tyr Pro Met Asp Tyr Trp Gly Gln
            100                 105                 110
Gly Thr Leu Val Thr Val Ser Ser
        115                 120

<210> SEQ ID NO 297
<211> LENGTH: 107
<212> TYPE: PRT
<213> ORGANISM: Artificial Sequence
<220> FEATURE:
<223> OTHER INFORMATION: CG_212_VL

<400> SEQUENCE: 297

Asn Ile Gln Met Thr Gln Ser Pro Ser Ser Leu Ser Ala Ser Val Gly
1               5                   10                  15
Asp Arg Val Thr Ile Thr Cys Arg Ala Ser Gln Asp Ile His Arg Tyr
            20                  25                  30
Leu Ser Trp Phe Gln Gln Lys Pro Gly Lys Val Pro Lys His Leu Ile
        35                  40                  45
Tyr Arg Glu Ser Arg Phe Val Asp Gly Val Pro Ser Arg Phe Ser Gly
        50                  55                  60
Ser Gly Ser Gly Thr Glu Phe Thr Leu Thr Ile Ser Ser Leu Gln Pro
65                  70                  75                  80
Glu Asp Phe Ala Thr Tyr Tyr Cys Leu Gln Tyr Glu Phe Pro Tyr
                85                  90                  95
Thr Phe Gly Gly Gly Thr Lys Val Glu Ile Lys
            100                 105
```

<210> SEQ ID NO 298
<211> LENGTH: 120
<212> TYPE: PRT
<213> ORGANISM: Artificial Sequence
<220> FEATURE:
<223> OTHER INFORMATION: CG_212_VH

<400> SEQUENCE: 298

```
Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Leu Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
            100                 105                 110

Gly Thr Leu Val Thr Val Ser Ser
        115                 120
```

<210> SEQ ID NO 299
<211> LENGTH: 107
<212> TYPE: PRT
<213> ORGANISM: Artificial Sequence
<220> FEATURE:
<223> OTHER INFORMATION: CG_213_VL

<400> SEQUENCE: 299

```
Asn Ile Gln Met Thr Gln Ser Pro Ser Ser Leu Ser Ala Ser Val Gly
1               5                   10                  15

Asp Arg Val Thr Ile Thr Cys Gln Ala Ser Gln Asp Ile His Arg Tyr
            20                  25                  30

Leu Ser Trp Phe Gln Gln Asp Pro Gly Thr Val Pro Gln His Leu Ile
        35                  40                  45

Tyr Arg Glu Ser Arg Phe Val Asp Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Glu Phe Pro Tyr
                85                  90                  95

Thr Phe Gly Gly Gly Thr Lys Val Glu Ile Lys
            100                 105
```

<210> SEQ ID NO 300
<211> LENGTH: 120
<212> TYPE: PRT
<213> ORGANISM: Artificial Sequence
<220> FEATURE:
<223> OTHER INFORMATION: CG_213_VH

<400> SEQUENCE: 300

```
Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
```

```
            20                  25                  30
Tyr Leu His Trp Val Arg Gln Ala Pro Gly Gln Gly Leu Glu Trp Met
        35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Ala Ser Leu Thr Ala Glu Asp Thr Ala Val Tyr Tyr Cys
                85                  90                  95

Asn Ala Ala Tyr Gly Ser Ser Ser Tyr Pro Met Asp Tyr Trp Gly Gln
            100                 105                 110

Gly Thr Leu Val Thr Val Ser Ser
            115                 120

<210> SEQ ID NO 301
<211> LENGTH: 107
<212> TYPE: PRT
<213> ORGANISM: Artificial Sequence
<220> FEATURE:
<223> OTHER INFORMATION: CG_214_VL

<400> SEQUENCE: 301

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
            20                  25                  30

Leu Ser Trp Phe Gln Gln Lys Pro Gly Lys Val Pro Lys His Leu Ile
        35                  40                  45

Tyr Arg Glu Ser Arg Phe Val Asp Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Ala Glu Phe Pro Tyr
                85                  90                  95

Thr Phe Gly Gly Gly Thr Lys Val Glu Ile Lys
            100                 105

<210> SEQ ID NO 302
<211> LENGTH: 120
<212> TYPE: PRT
<213> ORGANISM: Artificial Sequence
<220> FEATURE:
<223> OTHER INFORMATION: CG_214_VH

<400> SEQUENCE: 302

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Leu Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95
```

Asn Ala Ala Tyr Gly Ser Ser Tyr Pro Met Asp Tyr Trp Gln
            100                 105                 110

Gly Thr Leu Val Thr Val Ser Ser
        115                 120

<210> SEQ ID NO 303
<211> LENGTH: 107
<212> TYPE: PRT
<213> ORGANISM: Artificial Sequence
<220> FEATURE:
<223> OTHER INFORMATION: CG_215_VL

<400> SEQUENCE: 303

Asn Ile Gln Met Thr Gln Ser Pro Ser Ser Leu Ser Ala Ser Val Gly
1               5                   10                  15

Asp Arg Val Thr Ile Thr Cys Gln Ala Ser Gln Asp Ile His Arg Tyr
            20                  25                  30

Leu Ser Trp Phe Gln Gln Asp Pro Gly Thr Val Pro Gln His Leu Ile
        35                  40                  45

Tyr Arg Glu Ser Arg Phe Val Asp Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Ala Glu Phe Pro Tyr
                85                  90                  95

Thr Phe Gly Gly Gly Thr Lys Val Glu Ile Lys
            100                 105

<210> SEQ ID NO 304
<211> LENGTH: 120
<212> TYPE: PRT
<213> ORGANISM: Artificial Sequence
<220> FEATURE:
<223> OTHER INFORMATION: CG_215_VH

<400> SEQUENCE: 304

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Gln Gly Leu Glu Trp Met
        35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Ala Ser Leu Thr Ala Glu Asp Thr Ala Val Tyr Tyr Cys
                85                  90                  95

Asn Ala Ala Tyr Gly Ser Ser Tyr Pro Met Asp Tyr Trp Gly Gln
            100                 105                 110

Gly Thr Leu Val Thr Val Ser Ser
        115                 120

<210> SEQ ID NO 305
<211> LENGTH: 107
<212> TYPE: PRT
<213> ORGANISM: Artificial Sequence
<220> FEATURE:
<223> OTHER INFORMATION: CG_216_VL

```
<400> SEQUENCE: 305

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
            20                  25                  30

Leu Ser Trp Phe Gln Gln Lys Pro Gly Lys Val Pro Lys His Leu Ile
        35                  40                  45

Tyr Arg Ala Asn Arg Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Ala Glu Phe Pro Tyr
                85                  90                  95

Thr Phe Gly Gly Gly Thr Lys Val Glu Ile Lys
            100                 105

<210> SEQ ID NO 306
<211> LENGTH: 120
<212> TYPE: PRT
<213> ORGANISM: Artificial Sequence
<220> FEATURE:
<223> OTHER INFORMATION: CG_216_VH

<400> SEQUENCE: 306

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
            100                 105                 110

Gly Thr Leu Val Thr Val Ser Ser
        115                 120

<210> SEQ ID NO 307
<211> LENGTH: 107
<212> TYPE: PRT
<213> ORGANISM: Artificial Sequence
<220> FEATURE:
<223> OTHER INFORMATION: CG_217_VL

<400> SEQUENCE: 307

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
            20                  25                  30

Leu Ser Trp Phe Gln Gln Lys Pro Gly Lys Val Pro Lys His Leu Ile
        35                  40                  45

Tyr Arg Glu Ser Arg Phe Val Asp Gly Val Pro Ser Arg Phe Ser Gly
    50                  55                  60
```

```
Ser Gly Ser Gly Thr Glu Phe Thr Leu Thr Ile Ser Ser Leu Gln Pro
 65                  70                  75                  80

Glu Asp Phe Ala Thr Tyr Tyr Cys Leu Gln Tyr Asp Glu Phe Pro Tyr
                 85                  90                  95

Thr Phe Gly Gly Gly Thr Lys Val Glu Ile Lys
            100                 105

<210> SEQ ID NO 308
<211> LENGTH: 120
<212> TYPE: PRT
<213> ORGANISM: Artificial Sequence
<220> FEATURE:
<223> OTHER INFORMATION: CG_217_VH

<400> SEQUENCE: 308

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
                20                  25                  30

Tyr Leu His Trp Val Arg Gln Ala Pro Gly Lys Gly Leu Glu Trp Met
            35                  40                  45

Gly Trp Ile Asp Pro Asp Glu Gly Leu Thr Glu Tyr Ala Gln Lys Phe
 50                  55                  60

Gln Gly Arg Val Thr Ile Thr Arg Asp Arg Ser Thr Ser Thr Ala Tyr
 65                  70                  75                  80

Met Glu Leu Arg Ser Leu Arg Ala Glu Asp Thr Ala Val Tyr Tyr Cys
                 85                  90                  95

Asn Ala Ala Tyr Gly Ser Ser Tyr Pro Met Asp Tyr Trp Gly Gln
            100                 105                 110

Gly Thr Leu Val Thr Val Ser Ser
        115                 120

<210> SEQ ID NO 309
<211> LENGTH: 107
<212> TYPE: PRT
<213> ORGANISM: Artificial Sequence
<220> FEATURE:
<223> OTHER INFORMATION: CG_218_VL

<400> SEQUENCE: 309

Asn Ile Gln Met Thr Gln Ser Pro Ser Ser Leu Ser Ala Ser Val Gly
1               5                   10                  15

Asp Arg Val Thr Ile Thr Cys Gln Ala Ser Gln Asp Ile His Arg Tyr
                20                  25                  30

Leu Ser Trp Phe Gln Gln Asp Pro Gly Thr Val Pro Gln His Leu Ile
            35                  40                  45

Tyr Arg Glu Ser Arg Phe Val Asp Gly Val Pro Ser Arg Phe Ser Gly
         50                  55                  60

Ser Gly Ser Gly Thr Glu Phe Thr Leu Thr Ile Ser Ser Leu Gln Pro
 65                  70                  75                  80

Glu Asp Phe Ala Thr Tyr Tyr Cys Leu Gln Tyr Asp Glu Phe Pro Tyr
                 85                  90                  95

Thr Phe Gly Gly Gly Thr Lys Val Glu Ile Lys
            100                 105

<210> SEQ ID NO 310
<211> LENGTH: 120
<212> TYPE: PRT
<213> ORGANISM: Artificial Sequence
```

```
<220> FEATURE:
<223> OTHER INFORMATION: CG_218_VH

<400> SEQUENCE: 310

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Gln Gly Leu Glu Trp Met
        35                  40                  45

Gly Trp Ile Asp Pro Asp Glu Gly Leu Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Ala Ser Leu Thr Ala Glu Asp Thr Ala Val Tyr Tyr Cys
                85                  90                  95

Asn Ala Ala Tyr Gly Ser Ser Ser Tyr Pro Met Asp Tyr Trp Gly Gln
            100                 105                 110

Gly Thr Leu Val Thr Val Ser Ser
        115                 120

<210> SEQ ID NO 311
<211> LENGTH: 107
<212> TYPE: PRT
<213> ORGANISM: Artificial Sequence
<220> FEATURE:
<223> OTHER INFORMATION: CG_219_VL

<400> SEQUENCE: 311

Asn Ile Gln Met Thr Gln Ser Pro Ser Ser Leu Ser Ala Ser Val Gly
1               5                   10                  15

Asp Arg Val Thr Ile Thr Cys Gln Ala Ser Gln Asp Ile His Arg Tyr
            20                  25                  30

Leu Ser Trp Phe Gln Gln Asp Pro Gly Thr Val Pro Gln His Leu Ile
        35                  40                  45

Tyr Arg Glu Ser Arg Phe Val Asp Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 312
<211> LENGTH: 120
<212> TYPE: PRT
<213> ORGANISM: Artificial Sequence
<220> FEATURE:
<223> OTHER INFORMATION: CG_219_VH

<400> SEQUENCE: 312

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Gln Gly Leu Glu Trp Met
        35                  40                  45
```

```
Gly Trp Ile Asp Pro Asp Gln Gly Asp Thr Tyr Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Ala Ser Leu Thr Ala Glu Asp Thr Ala Val Tyr Tyr Cys
                85                  90                  95

Asn Ala Ala Tyr Gly Asp Ser Ser Tyr Pro Met Asp Tyr Trp Gly Gln
                100                 105                 110

Gly Thr Leu Val Thr Val Ser Ser
                115                 120

<210> SEQ ID NO 313
<211> LENGTH: 107
<212> TYPE: PRT
<213> ORGANISM: Artificial Sequence
<220> FEATURE:
<223> OTHER INFORMATION: CG_220_VL

<400> SEQUENCE: 313

Asn Ile Gln Met Thr Gln Ser Pro Ser Ser Leu Ser Ala Ser Val Gly
1               5                   10                  15

Asp Arg Val Thr Ile Thr Cys Gln Ala Ser Gln Asp Ile His Arg Tyr
                20                  25                  30

Leu Ser Trp Phe Gln Gln Asp Pro Gly Thr Val Pro Gln His Leu Ile
            35                  40                  45

Tyr Arg Glu Ser Arg Phe Val Asp Gly Val Pro Ser Arg Phe Ser Gly
        50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
                100                 105

<210> SEQ ID NO 314
<211> LENGTH: 120
<212> TYPE: PRT
<213> ORGANISM: Artificial Sequence
<220> FEATURE:
<223> OTHER INFORMATION: CG_220_VH

<400> SEQUENCE: 314

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
                20                  25                  30

Tyr Leu His Trp Val Arg Gln Ala Pro Gly Gln Gly Leu Glu Trp Met
            35                  40                  45

Gly Trp Ile Asp Pro Asp Gln Gly Asp Thr Val Tyr Ala Gln Lys Phe
        50                  55                  60

Gln Gly Arg Val Thr Ile Thr Arg Asp Arg Ser Thr Ser Thr Ala Tyr
65                  70                  75                  80

Met Glu Leu Ala Ser Leu Thr Ala Glu Asp Thr Ala Val Tyr Tyr Cys
                85                  90                  95

Asn Ala Ala Tyr Gly Glu Ser Ser Tyr Pro Met Asp Tyr Trp Gly Gln
                100                 105                 110

Gly Thr Leu Val Thr Val Ser Ser
                115                 120
```

<210> SEQ ID NO 315
<211> LENGTH: 107
<212> TYPE: PRT
<213> ORGANISM: Artificial Sequence
<220> FEATURE:
<223> OTHER INFORMATION: CG_221_VL

<400> SEQUENCE: 315

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
            20                  25                  30

Leu Ser Trp Phe Gln Gln Lys Pro Gly Lys Val Pro Lys His Leu Ile
        35                  40                  45

Tyr Arg Glu Ser Arg Phe Val Asp Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 316
<211> LENGTH: 120
<212> TYPE: PRT
<213> ORGANISM: Artificial Sequence
<220> FEATURE:
<223> OTHER INFORMATION: CG_221_VH

<400> SEQUENCE: 316

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Tyr Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Asp Ser Ser Tyr Pro Met Asp Tyr Trp Gly Gln
            100                 105                 110

Gly Thr Leu Val Thr Val Ser Ser
        115                 120

<210> SEQ ID NO 317
<211> LENGTH: 107
<212> TYPE: PRT
<213> ORGANISM: Artificial Sequence
<220> FEATURE:
<223> OTHER INFORMATION: 1361 CD47 VL

<400> SEQUENCE: 317

Asn Ile Gln Met Thr Gln Ser Pro Ser Ser Leu Ser Ala Ser Val Gly
1               5                   10                  15

Asp Arg Val Thr Ile Thr Cys Gln Ala Ser Gln Asp Ile His Arg Tyr
            20                  25                  30

Leu Ser Trp Phe Gln Gln Asp Pro Gly Thr Val Pro Gln His Leu Ile
        35                  40                  45

Tyr Arg Glu Ser Arg Phe Val Asp Gly Val Pro Ser Arg Phe Ser Gly
50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
                100                 105

<210> SEQ ID NO 318
<211> LENGTH: 120
<212> TYPE: PRT
<213> ORGANISM: Artificial Sequence
<220> FEATURE:
<223> OTHER INFORMATION: 1361 CD47 VH

<400> SEQUENCE: 318

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Gln Gly Leu Glu Trp Met
        35                  40                  45

Gly Trp Ile Asp Pro Asp Gln Gly Asp Thr Tyr Tyr Ala Gln Lys Phe
50                  55                  60

Gln Gly Arg Val Thr Ile Thr Arg Asp Arg Ser Thr Ser Thr Ala Tyr
65                  70                  75                  80

Met Glu Leu Ala Ser Leu Thr Ala Glu Asp Thr Ala Val Tyr Tyr Cys
                85                  90                  95

Asn Ala Ala Tyr Gly Glu Ser Ser Tyr Pro Met Asp Tyr Trp Gly Gln
                100                 105                 110

Gly Thr Leu Val Thr Val Ser Ser
        115                 120

<210> SEQ ID NO 319
<211> LENGTH: 107
<212> TYPE: PRT
<213> ORGANISM: Artificial Sequence
<220> FEATURE:
<223> OTHER INFORMATION: 1360 CD47 VL

<400> SEQUENCE: 319

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
            20                  25                  30

Leu Ser Trp Phe Gln Gln Lys Pro Gly Lys Val Pro Lys His Leu Ile
        35                  40                  45

Tyr Arg Glu Ser Arg Phe Val Asp Gly Val Pro Ser Arg Phe Ser Gly
50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

```
Thr Phe Gly Gly Gly Thr Lys Val Glu Ile Lys
            100                 105

<210> SEQ ID NO 320
<211> LENGTH: 120
<212> TYPE: PRT
<213> ORGANISM: Artificial Sequence
<220> FEATURE:
<223> OTHER INFORMATION: 1360 CD47 VH

<400> SEQUENCE: 320

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
                20                  25                  30

Tyr Leu His Trp Val Arg Gln Ala Pro Gly Lys Gly Leu Glu Trp Met
            35                  40                  45

Gly Trp Ile Asp Pro Asp Gln Gly Asp Thr Tyr Tyr Ala Gln Lys Phe
        50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Glu Ser Ser Tyr Pro Met Asp Tyr Trp Gly Gln
            100                 105                 110

Gly Thr Leu Val Thr Val Ser Ser
        115                 120

<210> SEQ ID NO 321
<211> LENGTH: 107
<212> TYPE: PRT
<213> ORGANISM: Artificial sequence
<220> FEATURE:
<223> OTHER INFORMATION: 1367 CD47 VL

<400> SEQUENCE: 321

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
                20                  25                  30

Leu Ser Trp Phe Gln Gln Lys Pro Gly Lys Val Pro Lys His Leu Ile
            35                  40                  45

Tyr Arg Ala Asn Arg Leu Val Ser Gly Val Pro Ser Arg Phe Ser Gly
        50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 322
<211> LENGTH: 120
<212> TYPE: PRT
<213> ORGANISM: Artificial Sequence
<220> FEATURE:
<223> OTHER INFORMATION: 1367 CD47 VH

<400> SEQUENCE: 322
```

```
Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
            35                  40                  45

Gly Trp Ile Asp Pro Asp Gln Gly Asp Thr Tyr Tyr Ala Gln Lys Phe
50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
            85                  90                  95

Asn Ala Ala Tyr Gly Glu Ser Ser Tyr Pro Met Asp Tyr Trp Gly Gln
            100                 105                 110

Gly Thr Leu Val Thr Val Ser Ser
            115                 120

<210> SEQ ID NO 323
<211> LENGTH: 106
<212> TYPE: PRT
<213> ORGANISM: Artificial Sequence
<220> FEATURE:
<223> OTHER INFORMATION: CD20 VL

<400> SEQUENCE: 323

Gln Ile Val Leu Ser Gln Ser Pro Ala Ile Leu Ser Ala Ser Pro Gly
1               5                   10                  15

Glu Lys Val Thr Met Thr Cys Arg Ala Ser Ser Ser Val Ser Tyr Ile
            20                  25                  30

His Trp Phe Gln Gln Lys Pro Gly Ser Ser Pro Lys Pro Trp Ile Tyr
            35                  40                  45

Ala Thr Ser Asn Leu Ala Ser Gly Val Pro Val Arg Phe Ser Gly Ser
50                  55                  60

Gly Ser Gly Thr Ser Tyr Ser Leu Thr Ile Ser Arg Val Glu Ala Glu
65                  70                  75                  80

Asp Ala Ala Thr Tyr Tyr Cys Gln Gln Trp Thr Ser Asn Pro Pro Thr
            85                  90                  95

Phe Gly Gly Gly Thr Lys Leu Glu Ile Lys
            100                 105

<210> SEQ ID NO 324
<211> LENGTH: 121
<212> TYPE: PRT
<213> ORGANISM: Artificial Sequence
<220> FEATURE:
<223> OTHER INFORMATION: CD20 VH

<400> SEQUENCE: 324

Gln Val Gln Leu Gln Gln Pro Gly Ala Glu Leu Val Lys Pro Gly Ala
1               5                   10                  15

Ser Val Lys Met Ser Cys Lys Ala Ser Gly Tyr Thr Phe Thr Ser Tyr
            20                  25                  30

Asn Met His Trp Val Lys Gln Thr Pro Gly Arg Gly Leu Glu Trp Ile
            35                  40                  45

Gly Ala Ile Tyr Pro Gly Asn Gly Asp Thr Ser Tyr Asn Gln Lys Phe
50                  55                  60

Lys Gly Lys Ala Thr Leu Thr Ala Asp Lys Ser Ser Ser Thr Ala Tyr
65                  70                  75                  80
```

```
Met Gln Leu Ser Ser Leu Thr Ser Glu Asp Ser Ala Val Tyr Tyr Cys
                85                  90                  95

Ala Arg Ser Thr Tyr Tyr Gly Gly Asp Trp Tyr Phe Asn Val Trp Gly
            100                 105                 110

Ala Gly Thr Thr Val Thr Val Ser Ala
        115                 120

<210> SEQ ID NO 325
<211> LENGTH: 107
<212> TYPE: PRT
<213> ORGANISM: Artificial Sequence
<220> FEATURE:
<223> OTHER INFORMATION: 90002 VL

<400> SEQUENCE: 325

Asn Ile Gln Met Thr Gln Ser Pro Ser Ala Met Ser Ala Ser Val Gly
1               5                   10                  15

Asp Arg Val Thr Ile Thr Cys Lys Ala Ser Gln Asp Ile His Arg Tyr
            20                  25                  30

Leu Ser Trp Phe Gln Gln Lys Pro Gly Lys Val Pro Lys His Leu Ile
        35                  40                  45

Tyr Arg Ala Asn Arg Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys
            100                 105

<210> SEQ ID NO 326
<211> LENGTH: 120
<212> TYPE: PRT
<213> ORGANISM: Artificial Sequence
<220> FEATURE:
<223> OTHER INFORMATION: 90002 VH

<400> SEQUENCE: 326

Gln Met Gln Leu Val Gln Ser Gly Ala Glu Val Lys Lys Thr Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Gln Ala Leu Glu Trp Met
        35                  40                  45

Gly Trp Ile Asp Pro Asp Gln Gly Asp Thr Glu Tyr Ala Gln Lys Phe
    50                  55                  60

Gln Asp Arg Val Thr Ile Thr Arg Asp Arg Ser Met Ser Thr Ala Tyr
65                  70                  75                  80

Met Glu Leu Ser Ser Leu Arg Ser Glu Asp Thr Ala Met Tyr Tyr Cys
                85                  90                  95

Asn Ala Ala Tyr Gly Ser Ser Tyr Pro Met Asp Tyr Trp Gly Gln
            100                 105                 110

Gly Thr Thr Val Thr Val Ser Ser
        115                 120

<210> SEQ ID NO 327
<211> LENGTH: 214
<212> TYPE: PRT
```

-continued

<213> ORGANISM: Artificial Sequence
<220> FEATURE:
<223> OTHER INFORMATION: 90002 WHOLE LC / IgG1

<400> SEQUENCE: 327

```
Asn Ile Gln Met Thr Gln Ser Pro Ser Ala Met Ser Ala Ser Val Gly
1               5                   10                  15

Asp Arg Val Thr Ile Thr Cys Lys Ala Ser Gln Asp Ile His Arg Tyr
            20                  25                  30

Leu Ser Trp Phe Gln Gln Lys Pro Gly Lys Val Pro Lys His Leu Ile
        35                  40                  45

Tyr Arg Ala Asn Arg Leu Val Ser Gly Val Pro Ser Arg Phe Ser Gly
50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210
```

<210> SEQ ID NO 328
<211> LENGTH: 450
<212> TYPE: PRT
<213> ORGANISM: Artificial Sequence
<220> FEATURE:
<223> OTHER INFORMATION: 90002 WHOLE HC / IgG1

<400> SEQUENCE: 328

```
Gln Met Gln Leu Val Gln Ser Gly Ala Glu Val Lys Lys Thr Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Gln Ala Leu Glu Trp Met
        35                  40                  45

Gly Trp Ile Asp Pro Asp Gln Gly Asp Thr Glu Tyr Ala Gln Lys Phe
    50                  55                  60

Gln Asp Arg Val Thr Ile Thr Arg Asp Arg Ser Met Ser Thr Ala Tyr
65                  70                  75                  80

Met Glu Leu Ser Ser Leu Arg Ser Glu Asp Thr Ala Met Tyr Tyr Cys
                85                  90                  95

Asn Ala Ala Tyr Gly Ser Ser Ser Tyr Pro Met Asp Tyr Trp Gly Gln
            100                 105                 110
```

```
Gly Thr Thr Val Thr Val Ser Ser Ala Ser Thr Lys Gly Pro Ser Val
            115                 120                 125

Phe Pro Leu Ala Pro Ser Ser Lys Ser Thr Ser Gly Gly Thr Ala Ala
    130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
                165                 170                 175

Leu Gln Ser Ser Gly Leu Tyr Ser Leu Ser Ser Val Val Thr Val Pro
            180                 185                 190

Ser Ser Ser Leu Gly Thr Gln Thr Tyr Ile Cys Asn Val Asn His Lys
            195                 200                 205

Pro Ser Asn Thr Lys Val Asp Lys Lys Val Glu Pro Lys Ser Cys Asp
    210                 215                 220

Lys Thr His Thr Cys Pro Pro Cys Pro Ala Pro Glu Leu Leu Gly Gly
225                 230                 235                 240

Pro Ser Val Phe Leu Phe Pro Pro Lys Pro Lys Asp Thr Leu Met Ile
                245                 250                 255

Ser Arg Thr Pro Glu Val Thr Cys Val Val Val Asp Val Ser His Glu
            260                 265                 270

Asp Pro Glu Val Lys Phe Asn Trp Tyr Val Asp Gly Val Glu Val His
            275                 280                 285

Asn Ala Lys Thr Lys Pro Arg Glu Glu Gln Tyr Asn Ser Thr Tyr Arg
            290                 295                 300

Val Val Ser Val Leu Thr Val Leu His Gln Asp Trp Leu Asn Gly Lys
305                 310                 315                 320

Glu Tyr Lys Cys Lys Val Ser Asn Lys Ala Leu Pro Ala Pro Ile Glu
                325                 330                 335

Lys Thr Ile Ser Lys Ala Lys Gly Gln Pro Arg Glu Pro Gln Val Tyr
            340                 345                 350

Thr Leu Pro Pro Ser Arg Glu Glu Met Thr Lys Asn Gln Val Ser Leu
            355                 360                 365

Thr Cys Leu Val Lys Gly Phe Tyr Pro Ser Asp Ile Ala Val Glu Trp
370                 375                 380

Glu Ser Asn Gly Gln Pro Glu Asn Asn Tyr Lys Thr Thr Pro Pro Val
385                 390                 395                 400

Leu Asp Ser Asp Gly Ser Phe Phe Leu Tyr Ser Lys Leu Thr Val Asp
                405                 410                 415

Lys Ser Arg Trp Gln Gln Gly Asn Val Phe Ser Cys Ser Val Met His
            420                 425                 430

Glu Ala Leu His Asn His Tyr Thr Gln Lys Ser Leu Ser Leu Ser Pro
            435                 440                 445

Gly Lys
    450

<210> SEQ ID NO 329
<211> LENGTH: 213
<212> TYPE: PRT
<213> ORGANISM: Artificial Sequence
<220> FEATURE:
<223> OTHER INFORMATION: LC - WHOLE RITUXIMAB

<400> SEQUENCE: 329

Gln Ile Val Leu Ser Gln Ser Pro Ala Ile Leu Ser Ala Ser Pro Gly
1               5                   10                  15
```

```
Glu Lys Val Thr Met Thr Cys Arg Ala Ser Ser Ser Val Ser Tyr Ile
             20                  25                  30

His Trp Phe Gln Gln Lys Pro Gly Ser Ser Pro Lys Pro Trp Ile Tyr
             35                  40                  45

Ala Thr Ser Asn Leu Ala Ser Gly Val Pro Val Arg Phe Ser Gly Ser
 50                  55                  60

Gly Ser Gly Thr Ser Tyr Ser Leu Thr Ile Ser Arg Val Glu Ala Glu
 65                  70                  75                  80

Asp Ala Ala Thr Tyr Tyr Cys Gln Gln Trp Thr Ser Asn Pro Pro Thr
                 85                  90                  95

Phe Gly Gly Gly Thr Lys Leu Glu Ile Lys Arg Thr Val Ala Ala Pro
             100                 105                 110

Ser Val Phe Ile Phe Pro Pro Ser Asp Glu Gln Leu Lys Ser Gly Thr
             115                 120                 125

Ala Ser Val Val Cys Leu Leu Asn Asn Phe Tyr Pro Arg Glu Ala Lys
 130                 135                 140

Val Gln Trp Lys Val Asp Asn Ala Leu Gln Ser Gly Asn Ser Gln Glu
145                 150                 155                 160

Ser Val Thr Glu Gln Asp Ser Lys Asp Ser Thr Tyr Ser Leu Ser Ser
                 165                 170                 175

Thr Leu Thr Leu Ser Lys Ala Asp Tyr Glu Lys His Lys Val Tyr Ala
             180                 185                 190

Cys Glu Val Thr His Gln Gly Leu Ser Ser Pro Val Thr Lys Ser Phe
             195                 200                 205

Asn Arg Gly Glu Cys
        210
```

<210> SEQ ID NO 330
<211> LENGTH: 451
<212> TYPE: PRT
<213> ORGANISM: Artificial Sequence
<220> FEATURE:
<223> OTHER INFORMATION: HC - WHOLE RITUXIMAB

<400> SEQUENCE: 330

```
Gln Val Gln Leu Gln Gln Pro Gly Ala Glu Leu Val Lys Pro Gly Ala
 1               5                  10                  15

Ser Val Lys Met Ser Cys Lys Ala Ser Gly Tyr Thr Phe Thr Ser Tyr
             20                  25                  30

Asn Met His Trp Val Lys Gln Thr Pro Gly Arg Gly Leu Glu Trp Ile
             35                  40                  45

Gly Ala Ile Tyr Pro Gly Asn Gly Asp Thr Ser Tyr Asn Gln Lys Phe
 50                  55                  60

Lys Gly Lys Ala Thr Leu Thr Ala Asp Lys Ser Ser Ser Thr Ala Tyr
 65                  70                  75                  80

Met Gln Leu Ser Ser Leu Thr Ser Glu Asp Ser Ala Val Tyr Tyr Cys
                 85                  90                  95

Ala Arg Ser Thr Tyr Tyr Gly Gly Asp Trp Tyr Phe Asn Val Trp Gly
             100                 105                 110

Ala Gly Thr Thr Val Thr Val Ser Ala Ala Ser Thr Lys Gly Pro Ser
             115                 120                 125

Val Phe Pro Leu Ala Pro Ser Ser Lys Ser Thr Ser Gly Gly Thr Ala
 130                 135                 140

Ala Leu Gly Cys Leu Val Lys Asp Tyr Phe Pro Glu Pro Val Thr Val
145                 150                 155                 160
```

-continued

Ser Trp Asn Ser Gly Ala Leu Thr Ser Gly Val His Thr Phe Pro Ala
                165                 170                 175

Val Leu Gln Ser Ser Gly Leu Tyr Ser Leu Ser Ser Val Val Thr Val
            180                 185                 190

Pro Ser Ser Ser Leu Gly Thr Gln Thr Tyr Ile Cys Asn Val Asn His
        195                 200                 205

Lys Pro Ser Asn Thr Lys Val Asp Lys Val Glu Pro Lys Ser Cys
    210                 215                 220

Asp Lys Thr His Thr Cys Pro Pro Cys Pro Ala Pro Glu Leu Leu Gly
225                 230                 235                 240

Gly Pro Ser Val Phe Leu Phe Pro Pro Lys Pro Lys Asp Thr Leu Met
                245                 250                 255

Ile Ser Arg Thr Pro Glu Val Thr Cys Val Val Val Asp Val Ser His
            260                 265                 270

Glu Asp Pro Glu Val Lys Phe Asn Trp Tyr Val Asp Gly Val Glu Val
        275                 280                 285

His Asn Ala Lys Thr Lys Pro Arg Glu Glu Gln Tyr Asn Ser Thr Tyr
    290                 295                 300

Arg Val Val Ser Val Leu Thr Val Leu His Gln Asp Trp Leu Asn Gly
305                 310                 315                 320

Lys Glu Tyr Lys Cys Lys Val Ser Asn Lys Ala Leu Pro Ala Pro Ile
                325                 330                 335

Glu Lys Thr Ile Ser Lys Ala Lys Gly Gln Pro Arg Glu Pro Gln Val
            340                 345                 350

Tyr Thr Leu Pro Pro Ser Arg Glu Glu Met Thr Lys Asn Gln Val Ser
        355                 360                 365

Leu Thr Cys Leu Val Lys Gly Phe Tyr Pro Ser Asp Ile Ala Val Glu
370                 375                 380

Trp Glu Ser Asn Gly Gln Pro Glu Asn Asn Tyr Lys Thr Thr Pro Pro
385                 390                 395                 400

Val Leu Asp Ser Asp Gly Ser Phe Phe Leu Tyr Ser Lys Leu Thr Val
                405                 410                 415

Asp Lys Ser Arg Trp Gln Gln Gly Asn Val Phe Ser Cys Ser Val Met
            420                 425                 430

His Glu Ala Leu His Asn His Tyr Thr Gln Lys Ser Leu Ser Leu Ser
        435                 440                 445

Pro Gly Lys
    450

<210> SEQ ID NO 331
<211> LENGTH: 213
<212> TYPE: PRT
<213> ORGANISM: Artificial Sequence
<220> FEATURE:
<223> OTHER INFORMATION: CD20 WHOLE LC

<400> SEQUENCE: 331

Gln Ile Val Leu Ser Gln Ser Pro Ala Ile Leu Ser Ala Ser Pro Gly
1               5                   10                  15

Glu Lys Val Thr Met Thr Cys Arg Ala Ser Ser Ser Val Ser Tyr Ile
            20                  25                  30

His Trp Phe Gln Gln Lys Pro Gly Ser Ser Pro Lys Pro Trp Ile Tyr
        35                  40                  45

Ala Thr Ser Asn Leu Ala Ser Gly Val Pro Val Arg Phe Ser Gly Ser
    50                  55                  60

```
Gly Ser Gly Thr Ser Tyr Ser Leu Thr Ile Ser Arg Val Glu Ala Glu
 65                  70                  75                  80

Asp Ala Ala Thr Tyr Tyr Cys Gln Gln Trp Thr Ser Asn Pro Pro Thr
                 85                  90                  95

Phe Gly Gly Gly Thr Lys Leu Glu Ile Lys Arg Thr Val Ala Ala Pro
            100                 105                 110

Ser Val Ala Ile Phe Pro Pro Ser Asp Glu Arg Leu Lys Ser Gly Thr
            115                 120                 125

Ala Ser Val Val Cys Val Leu Asn Asn Phe Tyr Pro Arg Glu Ala Lys
            130                 135                 140

Val Gln Trp Lys Val Asp Asn Ala Leu Gln Ser Gly Asn Ser Gln Glu
145                 150                 155                 160

Ser Val Thr Glu Gln Asp Ser Lys Asp Ser Thr Tyr Ser Leu Ser Ser
                165                 170                 175

Arg Leu Thr Leu Ser Lys Ala Asp Tyr Glu Lys His Lys Val Tyr Ala
            180                 185                 190

Cys Glu Val Thr His Gln Gly Leu Ser Ser Pro Val Thr Lys Ser Phe
            195                 200                 205

Asn Arg Gly Glu Cys
            210

<210> SEQ ID NO 332
<211> LENGTH: 451
<212> TYPE: PRT
<213> ORGANISM: Artificial Sequence
<220> FEATURE:
<223> OTHER INFORMATION: CD20 WHOLE HC

<400> SEQUENCE: 332

Gln Val Gln Leu Gln Gln Pro Gly Ala Glu Leu Val Lys Pro Gly Ala
  1               5                  10                  15

Ser Val Lys Met Ser Cys Lys Ala Ser Gly Tyr Thr Phe Thr Ser Tyr
                 20                  25                  30

Asn Met His Trp Val Lys Gln Thr Pro Gly Arg Gly Leu Glu Trp Ile
             35                  40                  45

Gly Ala Ile Tyr Pro Gly Asn Gly Asp Thr Ser Tyr Asn Gln Lys Phe
 50                  55                  60

Lys Gly Lys Ala Thr Leu Thr Ala Asp Lys Ser Ser Ser Thr Ala Tyr
 65                  70                  75                  80

Met Gln Leu Ser Ser Leu Thr Ser Glu Asp Ser Ala Val Tyr Tyr Cys
                 85                  90                  95

Ala Arg Ser Thr Tyr Tyr Gly Gly Asp Trp Tyr Phe Asn Val Trp Gly
            100                 105                 110

Ala Gly Thr Thr Val Thr Val Ser Ala Ala Ser Thr Lys Gly Pro Ser
            115                 120                 125

Val Phe Pro Leu Ala Pro Ser Ser Lys Ser Thr Ser Gly Gly Thr Ala
            130                 135                 140

Trp Leu Gly Cys Glu Val Thr Asp Tyr Phe Pro Glu Pro Val Thr Val
145                 150                 155                 160

Ser Trp Asn Ser Gly Ala Leu Thr Ser Gly Val His Thr Phe Pro Ala
                165                 170                 175

Val Leu Glu Ser Ser Gly Leu Tyr Ser Leu Ser Ser Val Val Thr Val
            180                 185                 190

Pro Ser Ser Ser Leu Gly Thr Gln Thr Tyr Ile Cys Asn Val Asn His
            195                 200                 205
```

Lys Pro Ser Asn Thr Lys Val Asp Lys Lys Val Glu Pro Lys Ser Cys
210                 215                 220

Asp Lys Thr His Thr Cys Pro Pro Cys Pro Ala Pro Glu Leu Leu Gly
225                 230                 235                 240

Gly Pro Ser Val Phe Leu Phe Pro Pro Lys Pro Lys Asp Thr Leu Met
            245                 250                 255

Ile Ser Arg Thr Pro Glu Val Thr Cys Val Val Val Asp Val Ser His
            260                 265                 270

Glu Asp Pro Glu Val Lys Phe Asn Trp Tyr Val Asp Gly Val Glu Val
        275                 280                 285

His Asn Ala Lys Thr Lys Pro Arg Glu Glu Gln Tyr Asn Ser Thr Tyr
290                 295                 300

Arg Val Val Ser Val Leu Thr Val Leu His Gln Asp Trp Leu Asn Gly
305                 310                 315                 320

Lys Glu Tyr Lys Cys Lys Val Ser Asn Lys Ala Leu Pro Ala Pro Ile
                325                 330                 335

Glu Lys Thr Ile Ser Lys Ala Lys Gly Gln Pro Arg Glu Pro Gln Val
            340                 345                 350

Tyr Val Tyr Pro Pro Ser Arg Glu Glu Met Thr Lys Asn Gln Val Ser
        355                 360                 365

Leu Thr Cys Leu Val Lys Gly Phe Tyr Pro Ser Asp Ile Ala Val Glu
    370                 375                 380

Trp Glu Ser Asn Gly Gln Pro Glu Asn Asn Tyr Lys Thr Thr Pro Pro
385                 390                 395                 400

Val Leu Asp Ser Asp Gly Ser Phe Ala Leu Val Ser Lys Leu Thr Val
                405                 410                 415

Asp Lys Ser Arg Trp Gln Gln Gly Asn Val Phe Ser Cys Ser Val Met
            420                 425                 430

His Glu Ala Leu His Asn His Tyr Thr Gln Lys Ser Leu Ser Leu Ser
        435                 440                 445

Pro Gly Lys
    450

<210> SEQ ID NO 333
<211> LENGTH: 214
<212> TYPE: PRT
<213> ORGANISM: Artificial Sequence
<220> FEATURE:
<223> OTHER INFORMATION: 1361 CD47

<400> SEQUENCE: 333

Asn Ile Gln Met Thr Gln Ser Pro Ser Ser Leu Ser Ala Ser Val Gly
1               5                   10                  15

Asp Arg Val Thr Ile Thr Cys Gln Ala Ser Gln Asp Ile His Arg Tyr
            20                  25                  30

Leu Ser Trp Phe Gln Gln Asp Pro Gly Thr Val Pro Gln His Leu Ile
        35                  40                  45

Tyr Arg Glu Ser Arg Phe Val Asp Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys Arg Thr Val Ala Ala
            100                 105                 110

```
Pro Ser Val Phe Ile Phe Pro Pro Ser Asp Glu Glu Leu Lys Ser Gly
            115                 120                 125

Thr Ala Ser Val Val Cys Trp Leu Asn Asn Phe Tyr Pro Arg Glu Ala
        130                 135                 140

Lys Val Gln Trp Lys Val Asp Asn Ala Leu Gln Ser Gly Asn Ser Glu
145                 150                 155                 160

Glu Ser Val Thr Glu Gln Asp Ser Lys Asp Ser Thr Tyr Ser Leu Ser
                165                 170                 175

Ser Thr Leu Glu Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 334
<211> LENGTH: 450
<212> TYPE: PRT
<213> ORGANISM: Artificial Sequence
<220> FEATURE:
<223> OTHER INFORMATION: 1361 CD47 WHOLE HC

<400> SEQUENCE: 334

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Gln Gly Leu Glu Trp Met
        35                  40                  45

Gly Trp Ile Asp Pro Asp Gln Gly Asp Thr Tyr Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Ala Ser Leu Thr Ala Glu Asp Thr Ala Val Tyr Tyr Cys
                85                  90                  95

Asn Ala Ala Tyr Gly Glu Ser Ser Tyr Pro Met Asp Tyr Trp Gly Gln
            100                 105                 110

Gly Thr Leu Val Thr Val Ser Ser Ala Ser Thr Lys Gly Pro Ser Val
        115                 120                 125

Phe Pro Leu Ala Pro Ser Ser Lys Ser Thr Ser Gly Gly Thr Ala Ala
    130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
                165                 170                 175

Leu Lys Ser Ser Gly Leu Tyr Ser Leu Ser Ser Val Val Thr Val Pro
            180                 185                 190

Ser Ser Ser Leu Gly Thr Gln Thr Tyr Ile Cys Asn Val Asn His Lys
        195                 200                 205

Pro Ser Asn Thr Lys Val Asp Lys Lys Val Glu Pro Lys Ser Cys Asp
    210                 215                 220

Lys Thr His Thr Cys Pro Pro Cys Pro Ala Pro Glu Leu Leu Gly Gly
225                 230                 235                 240

Pro Ser Val Phe Leu Phe Pro Pro Lys Pro Lys Asp Thr Leu Met Ile
                245                 250                 255
```

```
Ser Arg Thr Pro Glu Val Thr Cys Val Val Asp Val Ser His Glu
            260                 265                 270

Asp Pro Glu Val Lys Phe Asn Trp Tyr Val Asp Gly Val Glu Val His
            275                 280                 285

Asn Ala Lys Thr Lys Pro Arg Glu Glu Gln Tyr Asn Ser Thr Tyr Arg
            290                 295                 300

Val Val Ser Val Leu Thr Val Leu His Gln Asp Trp Leu Asn Gly Lys
305                 310                 315                 320

Glu Tyr Lys Cys Lys Val Ser Asn Lys Ala Leu Pro Ala Pro Ile Glu
                325                 330                 335

Lys Thr Ile Ser Lys Ala Lys Gly Gln Pro Arg Glu Pro Gln Val Tyr
            340                 345                 350

Val Leu Pro Pro Ser Arg Glu Glu Met Thr Lys Asn Gln Val Ser Leu
            355                 360                 365

Leu Cys Leu Val Lys Gly Phe Tyr Pro Ser Asp Ile Ala Val Glu Trp
370                 375                 380

Glu Ser Asn Gly Gln Pro Glu Asn Asn Tyr Leu Thr Trp Pro Pro Val
385                 390                 395                 400

Leu Asp Ser Asp Gly Ser Phe Phe Leu Tyr Ser Lys Leu Thr Val Asp
                405                 410                 415

Lys Ser Arg Trp Gln Gln Gly Asn Val Phe Ser Cys Ser Val Met His
            420                 425                 430

Glu Ala Leu His Asn His Tyr Thr Gln Lys Ser Leu Ser Leu Ser Pro
                435                 440                 445

Gly Lys
    450

<210> SEQ ID NO 335
<211> LENGTH: 214
<212> TYPE: PRT
<213> ORGANISM: Artificial Sequence
<220> FEATURE:
<223> OTHER INFORMATION: 1360 CD47 WHOLE LC

<400> SEQUENCE: 335

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
            20                  25                  30

Leu Ser Trp Phe Gln Gln Lys Pro Gly Lys Val Pro Lys His Leu Ile
        35                  40                  45

Tyr Arg Glu Ser Arg Phe Val Asp Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
                85                  90                  95

Thr Phe Gly Gly Gly Thr Lys Val Glu Ile Lys Arg Thr Val Ala Ala
            100                 105                 110

Pro Ser Val Phe Ile Phe Pro Pro Ser Asp Glu Glu Leu Lys Ser Gly
        115                 120                 125

Thr Ala Ser Val Val Cys Trp Leu Asn Asn Phe Tyr Pro Arg Glu Ala
    130                 135                 140

Lys Val Gln Trp Lys Val Asp Asn Ala Leu Gln Ser Gly Asn Ser Glu
145                 150                 155                 160
```

-continued

Glu Ser Val Thr Glu Gln Asp Ser Lys Asp Ser Thr Tyr Ser Leu Ser
              165                 170                 175

Ser Thr Leu Glu Leu Ser Lys Ala Asp Tyr Glu Lys His Lys Val Tyr
        180                 185                 190

Ala Cys Glu Val Thr His Gln Gly Leu Ser Ser Pro Val Thr Lys Ser
            195                 200                 205

Phe Asn Arg Gly Glu Cys
        210

<210> SEQ ID NO 336
<211> LENGTH: 450
<212> TYPE: PRT
<213> ORGANISM: Artificial Sequence
<220> FEATURE:
<223> OTHER INFORMATION: 1360 CD47 WHOLE HC

<400> SEQUENCE: 336

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Tyr Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Glu Ser Ser Tyr Pro Met Asp Tyr Trp Gly Gln
            100                 105                 110

Gly Thr Leu Val Thr Val Ser Ser Ala Ser Thr Lys Gly Pro Ser Val
        115                 120                 125

Phe Pro Leu Ala Pro Ser Ser Lys Ser Thr Ser Gly Gly Thr Ala Ala
    130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
                165                 170                 175

Leu Lys Ser Ser Gly Leu Tyr Ser Leu Ser Ser Val Val Thr Val Pro
            180                 185                 190

Ser Ser Ser Leu Gly Thr Gln Thr Tyr Ile Cys Asn Val Asn His Lys
        195                 200                 205

Pro Ser Asn Thr Lys Val Asp Lys Lys Val Glu Pro Lys Ser Cys Asp
    210                 215                 220

Lys Thr His Thr Cys Pro Pro Cys Pro Ala Pro Glu Leu Leu Gly Gly
225                 230                 235                 240

Pro Ser Val Phe Leu Phe Pro Pro Lys Pro Lys Asp Thr Leu Met Ile
                245                 250                 255

Ser Arg Thr Pro Glu Val Thr Cys Val Val Val Asp Val Ser His Glu
            260                 265                 270

Asp Pro Glu Val Lys Phe Asn Trp Tyr Val Asp Gly Val Glu Val His
        275                 280                 285

Asn Ala Lys Thr Lys Pro Arg Glu Glu Gln Tyr Asn Ser Thr Tyr Arg
    290                 295                 300

```
Val Val Ser Val Leu Thr Val Leu His Gln Asp Trp Leu Asn Gly Lys
305                 310                 315                 320

Glu Tyr Lys Cys Lys Val Ser Asn Lys Ala Leu Pro Ala Pro Ile Glu
            325                 330                 335

Lys Thr Ile Ser Lys Ala Lys Gly Gln Pro Arg Glu Pro Gln Val Tyr
            340                 345                 350

Val Leu Pro Pro Ser Arg Glu Glu Met Thr Lys Asn Gln Val Ser Leu
            355                 360                 365

Leu Cys Leu Val Lys Gly Phe Tyr Pro Ser Asp Ile Ala Val Glu Trp
    370                 375                 380

Glu Ser Asn Gly Gln Pro Glu Asn Asn Tyr Leu Thr Trp Pro Pro Val
385                 390                 395                 400

Leu Asp Ser Asp Gly Ser Phe Phe Leu Tyr Ser Lys Leu Thr Val Asp
            405                 410                 415

Lys Ser Arg Trp Gln Gln Gly Asn Val Phe Ser Cys Ser Val Met His
            420                 425                 430

Glu Ala Leu His Asn His Tyr Thr Gln Lys Ser Leu Ser Leu Ser Pro
            435                 440                 445

Gly Lys
    450

<210> SEQ ID NO 337
<211> LENGTH: 214
<212> TYPE: PRT
<213> ORGANISM: Artificial Sequence
<220> FEATURE:
<223> OTHER INFORMATION: 1367 CD47 WHOLE LC

<400> SEQUENCE: 337

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile His Arg Tyr
            20                  25                  30

Leu Ser Trp Phe Gln Gln Lys Pro Gly Lys Val Pro Lys His Leu Ile
        35                  40                  45

Tyr Arg Ala Asn Arg Leu Val Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Glu Phe Pro Tyr
            85                  90                  95

Thr Phe Gly Gly Gly Thr Lys Val Glu Ile Lys Arg Thr Val Ala Ala
            100                 105                 110

Pro Ser Val Phe Ile Phe Pro Pro Ser Asp Glu Gln Leu Lys Ser Gly
            115                 120                 125

Thr Ala Ser Val Val Cys Trp Leu Asn Asn Phe Tyr Pro Arg Glu Ala
    130                 135                 140

Lys Val Gln Trp Lys Val Asp Asn Ala Leu Gln Ser Gly Asn Ser Glu
145                 150                 155                 160

Glu Ser Val Thr Glu Gln Asp Ser Lys Asp Ser Thr Tyr Ser Leu Ser
            165                 170                 175

Ser Thr Leu Glu Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
    195                 200                 205
```

Phe Asn Arg Gly Glu Cys
    210

<210> SEQ ID NO 338
<211> LENGTH: 450
<212> TYPE: PRT
<213> ORGANISM: Artificial Sequence
<220> FEATURE:
<223> OTHER INFORMATION: 1367 CD47 WHOLE HC

<400> SEQUENCE: 338

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Tyr Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Glu Ser Ser Tyr Pro Met Asp Tyr Trp Gly Gln
            100                 105                 110

Gly Thr Leu Val Thr Val Ser Ser Ala Ser Thr Lys Gly Pro Ser Val
        115                 120                 125

Phe Pro Leu Ala Pro Ser Ser Lys Ser Thr Ser Gly Gly Thr Ala Ala
    130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
                165                 170                 175

Leu Lys Ser Ser Gly Leu Tyr Ser Leu Ser Ser Val Val Thr Val Pro
            180                 185                 190

Ser Ser Ser Leu Gly Thr Gln Thr Tyr Ile Cys Asn Val Asn His Lys
        195                 200                 205

Pro Ser Asn Thr Lys Val Asp Lys Lys Val Glu Pro Lys Ser Cys Asp
    210                 215                 220

Lys Thr His Thr Cys Pro Pro Cys Pro Ala Pro Glu Leu Leu Gly Gly
225                 230                 235                 240

Pro Ser Val Phe Leu Phe Pro Pro Lys Pro Lys Asp Thr Leu Met Ile
                245                 250                 255

Ser Arg Thr Pro Glu Val Thr Cys Val Val Val Asp Val Ser His Glu
            260                 265                 270

Asp Pro Glu Val Lys Phe Asn Trp Tyr Val Asp Gly Val Glu Val His
        275                 280                 285

Asn Ala Lys Thr Lys Pro Arg Glu Glu Gln Tyr Asn Ser Thr Tyr Arg
    290                 295                 300

Val Val Ser Val Leu Thr Val Leu His Gln Asp Trp Leu Asn Gly Lys
305                 310                 315                 320

Glu Tyr Lys Cys Lys Val Ser Asn Lys Ala Leu Pro Ala Pro Ile Glu
                325                 330                 335

Lys Thr Ile Ser Lys Ala Lys Gly Gln Pro Arg Glu Pro Gln Val Tyr
            340                 345                 350

Val Leu Pro Pro Ser Arg Glu Glu Met Thr Lys Asn Gln Val Ser Leu
            355                 360                 365

Leu Cys Leu Val Lys Gly Phe Tyr Pro Ser Asp Ile Ala Val Glu Trp
    370                 375                 380

Glu Ser Asn Gly Gln Pro Glu Asn Asn Tyr Leu Thr Trp Pro Pro Val
385                 390                 395                 400

Leu Asp Ser Asp Gly Ser Phe Phe Leu Tyr Ser Lys Leu Thr Val Asp
                405                 410                 415

Lys Ser Arg Trp Gln Gln Gly Asn Val Phe Ser Cys Ser Val Met His
            420                 425                 430

Glu Ala Leu His Asn His Tyr Thr Gln Lys Ser Leu Ser Leu Ser Pro
        435                 440                 445

Gly Lys
    450

<210> SEQ ID NO 339
<211> LENGTH: 107
<212> TYPE: PRT
<213> ORGANISM: Artificial Sequence
<220> FEATURE:
<223> OTHER INFORMATION: anti-CD47 IgG1 LC Constant Region

<400> SEQUENCE: 339

Arg Thr Val Ala Ala Pro Ser Val Phe Ile Phe Pro Pro Ser Asp Glu
1               5                   10                  15

Glu Leu Lys Ser Gly Thr Ala Ser Val Val Cys Trp Leu Asn Asn Phe
            20                  25                  30

Tyr Pro Arg Glu Ala Lys Val Gln Trp Lys Val Asp Asn Ala Leu Gln
        35                  40                  45

Ser Gly Asn Ser Glu Glu Ser Val Thr Glu Gln Asp Ser Lys Asp Ser
    50                  55                  60

Thr Tyr Ser Leu Ser Ser Thr Leu Glu Leu Ser Lys Ala Asp Tyr Glu
65                  70                  75                  80

Lys His Lys Val Tyr Ala Cys Glu Val Thr His Gln Gly Leu Ser Ser
                85                  90                  95

Pro Val Thr Lys Ser Phe Asn Arg Gly Glu Cys
            100                 105

<210> SEQ ID NO 340
<211> LENGTH: 57
<212> TYPE: PRT
<213> ORGANISM: Artificial Sequence
<220> FEATURE:
<223> OTHER INFORMATION: anti-CD47 IgG1 LC Constant Region

<400> SEQUENCE: 340

Glu Leu Lys Ser Gly Thr Ala Ser Val Val Cys Trp Leu Asn Asn Phe
1               5                   10                  15

Tyr Pro Arg Glu Ala Lys Val Gln Trp Lys Val Asp Asn Ala Leu Gln
            20                  25                  30

Ser Gly Asn Ser Glu Glu Ser Val Thr Glu Gln Asp Ser Lys Asp Ser
        35                  40                  45

Thr Tyr Ser Leu Ser Ser Thr Leu Glu
    50                  55

<210> SEQ ID NO 341
<211> LENGTH: 330
<212> TYPE: PRT
<213> ORGANISM: Artificial Sequence
<220> FEATURE:
<223> OTHER INFORMATION: anti-CD47 IgG1 HC Constant Region

<400> SEQUENCE: 341

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Lys Ser Ser Gly Leu Tyr Ser
    50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Lys
                85                  90                  95

Lys Val Glu Pro Lys Ser Cys Asp Lys Thr His Thr Cys Pro Pro Cys
            100                 105                 110

Pro Ala Pro Glu Leu Leu Gly Gly Pro Ser Val Phe Leu Phe Pro Pro
        115                 120                 125

Lys Pro Lys Asp Thr Leu Met Ile Ser Arg Thr Pro Glu Val Thr Cys
130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Pro Ile Glu Lys Thr Ile Ser Lys Ala Lys Gly
    210                 215                 220

Gln Pro Arg Glu Pro Gln Val Tyr Val Leu Pro Pro Ser Arg Glu Glu
225                 230                 235                 240

Met Thr Lys Asn Gln Val Ser Leu Leu Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Leu Thr Trp Pro Pro Val Leu Asp Ser Asp Gly Ser Phe Phe
        275                 280                 285

Leu Tyr Ser Lys Leu Thr Val Asp Lys Ser Arg Trp Gln Gln Gly Asn
    290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
                325                 330

<210> SEQ ID NO 342
<211> LENGTH: 220
<212> TYPE: PRT
<213> ORGANISM: Artificial Sequence
<220> FEATURE:
<223> OTHER INFORMATION: anti-CD47 IgG1 HC Constant Region

<400> SEQUENCE: 342

Lys Ser Ser Gly Leu Tyr Ser Leu Ser Ser Val Val Thr Val Pro Ser

-continued

```
                 1               5                  10                 15
            Ser Ser Leu Gly Thr Gln Thr Tyr Ile Cys Asn Val Asn His Lys Pro
                            20                 25                 30
            Ser Asn Thr Lys Val Asp Lys Lys Val Glu Pro Lys Ser Cys Asp Lys
                            35                 40                 45
            Thr His Thr Cys Pro Pro Cys Pro Ala Pro Glu Leu Leu Gly Gly Pro
                50                      55                 60
            Ser Val Phe Leu Phe Pro Pro Lys Pro Lys Asp Thr Leu Met Ile Ser
             65                      70                 75                 80
            Arg Thr Pro Glu Val Thr Cys Val Val Val Asp Val Ser His Glu Asp
                                85                 90                 95
            Pro Glu Val Lys Phe Asn Trp Tyr Val Asp Gly Val Glu Val His Asn
                            100                105                110
            Ala Lys Thr Lys Pro Arg Glu Glu Gln Tyr Asn Ser Thr Tyr Arg Val
                            115                120                125
            Val Ser Val Leu Thr Val Leu His Gln Asp Trp Leu Asn Gly Lys Glu
                130                135                140
            Tyr Lys Cys Lys Val Ser Asn Lys Ala Leu Pro Ala Pro Ile Glu Lys
            145                150                155                160
            Thr Ile Ser Lys Ala Lys Gly Gln Pro Arg Glu Pro Gln Val Tyr Val
                            165                170                175
            Leu Pro Pro Ser Arg Glu Glu Met Thr Lys Asn Gln Val Ser Leu Leu
                            180                185                190
            Cys Leu Val Lys Gly Phe Tyr Pro Ser Asp Ile Ala Val Glu Trp Glu
                            195                200                205
            Ser Asn Gly Gln Pro Glu Asn Asn Tyr Leu Thr Trp
                210                215                220

<210> SEQ ID NO 343
<211> LENGTH: 107
<212> TYPE: PRT
<213> ORGANISM: Artificial Sequence
<220> FEATURE:
<223> OTHER INFORMATION: anti-CD20 IgG1 LC Constant Region

<400> SEQUENCE: 343

Arg Thr Val Ala Ala Pro Ser Val Ala Ile Phe Pro Pro Ser Asp Glu
            1               5                  10                 15
            Arg Leu Lys Ser Gly Thr Ala Ser Val Val Cys Val Leu Asn Asn Phe
                            20                 25                 30
            Tyr Pro Arg Glu Ala Lys Val Gln Trp Lys Val Asp Asn Ala Leu Gln
                            35                 40                 45
            Ser Gly Asn Ser Gln Glu Ser Val Thr Glu Gln Asp Ser Lys Asp Ser
                50                      55                 60
            Thr Tyr Ser Leu Ser Ser Arg Leu Thr Leu Ser Lys Ala Asp Tyr Glu
             65                     70                  75                 80
            Lys His Lys Val Tyr Ala Cys Glu Val Thr His Gln Gly Leu Ser Ser
                            85                 90                 95
            Pro Val Thr Lys Ser Phe Asn Arg Gly Glu Cys
                            100                105

<210> SEQ ID NO 344
<211> LENGTH: 63
<212> TYPE: PRT
<213> ORGANISM: Artificial Sequence
<220> FEATURE:
<223> OTHER INFORMATION: anti-CD20 IgG1 LC Constant Region
```

<400> SEQUENCE: 344

Ala Ile Phe Pro Pro Ser Asp Glu Arg Leu Lys Ser Gly Thr Ala Ser
1               5                   10                  15

Val Val Cys Val Leu Asn Asn Phe Tyr Pro Arg Glu Ala Lys Val Gln
            20                  25                  30

Trp Lys Val Asp Asn Ala Leu Gln Ser Gly Asn Ser Gln Glu Ser Val
        35                  40                  45

Thr Glu Gln Asp Ser Lys Asp Ser Thr Tyr Ser Leu Ser Ser Arg
    50                  55                  60

<210> SEQ ID NO 345
<211> LENGTH: 330
<212> TYPE: PRT
<213> ORGANISM: Artificial Sequence
<220> FEATURE:
<223> OTHER INFORMATION: anti-CD20 IgG1 HC Constant Region

<400> SEQUENCE: 345

Ala Ser Thr Lys Gly Pro Ser Val Phe Pro Leu Ala Pro Ser Ser Lys
1               5                   10                  15

Ser Thr Ser Gly Gly Thr Ala Trp Leu Gly Cys Glu Val Thr Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Glu Ser Ser Gly Leu Tyr Ser
    50                  55                  60

Leu Ser Ser Val Val Thr Val Pro Ser Ser Leu Gly Thr Gln Thr
65                  70                  75                  80

Tyr Ile Cys Asn Val Asn His Lys Pro Ser Asn Thr Lys Val Asp Lys
                85                  90                  95

Lys Val Glu Pro Lys Ser Cys Asp Lys Thr His Thr Cys Pro Pro Cys
            100                 105                 110

Pro Ala Pro Glu Leu Leu Gly Gly Pro Ser Val Phe Leu Phe Pro Pro
        115                 120                 125

Lys Pro Lys Asp Thr Leu Met Ile Ser Arg Thr Pro Glu Val Thr Cys
    130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Pro Ile Glu Lys Thr Ile Ser Lys Ala Lys Gly
    210                 215                 220

Gln Pro Arg Glu Pro Gln Val Tyr Val Tyr Pro Ser Arg Glu Glu
225                 230                 235                 240

Met Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Ala
        275                 280                 285

Leu Val Ser Lys Leu Thr Val Asp Lys Ser Arg Trp Gln Gln Gly Asn
            290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
                325                 330

<210> SEQ ID NO 346
<211> LENGTH: 267
<212> TYPE: PRT
<213> ORGANISM: Artificial Sequence
<220> FEATURE:
<223> OTHER INFORMATION: Recombinant Sequence

<400> SEQUENCE: 346

Trp Leu Gly Cys Glu Val Thr Asp Tyr Phe Pro Glu Pro Val Thr Val
1               5                   10                  15

Ser Trp Asn Ser Gly Ala Leu Thr Ser Gly Val His Thr Phe Pro Ala
            20                  25                  30

Val Leu Glu Ser Ser Gly Leu Tyr Ser Leu Ser Ser Val Val Thr Val
        35                  40                  45

Pro Ser Ser Ser Leu Gly Thr Gln Thr Tyr Ile Cys Asn Val Asn His
    50                  55                  60

Lys Pro Ser Asn Thr Lys Val Asp Lys Val Glu Pro Lys Ser Cys
65                  70                  75                  80

Asp Lys Thr His Thr Cys Pro Pro Cys Pro Ala Pro Glu Leu Leu Gly
                85                  90                  95

Gly Pro Ser Val Phe Leu Phe Pro Pro Lys Pro Lys Asp Thr Leu Met
            100                 105                 110

Ile Ser Arg Thr Pro Glu Val Thr Cys Val Val Val Asp Val Ser His
        115                 120                 125

Glu Asp Pro Glu Val Lys Phe Asn Trp Tyr Val Asp Gly Val Glu Val
    130                 135                 140

His Asn Ala Lys Thr Lys Pro Arg Glu Glu Gln Tyr Asn Ser Thr Tyr
145                 150                 155                 160

Arg Val Val Ser Val Leu Thr Val Leu His Gln Asp Trp Leu Asn Gly
                165                 170                 175

Lys Glu Tyr Lys Cys Lys Val Ser Asn Lys Ala Leu Pro Ala Pro Ile
            180                 185                 190

Glu Lys Thr Ile Ser Lys Ala Lys Gly Gln Pro Arg Glu Pro Gln Val
        195                 200                 205

Tyr Val Tyr Pro Pro Ser Arg Glu Glu Met Thr Lys Asn Gln Val Ser
    210                 215                 220

Leu Thr Cys Leu Val Lys Gly Phe Tyr Pro Ser Asp Ile Ala Val Glu
225                 230                 235                 240

Trp Glu Ser Asn Gly Gln Pro Glu Asn Asn Tyr Lys Thr Thr Pro Pro
                245                 250                 255

Val Leu Asp Ser Asp Gly Ser Phe Ala Leu Val
            260                 265

<210> SEQ ID NO 347
<211> LENGTH: 11
<212> TYPE: PRT
<213> ORGANISM: Artificial Sequence
<220> FEATURE:
<223> OTHER INFORMATION: 90002 VL CDR1

<400> SEQUENCE: 347

Lys Ala Ser Gln Asp Ile His Arg Tyr Leu Ser
1               5                   10

<210> SEQ ID NO 348
<211> LENGTH: 7
<212> TYPE: PRT
<213> ORGANISM: Artificial Sequence
<220> FEATURE:
<223> OTHER INFORMATION: 90002 VL CDR2

<400> SEQUENCE: 348

Arg Ala Asn Arg Leu Val Ser
1               5

<210> SEQ ID NO 349
<211> LENGTH: 9
<212> TYPE: PRT
<213> ORGANISM: Artificial Sequence
<220> FEATURE:
<223> OTHER INFORMATION: 90002 VL CDR3

<400> SEQUENCE: 349

Leu Gln Tyr Asp Glu Phe Pro Tyr Thr
1               5

<210> SEQ ID NO 350
<211> LENGTH: 5
<212> TYPE: PRT
<213> ORGANISM: Artificial Sequence
<220> FEATURE:
<223> OTHER INFORMATION: 90002 VH CDR1

<400> SEQUENCE: 350

Asp Tyr Tyr Leu His
1               5

<210> SEQ ID NO 351
<211> LENGTH: 17
<212> TYPE: PRT
<213> ORGANISM: Artificial Sequence
<220> FEATURE:
<223> OTHER INFORMATION: 90002 VH CDR2

<400> SEQUENCE: 351

Trp Ile Asp Pro Asp Gln Gly Asp Thr Glu Tyr Ala Gln Lys Phe Gln
1               5                   10                  15
Asp

<210> SEQ ID NO 352
<211> LENGTH: 12
<212> TYPE: PRT
<213> ORGANISM: Artificial Sequence
<220> FEATURE:
<223> OTHER INFORMATION: 90002 VH CDR3

<400> SEQUENCE: 352

Ala Ala Tyr Gly Ser Ser Ser Tyr Pro Met Asp Tyr
1               5                   10

<210> SEQ ID NO 353
<211> LENGTH: 10
<212> TYPE: PRT
<213> ORGANISM: Artificial Sequence
<220> FEATURE:
<223> OTHER INFORMATION: Rituximab CD20 VL CDR1

```
<400> SEQUENCE: 353

Arg Ala Ser Ser Ser Val Ser Tyr Ile His
1               5                   10

<210> SEQ ID NO 354
<211> LENGTH: 7
<212> TYPE: PRT
<213> ORGANISM: Artificial Sequence
<220> FEATURE:
<223> OTHER INFORMATION: Rituximab CD20 VL CDR2

<400> SEQUENCE: 354

Ala Thr Ser Asn Leu Ala Ser
1               5

<210> SEQ ID NO 355
<211> LENGTH: 9
<212> TYPE: PRT
<213> ORGANISM: Artificial Sequence
<220> FEATURE:
<223> OTHER INFORMATION: Rituximab CD20 VL CDR3

<400> SEQUENCE: 355

Gln Gln Trp Thr Ser Asn Pro Pro Thr
1               5

<210> SEQ ID NO 356
<211> LENGTH: 5
<212> TYPE: PRT
<213> ORGANISM: Artificial Sequence
<220> FEATURE:
<223> OTHER INFORMATION: Rituximab CD20 VH CDR1

<400> SEQUENCE: 356

Ser Tyr Asn Met His
1               5

<210> SEQ ID NO 357
<211> LENGTH: 17
<212> TYPE: PRT
<213> ORGANISM: Artificial Sequence
<220> FEATURE:
<223> OTHER INFORMATION: Rituximab CD20 VH CDR2

<400> SEQUENCE: 357

Ala Ile Tyr Pro Gly Asn Gly Asp Thr Ser Tyr Asn Gln Lys Phe Lys
1               5                   10                  15

Gly

<210> SEQ ID NO 358
<211> LENGTH: 12
<212> TYPE: PRT
<213> ORGANISM: Artificial Sequence
<220> FEATURE:
<223> OTHER INFORMATION: Rituximab CD20 VH CDR3

<400> SEQUENCE: 358

Ser Thr Tyr Tyr Gly Gly Asp Trp Tyr Phe Asn Val
1               5                   10

<210> SEQ ID NO 359
<211> LENGTH: 11
<212> TYPE: PRT
<213> ORGANISM: Artificial Sequence
<220> FEATURE:
<223> OTHER INFORMATION: 1361 CD47 VL CDR1
```

<400> SEQUENCE: 359

Gln Ala Ser Gln Asp Ile His Arg Tyr Leu Ser
1               5                   10

<210> SEQ ID NO 360
<211> LENGTH: 7
<212> TYPE: PRT
<213> ORGANISM: Artificial Sequence
<220> FEATURE:
<223> OTHER INFORMATION: 1361CD47 VL CDR2

<400> SEQUENCE: 360

Arg Glu Ser Arg Phe Val Asp
1               5

<210> SEQ ID NO 361
<211> LENGTH: 9
<212> TYPE: PRT
<213> ORGANISM: Artificial Sequence
<220> FEATURE:
<223> OTHER INFORMATION: 1361CD47 VL CDR3

<400> SEQUENCE: 361

Leu Gln Tyr Asp Glu Phe Pro Tyr Thr
1               5

<210> SEQ ID NO 362
<211> LENGTH: 5
<212> TYPE: PRT
<213> ORGANISM: Artificial Sequence
<220> FEATURE:
<223> OTHER INFORMATION: 1361CD47 VH CDR1

<400> SEQUENCE: 362

Asp Tyr Tyr Leu His
1               5

<210> SEQ ID NO 363
<211> LENGTH: 17
<212> TYPE: PRT
<213> ORGANISM: Artificial Sequence
<220> FEATURE:
<223> OTHER INFORMATION: 1361CD47 VH CDR2

<400> SEQUENCE: 363

Trp Ile Asp Pro Asp Gln Gly Asp Thr Tyr Tyr Ala Gln Lys Phe Gln
1               5                   10                  15

Gly

<210> SEQ ID NO 364
<211> LENGTH: 11
<212> TYPE: PRT
<213> ORGANISM: Artificial Sequence
<220> FEATURE:
<223> OTHER INFORMATION: 1361CD47 VH CDR3

<400> SEQUENCE: 364

Ala Tyr Gly Glu Ser Ser Tyr Pro Met Asp Tyr
1               5                   10

<210> SEQ ID NO 365
<211> LENGTH: 11
<212> TYPE: PRT
<213> ORGANISM: Artificial Sequence
<220> FEATURE:

```
<223> OTHER INFORMATION: 1360 CD47 VL CDR1

<400> SEQUENCE: 365

Arg Ala Ser Gln Asp Ile His Arg Tyr Leu Ser
1               5                   10

<210> SEQ ID NO 366
<211> LENGTH: 7
<212> TYPE: PRT
<213> ORGANISM: Artificial Sequence
<220> FEATURE:
<223> OTHER INFORMATION: 1360 CD47 VL CDR2

<400> SEQUENCE: 366

Arg Glu Ser Arg Phe Val Asp
1               5

<210> SEQ ID NO 367
<211> LENGTH: 9
<212> TYPE: PRT
<213> ORGANISM: Artificial Sequence
<220> FEATURE:
<223> OTHER INFORMATION: 1360 CD47 VL CDR3

<400> SEQUENCE: 367

Leu Gln Tyr Asp Glu Phe Pro Tyr Thr
1               5

<210> SEQ ID NO 368
<211> LENGTH: 5
<212> TYPE: PRT
<213> ORGANISM: Artificial Sequence
<220> FEATURE:
<223> OTHER INFORMATION: 1360 CD47 VH CDR1

<400> SEQUENCE: 368

Asp Tyr Tyr Leu His
1               5

<210> SEQ ID NO 369
<211> LENGTH: 17
<212> TYPE: PRT
<213> ORGANISM: Artificial Sequence
<220> FEATURE:
<223> OTHER INFORMATION: 1360 CD47 VH CDR2

<400> SEQUENCE: 369

Trp Ile Asp Pro Asp Gln Gly Asp Thr Tyr Tyr Ala Gln Lys Phe Gln
1               5                   10                  15

Gly

<210> SEQ ID NO 370
<211> LENGTH: 11
<212> TYPE: PRT
<213> ORGANISM: Artificial Sequence
<220> FEATURE:
<223> OTHER INFORMATION: 1360 CD47 VH CDR3

<400> SEQUENCE: 370

Ala Tyr Gly Glu Ser Ser Tyr Pro Met Asp Tyr
1               5                   10

<210> SEQ ID NO 371
<211> LENGTH: 11
<212> TYPE: PRT
<213> ORGANISM: Artificial Sequence
```

```
<220> FEATURE:
<223> OTHER INFORMATION: 1367 CD47 VL CDR1

<400> SEQUENCE: 371

Arg Ala Ser Gln Asp Ile His Arg Tyr Leu Ser
1               5                   10

<210> SEQ ID NO 372
<211> LENGTH: 7
<212> TYPE: PRT
<213> ORGANISM: Artificial Sequence
<220> FEATURE:
<223> OTHER INFORMATION: 1367 CD47 VL CDR2

<400> SEQUENCE: 372

Arg Ala Asn Arg Leu Val Ser
1               5

<210> SEQ ID NO 373
<211> LENGTH: 9
<212> TYPE: PRT
<213> ORGANISM: Artificial Sequence
<220> FEATURE:
<223> OTHER INFORMATION: 1367 CD47 VL CDR3

<400> SEQUENCE: 373

Leu Gln Tyr Asp Glu Phe Pro Tyr Thr
1               5

<210> SEQ ID NO 374
<211> LENGTH: 5
<212> TYPE: PRT
<213> ORGANISM: Artificial Sequence
<220> FEATURE:
<223> OTHER INFORMATION: 1367 CD47 VH CDR1

<400> SEQUENCE: 374

Asp Tyr Tyr Leu His
1               5

<210> SEQ ID NO 375
<211> LENGTH: 17
<212> TYPE: PRT
<213> ORGANISM: Artificial Sequence
<220> FEATURE:
<223> OTHER INFORMATION: 1367 CD47 VH CDR2

<400> SEQUENCE: 375

Trp Ile Asp Pro Asp Gln Gly Asp Thr Tyr Tyr Ala Gln Lys Phe Gln
1               5                   10                  15

Gly

<210> SEQ ID NO 376
<211> LENGTH: 11
<212> TYPE: PRT
<213> ORGANISM: Artificial Sequence
<220> FEATURE:
<223> OTHER INFORMATION: 1367 CD47 VH CDR3

<400> SEQUENCE: 376

Ala Tyr Gly Glu Ser Ser Tyr Pro Met Asp Tyr
1               5                   10

<210> SEQ ID NO 377
<211> LENGTH: 11
<212> TYPE: PRT
```

```
<213> ORGANISM: Artificial Sequence
<220> FEATURE:
<223> OTHER INFORMATION: 1362 CD47 VL CDR1

<400> SEQUENCE: 377

Arg Ala Ser Gln Gly Ile Ser Ser Trp Leu Ala
1               5                   10

<210> SEQ ID NO 378
<211> LENGTH: 7
<212> TYPE: PRT
<213> ORGANISM: Artificial Sequence
<220> FEATURE:
<223> OTHER INFORMATION: 1362 CD47 VL CDR2

<400> SEQUENCE: 378

Ala Ala Ser Val Leu Glu Ser
1               5

<210> SEQ ID NO 379
<211> LENGTH: 9
<212> TYPE: PRT
<213> ORGANISM: Artificial Sequence
<220> FEATURE:
<223> OTHER INFORMATION: 1362 CD47 VL CDR3

<400> SEQUENCE: 379

Gln Gln Ala Asn Ser Phe Pro Tyr Thr
1               5

<210> SEQ ID NO 380
<211> LENGTH: 5
<212> TYPE: PRT
<213> ORGANISM: Artificial Sequence
<220> FEATURE:
<223> OTHER INFORMATION: 1362 CD47 VH CDR1

<400> SEQUENCE: 380

Asn Phe Val Met Ser
1               5

<210> SEQ ID NO 381
<211> LENGTH: 17
<212> TYPE: PRT
<213> ORGANISM: Artificial Sequence
<220> FEATURE:
<223> OTHER INFORMATION: 1362 CD47 VH CDR2

<400> SEQUENCE: 381

Thr Ile Ser Gly Ser Gly Gly Ser Thr Tyr Tyr Ala Asp Ser Val Lys
1               5                   10                  15

Gly

<210> SEQ ID NO 382
<211> LENGTH: 8
<212> TYPE: PRT
<213> ORGANISM: Artificial Sequence
<220> FEATURE:
<223> OTHER INFORMATION: 1362 CD47 VH CDR3

<400> SEQUENCE: 382

His Tyr Ile Leu Arg Tyr Phe Asp
1               5

<210> SEQ ID NO 383
<211> LENGTH: 107
```

-continued

```
<212> TYPE: PRT
<213> ORGANISM: Artificial Sequence
<220> FEATURE:
<223> OTHER INFORMATION: 1362 CD47 VL

<400> SEQUENCE: 383

Asp Ile Gln Met Thr Gln Ser Pro Ser Ser Val Ser Ala Ser Val Gly
1               5                   10                  15

Asp Arg Val Thr Ile Thr Cys Arg Ala Ser Gln Gly Ile Ser Ser Trp
            20                  25                  30

Leu Ala Trp Tyr Gln Gln Lys Pro Gly Lys Ala Pro Lys Leu Leu Ile
        35                  40                  45

Tyr Ala Ala Ser Val Leu Glu Ser Gly Val Pro Ser Arg Phe Ser Gly
50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Ala Asn Ser Phe Pro Tyr
                85                  90                  95

Thr Phe Gly Gln Gly Thr Lys Leu Glu Ile Lys
            100                 105

<210> SEQ ID NO 384
<211> LENGTH: 117
<212> TYPE: PRT
<213> ORGANISM: Artificial Sequence
<220> FEATURE:
<223> OTHER INFORMATION: 1362 CD47 VH

<400> SEQUENCE: 384

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Pro Asn Phe
            20                  25                  30

Val Met Ser Trp Val Arg Gln Ala Pro Gly Lys Gly Leu Glu Trp Val
        35                  40                  45

Ser Thr Ile Ser Gly Ser Gly Gly Ser Thr Tyr Tyr Ala Asp Ser Val
50                  55                  60

Lys Gly Arg Phe Thr Ile Ser Arg Asp Asn Ser Lys Asn Met Leu Tyr
65                  70                  75                  80

Leu Gln Met Asn Ser Leu Arg Ala Glu Asp Thr Ala Val Tyr Tyr Cys
                85                  90                  95

Ala Lys His Tyr Ile Leu Arg Tyr Phe Asp Trp Leu Ala Gly Thr Leu
            100                 105                 110

Val Thr Val Ser Ser
        115

<210> SEQ ID NO 385
<211> LENGTH: 214
<212> TYPE: PRT
<213> ORGANISM: Artificial Sequence
<220> FEATURE:
<223> OTHER INFORMATION: 1362 CD47 WHOLE LC

<400> SEQUENCE: 385

Asp Ile Gln Met Thr Gln Ser Pro Ser Ser Val Ser Ala Ser Val Gly
1               5                   10                  15

Asp Arg Val Thr Ile Thr Cys Arg Ala Ser Gln Gly Ile Ser Ser Trp
            20                  25                  30

Leu Ala Trp Tyr Gln Gln Lys Pro Gly Lys Ala Pro Lys Leu Leu Ile
```

```
               35                  40                  45
Tyr Ala Ala Ser Val Leu Glu Ser Gly Val Pro Ser Arg Phe Ser Gly
 50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Ala Asn Ser Phe Pro Tyr
                 85                  90                  95

Thr Phe Gly Gln Gly Thr Lys Leu Glu Ile Lys Arg Thr Val Ala Ala
                100                 105                 110

Pro Ser Val Phe Ile Phe Pro Pro Ser Asp Glu Gln Leu Lys Ser Gly
            115                 120                 125

Thr Ala Ser Val Val Cys Leu Leu Asn Asn Phe Tyr Pro Arg Glu Ala
        130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Glu Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 386
<211> LENGTH: 447
<212> TYPE: PRT
<213> ORGANISM: Artificial Sequence
<220> FEATURE:
<223> OTHER INFORMATION: 1362 CD47 WHOLE HC

<400> SEQUENCE: 386

Glu Val Gln Leu Leu Glu Ser Gly Gly Gly Leu Val Gln Pro Gly Gly
1               5                  10                  15

Ser Leu Arg Leu Ser Cys Ala Ala Ser Gly Phe Thr Phe Pro Asn Phe
            20                  25                  30

Val Met Ser Trp Val Arg Gln Ala Pro Gly Lys Gly Leu Glu Trp Val
        35                  40                  45

Ser Thr Ile Ser Gly Ser Gly Ser Thr Tyr Tyr Ala Asp Ser Val
 50                  55                  60

Lys Gly Arg Phe Thr Ile Ser Arg Asp Asn Ser Lys Asn Met Leu Tyr
65                  70                  75                  80

Leu Gln Met Asn Ser Leu Arg Ala Glu Asp Thr Ala Val Tyr Tyr Cys
                85                  90                  95

Ala Lys His Tyr Ile Leu Arg Tyr Phe Asp Trp Leu Ala Gly Thr Leu
            100                 105                 110

Val Thr Val Ser Ser Ala Ser Thr Lys Gly Pro Ser Val Phe Pro Leu
        115                 120                 125

Ala Pro Ser Ser Lys Ser Thr Ser Gly Gly Thr Ala Ala Leu Gly Cys
    130                 135                 140

Leu Val Lys Asp Tyr Phe Pro Glu Pro Val Thr Val Ser Trp Asn Ser
145                 150                 155                 160

Gly Ala Leu Thr Ser Gly Val His Thr Phe Pro Ala Val Leu Gln Ser
                165                 170                 175

Ser Gly Leu Tyr Ser Leu Ser Ser Val Val Thr Val Pro Ser Ser Ser
```

```
                180             185             190
Leu Gly Thr Gln Thr Tyr Ile Cys Asn Val Asn His Lys Pro Ser Asn
            195             200             205

Thr Lys Val Asp Lys Val Glu Pro Lys Ser Cys Asp Lys Thr His
    210             215             220

Thr Cys Pro Pro Cys Pro Ala Pro Glu Leu Leu Gly Gly Pro Ser Val
225             230             235             240

Phe Leu Phe Pro Pro Lys Pro Lys Asp Thr Leu Met Ile Ser Arg Thr
            245             250             255

Pro Glu Val Thr Cys Val Val Val Asp Val Ser His Glu Asp Pro Glu
        260             265             270

Val Lys Phe Asn Trp Tyr Val Asp Gly Val Glu Val His Asn Ala Lys
            275             280             285

Thr Lys Pro Arg Glu Glu Gln Tyr Asn Ser Thr Tyr Arg Val Val Ser
        290             295             300

Val Leu Thr Val Leu His Gln Asp Trp Leu Asn Gly Lys Glu Tyr Lys
305             310             315             320

Cys Lys Val Ser Asn Lys Ala Leu Pro Ala Pro Ile Glu Lys Thr Ile
            325             330             335

Ser Lys Ala Lys Gly Gln Pro Arg Glu Pro Gln Val Tyr Val Leu Pro
            340             345             350

Pro Ser Arg Glu Glu Met Thr Lys Asn Gln Val Ser Leu Leu Cys Leu
        355             360             365

Val Lys Gly Phe Tyr Pro Ser Asp Ile Ala Val Glu Trp Glu Ser Asn
370             375             380

Gly Gln Pro Glu Asn Asn Tyr Leu Thr Trp Pro Pro Val Leu Asp Ser
385             390             395             400

Asp Gly Ser Phe Phe Leu Tyr Ser Lys Leu Thr Val Asp Lys Ser Arg
            405             410             415

Trp Gln Gln Gly Asn Val Phe Ser Cys Ser Val Met His Glu Ala Leu
            420             425             430

His Asn His Tyr Thr Gln Lys Ser Leu Ser Leu Ser Pro Gly Lys
            435             440             445

<210> SEQ ID NO 387
<211> LENGTH: 107
<212> TYPE: PRT
<213> ORGANISM: Artificial Sequence
<220> FEATURE:
<223> OTHER INFORMATION: VL

<400> SEQUENCE: 387

Asn Ile Gln Met Thr Gln Ser Pro Ser Ser Leu Ser Ala Ser Val Gly
1               5               10              15

Asp Arg Val Thr Ile Thr Cys Arg Ala Ser Gln Asp Ile His Arg Tyr
            20              25              30

Leu Ser Trp Phe Gln Gln Lys Pro Gly Lys Val Pro Lys His Leu Ile
        35              40              45

Tyr Arg Ala Asn Arg Leu Val Ser Gly Val Pro Ser Arg Phe Ser Gly
    50              55              60

Ser Gly Ser Gly Thr Glu Phe Thr Leu Thr Ile Ser Ser Leu Gln Pro
65              70              75              80

Glu Asp Phe Ala Thr Tyr Tyr Cys Leu Gln Tyr Asp Glu Phe Pro Tyr
            85              90              95

Thr Phe Gly Gly Gly Thr Lys Val Glu Ile Lys
```

-continued

```
<210> SEQ ID NO 388
<211> LENGTH: 120
<212> TYPE: PRT
<213> ORGANISM: Artificial Sequence
<220> FEATURE:
<223> OTHER INFORMATION: VH

<400> SEQUENCE: 388

Gln Met Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Tyr
            20                  25                  30

Tyr Leu His Trp Val Arg Gln Ala Pro Gly Lys Gly Leu Glu Trp Met
        35                  40                  45

Gly Trp Ile Asp Pro Asp Gln Gly Asp Thr Glu Tyr Ala Gln Lys Phe
    50                  55                  60

Gln Gly Arg Val Thr Ile Thr Arg Asp Arg Ser Thr Ser Thr Ala Tyr
65                  70                  75                  80

Met Glu Leu Arg Ser Leu Arg Ala Glu Asp Thr Ala Val Tyr Tyr Cys
                85                  90                  95

Asn Ala Ala Tyr Gly Ser Ser Ser Tyr Pro Met Asp Tyr Trp Gly Gln
            100                 105                 110

Gly Thr Leu Val Thr Val Ser Ser
            115                 120
```